US011087141B2

(12) United States Patent
Bulzacki et al.

(10) Patent No.: US 11,087,141 B2
(45) Date of Patent: *Aug. 10, 2021

(54) SYSTEMS, METHODS AND DEVICES FOR MONITORING BETTING ACTIVITIES

(71) Applicant: ARB LABS INC., Toronto (CA)

(72) Inventors: Adrian Bulzacki, Mississauga (CA); Vlad Cazan, Thornhill (CA); Muhammad Talal Ibrahim, Niagara Falls (CA)

(73) Assignee: ARB LABS INC., Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/530,488

(22) Filed: Aug. 2, 2019

(65) Prior Publication Data

US 2020/0202134 A1    Jun. 25, 2020

Related U.S. Application Data

(63) Continuation of application No. 15/897,075, filed on Feb. 14, 2018, now Pat. No. 10,410,066, which is a
(Continued)

(51) Int. Cl.
*G06K 9/62* (2006.01)
*G06K 9/00* (2006.01)
(Continued)

(52) U.S. Cl.
CPC ...... *G06K 9/00771* (2013.01); *A63F 3/00157* (2013.01); *G06K 9/00496* (2013.01);
(Continued)

(58) Field of Classification Search
CPC .......... G06K 7/10; G06K 7/14; G06K 7/1404; G06K 7/1408; G06K 7/1413; G06K 7/143;
(Continued)

(56) References Cited

U.S. PATENT DOCUMENTS 5,283,422 A * 2/1994 Storch ................ G06K 7/14
235/375
5,546,475 A * 8/1996 Bolle ................. G06K 9/4647
382/190
(Continued)

FOREIGN PATENT DOCUMENTS

WO    2016191856 A1    12/2016

OTHER PUBLICATIONS

Form PTO/SB/08a filed in related U.S. Appl. No. 15/309,102, on Jun. 11, 2018.
(Continued)

*Primary Examiner* — Eric Rush
(74) *Attorney, Agent, or Firm* — Norton Rose Fulbright Canada LLP

(57) ABSTRACT

A platform, device and process for capturing images of the surface of a gaming table and determining the quantity, identity, and arrangement of chips bet at a gaming table. Image data is captured corresponding to the one or more chips positioned in at least one betting area on a gaming surface of the respective gaming table and the data is processed to filter out the background, establish a two dimensional grid of points of interests and corresponding histograms for classifying the one or more chips through identifying a dominant classification of each row in the grid of points of interests.

20 Claims, 87 Drawing Sheets

Related U.S. Application Data continuation-in-part of application No. 15/309,102, filed as application No. PCT/CA2016/050442 on Apr. 15, 2016, now Pat. No. 10,096,206.

(60) Provisional application No. 62/168,395, filed on May 29, 2015, provisional application No. 62/298,154, filed on Feb. 22, 2016.

(51) Int. Cl.
<table>
<tr><td>G07F 17/32</td><td>(2006.01)</td></tr>
<tr><td>G06K 9/44</td><td>(2006.01)</td></tr>
<tr><td>G06K 9/46</td><td>(2006.01)</td></tr>
<tr><td>G06T 7/194</td><td>(2017.01)</td></tr>
<tr><td>G06T 7/60</td><td>(2017.01)</td></tr>
<tr><td>G06T 7/50</td><td>(2017.01)</td></tr>
<tr><td>A63F 3/00</td><td>(2006.01)</td></tr>
<tr><td>G06K 9/32</td><td>(2006.01)</td></tr>
<tr><td>G06K 9/20</td><td>(2006.01)</td></tr>
</table>

(52) U.S. Cl.
CPC ...... *G06K 9/00536* (2013.01); *G06K 9/2027* (2013.01); *G06K 9/2054* (2013.01); *G06K 9/3233* (2013.01); *G06K 9/44* (2013.01); *G06K 9/4604* (2013.01); *G06K 9/4642* (2013.01); *G06K 9/4647* (2013.01); *G06K 9/4652* (2013.01); *G06K 9/4671* (2013.01); *G06K 9/6212* (2013.01); *G06K 9/6256* (2013.01); *G06K 9/6282* (2013.01); *G06K 9/6288* (2013.01); *G06T 7/194* (2017.01); *G06T 7/50* (2017.01); *G06T 7/60* (2013.01); *G07F 17/322* (2013.01); *G07F 17/3211* (2013.01); *G07F 17/3227* (2013.01); *G07F 17/3237* (2013.01); *G07F 17/3239* (2013.01); *G07F 17/3241* (2013.01); *G07F 17/3288* (2013.01); *A63F 2003/00164* (2013.01); *G06K 9/00201* (2013.01)

(58) Field of Classification Search
CPC .. G06K 7/1439; G06K 7/1443; G06K 7/1447; G06K 7/1456; G06K 7/146; G06K 7/1465; G06K 7/1482; G06K 7/1495; G06K 9/00201; G06K 9/00496; G06K 9/00503; G06K 9/0051; G06K 9/00523; G06K 9/00536; G06K 9/00771; G06K 9/00973; G06K 9/03; G06K 9/2027; G06K 9/2054; G06K 9/32; G06K 9/3208; G06K 9/3233; G06K 9/3241; G06K 9/3275; G06K 9/36; G06K 9/44; G06K 9/46; G06K 9/4604; G06K 9/4642; G06K 9/4647; G06K 9/4652; G06K 9/4671; G06K 9/48; G06K 9/481; G06K 9/50; G06K 9/62; G06K 9/6201; G06K 9/6202; G06K 9/6203; G06K 9/6204; G06K 9/6212; G06K 9/6256; G06K 9/6281; G06K 9/6282; G06K 9/6288; G06K 9/6289; G06K 9/629; G06K 9/6298; G06K 9/78; G06K 9/80; G06K 2009/2045; G06K 2009/485; G06T 3/00; G06T 3/0006; G06T 3/0056; G06T 3/40; G06T 3/60; G06T 5/00; G06T 5/001; G06T 5/002; G06T 5/006; G06T 5/50; G06T 7/10; G06T 7/11; G06T 7/12; G06T 7/13; G06T 7/174; G06T 7/194; G06T 7/50; G06T 7/60; G06T 7/62; G06T 7/66; G06T 7/70; G06T 7/90; G07F 17/32; G07F 17/3211; G07F 17/322; G07F 17/3225; G07F 17/3227; G07F 17/3232; G07F 17/3237; G07F 17/3239; G07F 17/3241; G07F 17/3288; A63F 3/00157; A63F 3/00164
USPC ....... 382/100, 103, 136, 155, 159, 160, 162, 382/165, 168, 170, 173, 181, 190, 382/192–196, 199, 205, 209, 224, 226, 382/227, 254, 272, 275, 276, 282, 288, 382/291, 296, 298, 325; 463/25, 26; 700/91; 377/3, 4, 6, 7, 13, 14
See application file for complete search history.

(56) References Cited

U.S. PATENT DOCUMENTS

<table>
<tr><td>5,586,936</td><td>A</td><td></td><td>12/1996</td><td>Bennett</td><td></td></tr>
<tr><td>5,781,647</td><td>A</td><td>*</td><td>7/1998</td><td>Fishbine</td><td>............... G07D 9/04<br>382/100</td></tr>
<tr><td>6,532,297</td><td>B1</td><td>*</td><td>3/2003</td><td>Lindquist</td><td>............... G07D 9/04<br>382/100</td></tr>
<tr><td>6,567,159</td><td>B1</td><td></td><td>5/2003</td><td>Corech</td><td></td></tr>
<tr><td>6,663,490</td><td>B2</td><td>*</td><td>12/2003</td><td>Soltys</td><td>............. G06Q 10/0639<br>463/25</td></tr>
<tr><td>6,848,994</td><td>B1</td><td>*</td><td>2/2005</td><td>Knust</td><td>............... H04N 1/2166<br>348/143</td></tr>
<tr><td>6,901,163</td><td>B1</td><td></td><td>5/2005</td><td>Pearce</td><td></td></tr>
<tr><td>7,559,839</td><td>B2</td><td>*</td><td>7/2009</td><td>Bahar</td><td>................. G07F 17/32<br>273/274</td></tr>
<tr><td>7,719,424</td><td>B2</td><td></td><td>5/2010</td><td>Steil</td><td></td></tr>
<tr><td>8,073,657</td><td>B2</td><td></td><td>12/2011</td><td>Moore</td><td></td></tr>
<tr><td>8,961,298</td><td>B2</td><td></td><td>2/2015</td><td>Czyzewski</td><td></td></tr>
<tr><td>9,269,025</td><td>B1</td><td></td><td>2/2016</td><td>Hsiao</td><td></td></tr>
<tr><td>2002/0042298</td><td>A1</td><td>*</td><td>4/2002</td><td>Soltys</td><td>............. G07F 17/3251<br>463/29</td></tr>
<tr><td>2002/0159651</td><td>A1</td><td>*</td><td>10/2002</td><td>Tener</td><td>................... G06T 5/50<br>382/266</td></tr>
<tr><td>2005/0026680</td><td>A1</td><td>*</td><td>2/2005</td><td>Gururajan</td><td>............... A63F 1/14<br>463/25</td></tr>
<tr><td>2005/0272501</td><td>A1</td><td></td><td>12/2005</td><td>Tran</td><td></td></tr>
<tr><td>2006/0160600</td><td>A1</td><td></td><td>7/2006</td><td>Hill</td><td></td></tr>
<tr><td>2006/0160608</td><td>A1</td><td>*</td><td>7/2006</td><td>Hill</td><td>.............. G07F 17/3293<br>463/25</td></tr>
<tr><td>2007/0015583</td><td>A1</td><td></td><td>1/2007</td><td>Tran</td><td></td></tr>
<tr><td>2007/0057469</td><td>A1</td><td></td><td>3/2007</td><td>Grauzer</td><td></td></tr>
<tr><td>2007/0077987</td><td>A1</td><td></td><td>4/2007</td><td>Gururajan</td><td></td></tr>
<tr><td>2009/0124379</td><td>A1</td><td></td><td>5/2009</td><td>Wells</td><td></td></tr>
<tr><td>2009/0131151</td><td>A1</td><td></td><td>5/2009</td><td>Harris</td><td></td></tr>
<tr><td>2011/0034176</td><td>A1</td><td>*</td><td>2/2011</td><td>Lord</td><td>................... G06K 9/6253<br>382/275</td></tr>
<tr><td>2011/0052049</td><td>A1</td><td>*</td><td>3/2011</td><td>Rajaraman</td><td>......... G06K 9/00496<br>382/165</td></tr>
<tr><td>2011/0069896</td><td>A1</td><td></td><td>3/2011</td><td>Ishiga</td><td></td></tr>
<tr><td>2011/0286628</td><td>A1</td><td>*</td><td>11/2011</td><td>Goncalves</td><td>.......... G06F 16/5838<br>382/103</td></tr>
<tr><td>2012/0108337</td><td>A1</td><td></td><td>5/2012</td><td>Kelly</td><td></td></tr>
<tr><td>2014/0204013</td><td>A1</td><td>*</td><td>7/2014</td><td>O'Prey</td><td>............. G06K 9/00288<br>382/159</td></tr>
<tr><td>2015/0018083</td><td>A1</td><td>*</td><td>1/2015</td><td>Czyzewski</td><td>......... G07F 17/3248<br>463/25</td></tr>
<tr><td>2016/0191856</td><td>A1</td><td></td><td>12/2016</td><td>Huang et al.</td><td></td></tr>
<tr><td>2017/0069159</td><td>A1</td><td></td><td>3/2017</td><td>Vikranth</td><td></td></tr>
<tr><td>2017/0193735</td><td>A1</td><td></td><td>7/2017</td><td>Mandava</td><td></td></tr>
</table>

OTHER PUBLICATIONS

Form PTO/892 filed in related U.S. Appl. No. 15/309,102, on May 30, 2018.
Form PTO/SB/08a filed in related U.S. Appl. No. 15/309,102, on May 30, 2018.
Form PTO/892 filed in related U.S. Appl. No. 15/309,102, on Feb. 7, 2018.
Form PTO/SB/08a filed in related U.S. Appl. No. 15/309,102, on Mar. 20, 2017.

(56) References Cited

OTHER PUBLICATIONS

Form PTO/SB/08a filed in related U.S. Appl. No. 15/309,102, on Jan. 11, 2017; and Form PTO/SB/08a filed in related U.S. Appl. No. 15/309,102, on Nov. 4, 2016.
Form PTO/SB/08a filed in related application No. 15/309,102 on Nov. 4, 2016.
Extended European Search Report issued in European Application No. 19157130.6, dated May 10, 2019.
European Communication and Examination Report issued in European Application No. 19157130.6 dated Mar. 29, 2021.

* cited by examiner

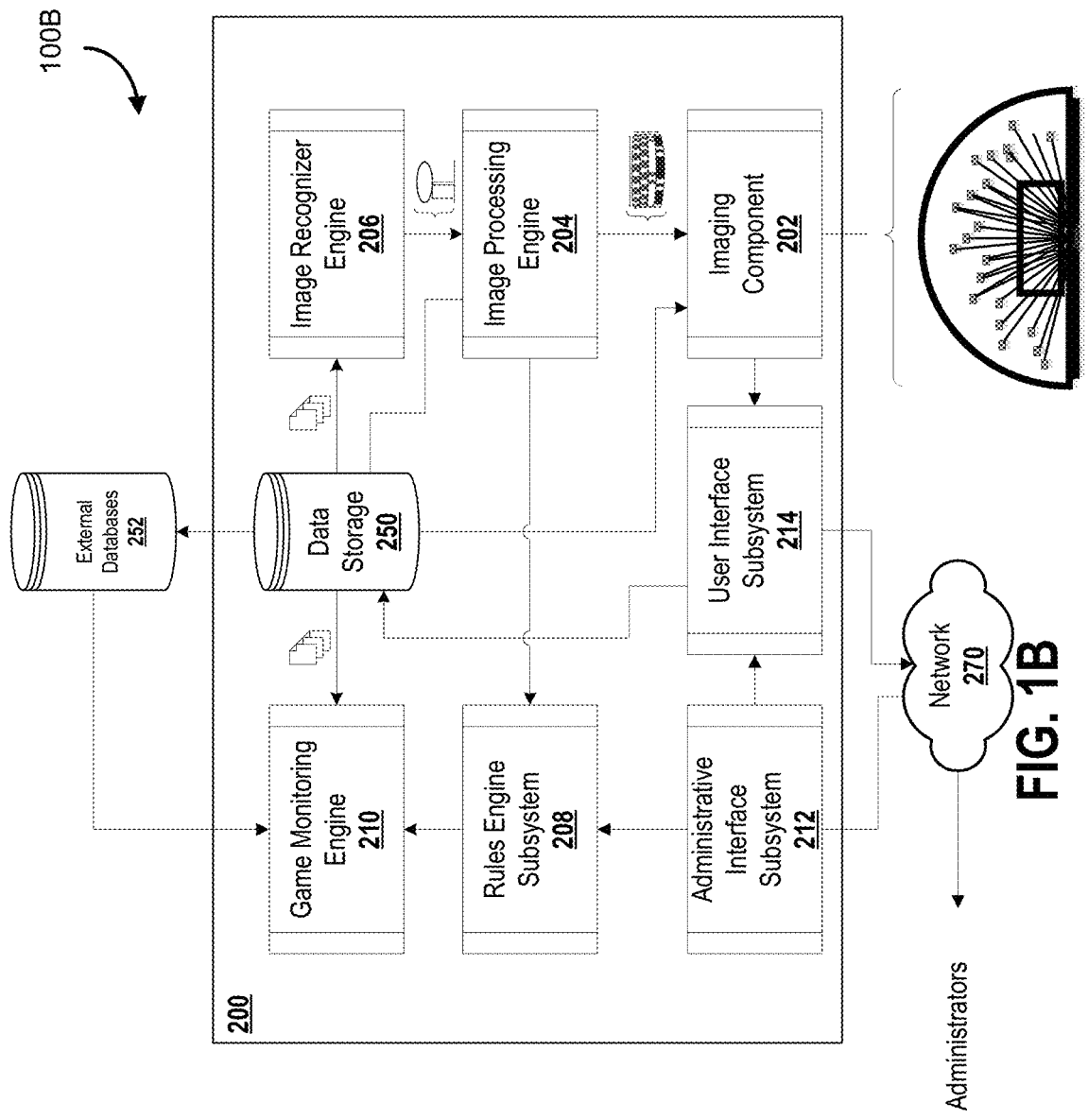
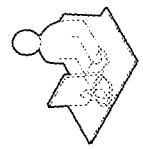
FIG. 1B

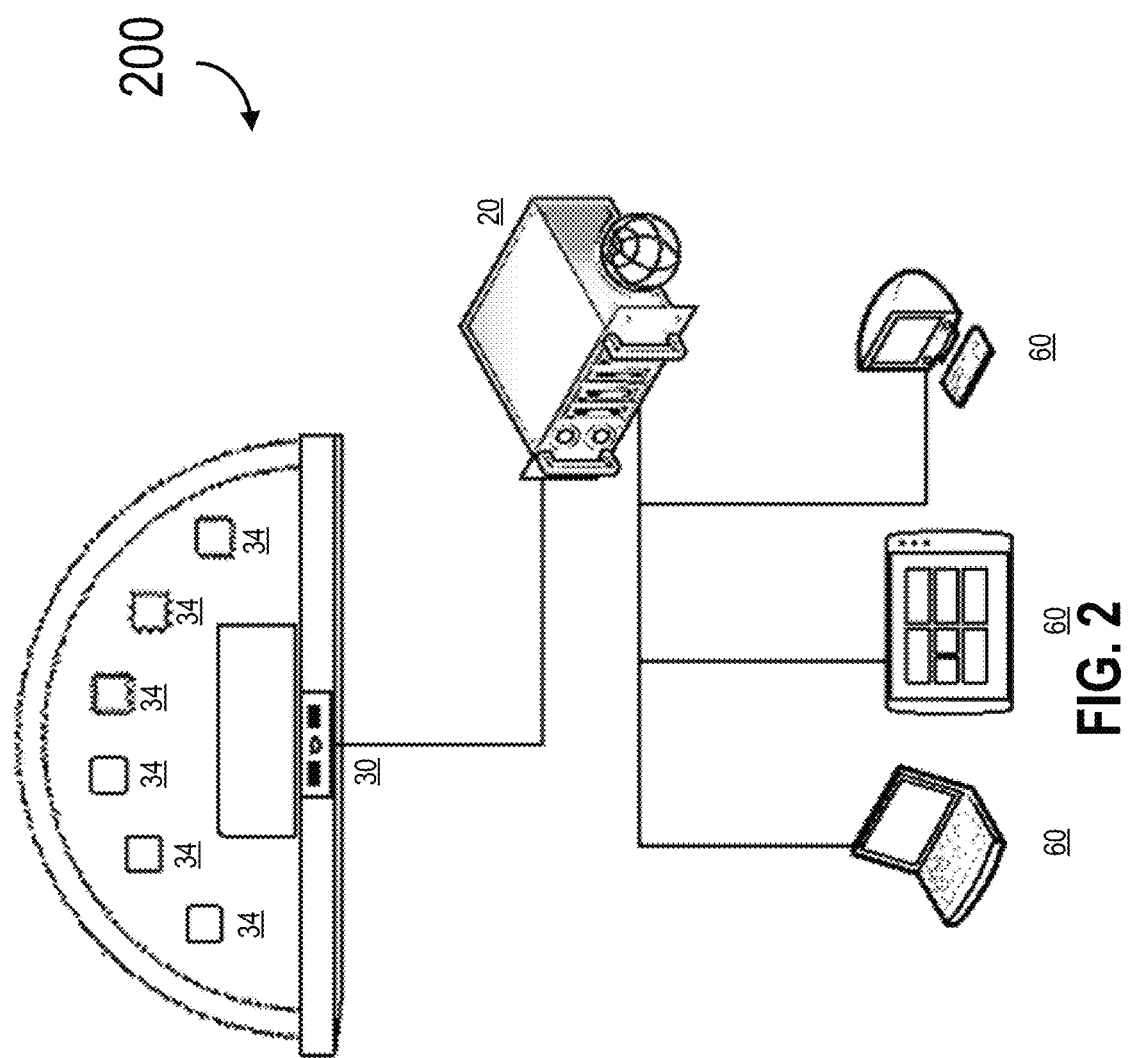

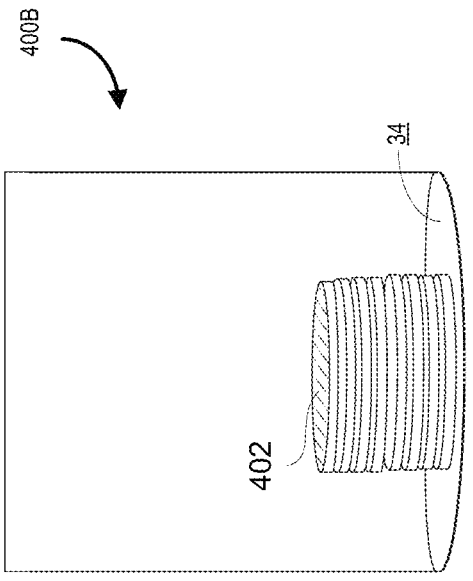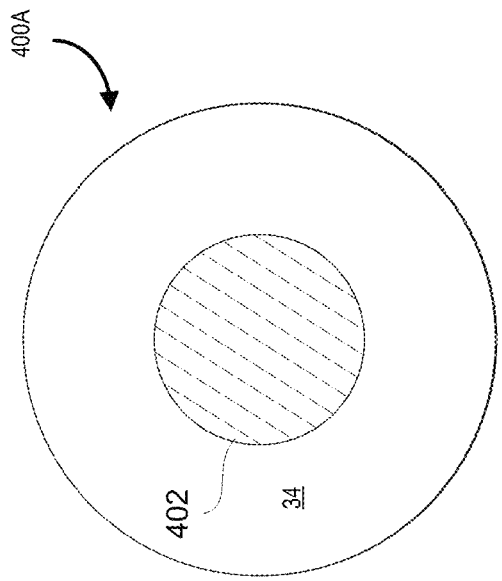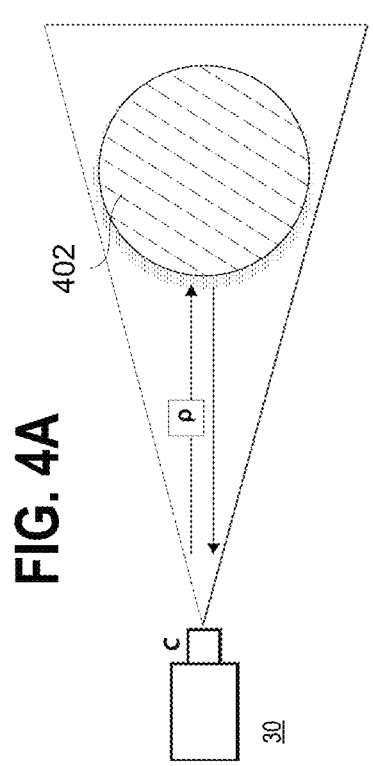
FIG. 4A
FIG. 4B
FIG. 4C

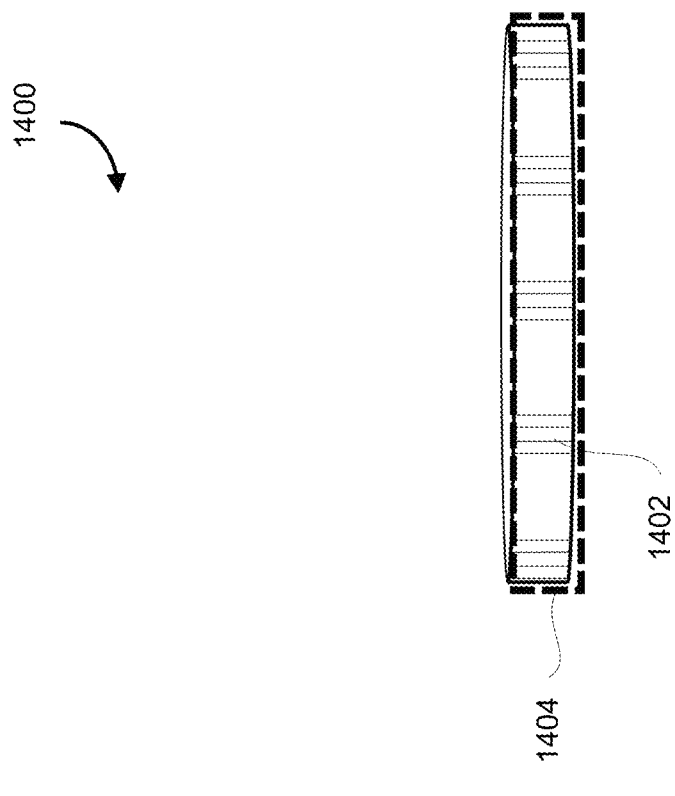
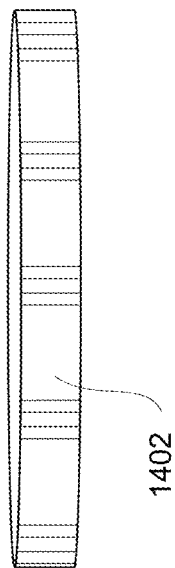
FIG. 14

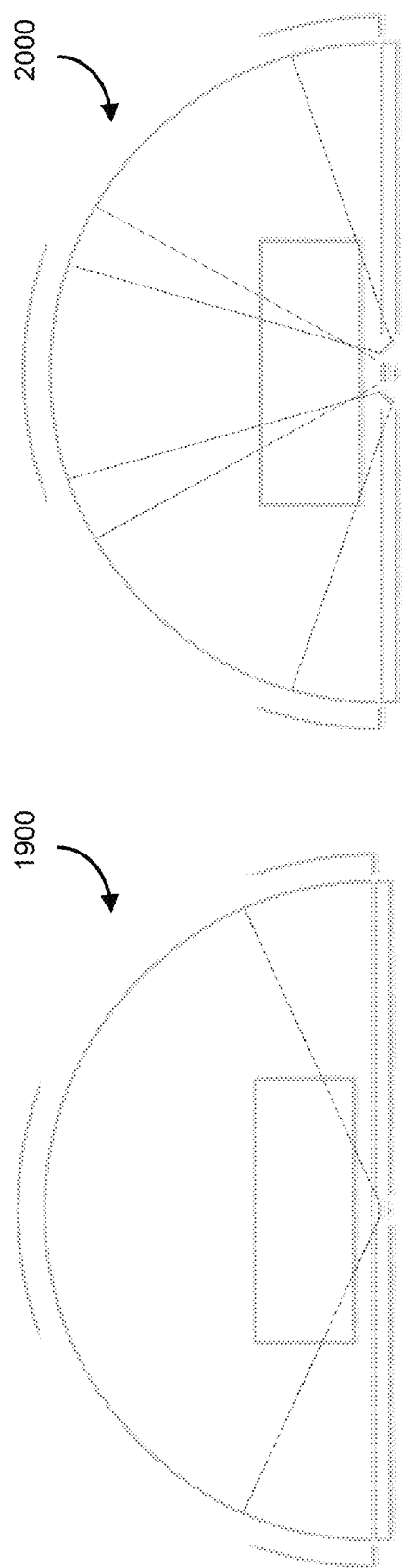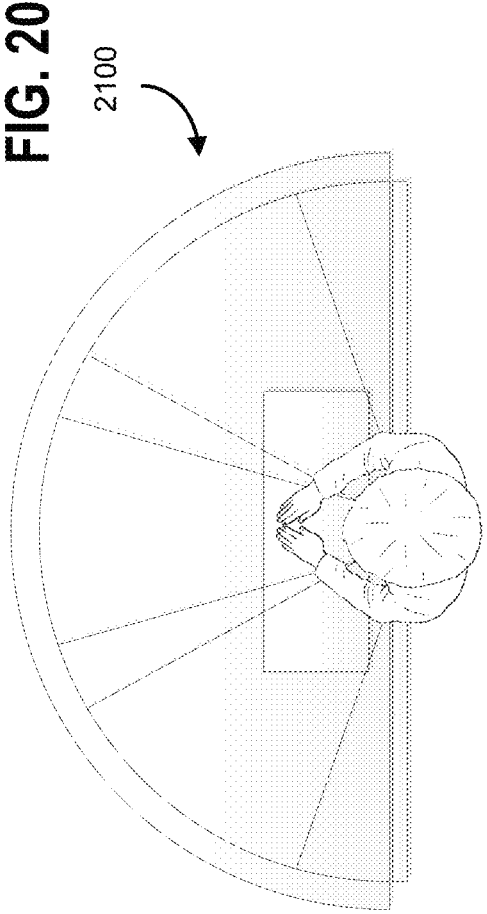
FIG. 19   FIG. 20   FIG. 21

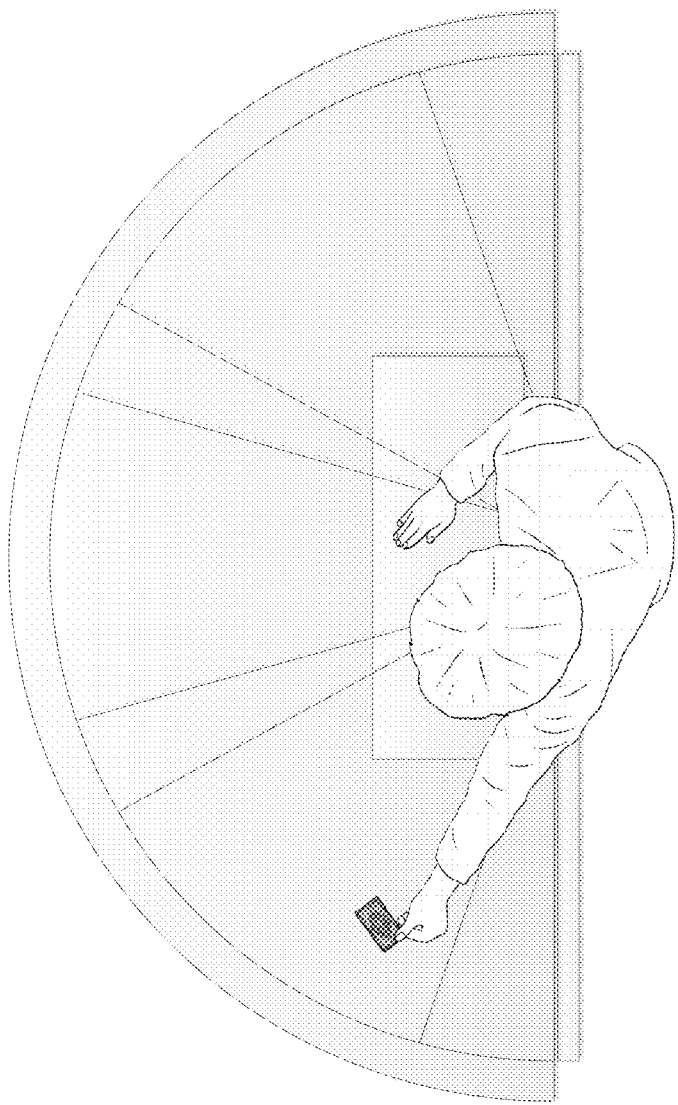

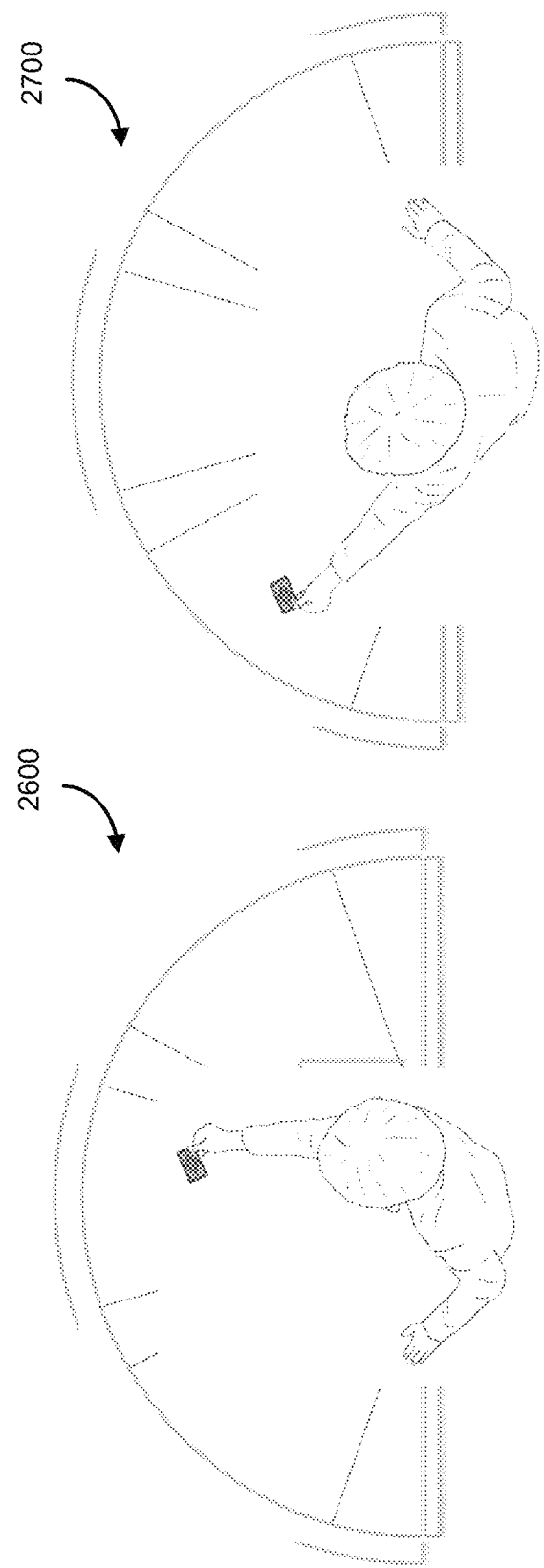

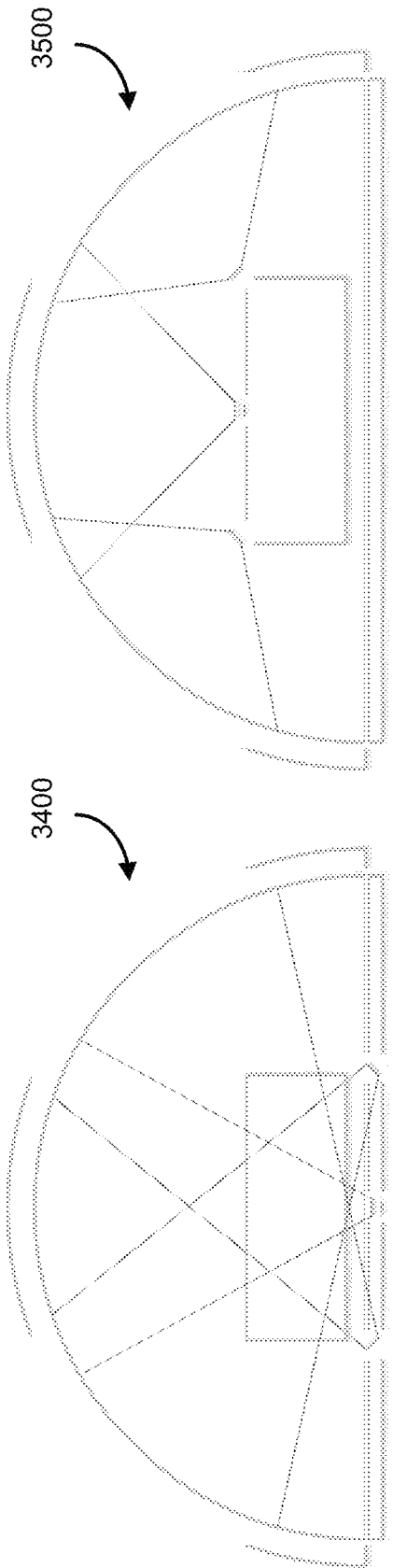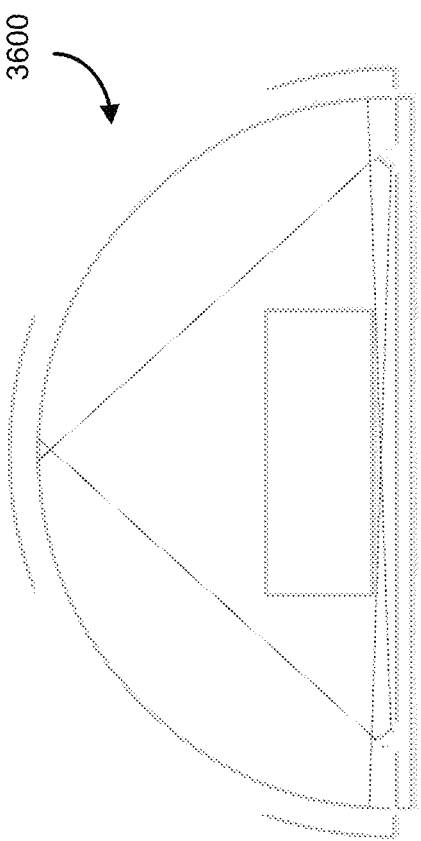

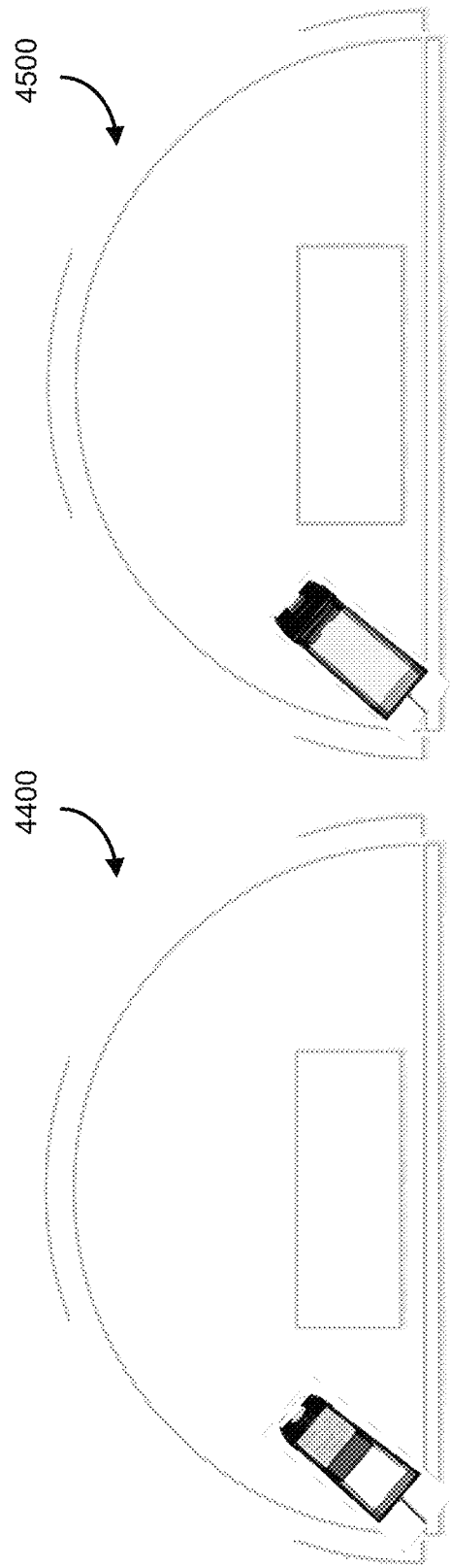

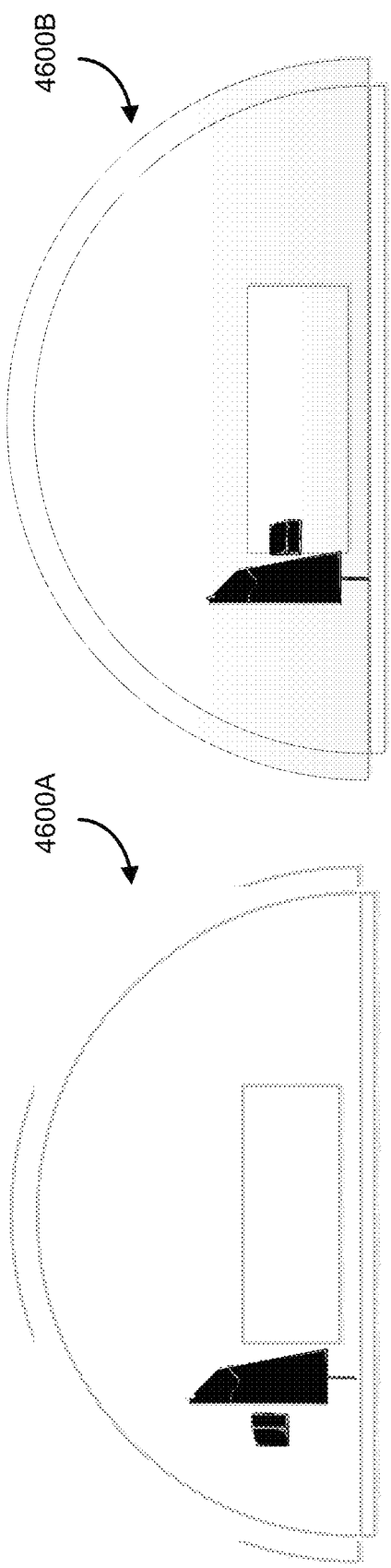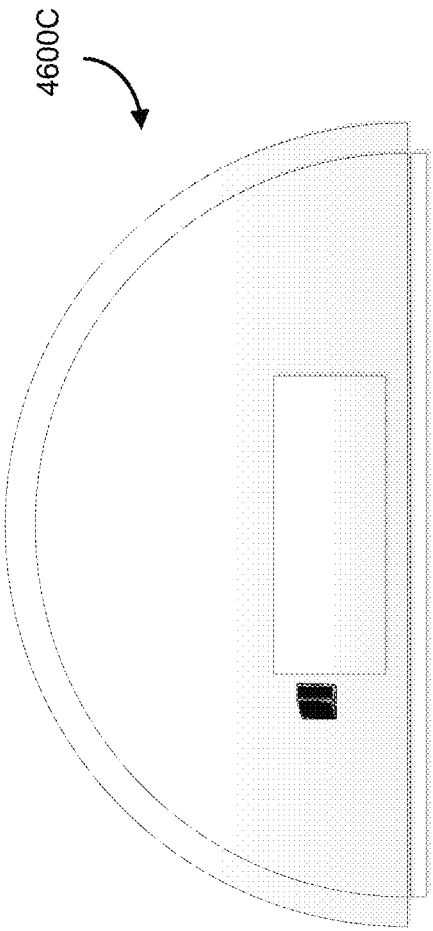
FIG. 46A  FIG. 46B  FIG. 46C

| Class Names | Class Colors | | |
|---|---|---|---|
| '0001-white' | 0 | 0 | 1 |
| '0005-red' | 0 | 0.5 | 1 |
| '0025-green' | 0 | 1 | 1 |
| '0100-black' | 0.5 | 1 | 0.5 |
| '0500-purple' | 1 | 1 | 0 |
| '1000-yellow' | 1 | 0.5 | 0 |
| '5000-pink' | 1 | 0 | 0 |
| 'none' | 1 | 1 | 1 |

FIG. 81

SYSTEMS, METHODS AND DEVICES FOR MONITORING BETTING ACTIVITIES

CROSS-REFERENCE TO RELATED APPLICATIONS

This application is a continuation of U.S. patent application Ser. No. 15/897,075, filed Feb. 14, 2018, which is a continuation-in-part of U.S. patent application Ser. No. 15/309,102 filed Nov. 4, 2016, which is a national phase entry of PCT/CA2016/050442 filed Apr. 15, 2016. This application claims the benefit of and priority to U.S. Provisional Application No. 62/168,395 filed May 29, 2015 and U.S. Provisional Application No. 62/298,154 filed Feb. 22, 2016. The entire contents of each of the above applications are herein incorporated by reference.

FIELD

Embodiments generally relate to the field of monitoring game activities at gaming tables in casinos and other gaming establishments, and in particular, to monitoring game activities including betting activities.

INTRODUCTION

Casinos and gaming establishments may offer a variety of card games to customers. Card games involve various game activities, such as card play and betting, for example. A card game may be played at a gaming table by players, including a dealer and one or more customers. It may be desirable for casinos or gaming establishments to monitor betting activities for security and management purposes.

Gaming establishments are diverse in layouts, lighting, and security measures, among others. For example, betting markers, such as chips, may have varying designs and markings that not only distinguish between chip types (e.g., chip values), but also different series of chips having the same values (e.g., to reduce the risk counterfeiting and/or to enable tracking).

SUMMARY

Embodiments described herein provide a platform, device and process for monitoring game activities at a gaming table. In particular, embodiments described herein provide a platform, device and process for capturing images of the surface of a gaming table and determining the quantity, identity, and arrangement of chips bet at a gaming table.

Embodiments described herein can be used to capture images of the surface of a gaming table, including gambling chips, in response to certain events such as placing a bet. A device included in some embodiments is configured to remove background image data, for example, by distinguishing chips from the background or its surroundings based on their respective depth values. The device is configured to identify points of interest on the chip images, including across the length of a side view of each chip, and classify each point of interest using histogram descriptor derived from various image channels corresponding to the point of interest. The device is configured to then generate a classification for each chip, based on the classified point of interest in a single row. The classification for each chip can be stored as a separate value in a data structure. The device is configured to identify the quantity, type, and arrangement of each chip based on the arrangement and identity of the values in the data structure.

Computation at each stage can be separated logically, temporally, or physically; compartmentalized; and/or performed by separate system components to improve computation time and enable the process to be completed in manageable steps, for example, at times or in sequences optimal for use of computational resources or generating a result.

The device can enable efficient transmission of data relating to betting activity or chip quantification and classification by generating data at each step locally and encoding the relevant data in forms, such as vectors or other data structures, that are more easily transmitted.

Embodiments can also thereby enable efficient transmission, storage, and use of data generated from images captured, which can allow bet monitoring and classification to be accomplished, avoiding a need for transmission of many and large raw images to a separate server.

Embodiments described herein can capture image data across a plurality of channels and can include processors configured to extend one or more of the channels by transforming the image data, for example, to provide additional data for improved processing or classification accuracy. Embodiments can aggregate data from one or more images captured over time to reduce transient effects arising from temporary visual obstructions of an object captured. This can allow betting activities to be monitored even in chaotic gambling situations, with moving participants and placement of objects within the monitored area. Horizontal gradients of the image data and/or transformed image data can be generated to capture vertical texture in the chips and can be used, for example, to extract image data reflecting geophysical edge locations of chips or other objects for improved image recognition.

In accordance with an aspect, there is provided a device for monitoring game activities at a gaming table comprising an imaging component positioned on a gaming table or proximate thereto to capture image data corresponding to the one or more chips positioned in at least one betting area on a gaming surface of the respective gaming table, each imaging component comprising one or more sensors responsive to activation events and deactivation events to trigger capture of the image data by the imaging component, the imaging component positioned to capture images of a gaming surface of the respective gaming table; a processor configured to pre-process the captured image data to filter at least a portion of background image data to generate a compressed set of image data of the one or more chips free of the background image data; the processor further configured to process the compressed set of image data to establish a two-dimensional grid comprising points of interest overlaid over the compressed set of image data, and for each point of interest, classify the point of interest based on an analysis of a corresponding representative histogram descriptor generated based on the image data corresponding to the corresponding point of interest; the processor further configured to identify a dominant classification for each row in the grid of the points of interest, the dominant classification recorded in a data structure to establish a vector representation of the one or more chips in the at least one betting area; the processor further configured to determine one or more quantities of one or more chip types of the one or more chips in the at least one betting area by processing the vector representation based at least on a comparison with physical geometric characteristics of the one or more chip types; and data storage configured to maintain a data structure storing one or more data fields representative of the determined one or more quantities of one or more chip types of the one or more chips in the at least one betting area.

In accordance with an aspect, there is provided a device for monitoring game activities at a gaming table comprising an imaging component positioned on a gaming table or proximate thereto to capture image data corresponding to the one or more chips positioned in at least one betting area on a gaming surface of the respective gaming table, each imaging component positioned to capture images of a gaming surface of the respective gaming table; a processor configured to pre-process the captured image data to filter at least a portion of background image data to generate a compressed set of image data of the one or more chips free of the background image data; the processor further configured to process the compressed set of image data to establish a two-dimensional grid comprising points of interest overlaid over the compressed set of image data, and for each point of interest, classify the point of interest based on an analysis of a corresponding representative histogram generated based on the image data corresponding to the corresponding point of interest; the processor further configured to identify a dominant classification for each row in the grid of the points of interest, the dominant classification recorded in a data structure to establish a vector representation of the one or more chips in the at least one betting area; the processor further configured to determine one or more quantities of one or more chip types of the one or more chips in the at least one betting area by processing the vector representation based at least on a comparison with physical geometric characteristics of the one or more chip types; and data storage configured to maintain a data structure storing one or more data fields representative of the determined one or more quantities of one or more chip types of the one or more chips in the at least one betting area.

In accordance with an aspect, there is provided the device further comprising a communication link configured for transmitting the data structure or a subset of the data structure to generate betting data for the gaming table, the betting data including betting amounts for the at least one betting area.

In accordance with an aspect, there is provided a device wherein the captured image data is captured across a plurality of channels including at least a red channel, a green channel, a blue channel, a depth information channel, and an infrared channel; and wherein each representative histogram is an aggregated histogram generated from combining histograms generated for each channel of the plurality of the channels.

In accordance with an aspect, there is provided a device wherein the processor is configured to extend the plurality of channels by transforming the captured image data from RGB to a different colour space where intensity is decoupled from color information, the transformations yielding additional channels in the plurality of channels.

In accordance with an aspect, there is provided a device wherein the processor is configured to extend the plurality of channels by transforming the captured image data from RGB to a different colour space where luminance is decoupled from chrominance, the transformations yielding additional channels in the plurality of channels.

In accordance with an aspect, there is provided a device wherein horizontal gradients are calculated using a 3×3 Sobel operator in order to capture the vertical texture in the chips.

In accordance with an aspect, there is provided a device wherein horizontal gradients are calculated using a 3×3 Sobel operator in order to capture the vertical texture in the chips based on the R, G, and B channels.

In accordance with an aspect, there is provided a device wherein the 3×3 Sobel operator is used on the R, G, and B channels.

In accordance with an aspect, there is provided a device wherein the captured image data is represented by an aggregated frame corresponding to average image data of image data captured across a duration of time to reduce transient effects arising from temporary visual obstructions of the imaging component.

In accordance with an aspect, there is provided a device wherein the processor is further configured to pre-process the captured image data to apply at least one of rotation and scale invariance.

In accordance with an aspect, there is provided a device wherein the dominant classifications are determined by utilizing a trained random forest classifier; and wherein the trained random forest classifier is optimized during training in relation to at least one of (i) criterion for a decision split, (ii) a number of features for consideration for determining the criterion for the decision split, (iii) a number of trees in the forest, (iv) a minimum number of samples required to split an internal node, (v) a maximum depth of a tree, and (vi) use of bootstrap samples.

In accordance with an aspect, there is provided a device wherein the dominant classifications are determined by utilizing a trained random forest classifier and wherein the trained random forest classifier includes a plurality of classification trees and each representative histogram is classified by a classification identified by a majority of the plurality of the classification trees.

In accordance with an aspect, there is provided a device wherein the dominant classification for each row in the grid of the points of interest is determined by a classification type representing a largest proportion of the points of interest in the row in the grid.

In accordance with an aspect, there is provided a device wherein the determination of the one or more quantities of the one or more chip types of the one or more chips in the at least one betting area includes identifying one or more chip volumes within the vector representation by grouping similar classifications in the vector representation, each chip volume representing a stack of chips having similar classifications; determining a centroid for each chip volume of the one or more chip volumes; identifying a height for each chip volume; and estimating a number of chips in each chip volume by comparing the centroid and the height of each chip volume with the physical geometric characteristics of the one or more chip types, the estimated number of chips in each chip volume utilized to determine the one or more quantities of the one or more chip types.

In various further aspects, the disclosure provides corresponding methods, systems and devices, and logic structures such as machine-executable coded instruction sets for implementing such systems, devices, and methods.

In an aspect, there is provided a system for monitoring game activities at a plurality of gaming tables comprising: a plurality of client hardware devices for the plurality of gaming tables, each client hardware device comprising an imaging component positioned on a respective gaming table or proximate thereto to capture image data corresponding to the one or more chips positioned in a betting area on a gaming surface of the respective gaming table and, in response, pre-processing the captured image data to generate a compressed set of image data free of background image data, each client hardware device comprising one or more sensors responsive to activation events and deactivation events to trigger capture of the image data by the imaging component; a game monitoring server for collecting, processing and aggregating the compressed image data from the client hardware devices to generate aggregated betting data for the plurality of gaming tables; and a front end interface device for displaying the aggregated betting data from the game monitoring server for provision to or display on end user systems, the front end interface device for receiving control commands from the end user systems for controlling the provision or display of the aggregated betting data.

In another aspect, the imaging component is positioned to capture the image data at an offset angle relative to a plane of the gaming surface of the respective gaming table; and wherein the offset angle permits the imaging component to capture the image data from sidewalls of the one or more chips.

In another aspect, the offset angle is an angle selected from the group of angles consisting of about −5 degrees, about −4 degrees, about −3 degrees, about −2 degrees, about −1 degrees, about 0 degrees, about 1 degrees, about 2 degrees, about 3 degrees, about 4 degrees, and about 5 degrees; and the altitude is an altitude selected from the group of altitudes consisting of about 0.2 cm, about 0.3 cm, about 0.4 cm, about 0.5 cm, about 0.6 cm, about 0.7 cm, about 0.8 cm, about 0.9 cm, and about 1.0 cm.

In another aspect, the system further comprises an illumination strip adapted to provide a reference illumination on the one or more chips, the illumination strip positioned at a second substantially horizontal angle to provide illumination on the sidewalls of the one or more chips; the second substantially horizontal angle selected such that the presence of shadows on the one or more chips is reduced.

In another aspect, the illumination strip is controllable by the client hardware devices and configured to provide the reference illumination in accordance with control signals received from the client hardware devices; the control signals, when processed by the illumination strip, cause the illumination strip to change an intensity of the reference illumination based at least on ambient lighting conditions, the control signals adapted to implement a feedback loop wherein the reference illumination on the one or more chips is substantially constant despite changes to the ambient lighting conditions.

In another aspect, the one or more sensors are adapted to determine one or more depth values corresponding to one or more distances from a reference point to the one or more chips, each of the depth values corresponding to the distance to a corresponding chip.

In another aspect, the one or more sensors determine the one or more depth values by using at least one of Doppler radar measurements, parallax measurements, infrared thermography, shadow measurements, light intensity measurements, relative size measurements, and illumination grid measurements.

In another aspect, the one or more sensors include at least two sensors configured to determine the one or more depth values by measuring stereo parallax.

In another aspect, at least one of the client hardware devices and the game monitoring server are configured to determine a presence of one or more obstructing objects that are partially or fully obstructing the one or more chips from being sensed by the one or more sensors, the presence of the one or more obstructing objects being determined by continuously monitoring the one or more depth values to track when the one or more depth values abruptly changes responsive to the obstruction.

In another aspect, at least one of the client hardware devices and the game monitoring server are configured to, responsive to positively determining the presence of the one or more obstructing objects that are partially or fully obstructing the one or more chips from being sensed by the one or more sensors, aggregate a plurality of captured images over a duration of time and to compare differences between each of the plurality of captured images to estimate the presence of the one or more chips despite the presence of the one or more obstructing objects that are partially or fully obstructing the one or more chips from being sensed by the one or more sensors.

In another aspect, the compressed set of image data free of background image data is obtained by using an estimated chip stack height in combination with the more one or more depth values to determine a chip stack bounding box that is used for differentiating between the background image data and chip image data during the pre-processing.

In another aspect, the game monitoring server is configured to process the compressed set of image data free to individually identify one or more specific chips of the one or more chips within the chip stack bounding box represented by the compressed set of image data, each specific chip being identified through a chip bounding box established around the pixels representing the specific chip.

In another aspect, the game monitoring server is configured to identify one or more chip values associated with each of the one or more chips within the chip stack bounding box by estimating a chip value based on machine-vision interpretable features present on the one or more chips.

In another aspect, the game monitoring server is configured to identify the one or more chip values by generating one or more histograms, each of histogram corresponding with image data in the corresponding chip bounding box, by processing the one or more histograms to obtain one or more waveforms, each waveform corresponding to a histogram; and the game monitoring server is configured to perform feature recognition on each waveform to compare each waveform against a library of pre-defined reference waveforms to estimate the one or more chip values through identifying the pre-defined reference waveform that has the greatest similarity to the waveform.

In another aspect, the processing of the one or more histograms to obtain the one or more waveforms includes at least performing a Fourier transformation on the one or more histograms to obtain one or more plots decomposing each histogram into a series of periodic waveforms which in aggregation form the histogram.

In another aspect, the machine-vision interpretable features present on the one or more chips include at least one of size, shape, pattern, and color.

In another aspect, the machine-vision interpretable features present on the one or more chips include at least one of size, shape, pattern, and color and the one or more waveforms differ from one another at least due to the presence of the machine-vision interpretable features.

In another aspect, the activation events and deactivation events comprising placement and removal of the one or more chips within a field of view of the imaging component.

In another aspect, the activation events and deactivation events are triggered by a signal received from an external transmitter, the external transmitter being a transmitting device coupled to a dealer shoe that transmits a signal whenever the dealer shoe is operated.

In another aspect, the system further includes an interface engine adapted to provision an interface providing real or near-real-time betting data to a dealer, the real or near-realtime betting data based on the betting data extracted by the game monitoring server from the captured image data, the betting data including one or more estimated values for each stack of chips in one or more betting areas of the gaming surface.

In another aspect, there is provided a system for monitoring game activities comprising: a game monitoring server for collecting, processing and aggregating betting data from a plurality of client hardware devices to generate aggregated betting data for a plurality of gaming tables, each client hardware device having at least one imaging component positioned substantially parallel to a gaming surface of a respective gaming table and configured to capture image data corresponding to one or more chips positioned on the gaming surface in response to activation events, the betting data derived from the image data; and a front end interface device for displaying the aggregated betting data from the game monitoring server for provision to or display on end user systems, the front end interface device for receiving control commands from the end user systems for controlling the provision or display of the aggregated betting data.

In another aspect, the imaging component is positioned to capture the image data at an offset angle relative to a plane of the gaming surface of the respective gaming table; and wherein the offset angle permits the imaging component to capture the image data from sidewalls of the one or more chips.

In another aspect, there is provided a device for monitoring game activities at a plurality of gaming tables comprising: an imaging component positioned on a respective gaming table or proximate thereto to capture image data corresponding to the one or more chips positioned in a betting area on a gaming surface of the respective gaming table and, in response, pre-processing the captured image data to generate a compressed set of image data free of background image data, each client hardware device comprising one or more sensors responsive to activation events and deactivation events to trigger capture of the image data by the imaging component, the imaging component positioned substantially parallel to a gaming surface of the respective gaming table; a processor configured to pre-process the captured image data to generate a compressed set of image data free of background image data responsive to activation events and deactivation events to trigger collection of betting events; and a communication link configured for transmitting the compressed set of image data to a game monitoring server configured to generate aggregated betting data for the plurality of gaming tables, the generated aggregated betting data being provided to a front end interface device configured for displaying the aggregated betting data from the game monitoring server for provision to or display on end user systems, the front end interface device configured for receiving control commands from the end user systems for controlling the provision or display of the aggregated betting data.

In another aspect, there is provided a method for monitoring betting activities comprising: detecting, by an imaging component, that one or more chips have been placed in one or more defined bet areas on a gaming surface, each chip of the one or more chips having one or more visual identifiers representative of a face value associated with the chip, the one or more chips arranged in one or more stacks of chips; capturing, by the imaging component, image data corresponding to the one or more chips positioned on the gaming surface, the capturing triggered by the detection that the one or more chips have been placed in the one or more defined bet areas; transforming, by an image processing engine, the image data to generate a subset of the image data relating to the one or more stacks of chips, the subset of image data isolating images of the one or more stacks from the image data; recognizing, by an image recognizer engine, the one or more chips composing the one or more stacks, the recognizer engine generating and associating metadata representative of (i) a timestamp corresponding to when the image data was obtained, (ii) one or more estimated position values associated with the one or more chips, and (iii) one or more face values associated with the one or more chips based on the presence of the one or more visual identifiers; segmenting, by the image recognizer engine, the subset of image data and with the metadata representative of the one or more estimated position values with the one or more chips to generate one or more processed image segments, each processed image segment corresponding to a chip of the one or more chips and including metadata indicative of an estimated face value and position; and determining, by a game monitoring engine, one or more bet data values, each bet data value corresponding to a bet area of the one or more defined bet areas, and determined using at least the number of chips visible in each of the one or more bet areas extracted from the processed image segments and the metadata indicative of the face value of the one or more chips.

In another aspect, the method further comprises transmitting, the one or more bet data values corresponding to the one or more defined bet areas, to a gaming data repository, the game data repository configured for associating the one or more bet data values to one or more bets made by one or more players as the one or more players interact with a game being played on the gaming surface; and generating, on a display of a computing device by n interface component, an electronic dashboard illustrative of at least one of current and historical bets made by the one or more players.

In this respect, before explaining at least one embodiment in detail, it is to be understood that the embodiments are not limited in application to the details of construction and to the arrangements of the components set forth in the following description or illustrated in the drawings. Also, it is to be understood that the phraseology and terminology employed herein are for the purpose of description and should not be regarded as limiting.

Many further features and combinations thereof concerning embodiments described herein will appear to those skilled in the art following a reading of the instant disclosure.

DESCRIPTION OF THE FIGURES

In the figures, which depict example embodiments:

FIGS. 1A and 1B illustrate a block diagrams of a system for monitoring betting activities at gaming tables according to some embodiments.

FIG. 2 illustrates a block diagram of another system for monitoring game activities at gaming tables according to some embodiments.

FIGS. 4A-4C illustrates a schematic diagram of bet regions monitored by a bet recognition device according to some embodiments.

FIGS. 13A, 13B and 14 illustrate example images from a bet recognition device and processed images after transformation by server according to some embodiments.

FIGS. 19-23, 24A-24D, 25A-25E, 26 to 39 illustrate schematic diagrams of bet recognition devices with camera layouts according to some embodiments.

FIGS. 44, 45, 46A-46C illustrate schematic diagrams of bet recognition devices with shoe devices according to some embodiments.

FIG. 81 is a diagram of an example mapping between classification names and colour representations according to some embodiments.

DETAILED DESCRIPTION

Figure 1A:
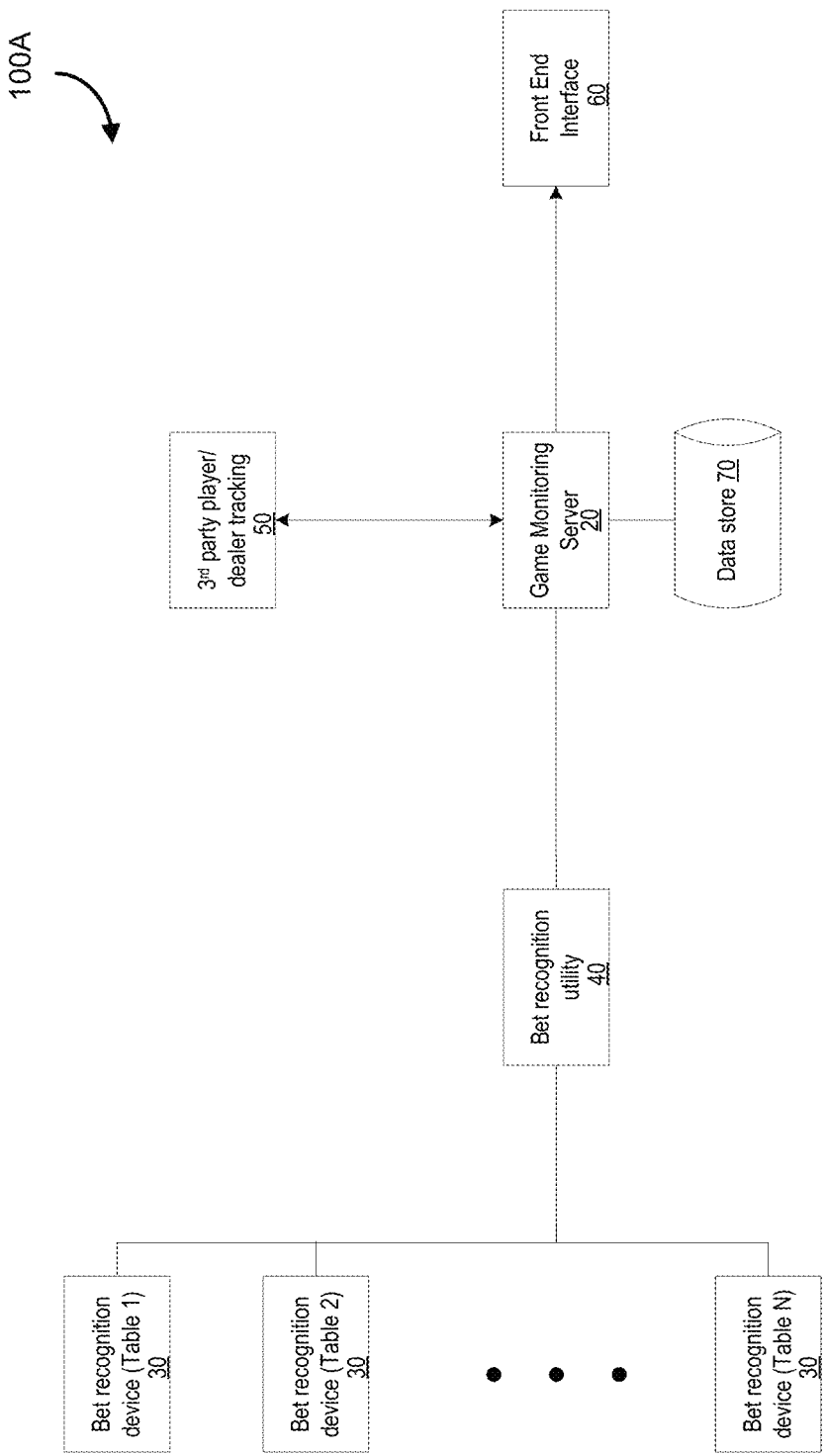

Accurate monitoring of betting activities can be used to identify and deter people who unfairly gain an advantage during participation in the betting activities, for example, those who place bets when an outcome of a game is more readily discernable. This behaviour can disadvantage other game participants who place bets at the proper time and whose winnings can depend on other participants not winning. Participants who engage in unfair behaviour can disproportion the odds of winning in their favour over other game participants. In addition, casinos and other gambling establishments can lose money to these participants. Participants are more inclined to engage in unfair betting behaviour and more likely to do so unnoticed when their activities are not monitored. There is a need for accurate monitoring of betting activities that is not limited by the capacity of human detection.

Further, casinos and other gambling establishments can benefit from data on game participants and their betting patterns. This information can be used to target participants who engage in riskier betting patterns so as encourage their continued participation in betting activities, for example. Betting patterns or statistics related to betting activities can be used in a nuanced way to offer other incentive for certain behaviour. It is difficult for this data to be identified, understood, and capitalized on in popular gambling establishments where there are many game participants who engage with different games and have different gambling styles. There is a need for accurate monitoring and generation of data that can uncover useful trends in betting activities.

Transmission of many and/or large images to a remote computational processing system or computer can be slow and therefore unfeasible for use in monitoring betting activities, where decisions may need to be made in near real-time.

Embodiments described herein provide a platform, device and process for monitoring game activities at a gaming table. In particular, embodiments described herein can provide a platform, device and process for capturing images of the surface of a gaming table and determining the quantity, identity, and arrangement of chips bet at a gaming table.

Embodiments described herein can be used to capture images of the surface of a gaming table, including gambling chips, in response to certain events such as placing a bet. A device included in some embodiments is configured to remove background image data, for example, by distinguishing chips from the background based on their respective depth values. The device is configured to identify points of interest on the chip images, including across the length of a side view of each chip, and classify each point of interest using histogram data of image channels corresponding to the point of interest. The device is configured to then decide on a classification for each chip, based on the classifications for each point of interest in a single row. The decided classification for each chip can be stored as a separate value in a data structure. The device is configured to identify the quantity, type, and arrangement of each chip based on the arrangement and identity of the values in the data structure. This may involve determining groups of similar classifications and determining the number of chips corresponding to each group.

Computation at each stage can be separated logically, temporally, or physically; compartmentalized; and/or performed by separate system components to improve computation time and enable the process to be completed in manageable steps, for example, at times or in sequences optimal for use of computational resources or generating a result.

The device can enable efficient transmission of data relating to betting activity or chip quantification and classification by generating data at each step locally and encoding the relevant data in forms, such as vectors or other data structures, that are more easily transmitted.

Embodiments can also thereby enable efficient transmission, storage, and use of data generated from images captured, which can allow bet monitoring and classification to be accomplished, avoiding a need for transmission of the many and large raw images to a separate server.

Embodiments described herein can capture image data across a plurality of channels and can include processors configured to extend one or more of the channels by transforming the image data, for example, to provide additional data for improved processing or classification accuracy. Embodiments can aggregate data from one or more images captured over time to reduce transient effects arising from temporary visual obstructions of an object captured. This can allow betting activities to be monitored even in chaotic gambling situations, with moving participants and placement of objects within the monitored area. Horizontal gradients of the image data and/or transformed image data can be generated to capture vertical texture in the chips and can be used, for example, to extract image data reflecting geophysical edge locations of chips or other objects for improved image recognition.

Embodiments of methods, systems, and apparatus are described through reference to the drawings.

Embodiments described herein relate to systems, methods and devices for monitoring game activities at gaming tables in casinos and other gaming establishments. For example, embodiments described herein relate to systems, methods and devices for monitoring card game activities at gaming tables. Each player, including the dealer and customer(s), may be dealt a card hand. Embodiments described herein may include devices and systems particularly configured to monitor game activities that include betting activities at gaming tables to determine bet data including a number of chips in a betting area of the gaming table and a total value of chips in the betting area.

The player bet data may be used by casino operators and third parties for data analytics, security, customer promotions, casino management, and so on. Games are not necessarily limited to card games, and may include dice games, event betting, other table games, among others.

In accordance with an aspect of embodiments described herein, monitoring devices may be used to retrofit gaming tables. The monitoring devices may be integrated with the gaming tables to provide a smooth working area in a manner that does not catch on cards or chips. The monitoring device may not require changing of a gaming table top as it may be integrate within existing table top structure. An example of a monitoring device is a bet recognition device, as described herein.

Tracking bet activities that are on-going at a gaming facility is a non-trivial task that has myriad financial consequences. Accurate bet tracking is important as it may be used to more closely monitor the revenues and outflows of the gaming facility, identify patterns (e.g., theft, collusion), and provide an enhanced gaming experience. For example, tracked bet information, in the form of betting records, may be used to determine compensation levels for loyal players (e.g., the accurate provisioning of "comps" in relation to overall casino returns), rebates, etc., or track dealer and/or game performance.

Bets are often performed in conjunction with games (e.g., baccarat, poker, craps, roulette) or events (e.g., horse racing, professional sports, political outcomes), and traditionally, some bets are placed with the aid of specially configured markers (e.g., chips). These bet markers may have various markings on them, and are often distinguished from one another so that it is easy to track the value of each of the markers (e.g., denominations, characteristics). Some of the markers are designed with a particular facility in mind, and accordingly, may vary from facility to facility. For example, facilities may include casinos, gaming halls, among others.

Betting markers, such as chips, may have varying designs and markings that not only distinguish between chip types (e.g., chip values), but also different series of chips having the same values (e.g., to reduce the risk counterfeiting and/or to enable tracking). For example, such variations may be purposefully and periodically introduced such that counterfeiters may have a harder time successfully copying chip designs.

Accordingly, a flexible implementation may provide a diverse range of conditions and chips can be used with the system. For example, in some embodiments, a system is provided that is configured for interoperation with a diverse range of chip types, and also to flexibly adapt in view of modifications to chip designs and markings. In such embodiments, the system is not "hard coded" to associate specific designs and markings with chip values, but rather, applies machine-learning to dynamically associate and create linkages as new chip types are introduced into the system. Interoperability may be further beneficial where a single system can be provisioned to different gaming facilities having different needs and environments, and the system may, in some embodiments, adapt flexibly in response to such differences (e.g., by modifying characteristics of a reference illumination on the chips, adapting defined feature recognition linkages, adapting imaging characteristics, image data processing steps, etc.).

The bet markers, such as chips, are often provided in physical form and placed individually or in "stacks" that are provided in specific betting areas on tables so that a dealer can see that a player has made a bet on a particular outcome and/or during a betting round. A game or event may include multiple betting rounds, where a player is able to make a particular bet in conjunction with a phase and/or a round in the game or event. The betting may result in a win, loss, push, or other outcome, and the player may be paid chips equivalent to an amount of winnings.

The ability to track bets in real or near-real time may be of commercial and financial importance to a gaming facility. Inaccurate tracking of bets may lead to increased management overhead and/or an inability to accurate track betting, which may, for example, lead to missed opportunities to enhance player experience, or missed malicious behavior trends. For example, analyzing betting patterns may indicate that some players are "gaming the system" by placing suspicious bets (e.g., due to card counting, hole carding), or may indicate particularly profitable bets for the gaming facility (e.g., Blackjack insurance bets). The bet tracking information may be utilized in conjunction with other types of backend systems, such as a hand counting system, a security management system, a player compensation system (e.g., for calculating when complimentary items/bonuses are provided), etc. Bet recognition may also be used in gaming training systems, where players can be informed that their betting was not efficient or suboptimal based on computer-based simulation and calculation of odds (e.g., for Texas Hold-em poker, efficient betting may be determined based on mathematical odds and table positioning, especially for structured betting games and/or pot-limit and limit games, and may also be influenced by the presence of rule modifications).

In some embodiments, bet tracking information is collected using machine-vision capable sensors that may be present on a gaming table or surface, or other type of gaming machine. These machine-vision capable sensors monitor betting areas to determine the types of chips placed in them, and estimate the value of bets, tracking betting as betting progresses from round to round and from game to game. As many gaming facilities have invested significantly into their existing chips, tables, technologies and/or layouts, some embodiments described herein are designed for flexibility and interoperation with a variety of existing technologies and architectures. Machine vision is not limited to imaging in the visual spectrum, but may also include, in various embodiments, imaging in other frequency spectra, RADAR, SONAR, etc. Machine vision may include image processing techniques, such as filtering, registration, stitching, thresholding, pixel counting, segmentation, edge detection, optical character recognition, among others.

Accordingly, a bet tracking system may benefit from being able to be retrofit into existing tables and/or layouts, and interface with other table and/or gaming facility management systems (e.g., to communicate information regarding betting activities). Machine-learning techniques (e.g., random forests) may be utilized and refined such that visual features representative of different chip values are readily identified, despite variations between different facilities, lighting conditions and chip types. For example, such a system may not necessarily need to have hard-coded reference libraries of what chips should look like for each value, and instead, may be flexibly provisioned during the calibration process to build a reference library using real-world images of chips to train a base set of features. Accordingly, in some embodiments, the system may be utilized without a priori knowledge of the markers present on the various betting markers, such as chips. This may be useful where a system may need to account for introduced variations in chip design, which, for security reasons, are not distributed ahead of introduction.

A potential challenge with tracking bets is that there are a diversity of betting markers, objects on a gaming surface, lighting conditions that may lead to complexities in relation to accurately determining what bet markers are present, and further, what value should be attributed to a bet. Bets may be placed off-center by players, chips may not be uniformly stacked, chips may be obscuring one another, players may obscure bets using their hands, players may be deliberately modifying their bets (e.g., surreptitiously adding to a bet after cards have been dealt to obtain a higher payout), etc. Bet recognition can be conducted with minimal disruption to the operations of the gaming facility or player experience.

There may also be limitations on the amount of available computing resources, and given that many gaming tables operate with a high volume of games per hour, there is limited time available for processing (especially where bet data is being tracked in real or near-real time). Gaming facilities may have computational resources available at different locations, and these locations may need to communicate with one another over limited bandwidth connections. For example, there may be some computing components provided at or near a gaming table such that pre-processing may be conducted on sensory data, so that a compressed and/or extracted set of data may be passed to a backend for more computationally intensive analysis. In some embodiments, the backend may revert computed information back to the computing components provided at or near a gaming table so that a dealer or a pit-boss, or other gaming employee may use an interface to monitor betting activities (e.g., to determine "comp" amounts, track suspicious betting patterns, identify miscalculated payouts).

Bet recognitions systems may utilize sensors positioned at a variety of different locations to obtain information. For example, systems may utilize overhead cameras, such as existing security cameras. A challenge with overhead camera systems is that the presence of shadows, skewed image angles, obstructions, have rendered some embodiments particularly complicated from a computational perspective, as issues relating to data quality and the amount of visible information may lead to unacceptably low accuracy and/or confidence in computationally estimated bet counts.

Embodiments described herein provide unconventional solutions to many problems, including accurately monitoring and identifying bet volumes at a speed feasible for use in live games to allow for intervention during the game or otherwise soon after a betting amount is changed. For example, the use of single key frames to represent relevant bet volumes instead of a large number of frames helps overcome technological problems of slow image processing times to prepare images for use as well as long times for transmission of images to servers for processing. Embodiments herein described also provide an ability to be retrofitted at a betting surface or gaming table, for example, at a chip tray, so as to further overcome problems of requiring transmission to a remote server for processing or use.

Embodiments described herein provide an improved process for using imaging components and processing units to register images and isolate or localize regions of interest. For example, embodiments described herein provide for strategically placed imaging components with overlapping fields of view that each capture channels of images (RGB, IR), as well as processing components that generate depth images; extend those channels, for example, to generate more data for increased accuracy in image classification and determining bet volume; and register the images captured or generated to generate an averaged key frame image representing relevant data across the channels, for example, by averaging only those registered frames that do not have transient obstructions. The imaging components in some embodiments use one or more sensors to provide a solution to problems, including improving accuracy and consistency in image registration and accurately determining the distance away an object in an image is, for example, to remove background data. This removal can allow for an ability to localize bet volumes at a betting surface, as well as improve processing and transmission speeds, for example, by reducing the amount of data for processing or transmission, reducing bandwidth, or reducing potential for data packets to be dropped.

FIG. 1A illustrates a block diagram of a system 100A for monitoring betting activities at gaming tables according to some embodiments. The system may be configured such that sensors and/or imaging components are utilized to track betting activities, generating sensory data that is sent to a backend for processing. The betting activities may be provided in the form of chips being placed in betting areas, and the sensors and/or imaging components may include machine-vision sensors adapted for capturing images of the betting areas.

As depicted, the system includes bet recognition devices 30 (1 to N) integrated with gaming tables (1 to N). The bet recognition devices 30 may include various sensors and imaging components, among other physical hardware devices.

Each bet recognition device 30 has an imaging component for capturing image data for the gaming table surface. The gaming table surface has defined betting areas, and the imaging component captures image data for the betting areas. A transceiver transmits the captured image data over a network and receives calibration data for calibrating the bet recognition device 30 for the betting areas. Bet recognition device 30 may also include a sensor component and a scale component, in some embodiments. The image data may, for example, focus on a particular region of interest or regions of interest that are within the field of view of the sensor component.

In some embodiments, the bet recognition devices 30 are hardware electronic circuitry that are coupled directly in or indirectly to a gaming surface. In some embodiments, the bet recognition device 30 is integrated into the gaming surface. The bet recognition device 30 may be provided as a retrofit for existing gaming surfaces (e.g., screwed in, provided as part of a chip tray).

The bet recognition devices 30 may further include illuminating components or other peripheral components utilized to increase the accuracy of the bet recognition. For example, an illuminating bar may be provided that provides direct illumination to chip stacks such that the imaging component is more able to obtain consistent imagery, which may aid in processing and/or pre-processing of image data. Another peripheral component may include the use of pressure sensitive sensors at the betting area to denote when there are chips present in the betting area, and in some embodiments, the weight of the chips (e.g., which can be used to infer how many chips, which can be cross-checked against the image data).

The bet recognition device 30 may have one or more processors and computational capabilities directly built into the bet recognition device 30. In some embodiments, these computational capabilities may be limited in nature, but may provide for image pre-processing features that may be used to improve the efficiency (e.g., file-size, relevancy, redundancy, load balancing) of images ultimately provided to a backend for downstream processing. The bet recognition device 30 may also include some storage features for maintaining past data and records. Some implementations provide for a very limited window of processing time (e.g., fast betting rounds or game resolution), and the pre-processing aids in speeding up computation so that it may be conducted in a feasible manner in view of resource constraints.

In some embodiments, the bet recognition device 30 contains multiple physical processors, each of the physical processors associated with a corresponding sensor and adapted to track a particular bet area. In such an embodiment, the system has increased redundancy as the failure of a processor may not result in a failure of the entirety of bet recognition capabilities, and the system may also provide for load balancing across each of the physical processors, improving the efficiency of computations. Each sensor may be tracked, for example, using an individual processing thread.

The system includes a game monitoring server 20 with a processor coupled to a data store 70. In some embodiments, the game monitoring server 20 resides on, near or proximate the gaming surface or gaming table. For example, the game monitoring server 20 may include a computing system that is provided as part of a dealer terminal, a computer that is physically present at a gaming station, etc.

The game monitoring server 20 processes the image data received from the bet recognition devices 30 over the network to detect, for each betting area, a number of chips and a final bet value for the chips. The game monitoring server 20 may also process other data including sensor data and scale data, as described herein.

The game monitoring server 20 is configured to aggregate game activity data received from bet recognition devices 30 and transmit commands and data to bet recognition devices 30 and other connected devices. The game monitoring server 20 processes and transforms the game activity data from various bet recognition devices 30 to compute bet data and to conduct other statistical analysis.

The game monitoring server 20 may connect to the bet recognition devices 30 via bet recognition utility 40. The bet recognition utility 40 aggregates image data received from multiple bet recognition devices 30 for provision to the game monitoring server 20 in a tiered manner. In some example embodiments, game monitoring server 20 may connect to multiple bet recognition utilities 40.

Each bet recognition device 30 may be linked to a particular gaming table and monitor game activities at the gaming table. A gaming table may be retrofit to integrate with bet recognition device 30. Bet recognition device 30 includes an imaging component as described herein. In some embodiments, bet recognition device 30 may also include sensors or scales to detect chips.

Bet recognition utility device 40 connects bet recognition devices 30 to the game monitoring server device 20. Bet recognition utility 40 may act as a hub and aggregate, pre-process, normalize or otherwise transform game activity data, including image data of the gaming tables. In some embodiments, bet recognition utility 40 may relay data. Bet recognition utility 40 may be linked to a group of gaming tables, or a location, for example.

Bet recognition utility device 40, for example, may be a backend server cluster or data center that has a larger set of available computing resources relative to the game monitoring server 20. The bet recognition utility device 40 may be configured to provide image data in the form of extracted and/or compressed information, and may also receive accompanying metadata tracked by the bet recognition device 30, such as timestamps, clock synchronization information, dealer ID, player ID, image characteristics (e.g., aperture, shutter speed, white balance), tracked lighting conditions, reference illumination settings, among others.

This accompanying metadata, for example, may be used to provide characteristics that are utilized in a feedback loop when bet outcomes are tracked. For example, the type of image characteristics or reference illumination characteristics of the bet recognition utility device 40 may be dynamically modified responsive to the confidence and/or accuracy of image processing performed by the bet recognition utility device 40. In some embodiments, the bet recognition utility device 40 extracts from the image data a three-dimensional representation of the betting and maybe used to track not only betting values but also chip positioning, orientation, among others. This information may, for example, be used to track patterns of betting and relate the patterns to hand outcomes, the provisioning of complimentary items, player profile characteristics, etc.

The system may also include a front end interface 60 to transmit calculated bet data, and receive game event requests from different interfaces. As shown in FIG. 2, front end interface 60 may reside on different types of devices. Front end interface 80 may provide different reporting services and graphical renderings of bet data for client devices. Graphical renderings of bet data may be used, for example, by various parties and/or stakeholders in analyzing betting trends. Gaming facilities may track the aggregate amounts of bets by account, demographic, dealer, game type, bet type, etc. Dealers may utilize betting information on a suitable interface to verify and/or validate betting that is occurring at a table, pit bosses may use the betting information to more accurately determine when complementary items should be dispensed and provided, etc.

Front end interface 60 may provide an interface to game monitoring server 20 for end user devices and third-party systems 50. Front end interface 60 may generate, assemble and transmit interface screens as web-based configuration for cross-platform access. An example implementation may utilize Socket.io for fast data access and real-time data updates.

Front end interface 60 may assemble and generate a computing interface (e.g., a web-based interface). A user can use the computing interface to subscribe for real time game event data feeds for particular gaming tables, via front end interface 60. The interface may include a first webpage as a main dashboard where a user can see all the live gaming tables and bet data in real time, or near real time. For example, the main dashboard page may display bet data, hand count data, player count data, dealer information, surveillance video image, and so on. Bet data may include, for example, total average and hourly average bets per hand, player or dealer, per hour bet data for each gaming table in real time, and so on. The display may be updated in real-time.

The interface may include a management page where management users can perform management related functions. For example, the interface may enable management users to assign dealers to inactive gaming tables or close live gaming tables. An on and off state of a gaming table may send a notification to all instances of the interface. If a user is on the monitor management page when a new gaming table is opened, the user may see the live gaming table updated on their display screen in real-time. The management page may also shows surveillance images of each gaming table, and other collected data. The surveillance images may be used or triggered upon detection of particular patterns of bet data at a gaming table, for example.

Front end interface 60 may include a historical data webpage, which may display historical bet data of a selected gaming table. It may allow the user to browse the historical bet data by providing a date range selecting control. The bet data may be organized hourly, daily, monthly, and so on depending on the range the user chooses. The bet data along with the hand data and a theoretical earning coefficient may be used to estimate the net earnings of the gaming table over the selected date period.

A server and client model may be structured based on receiving and manipulating various sorts of game event data, such as hand count data, betting data, player data, dealer data, and so on. The interface may be expanded to process other types of game data such as average bets per hands on a table. Bet data can be displayed on the monitor or management page in an additional graph, for example. The date range selection tool may be used for analyzing the added data along with the bet data. Similarly, the main dashboard may show real-time statistics of both the bet data and the additional game data.

In some embodiments, the bet recognition utility device 40 may receive activation/deactivation signals obtained from various external devices, such as an external shoe, a hand counting system, a player account registration system, a pit boss/employee manual triggering system, etc. These external devices may be adapted to transmit signals representative of when a betting event has occurred or has terminated. For example, a specially configured dealer shoe may be operated to transmit signals when the dealer shoe is shaken, repositioned, activated, etc., or a hand counting system may be interoperating with the bet recognition utility device 40 to indicate that a new round of betting has occurred, etc. In some embodiments, betting may be triggered based on the particular game being played in view of pre-defined logical rules establishing when betting rounds occur, when optional betting is possible (e.g., side-bets, insurance bets, progressive bets), etc.

The system 10 may also integrate with one or more third party systems 50 for data exchange. For example, a third party system 50 may collect dealer monitoring data which may be integrated with the bet data generated by game monitoring server device 20. As another example, a third party system 50 may collect player monitoring data which may be integrated with the bet data generated by game monitoring server device 20.

FIG. 1B is an example block schematic 100B illustrative of some components of a bet recognition system 200, according to some embodiments. The components shown are for example only and may reside in different platforms and/or devices. The system 200 may include, for example, an imaging component 202 including one or more sensors to detect and/or obtain image data representative of betting areas. The imaging components 202 may be, for example, cameras, sensors, and may collect image data in the form of video, pictures, histogram data, in various formats. The image data may have particular characteristics tracked in the form of associated metadata, such as shutter speeds, camera positions, imaging spectra, reference illumination characteristics, etc. In some embodiments, the imaging components may provide an initial pre-processing to perform preliminary feature recognition, optical character recognition, etc. For example, the gaming surface may have visual indicators which may be tracked as reference markers by the imaging components (e.g., optical position markers indicative of betting areas where bets may be placed).

An image processing engine 204 may be provided that is configured to receive the images and to extract features from the images. In some embodiments, the image processing engine 204 segments and/or pre-processes the raw image data to remove noise, artifacts, and/or background/foreground imagery. For example, the image processing engine 204 may be configured to visually identify the pixels and/or regions of interest (e.g., by using a combination of depth data and similarity/size information) regarding the chips. Specific stacks of chips may be identified, along with their constituent chips. The chips may have "bounding boxes" drawn over them, indicative of the pixels to be used for analysis. Similarly, in some embodiments, "bounding boxes" are drawn over entire stacks of chips. The image processing engine 204 may extract features from the bounding boxes and, for example, create a compressed transform representative of a subset of the image information. For example, in some embodiments, various vertical, horizontal, or diagonal lines of information may be drawn through a determined stack of chips, and samples may be obtained through tracking the image pixels proximate to and/or around a determined centroid for each of the chips.

In some embodiments, to account for variations in markings (e.g., vertical stripes), the pixels (e.g., horizontal pixels) estimated to comprise a particular chip are blurred and/or have other effects performed on them prior to extraction such that the centroid and its surrounding pixels are representative of the chip as a whole.

The image processing engine 204 may also extract out a particular height of the chips, and this information may be utilized to determine the general size and/or makeup of the stack of chips. For example, knowledge of the chip stack, distance, and height of specific chips may permit for the segmentation of pixel information on a per-chip basis.

The image recognizer engine 206 may obtain the extracted and compressed information from the image processing engine 204, applying recognition techniques to determine the actual chip value for each chip in the relevant region of interest. As the image recognizer engine 206 receives a set of features, the image recognizer engine 206 may be configured to utilize a classifier to determine how well the feature set corresponds to various reference templates. In some embodiments, the classifier provides both an estimated value and a confidence score (e.g., a margin of error indicative of the level of distinction between potential chip value candidates). Where the chip value cannot be reliably ascertained through the reference templates, a notification may be provided to either request re-imaging with varied characteristics, or to generate an error value. For example, features may be poorly captured due to changes in ambient lighting and/or environmental shadows, and the notification from the classifier may control a reference lighting source to activate and/or modify illumination to potentially obtain a more useful set of image features.

In some embodiments, the image recognizer engine 206 may dynamically provision computing resources to be used for recognition. For example, if the image recognizer engine 206 identifies that a larger amount of processing will be required in view of a large volume of poor quality image data, it may pre-emptively request additional processing resources in view of a requirement to complete processing within a particular timeframe. Conversely, in some embodiments, where image data is of sufficiently high quality to quickly and accurately conclude that a chip is a particular type of chip, processing resources may be freed up.

A rules engine subsystem 208 may be provided in relation to classification of chip image data/features to chip values. The rules engine subsystem 208 may, for example, include tracked linkages and associations that are used by the classifier to determine a relationship between a particular reference feature set. In some embodiments, the rules engine subsystem 208 includes weighted rules whose weights dynamically vary in view of updated reference feature sets or accuracy feedback information (e.g., indicated false positives, false negatives, true positives, true negatives), among others. The rules engine subsystem 208 may also include logical processing rules that control operation of various characteristics of the classifier, the reference illumination, processing characteristics, etc.

A game monitoring engine 210 may obtain the tracked chip/bet values for each bet, for example, from a plurality of imaging components 202, processing engines 204 and/or recognizer engines 206, and maintain an inventory of betting data, which may be stored in data storage 250. The game monitoring engine 210 may be adapted to provide real or near-real-time feedback, and also to perform various analyses (e.g., overnight processing). The game monitoring engine 210 may identify patterns from combining bet tracking data with other data, such as player profile information, demographics, hand counting information, dealer tracking information, etc.

An administrative interface subsystem 212 may be provided for administrative users to control how the system operates and/or to request particular analyses and/or reports. A user interface subsystem 214 may provide, for example, various graphical interfaces for understanding and/or parsing the tracked bet recognition data. The graphical interfaces may, for example, be configured to generate notifications based on tracked discrepancies, etc. The various components may interoperate through a network 270.

Figure 99:
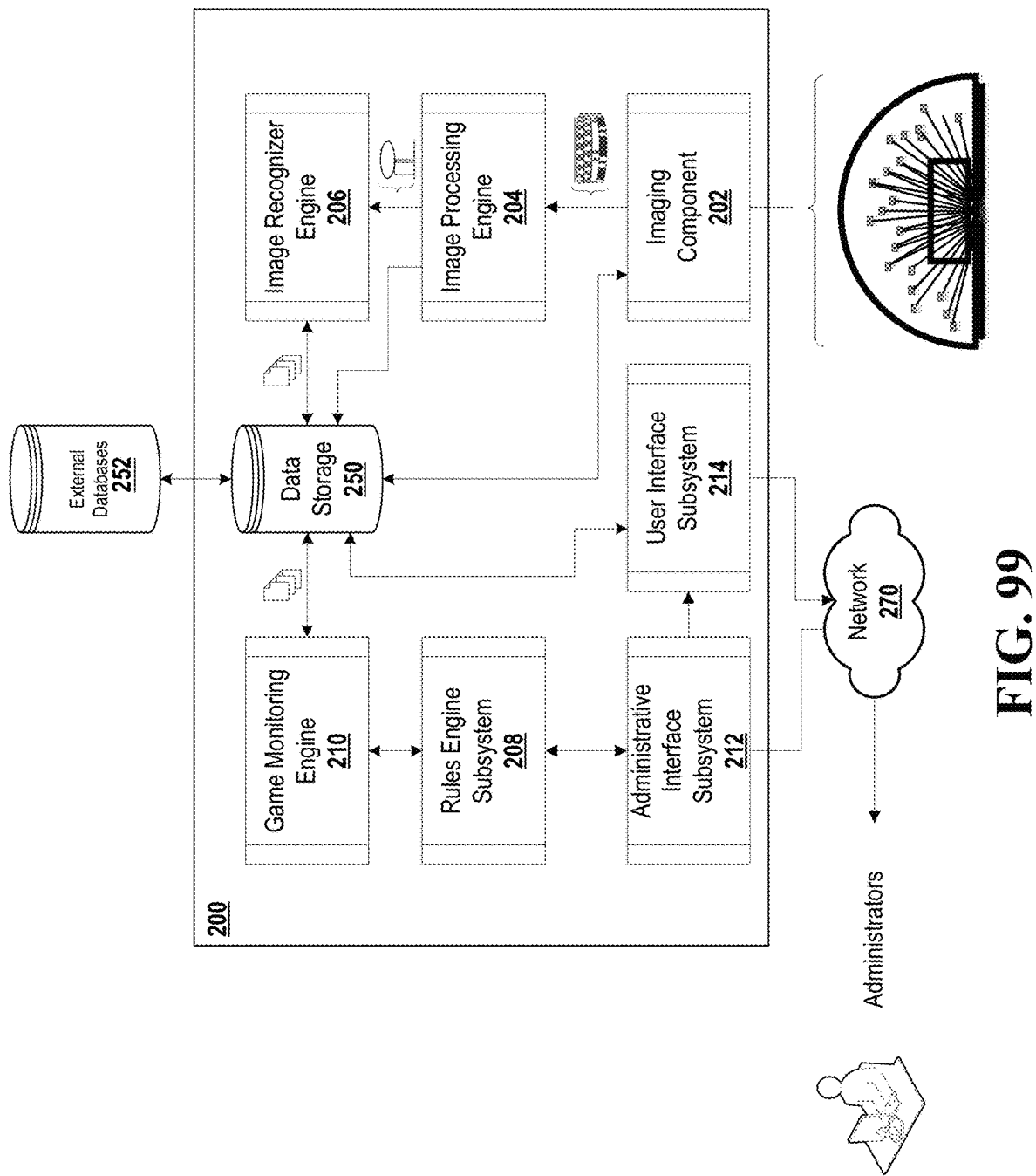
FIG. 99 is a block diagram of a system for monitoring betting activities at gaming tables according to some embodiments.

FIG. 99 is an example block schematic illustrative of some components of a bet recognition system 200, according to some embodiments. The components shown are for example only and may reside in different platforms and/or devices. As depicted in the example embodiment, bet recognition system 200 includes imaging component 202, image processing engine 204, image recognizer engine 206, game monitoring engine 210, rules engine subsystem 208, administrative interface subsystem 212, data storage 250, user interface subsystem 214, external databases 252, and network 270 (or multiple networks).

As depicted in the example embodiment, imaging component 202 is configured to connect to image processing engine 204, for example, to provide captured images for processing. Image processing engine 204 is configured to connect to image recognizer engine 206, for example, to provide processed images or extracted and compressed information in order for recognition techniques to be applied. The image recognizer engine 206 receives a set of features, and the image recognizer engine 206 may be configured to utilize a classifier to determine how well the feature set corresponds to various reference templates. Each of imaging component 202, image processing engine 204, image recognizer engine 206, game monitoring engine 210, and user interface subsystem 214 can be configured to connect with data storage 250 to provide or retrieve data. Data storage 250 is configured to store data received and retrieve data from one or more external databases 252.

As depicted in the example embodiment, game monitoring engine 210 is configured to connect with rules engine subsystem 208, for example, to provide data allowing rules engine subsystem 208 to track linkages and associations that are used by a classifier to determine a relationship between a particular reference feature set. The data can be, for example, tracked chip/bet values for each bet in a set of bets or in a game. Rules engine subsystem 208 can be configured to provide feedback to game monitoring engine 210, such as acknowledgement of receipt of data.

As depicted in the example embodiment, administrative interface subsystem 212 is configured to connect with rules engine subsystem 208, for example, to allow users to control how the system operates and/or to request particular analyses and/or reports. Administrative interface subsystem 212 can receive from rules engine subsystem 208 data to present reports or analyses, for example, to a user. User interface subsystem 214 is configured to connect with administrative interface subsystem 212, for example, to receive configuration, permissions, and/or security data. This may allow for an administrator to tailor graphical interface elements generated by user interface subsystem 214 and presented to a user.

As depicted in the example embodiment, user interface subsystem 214 and administrative interface subsystem 212 are configured to interoperate over a network (or multiple networks).

In some example embodiments, game monitoring server 20 may connect directly to bet recognition devices 30. FIG. 2 illustrates a block diagram 200 of another system for monitoring game activities at gaming tables according to some embodiments. System may include bet recognition device 30 at gaming table with defined bet areas 34 on the gaming table surface. In this example, bet recognition device 30 directly connects to game monitoring server 20 to provide image data for the gaming table surface and the bet areas 34.

Figure 3:
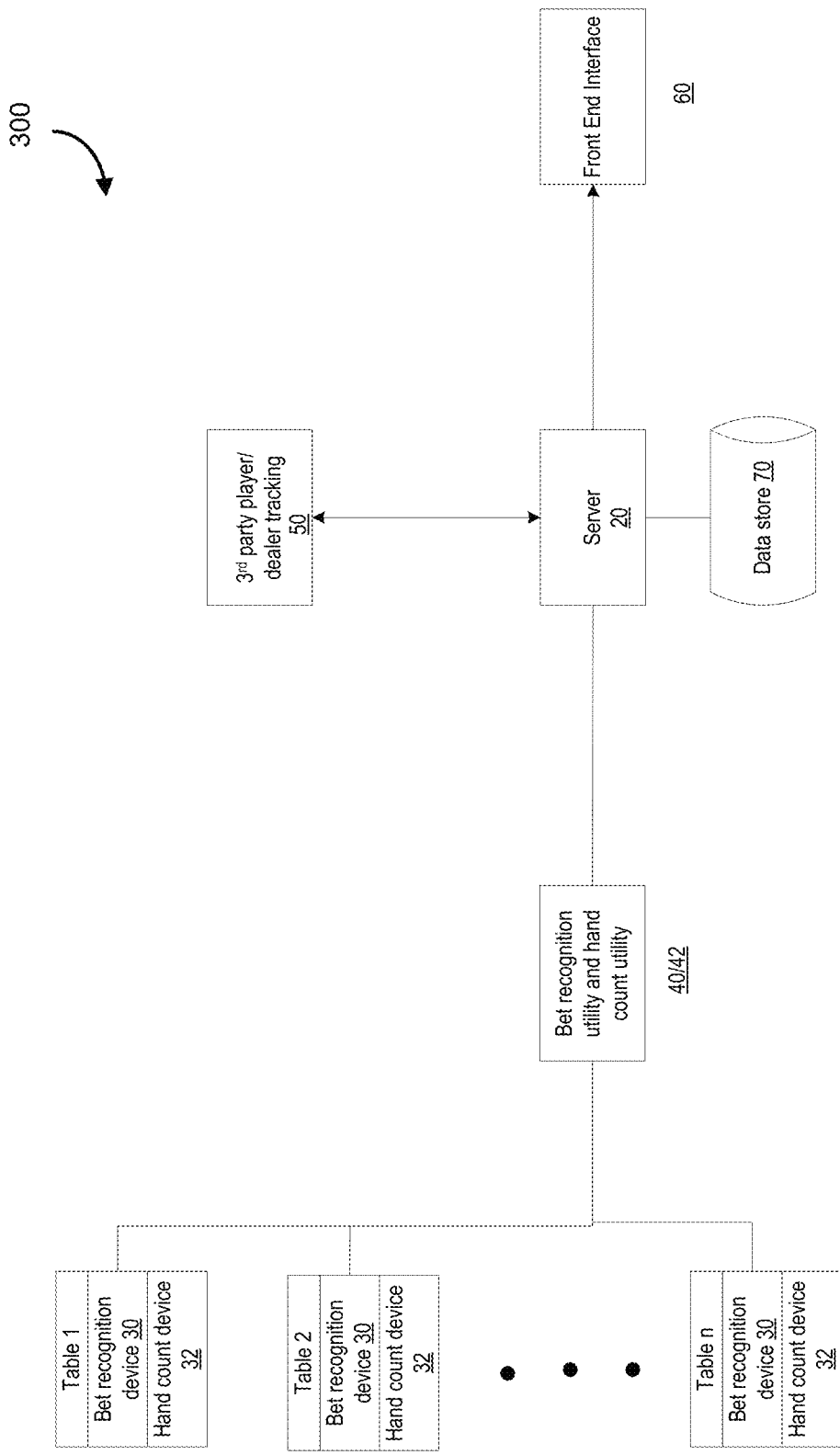
FIG. 3 illustrates a block diagram of another system for monitoring game activities at gaming tables according to some embodiments.

FIG. 3 illustrates a block diagram 300 of a further system for monitoring game activities at gaming tables according to some embodiments involving betting data and hand count data. Card game activities may generally include dealing card hands, betting, playing card hands, and so on. Each player, including the dealer and customers, may be dealt a card hand. For a card game, each active player may be associated with a card hand. The card hand may be dynamic and change over rounds of the card game through various plays. A complete card game may result in a final card hand for remaining active players, final bets, determination of winning card hands amongst those active players' hands, and determination of a winning prize based on winning card hands and the final bets. At different rounds or stages of the game different players make bets by placing chips in bet regions on the gaming table surface.

Bet recognition device 30 and hand count device 32 may be integrated at each gaming table for capturing image data for bets and counting the number of card hands played at the particular gaming table. Hand count device 32 is another example of a game monitoring device. A player may have multiple card hands over multiple games, with different bets associated with hands. Hand count device 32 may count the number of hands played at a gaming table, where the hands may be played by various players. Bet recognition device 30 may collect image data for server 20 to calculate bet data for different hands and players.

Hand count device 32 may determine a player hand count may be over a time period. Bet recognition device 30 may determine bet data over a time period, using timestamps, for example. Server 20 may correlate hand count and bet data using timestamps or time periods, for example. The information may be stored on data store 70, and presented on front enter interface 60.

Bet recognition device 30 may associate bet data with a particular gaming table, dealer, customers, geographic location, subset of gaming tables, game type, and so on. Similarly, hand count device 32 may associate hand count data with a particular gaming table, dealer, customers, geographic location, subset of gaming tables, game type, and so on. For example, bet data may be associated with a timestamp and gaming table identifier to link data structures for further data analysis, processing and transformation.

Metadata is collected alongside image data and may be associated (e.g., using pointers, labels, metadata tags) with the image data to indicate additional information, such as checksums (e.g., for redundancy and immutability), timestamps, player information, hand count information, bet round information, lighting conditions, reference lighting characteristics, confidence score associated with image data, sensors in use, processor in use, etc.

Image data, along with other metadata may be encapsulated in the form of information channels that may be use for transmission and/or otherwise encoded. In some embodiments, 10 or more channels of information are provided by the bet recognition device 30, and the channels may include, for example, image data taken with different color balances and parameters, image data from different sensors, metadata, etc.

Each bet recognition device 30 may transmit image data or other bet data to bet recognition utility 42 for provision to game monitoring server 20. Each hand count device 32 may transmit hand count data from a sensor array to hand count utility 42 for provision to game monitoring server 20. Further details on hand count device 32 and game monitoring server 20 for calculating hand count data is described in U.S. Provisional Application No. 62/064,675 filed Oct. 16, 2014 the entire contents of which is hereby incorporated by reference.

Hand count device 32 may include sensors, such as for example laser sensors with optical emitters and receivers. Laser sensors, instead of other types such as ambient light sensors, may be advantageous to reduce the effect of lighting in the environment, to not require special table top felt material, to waterproof the device, and so on. Ambient light sensors may not work well if a part of the table is not well lit, as those types of sensors are looking for darkness for object detection. Hand count device 32 may use optical receiver and emitter sensors that look for light for object detection. Additional types of sensors include radio frequency and optics. The sensors may be organized to form a sensor array. Hand count device 32 may further include an infrared receiver and infrared emitter or transmitter for electronic data exchange. The sensors are particularly configured and positioned relative to the play area and bet area on the gaming table. For example, a sensor array may be positioned proximate to the card play area and bet area. The device may be configured to provide a particular distance between sensor and card play area or bet area, such as a one centimeter distance, for example.

Bet recognition device 30 may similarly retrieve image data captured by imaging component. Hand count device 32 may receive power and retrieve data off of sensors used for monitoring game activities. Both hand count device 32 and bet recognition device 30 generate game activity data (which may also be referred to herein as game event data) for provision to game monitoring server 20. Game activity data may include hand count data events, such as hand start event data and hand stop event data. Hand start event data indicates the start of a new hand. Hand stop event data indicates the end of a hand. Together with timestamps these values may be used to compute hand duration and other data values. Bet data may also be linked by timestamps. The sensors of hand count device 32 may be positioned on the gaming table to detect card hand activities and trigger hand start events and hand stop events. The sensors may deliver real-time data regarding card play activity, including hand start event data and hand stop event data. The imaging components may also deliver real-time image data regarding bet activities. The imaging component of bet recognition device may be mounted or integrated into gaming table to capture real-time image data for bet areas on the gaming table surface.

In some embodiments, the clocks of the bet recognition device 30, the hand count device 32, game monitoring server 20 are synchronized together to ensure that data is readily interpretable regardless of source.

Bet recognition device 30 may be configured with particular trigger events, such as detection of chips or objects in defined bet areas on the gaming table by sensors. The trigger events may trigger imaging component to capture image data for calculating bet values for the chips. A timing or threshold value may be set off to trigger transmission of game event data used to calculate bet data and count card hands. An example trigger may be sensor activation for a threshold value, for example two, three or four seconds. Another example trigger may be sensor deactivation for a threshold value.

Game activity data may include bet data, player count data and hand count data, which may be valuable for casinos for security, management, and data analytics. For example, a casino may determine a link between a game and a dealer, and also a dealer and a customer, through the bet data, the hand count data and the player count data. A casino may provide real-time compensation to players using the bet data, hand count, and player count data. Accordingly, the systems, devices and methods in accordance with embodiments described herein may provide various levels of granularity and specificity for game activity data, using the bet data, hand count data, player count data, and other generated game activity data values. There may further be third party player tracking and/or dealer tracking data 50 that may be utilized in relation to performing analysis and reporting.

A gaming table includes one or more bet areas. FIGS. 4A-4C illustrates a schematic diagram of bet areas 34 monitored by a bet recognition device 30 according to some embodiments.

As illustrated in FIGS. 4A-4C, a challenge with tracking betting and chips is the ability to obtain sufficient quality and resolution to accurately track bets. FIG. 4A is an overhead or elevational top view 400A, according to some embodiments. FIG. 4B is a perspective view 400B, according to some embodiments. FIG. 4C is an overhead or elevational top view 400C in relation to a camera system 30, according to some embodiments. Bets 402 may be placed in a betting area 34 on a gaming table, and for example, betting areas may be demarcated through the use of machine-vision interpretable boundaries, etc. The bets may include various chips, and the chips may have different values attributed to the chips. The chips may be placed in one or more stacks within the field of view of the camera system 30.

These boundaries, for example, may appear to be a single visual ring to a player, but in some embodiments, layers of different boundaries (e.g., as different rings) may be utilized to more granularly indicate slight differences in positioning of chips. For example, boundaries that are only visible in the infrared or ultraviolet lighting may be used, and these may be tracked by machine-vision sensors to demarcate where the betting area begins, ends, different parts of a betting area, etc. For example, such granular boundaries may be helpful where small differences in depth, positioning, etc. may impact the accuracy of such a system. Visual and/or other types of optical markers may be used to serve as reference areas for depth calculations While some other systems have utilized overhead cameras positioned over a table or based on tracking images captured from overhead security cameras, these systems have had difficulties obtaining sufficiently high quality images of chips placed in betting areas to be able to accurately and responsively track bet counting. For example, using an overhead camera may lead to an inconsistent number of pixels being used to track each chip, the number of available pixels being limited due to the obstruction caused by chips being placed on one another (e.g., an overhead camera directly above a stack of chips may not be able to adequately identify chips underneath the top chip of a stack, or if it is placed at an overhead some distance away, the system may not have a good view of the individual chips within the stack as there may either be obstructions or the specific angle of the chips may cause undesirable shadowing effects. For example, depending on a camera's ability to obtain images, chips deep in a stack of chips may all appear to be black as the chips in the stack end up casting shadows on one another. Perspective views of chips may computationally difficult to analyze in view of the required transformations to obtain a representative set of pixels.

Similarly, it may be difficult to account for variations of ambient and environmental lighting that may be illuminating the chips themselves. Where differences in illumination intensities are utilized to track chip values and distances, such variations may reduce the accuracy of readings or provide false positive/false negative readings.

In some embodiments, imaging components (e.g., cameras) are placed and positioned to have a substantially horizontal sensor angle when viewing the chips, a depiction of which is provided at FIG. 4B. Substantially horizontal may mean substantially parallel to a plane of the gaming surface.

The imaging components may be adapted such that the imaging component is directed towards the betting areas from or near the perspective of a dealer. Such a configuration may be helpful in ensuring that the chips are less obstructed, and provide a sufficient view of the sidewalls of the chips. An "offset angle" may be provided where the imaging components, while "looking" substantially parallel at the sidewalls of the chips, due to the stacked nature of chips, may aid in obtaining as many pixels as possible.

As described, the imaging component angle may be important to ensure that as many pixels of information can be extracted from a machine-vision image that are representative of chips. The imaging component itself may also require to be off-set from the gaming surface (e.g., at a particular altitude or height) such that the sensing is not blocked by the presence of objects on the gaming surface, such as playing cards, dice, markers, etc. For example, a card may be curled at a corner, and a sensor placed directly horizontal and in contact with the gaming surface may end up being obstructed by the cards (and thus unable to read the value of the chips). The horizontal angle, for example, may be an angle between −5 to 5 degrees, and the altitude may be between 0.2 cm to 1.0 cm. While the image obtained may be direct for some chips, there is nonetheless some angle for chips that are at the top or the bottom of the stack.

In some embodiments, the imaging component may be utilized in combination with an illumination strip, the illumination strip (e.g., lights, infrared lights, ultraviolet lights) providing a "reference illumination" against the sidewall of the chips.

For example, the illumination strip may be placed above or below the imaging component and may provide illumination in all or a portion of the field of view of the imaging component. The illumination provided may be static (e.g., a regular light) or controlled (e.g., a controllable light). The illumination characteristics may be modified (e.g., filters applied, the amount of total light controlled, the spectral makeup of the light may change, etc.). The illumination characteristics may be used in various ways, for example, to ensure that at a minimum number of pixels are able to be captured per chip, to ensure that there is constant reference illumination despite changes in ambient lighting, etc.

In some embodiments, illumination characteristics are modified in response to requests from the system. For example, the system may determine that there indeed are chips providing in a particular area, but the system is experiencing difficulty in assessing the value of the chips (e.g., due to environmental, ambient illumination, distortions.

In some embodiments, the imaging component and/or the illumination is provided on a physical track or pivot and is able to modify viewing angles and/or positions (or both) in response to poor image recognition. For example, at some angles, chips may be covered by shadows (especially the bottom chips of a stack) and due to the shadowing, may appear to be indistinguishable from other chips or erroneously recognized. The classifier may identify a low level of confidence in the recognition and in response, generate a control signal to move the camera and/or pivot the camera and/or other sensors, such as depth sensors, etc.

A control system may note that the recognition device is having difficulty (e.g., by an increase in error rate, failing to meeting a pre-defined threshold of pixels required to make an accurate determination) and issue a command control to the illumination device to control the illumination device to more actively "light up" the chips so that a better picture may be taken for conducting image recognition.

Similarly, bet recognition devices may be designed to operate in environments where the amount of environmental and ambient lighting varies quite frequently. Light may be provided from natural sources (e.g., windows), or from artificial sources. Ambient lighting may occur from artificial sources that are incident to the bet recognition device, such as the lights provided on other machines, room lighting, etc. In some embodiments, a gaming facility may purposefully modify the lighting conditions to impress upon the players a particular ambience or theme. Individuals at the facility may be smoking, casting shadows, etc.

These variations may significantly impact the ability of the system to perform bet recognition. A commercial consideration as to how the system functions is the ability to operate the system in a variety of different environments having different lighting conditions. For example, a bet recognition system may require some level of portability as the system may be moved around a gaming facility over its lifetime, or sold and/or moved between different gaming facilities.

In some embodiments, the aspect ratio associated with the imaging component may be a factor for consideration. For example, if the imaging component was a 1080p camera, it means it has more pixels horizontally than vertically, so the extra resolution in the width is more valuable in measuring the thickness of the chip. Rotating from a landscape orientation to a portrait orientation would allow for more resolution for distinguishing chips from one another within a stack, potentially offering more detail to for downstream processing.

In some embodiments, an illumination strip provides the reference illumination, and the reference illumination may be provided in a substantially horizontal view relative to the sidewalls of the chips. The reference illumination may, relative to overhead camera systems, provide more direct and relatively unobstructed illumination to the chip sidewalls, making any machine-vision interpretable markings more visible and easy to distinguish. As an example in the context of machine vision, particular colors may be difficult to distinguish from one another (e.g., red from pink), and similarly, striped markings may also be difficult to process as poor lighting may impact the ability to determine how thick a line is, etc. This problem may be particularly exacerbated if the machine-vision is not operating in the same range wavelengths as human vision, for example, if the machine vision operates in infrared, ultraviolet ranges, monochromatic ranges, etc.

The reference illumination may be provided proximate to or substantially at the same location as the imaging components. For example, the reference illumination may be provided in the form of an illumination strip running across a sensor housing. In some embodiments, the reference illumination is provided in the form of spaced-apart light sources.

Accordingly, in some embodiments, the reference illumination in accordance with control signals such that the reference illumination characteristics (intensity, spread, spectral makeup, etc.) may be modified and monitored to dynamically adjust and/or control for variations from light provided from other sources For example, control signals may be provided, which when processed by the illumination strip, the illumination strip changes an intensity of the reference illumination based at least on ambient lighting conditions. The control signals may be adapted to implement a feedback loop wherein the reference illumination on the one or more chips is substantially constant despite changes to the ambient lighting conditions.

In some embodiments, rather than, or in combination with changing the reference illumination to provide a constant lighting condition, the reference illumination is adapted to monitor a confidence level associated with the bet recognition processing from machine-vision images that are provided to a backend system. For example, if the backend image processing system indicates that there are significant accuracy and/or confidence issues, the backend image processing system may be configured to generate a control signal requesting modifications to the reference illumination relative to the chips themselves. Outcomes may be monitored, for example, by using a feedback loop, and controlled such that an optimal amount of reference lighting is provided. In some embodiments, the reference illumination is not constant, but is rather adjusted to ensure that a sufficiently high level of confidence is obtained during image processing. In some embodiments, reference illumination may be provided in a strobe fashion and/or otherwise intermittently used when image processing capabilities are impacted (e.g., a transient shadow passes by, the chips are momentarily obstructed by the hand of a player or the dealer, etc.).

The reference illumination, to save energy, may, in some embodiments, be controlled such that it can be turned on whenever additional illumination is required.

Embodiments described herein provide a game monitoring server 20 configured to calculate a red green blue (RGB) Depth Bounding Area for a gaming table to calibrate the corresponding bet recognition device 30.

Game monitoring server 20 and bet recognition device 30 calibrates each bet area to ensure that only the chips in the bet area are counted, and not chips in other areas of the gaming table that are not in play. The bet area may be defined in response to input received at front end interface 60 providing a graphical display of the gaming table surface and using an input device (e.g. a keyboard and mouse) to define a region. As another illustrative example, the bet area may also be defined by positioning chips in the bet area and nothing else on the gaming table.

Game monitoring server 20 and bet recognition device 30 may automatically implement bet area calibration by scanning the gaming table and detecting any chips on the gaming table surface. If the chips on the gaming table are directly inside the bet area then game monitoring server 20 will automatically record xyz coordinate values for the detected chips.

The game monitoring server 20 may be configured for performing various steps of calibration, and the calibration may include developing an array of reference templates in relation to the particular set up of a gaming surface or gaming table. For example, the reference templates may include what chips "look like" at a particular table in view of usual gameplay settings, etc. Further, the reference templates may track lighting conditions across the span of a day, a season, in view of upcoming events, nearby light sources (e.g., slot machines), etc. New templates may be provided, for example, when new chips or variations of chip types are being introduced into circulation at a particular gaming facility. In some embodiments, such introduction of new chips may require a machine-learning training phase to be conducted to build a reference library.

The calibration may be conducted, for example, on an empty table to determine where the betting areas should be, where any demarcations exist, etc. The calibration may be used to "true up" color settings, lighting conditions, distances, etc. For example, the reference templates may be indicative of how many pixels are generally in a chip in a first betting area, based on their position on a stack of chips, etc. The calibration may also track the particular height of chip stacks based on how many chips are in the stacks and what kind of chips are in the stack. These reference values may be stored for future use during bet recognition, and may be compressed such that only a subset of features are stored for reference. The subset of features stored, for example, may be utilized in a pattern recognition and/or downstream machine-learning approach where relationships are dynamically identified between particular features and recognized bets.

The calibration may be conducted with reference games and betting, and tracked against manual and/or semi-manual review to determine accuracy and features for extraction, and characteristics associated with the bet recognition may be modified over time. For example, the processing/preprocessing steps may be modified to change definitions of bet areas, bounding boxes, what image features are considered background or foreground, how lighting needs to be compensated for in view of changing lighting conditions, transient shadowing, etc.

Embodiments described herein provide a game monitoring server 20 configured to monitor betting activities by calculating RGB and Depth Data for chips detected within bet areas of the gaming table.

The game monitoring server 20 may be configured to generate an electronic representation of the gaming table surface. The game monitoring server 20 is configured to process the captured chip data images by segmenting the background chips and other data from the gaming table images relative to the distance from camera component of the bet recognition device 30, or relative to the position on the gaming table. The bet recognition device 30 may only capture and transmit portions of the image data relating to the chip stack itself to the game monitoring server 20 via bet recognition utility 40. In accordance with some embodiments the game monitoring server 20 or bet recognition utility 40 receive image data for the gaming table surface and perform processing operations to reduce the image data to portions of the image data relating to the chip stack itself. The game monitoring server 20 implements image processing to transform the image data in order to detect the number of chips in the betting area and ultimately the final value of the chips.

In some embodiments, the electronic representation of the gaming table surface is used as a streamlined approach to extracting information relevant to the bet recognition. For example, the gaming table surface may be represented in two- or three dimensional space and used for coordinate positioning. There may be defined bet areas that are provided based on position, etc. and in some embodiments, the actual bet areas may include further markings that may or may not be visible to human players that are used for machine vision boundary demarcation and/or depth calculations. For example, there may be areas indicated to indicate depth (e.g., if a particular boundary is covered, the boundary is known to be at position (x, y), and therefore a chip stack is at least around or covering position (x, y).

The game monitoring server 20 may utilize the electronic representation in generating a streamlined set of compressed information that is used for downstream analysis, such as for bet recognition, confidence score tracking, machine learning, etc. For example, the electronic representation may be updated as chips are placed into betting areas and sensed by the sensors. The sensors may track various elements of information associated with the chips and modify the electronic representation to note that, with a particular confidence level, that a stack of chips has been placed, the stack of chips having a particular makeup and value of chips, etc. The game monitoring server 20 may then extract out only specific features and discard the other information in preparing a compressed set of information representative of the bets being placed on a gaming surface (e.g., only a simple set of depth coordinates, the estimated make-up of the chips in the stack, confidence values associated with how accurately the system considers its assessments to be, etc.).

Embodiments described herein provide a game monitoring server 20 configured to monitor betting activities by calculating depth data for chips detected within bet areas of the gaming table. Depth data can be captured with a variety of different processes using different imaging components. For example, an imaging component may include stereo cameras (e.g., RGB cameras) mounted in different positions on the gaming table to capture image data for the betting areas. An imaging component with stereo cameras may have two or more black/white or RGB cameras, for example. As another example, an imaging component may include a depth aware camera using Infrared (IR) and Time-Of-Flight (TOF). An imaging component with depth cameras may use IR TOF or IR projection of structured light or speckled pattern.

Depth data may be an important output in relation to machine-vision systems. For example, the distance from a chip may indicate how many available pixels would make up chips in an image of chips, etc. The number of available pixels may determine how a bounding box may be drawn (e.g., dimensions) around a chip, a stack of chips, etc., and in some embodiments, may be a factor in automatic determinations of confidence scores associated with machine-vision estimations of the values of the chips (e.g., if there are only 12 pixels available due to the stack being far away for a particular chip, and the pixels are impacted by poor lighting conditions and partial obstructions, the confidence score may be particularly low, especially if the chip has markers that are difficult to discern in poor lighting conditions).

Depth data may be generated based on, for example, tracking parallax effects (e.g., by moving a single sensor), stereoscopic effects (e.g., by comparing parallax in two different cameras), pressure sensors in the betting areas, range finding radar (e.g., Doppler radar), UV light dispersion/brightness levels, distortion effects, etc.

Where sensors may be obstructed, depth data may be estimated from an aggregated set of captured images over a duration of time. For example, differences between each of the plurality of captured images may be compared to estimate the presence of the one or more chips despite the presence of the one or more obstructing objects that are partially or fully obstructing the one or more chips from being sensed by the one or more sensors.

The depth data may be determined in combination with a confidence score. For example, if a chip is particularly far away, there may be a limited number of pixels to analyze regarding the chip. The number of pixels available may be further reduced if lighting conditions are poor, the chips are obstructed, there are imaging artifacts, etc., and accordingly, a lower confidence score may be presented.

Figure 5:
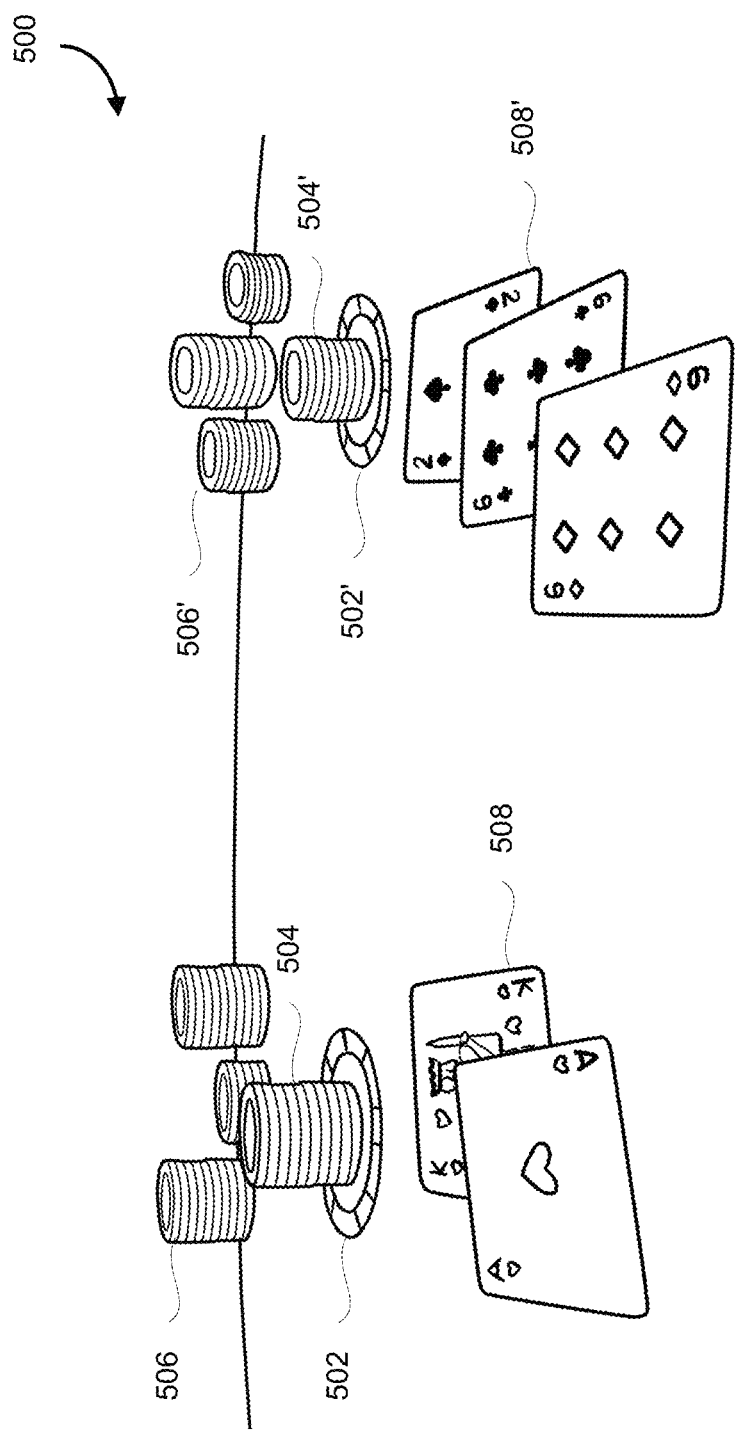
FIGS. 5 to 7 illustrate example images taken from a bet recognition device mounted on a gaming table according to some embodiments.
Figure 6:
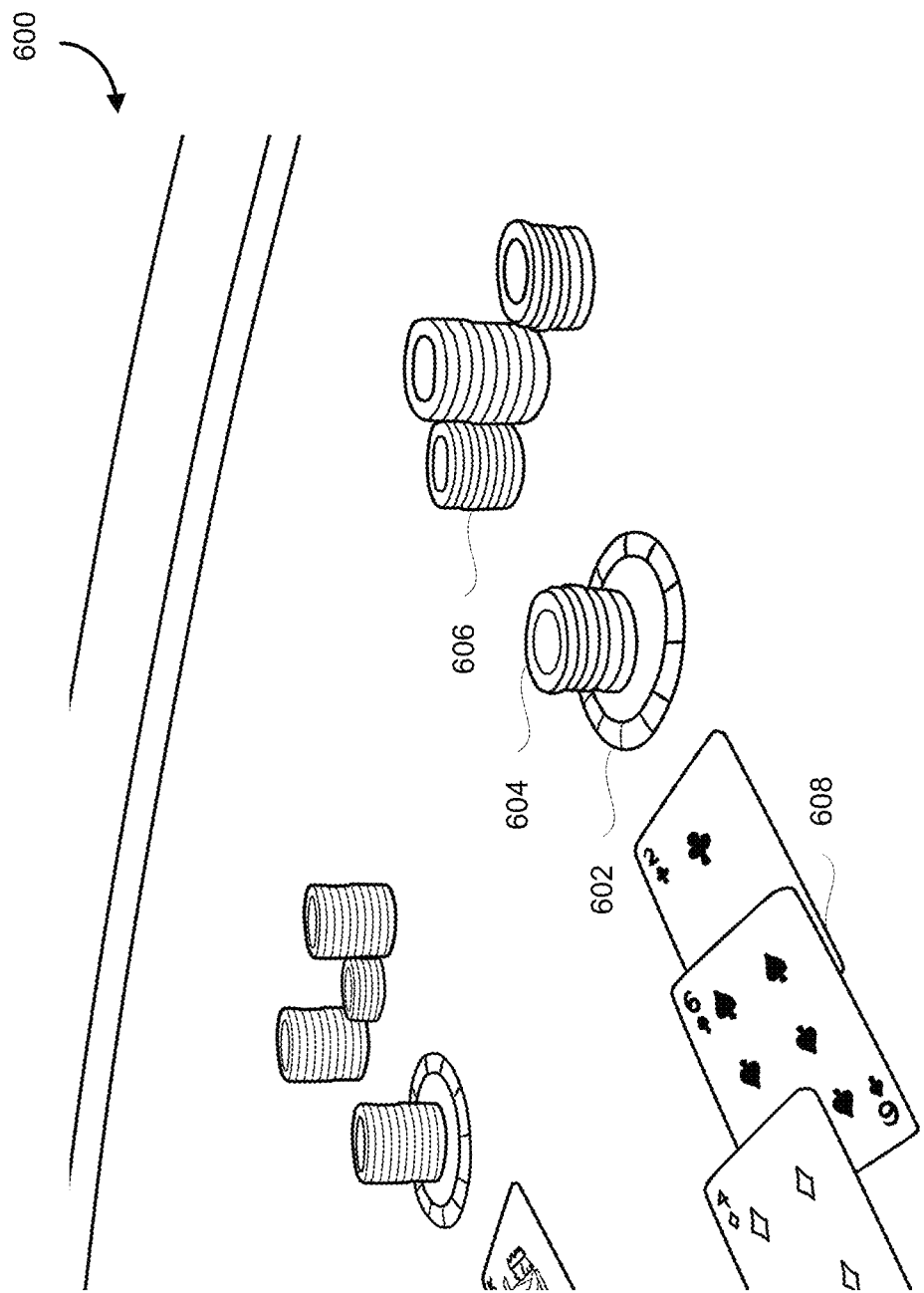
Figure 7:
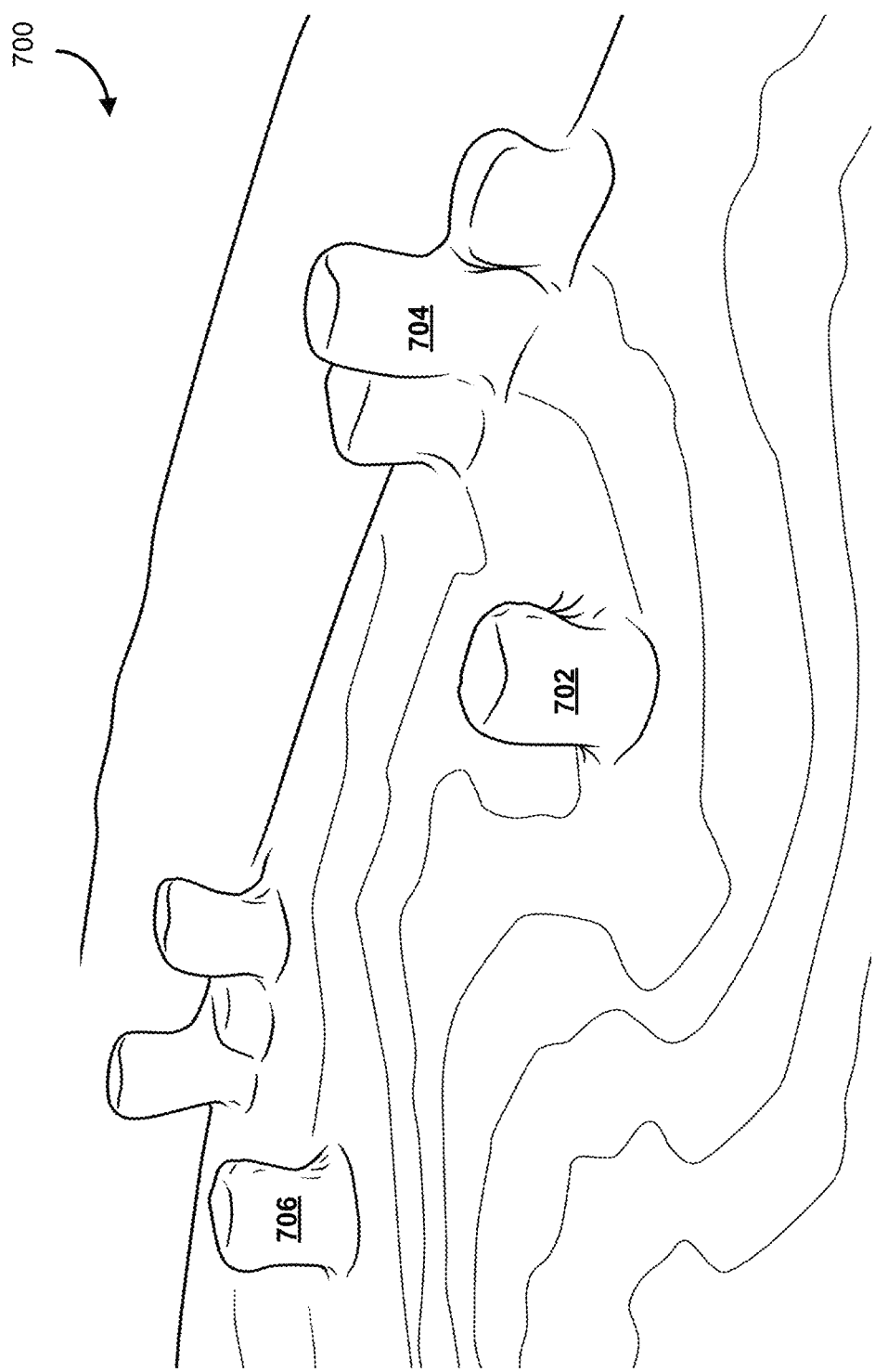

FIGS. 5 to 7 illustrate example images taken from a bet recognition device mounted on a gaming table according to some embodiments. The image data for the images may include depth data taken from a table-mounted depth camera. The example images illustrate the table and bet area rendered in three-dimensions (3D). The image data defines stacks of chips in the bet areas in 3D defined using X, Y, and Z coordinate values. The game monitoring server 20 may represent a gaming table surface as a model of X, Y and Z coordinate values including betting areas.

As depicted in FIG. 5, the sensors may take images 500 of the gaming surface, including bet area 502/502', cards 508/508', stacks of chips 504/504'/506/506', etc. As noted in FIG. 5, there may be some chips in the foreground 504/504', some in the background 506/506', there may be other background images, etc. The images may be taken in human visible and/or non-human visible wavelength ranges. For example, the images may utilize infrared, ultraviolet, and accordingly, some wavelengths may be more prominent than others. Another image 600 is depicted in FIG. 6, having bet area 602/602', cards 608/608', stacks of chips 604/604'/606/606', etc. As noted in FIG. 6, there may be some chips in the foreground 604/604', some in the background 606/606'.

FIG. 7 is a compressed representation 700, wherein non-chip imagery has been filtered out, and the image primarily consists of images of stacks of chips 702, 704, and 706. Filtering techniques, for example, include the use of edge detection algorithms (e.g., difference of Gaussians). The representation 700 may be compressed such that chips are detected among other features, so that various regions of interest can be identified. In some embodiments, representation 700 is combined with depth data so that background and foreground chips may be distinguished from one another. For example, chips that may be within a betting area indicative of a bet may also have chips that are in the background (e.g., chips that the player has in the player's stacks that are not being used for betting). Depth data may be used to distinguish between those chips that are in the betting area as opposed to those chips that are out of the betting area.

Figure 8:
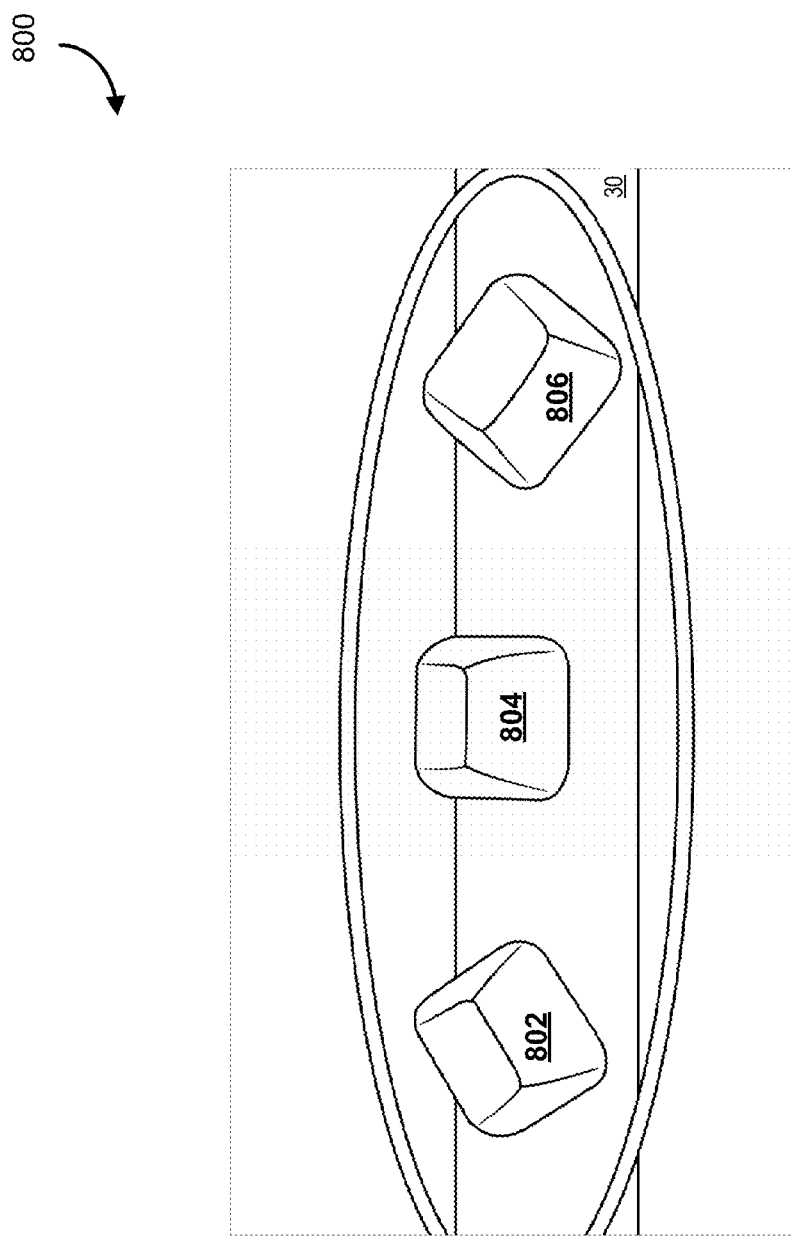
FIGS. 8 and 9 illustrate example images of a bet recognition device mounted on a gaming table according to some embodiments.

In some embodiments, the imaging component may include a wide angle camera. The wide angle camera can used to capture image data for all bet areas game monitoring server 20 may implement correction operations on the image data to remove warping affects. FIG. 8 illustrates an example schematic 800 of a bet recognition device 30 with a wide angle camera.

In some embodiments, the imaging component may include three cameras 802, 804 and 806 per gaming table. Three cameras may be mounted on a gaming table in a configuration in front of the dealer position on the gaming table. Each camera may be dedicated or responsible for two bet areas. When a hand has started (e.g., as per a detected hand start event) each camera may capture image data of their respective bet areas for transmission to game monitoring server 20. The game monitoring server 20 stores the captured image data in a central data store 70. When new image data is sent to the data store 70 it may be processed by game monitoring server 20 using the recognition process described herein. The processed image data may generate bet data including the number of chips in a bet area and the total value of chips in the bet area. Game monitoring server 20 stores calculated bet data at data store 70. The bet data may be linked with timestamp which is also recorded at data store 70. When all image data captured by the three cameras has been processed, image data for the hand played is recorded to the data store 70. Game monitoring server 20 is operable to correlate the capture hand event data to the bet data to calculate bet values for particular hands.

The cameras of imaging component can be installed into the back bumper located between the dealer position and the gaming table. This installation process simplifies retrofitting existing gaming tables allowing the casino operator to replace the back bumper without having to impact the gaming table felt or surface.

Figure 9:
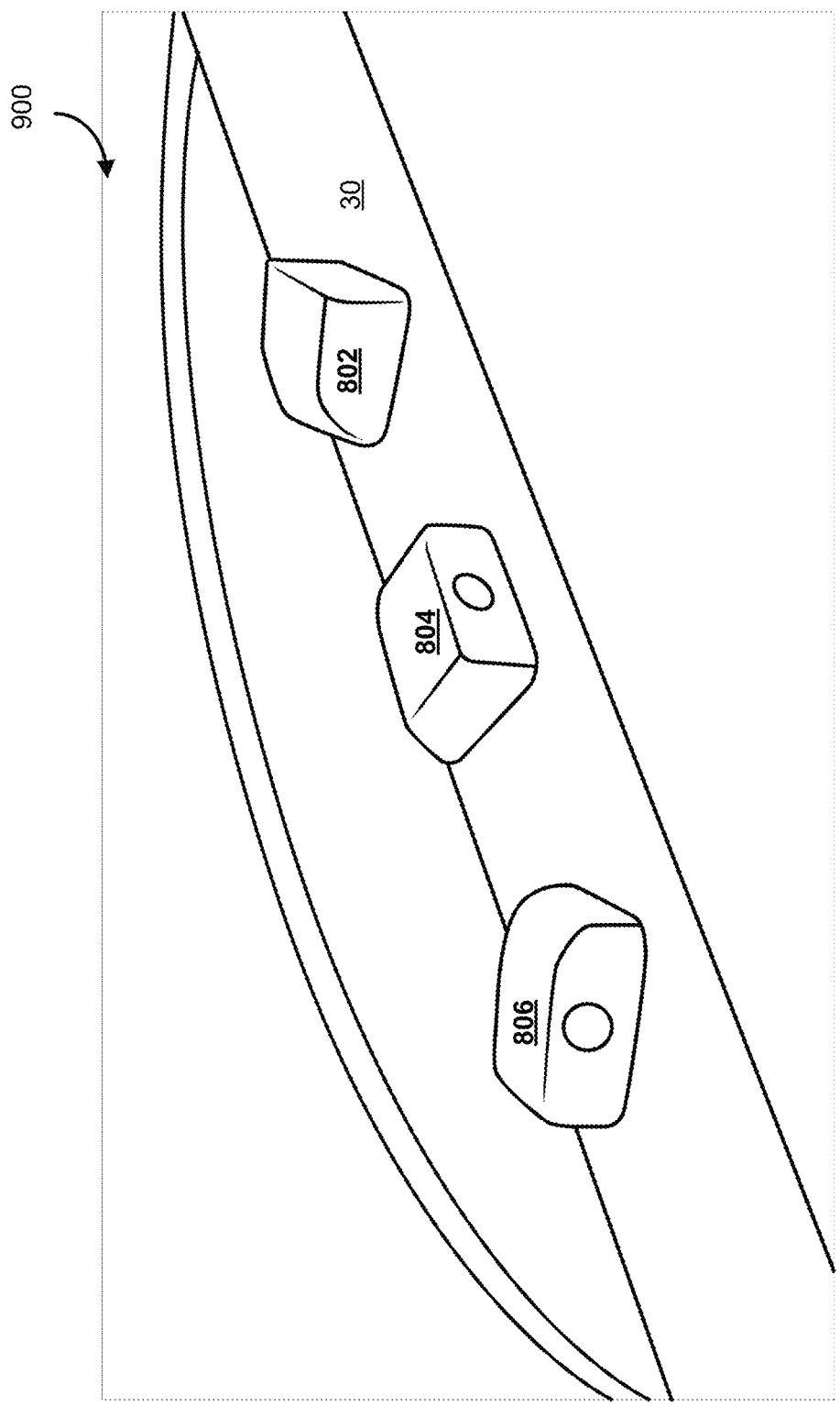

FIGS. 8 and 9 illustrate example images of a bet recognition device 30 mounted on a gaming table according to some embodiments. The illustrative example 900 shows three cameras as an imaging component of the bet recognition device 30. The cameras are installed into the back bumper of the gaming table. Game monitoring server 20 can stitch together image data captured by different cameras to recreate a 3D model of the table surface using X, Y and Z coordinate values. In some example embodiments, the game monitoring server 20 may evaluate image data independently for each camera. Game monitoring server 20 uses the captured image data to generate a 3D model of the gaming table surface. Game monitoring server 20 processes the image data by isolating image data for all bet areas and cropping the image data for all bet areas for further processing. Game monitoring server 20 processes the image data for the bet area in order to find bet value for each bet area and total bet or chip amount for each bet area.

In some embodiments, the 3D model is utilized to generate a representation of where the system interprets and/or estimates the chips to be. The 3D model may be adapted to extrapolate position information based on known sizes and/or dimensions of chips, as the image data may often only include an incomplete set of information required to generate a 3D model. Multiple images may be stitched together to derive the 3D model.

Figure 10:
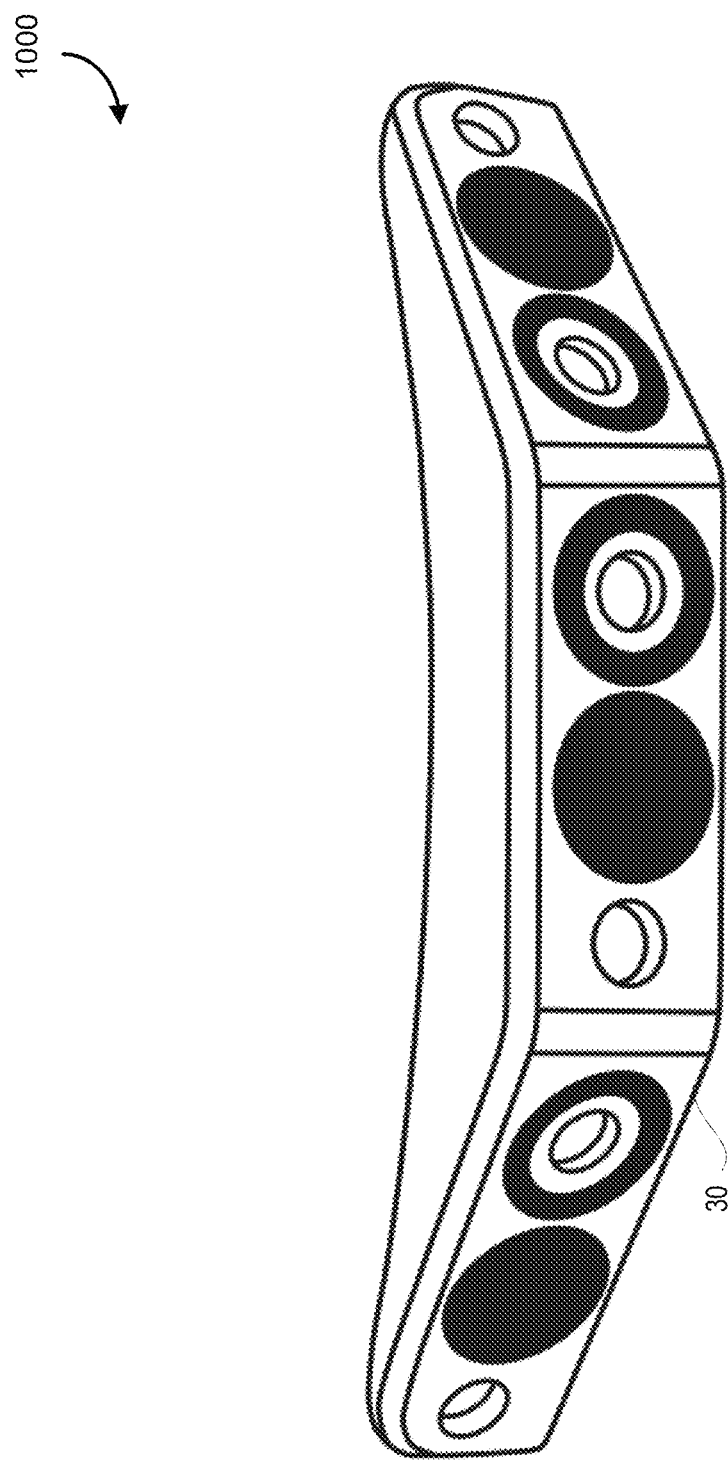
FIGS. 10 and 11 illustrate example images of a bet recognition device according to some embodiments.
Figure 11:
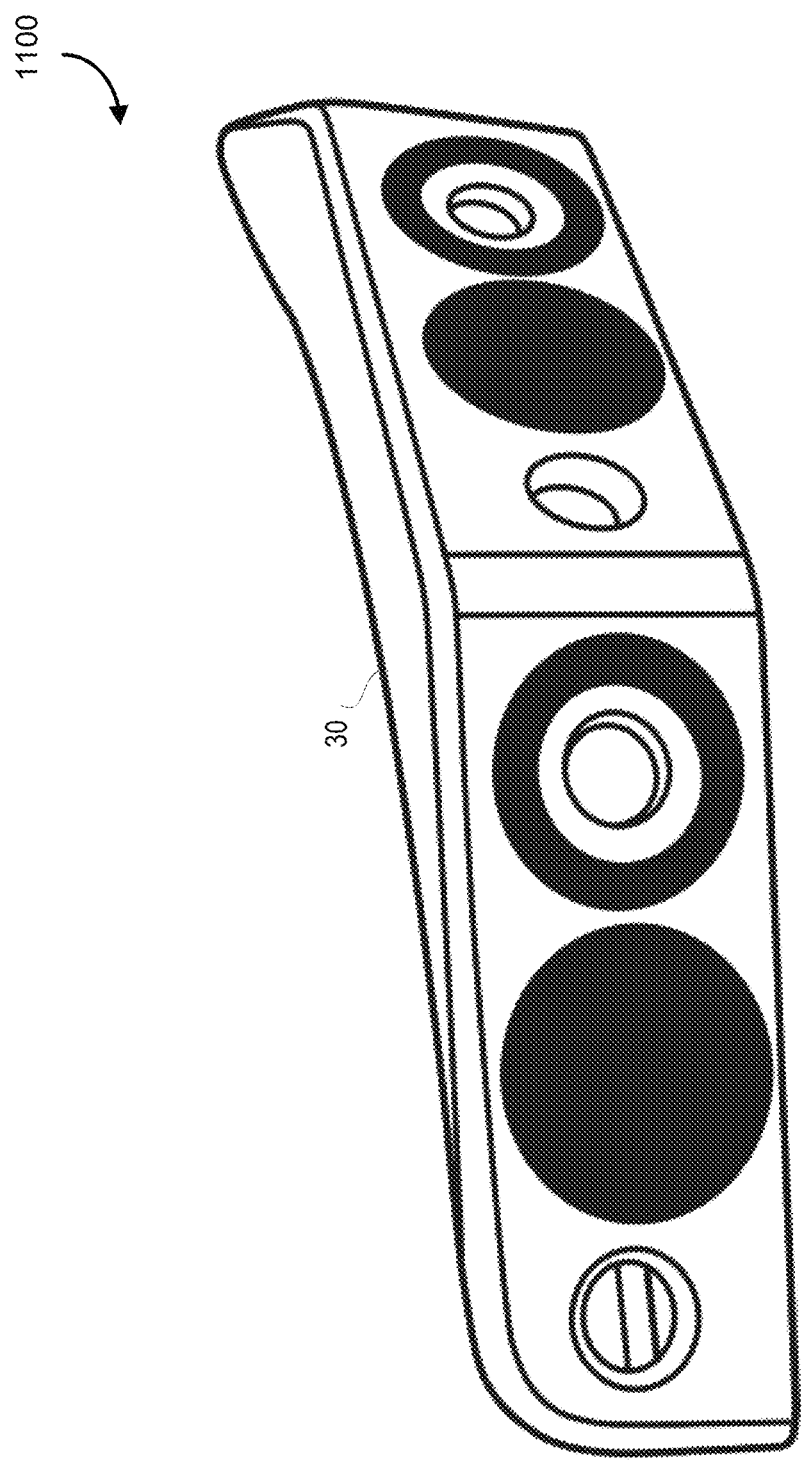

FIGS. 10 and 11 illustrate example images of a bet recognition devices 30 according to some embodiments. FIG. 10 is an illustration 1000 of an example bet recognition device 30 including three cameras capturing different portions of the gaming table surface. FIG. 11 is an illustration 1100 that illustrates another example bet recognition device 30 including a camera.

Figure 12:
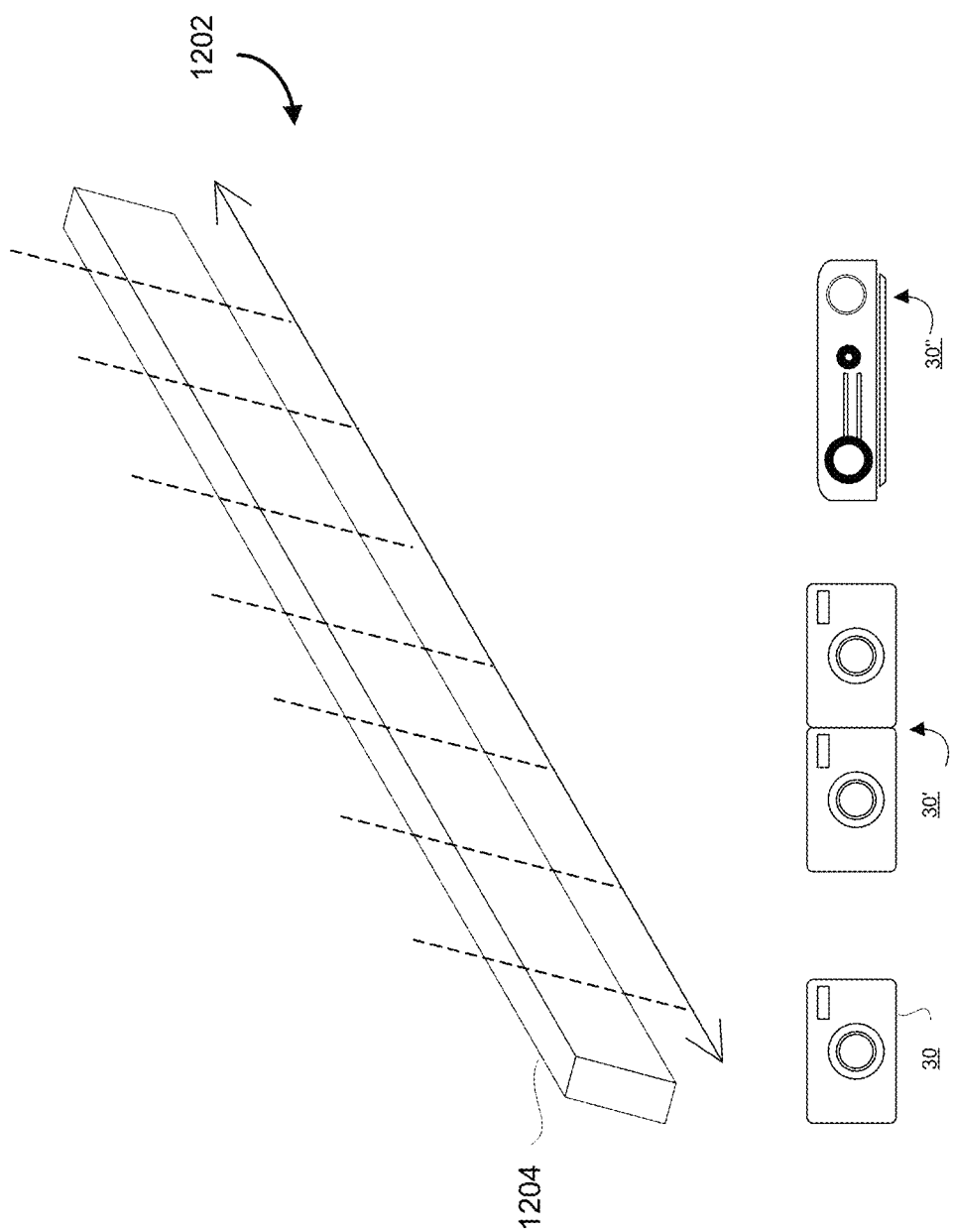
FIG. 12 illustrate a schematic diagram of another example bet recognition device according to some embodiments.

FIG. 12 illustrates a schematic diagram 1202 of another example bet recognition device 30 according to some embodiments. The bet recognition device 30 may include a moving camera according to some embodiments. A linear bearing can be used alongside a stepper motor to move the camera from one side of the gaming table 1204 to the other. This allows for one camera system to capture image data of the gaming table surface from different angles (as denoted by the dashed lines). The number of image frames captured and the interval at which the image frames are captured can be defined. The imaging component may be an RGB Camera 30 or two RGB cameras 30', or one depth camera 30", for example.

The movement of the camera may be used, for example, to assess depth using parallax measurements, to stitch together images in generating a 3D model, etc.

Game monitoring server 20 implements a chip recognition process to determine the number of chips for each betting area and the total value of chips for the betting area. For example, when a new hand is detected at a gaming table, bet recognition device 30 captures image data of each bet area on the gaming table surface and sends the captured image data to game monitoring server 20.

In some embodiments, bet recognition device 30 isolates image data for each bet area from image data for a larger portion of the gaming table surface and sends cropped image data only for the bet area to the game monitoring server 20. In other embodiments, game monitoring server 20 isolates image data for each bet area from image data for a larger portion of the gaming table surface.

Game monitoring server 20 processes each image frame of the captured image data and segments image data defining chips for each chip by size and color to determine a total number of chips for the betting area. Game monitoring server 20 detects a face value for each chip. Data records of data store 70 may link color and size data to face value. Game monitoring server 20 may also implement number recognition on the image data for chips to detect face value. Game monitoring server 20 calculates the total value of the bet by multiplying the number of chips detected by the face value of the chips.

FIGS. 13A, 13B and 14 illustrate example images taken from a bet recognition device mounted on a gaming table and processed images after transformation by server according to some embodiments. The images 1300A, 1300B, and 1400 illustrate segments generated by the game monitoring server 20 to determine the number of chips and the face value of the chips. Game monitoring server 20 stores the bet data in data store 70. A "bounding box" 1602 is illustrated for chip 1402.

Chips 1300-1314 may be processed by size, and color (e.g., in this example, 1302 is a different type of chip than the others), and the sensors and/or imaging components may obtain data, including images in visual spectrum or non-visual spectrum. For example, some markings may be only shown in infrared or ultraviolet, or may fluoresce in response to the reference illumination applied to the chips. Texture and shape, in some embodiments, are also tracked based on visually apparent features.

As depicted in FIG. 13B, the images may be processed such that the sidewalls of the chips can be analyzed, by identifying a region of interest represented, for example, by the pixels within a "bounding box" 1316 and 1316' around each of the chips. Depending on the amount of available resources, the determination of the region of interest may be conducted at a backend server, or during pre-processing on a device coupled to the gaming table, in various embodiments.

Figure 13:
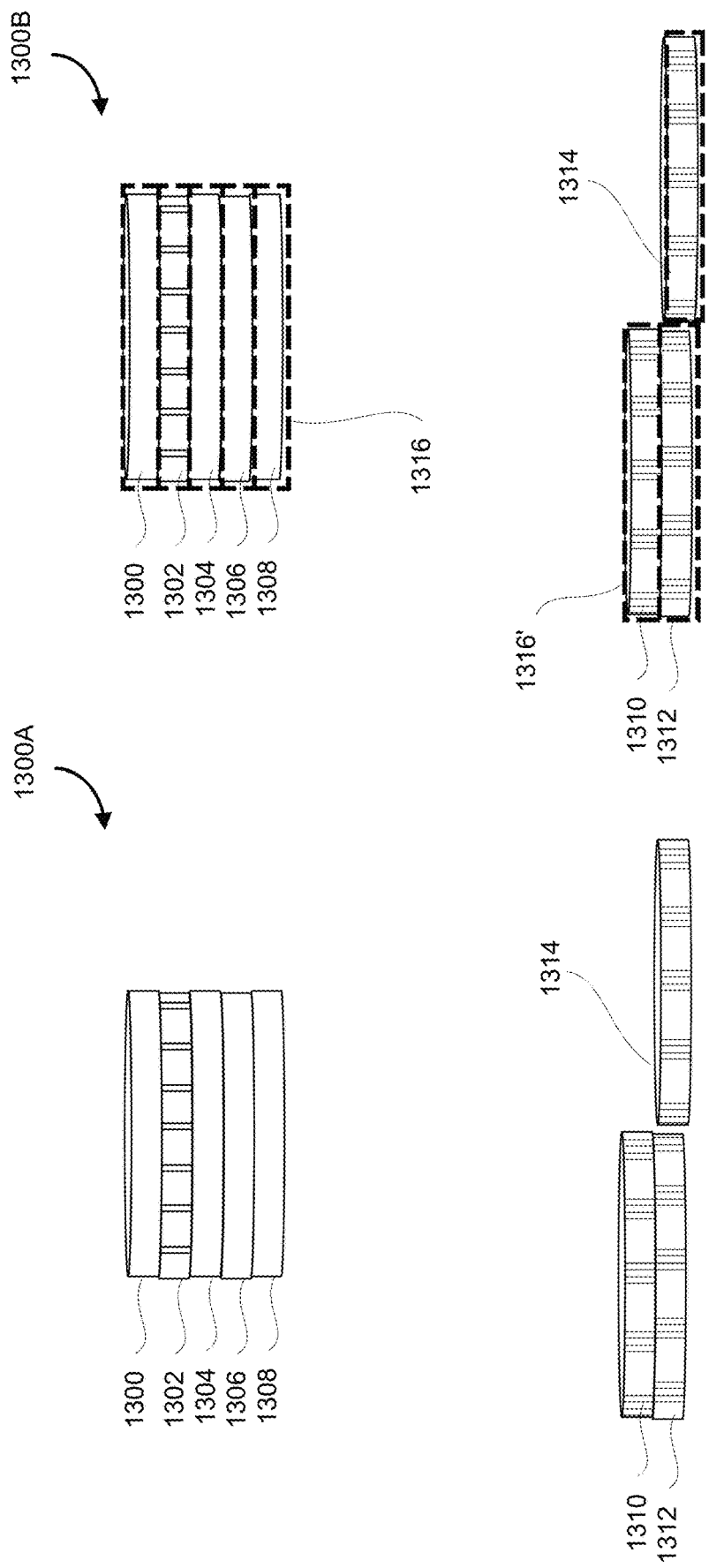

Game monitoring server 20 watches for new captured image data for the bet area and processes the new captured images against existing data records for bet data stored in data store 70. Chips in the bet area are checked for size, shape, and color to ensure accuracy. FIGS. 13 and 14 illustrate that only the chips in the bet area are detected by the game monitoring server 20 bet recognition process. Once processing is completed, the game monitoring server 20 sends the bet values of each bet area or region to the data store 70. In some example embodiments, game monitoring server 20 associates a hand identifier to the bet data values. A timestamp may also be recorded with the bet data values stored in data store 70.

Embodiments described herein provide a bet recognition device 30 with both an imaging component and a sensor component. Bet recognition device 30 captures image and sensor data for provision to gaming monitoring server 20 to calculate bet data.

Figure 15:
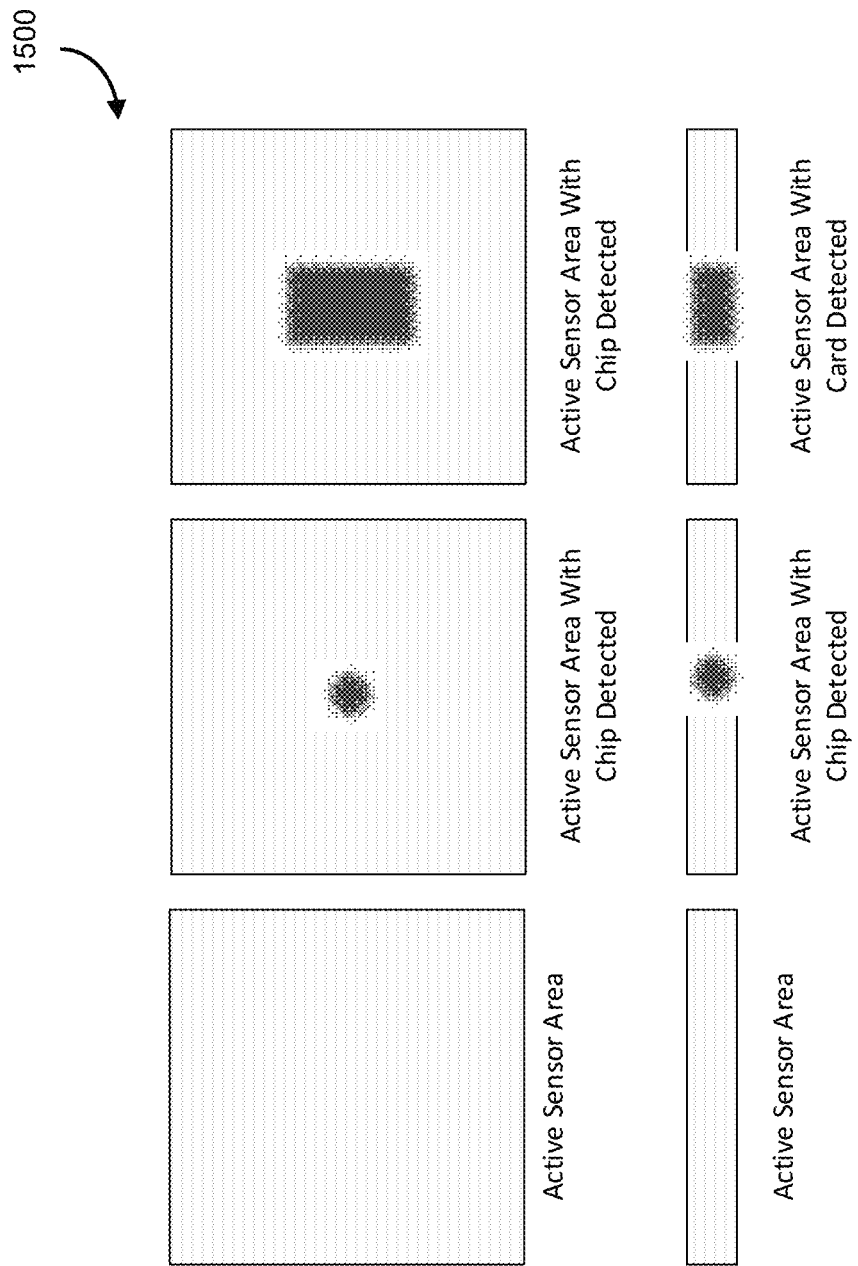
FIG. 15 illustrates a schematic diagram of a sensor array device for bet recognition device according to some embodiments.

FIG. 15 illustrates a schematic diagram 1500 of a sensor array device for bet recognition device according to some embodiments. A bet recognition device may include a microcontroller, a sensor array network and connection cables. The microcontroller may run the logic level code for checking onboard sensors (e.g. sensors integrated into the gaming tables via client hardware devices 30) for predefined thresholds triggering capture of image data to determine bet data. The microcontroller may also emulate a serial communication protocol for the host. The sensor array network may include interconnected sensors that can communicate with each other. The sensors may be integrated with a gaming table and positioned relative to playing area of the table. They may be all connected via the microcontroller and routed accordingly. A connection cable may process the digital serial signal and allow the device to connect via USB or other protocol (e.g. wireless) to a computer with a free port. The data may be transmitted via the USB cable or other protocol and may be read by a small utility on the host computer.

Figure 16:
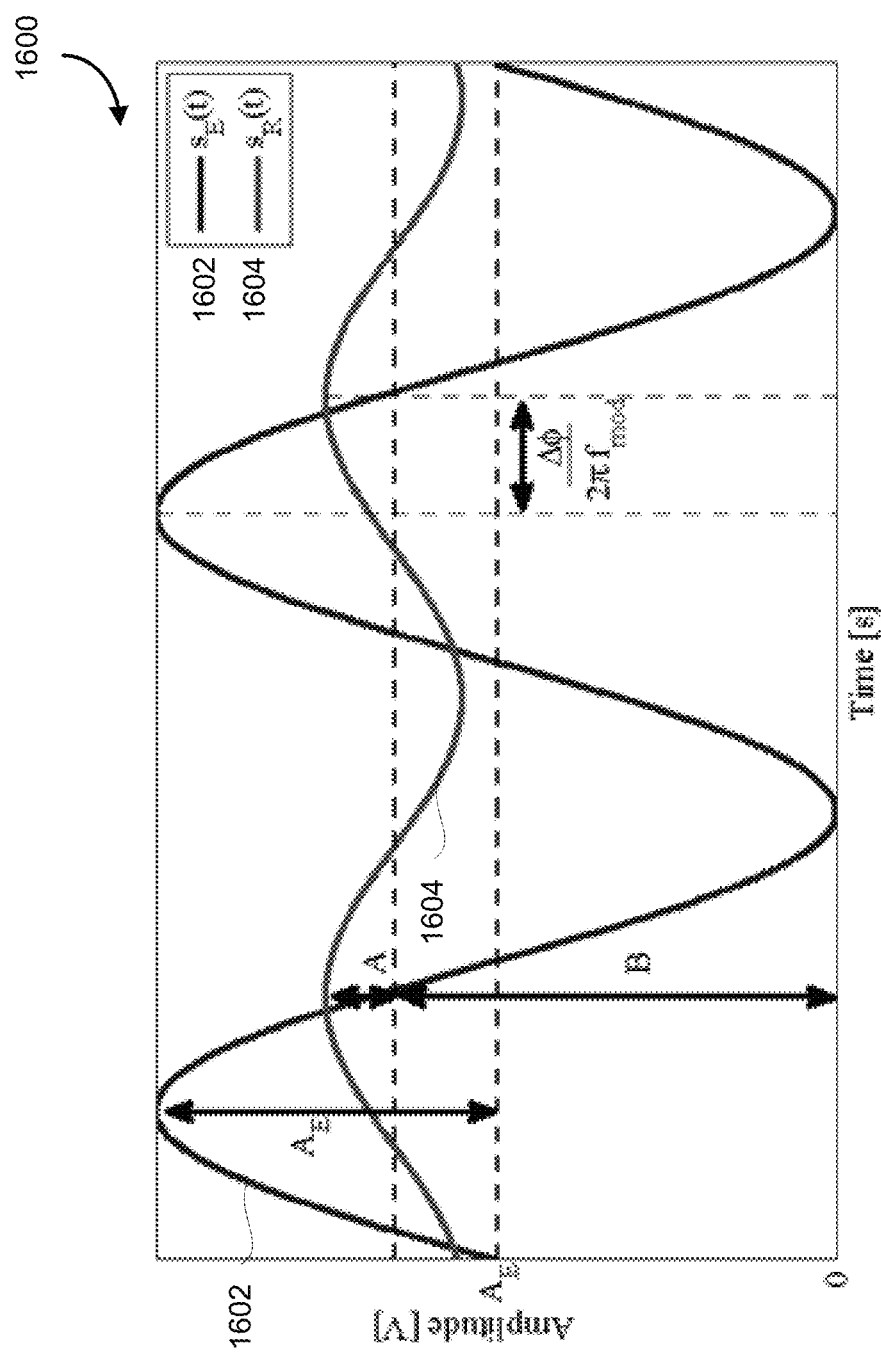
FIG. 16 illustrates a schematic graph of the amplitude of the received signal over time according to some embodiments.

FIG. 16 illustrates a schematic graph 1600 of the amplitude of the received signal from a sensor and/or imaging component over time according to some embodiments.

The following is an illustrative example measurement setup for a scene point. A sensor estimates the radial distance by ToF or RADAR principle. The distance, $\rho$, is calculated at time $\tau$ with electromagnetic radiation at light speed c, is $\rho = c\tau$. The transmitter emits radiation, which travels towards the scene and is then reflected back by the surface to the sensor receiver. The distance covered is now $2\rho$ at time T. The relationship can be written as:

$$p = \frac{c\tau}{2}$$

Signal $S_E(t)$ may be reflected back by the scene surface and travels back towards a receiver (back to receiver) and written as:

$$S_E(t) = A_E[2\pi f_{mod}t]$$

Because of free-path propagation attenuation (proportional to the square of the distance) and the non-instantaneous propagation of IR optical signals leading to a phase delay $\Delta\emptyset$. The Attenuated Amplitude of received signal may be referred to as $A_R$. The interfering radiation at IR wavelength of emitted signal reaching the receiver may be referred to as $B_R$.

Waveforms may be extracted in relation to each chip (e.g., as extracted from the available pixels in image data for each channel of information), and these waveforms may represent, for example, information extracted from histogram information, or from other image information. For example, a Fourier transform may be conducted on the image data separately from extracted histogram information. In some embodiments, a histogram and a Fourier transform are used in combination.

A best-matching waveform approach may be utilized to estimate which color and/or markings are associated with a particular chip. For example, each chip may have a corresponding waveform (for each image channel) and these may be used, in some embodiments, in aggregate, to classify the chips based on chip values. In some embodiments, where the data is not sufficiently distinguishing between different chip values (e.g., poor lighting makes it difficult to distinguish between pink and red), the system may be adapted to provide a confidence score associated with how closely matched the waveform is with a reference template. This confidence score, for example, may be used to modify sensory characteristics, lighting conditions, etc., so that the confidence score may be improved on future image processing. In some embodiments, the interfaces provided to users may also utilize the confidence score in identifying how strong of a match was determined between chip images and reference templates. The received signals 1602 and 1604 may be different for each type of chip, and the waveforms may be processed through a classifier to determine a "best match". As described in some embodiments, the confidence in determining a best match may be based on (1) how well matched the chip is to a reference waveform, and (2) how much the chip is able to distinguish between two different reference waveforms. The confidence score may be used to activate triggers to improve the confidence score, for example, by automatically activating reference illumination or requesting additional images (e.g., moving the camera to get more pixels due to an obstruction, lengthening a shutter speed to remove effects of motion, temporarily allocating additional processing power to remove noise artifacts).

Figure 17:
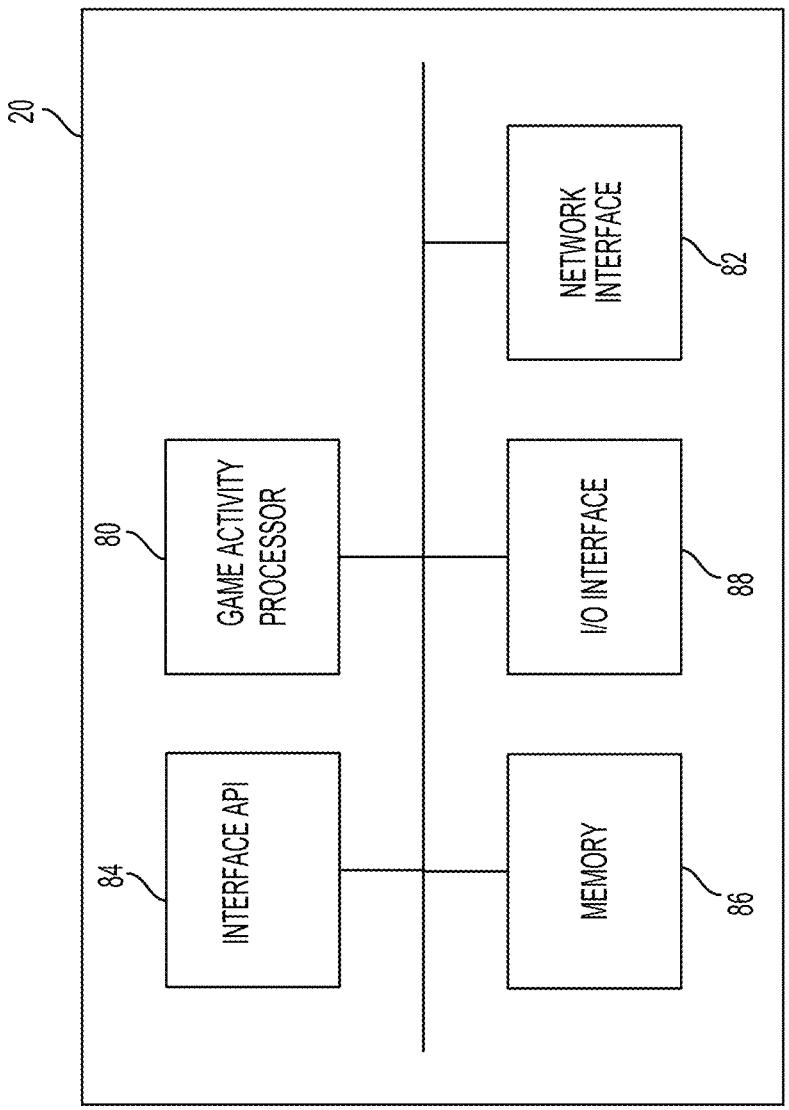
FIG. 17 illustrates a schematic of a game monitoring server according to some embodiments.

FIG. 17 is an illustration of a schematic of a game monitoring server 20 according to some embodiments.

Game monitoring server 20 is configured to collect game event data including bet data and hand start data and hand stop data, which may be referred to generally as hand event data. The hand event data may be used to determine a hand count (e.g., the number of hands played by various players) for a particular gaming table for a particular period of time. Bet and hand count data may be associated with a time stamp (e.g., start time, stop time, current time) and table identifier. The bet data may also be associated with a particular player (e.g. dealer, customer) and a player identifier may also be stored in the data structure.

For simplicity, only one game monitoring server 20 is shown but system may include more game monitoring servers 20. The game monitoring server 20 includes at least one processor, a data storage device (including volatile memory or non-volatile memory or other data storage elements or a combination thereof), and at least one communication interface. The computing device components may be connected in various ways including directly coupled, indirectly coupled via a network, and distributed over a wide geographic area and connected via a network (which may be referred to as "cloud computing").

For example, and without limitation, the computing device may be a server, network appliance, set-top box, embedded device, computer expansion module, personal computer, laptop, or computing devices capable of being configured to carry out the methods described herein.

As depicted, game monitoring server 20 includes at least one game activity processor 80, an interface API 84, memory 86, at least one I/O interface 88, and at least one network interface 82.

Game activity processor 80 processes the game activity data including image data, bet data, and so on, as described herein. Each processor 80 may be, for example, a microprocessor or microcontroller, a digital signal processing (DSP) processor, an integrated circuit, a field programmable gate array (FPGA), a reconfigurable processor, a programmable read-only memory (PROM), or any combination thereof.

Memory 86 may include a suitable combination of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

Each I/O interface 88 enables game activity processor 80 to interconnect with one or more input devices, such as a keyboard, mouse, camera, touch screen and a microphone, or with one or more output devices such as a display screen and a speaker.

Each network interface 82 enables game activity processor 80 to communicate with other components, to exchange data with other components, to access and connect to network resources, to serve applications, and perform other computing applications by connecting to a network (or multiple networks) capable of carrying data including the Internet, Ethernet, digital subscriber line (DSL), coaxial cable, fiber optics, satellite, mobile, wireless (e.g. WMAX), local area network, wide area network, and others, including any combination of these.

Application programming interface (API) 84 is configured to connect with front end interface 60 to provide interface services as described herein.

Game activity processor 80 is operable to register and authenticate user and client devices (using a login, unique identifier, and password for example) prior to providing access to applications, network resources, and data. Game activity processor 80 may serve one user/customer or multiple users/customers.

Figure 18:
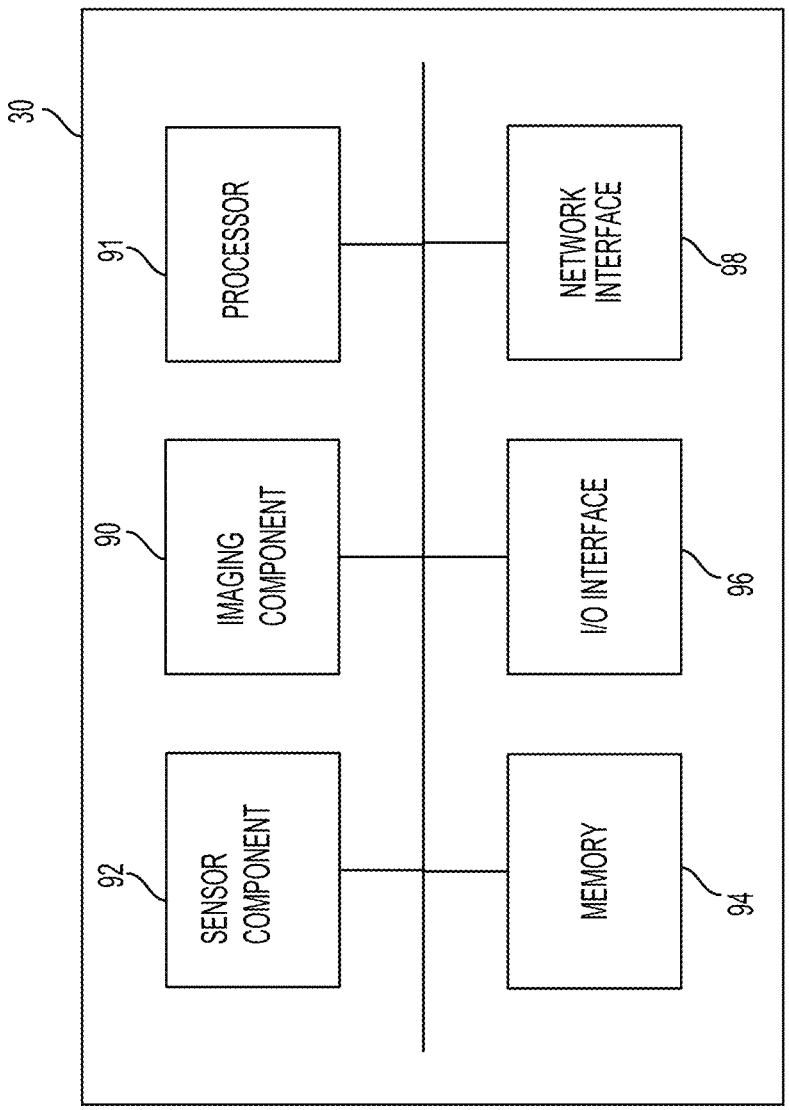
FIG. 18 illustrates a schematic of a bet recognition device according to some embodiments.
Figure 23:
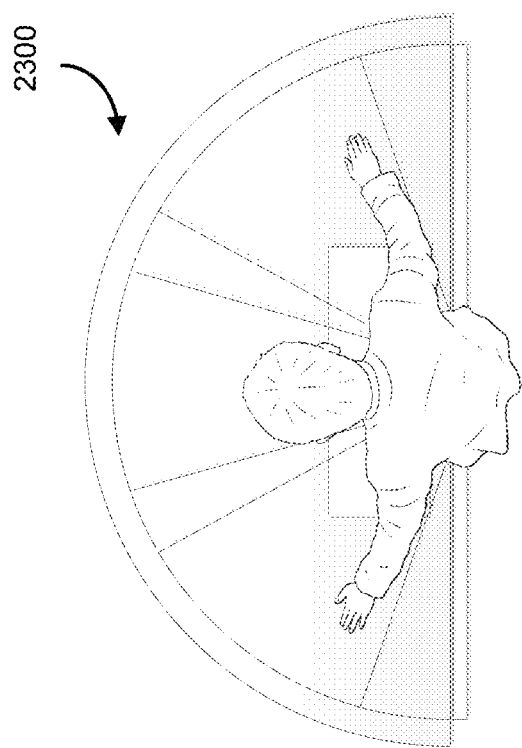
Figure 22:
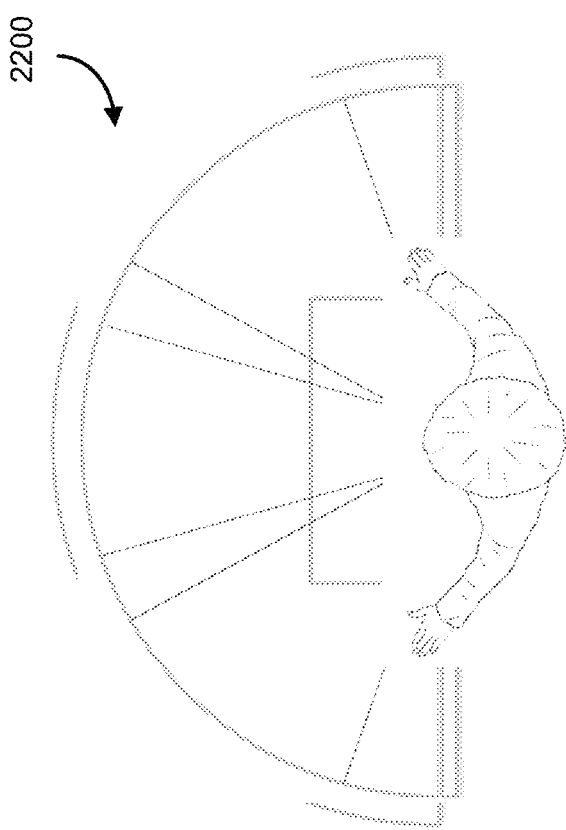
Figure 24B:
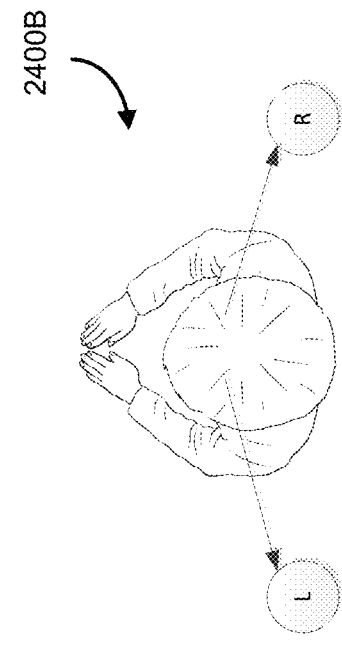
Figure 24D:
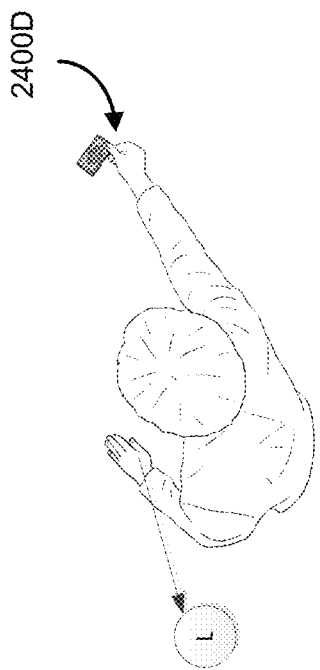
Figure 24A:
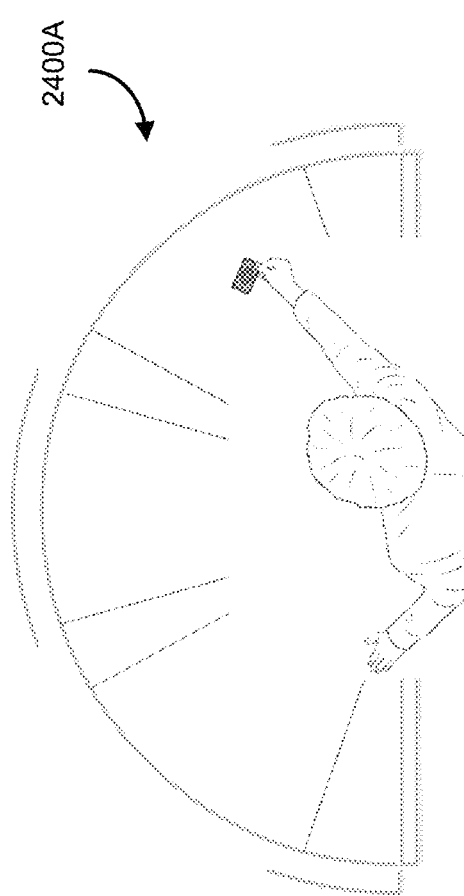
Figure 24C:
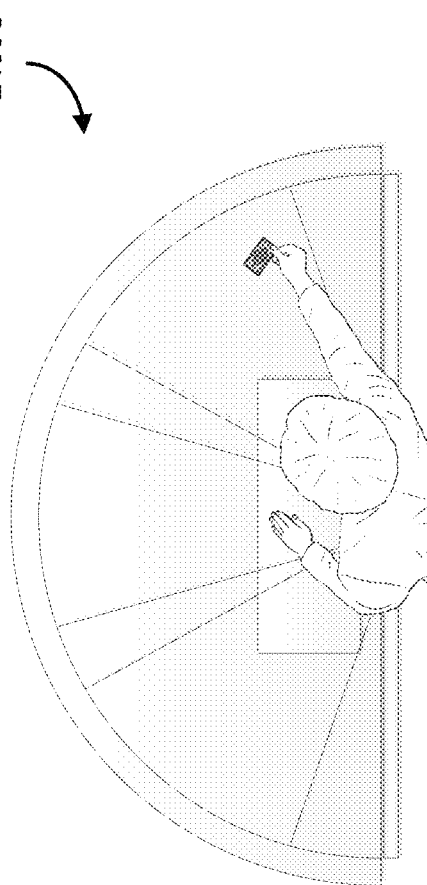
Figure 25A:
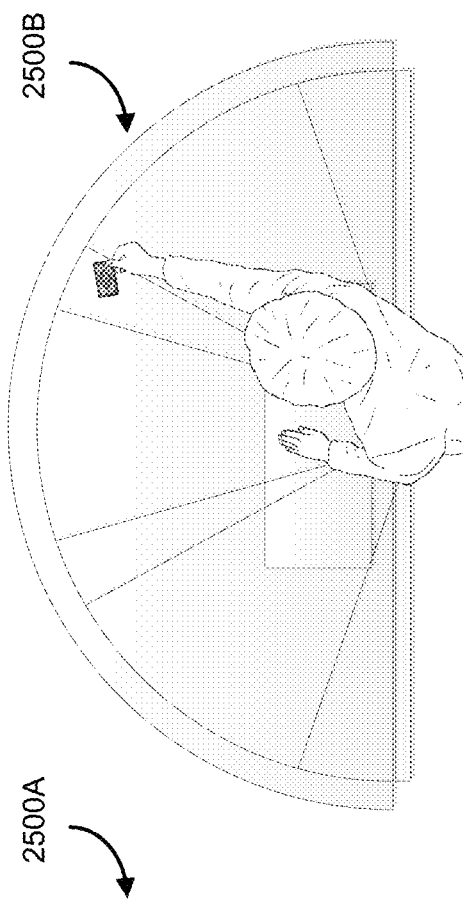
Figure 25B:
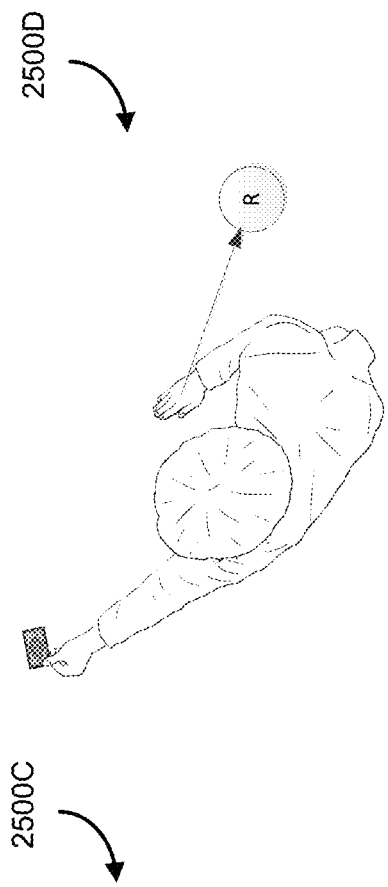
Figure 25C:
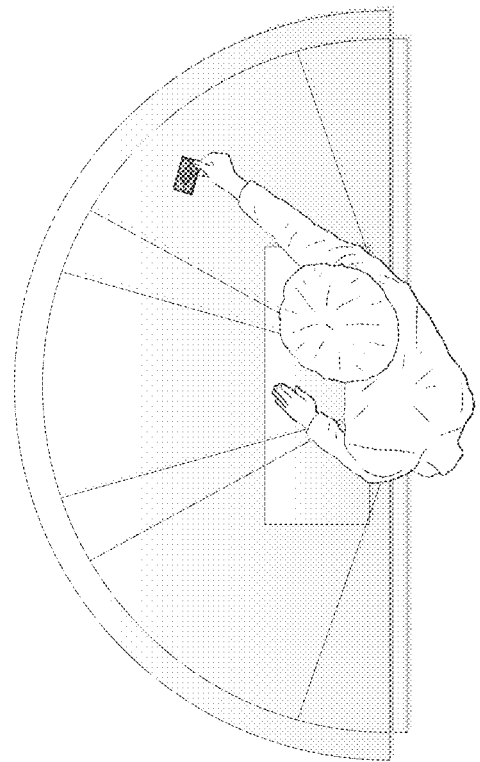
Figure 25D:
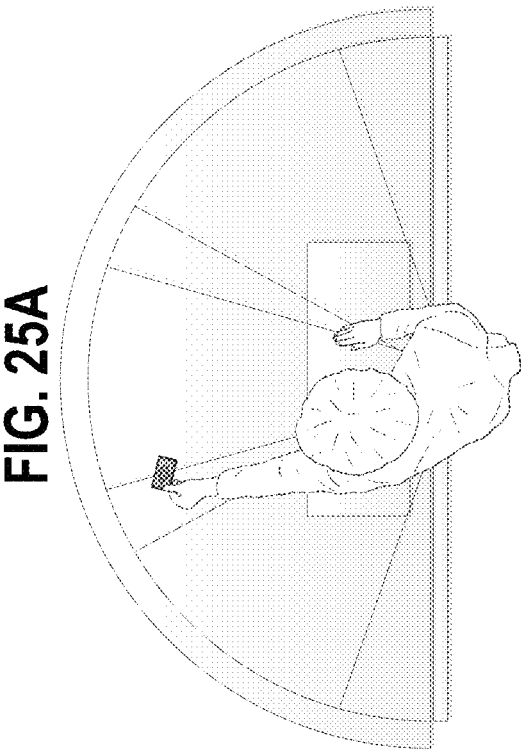

FIG. 18. illustrates a schematic of a bet recognition device 30 according to some embodiments.

As depicted, bet recognition device 30 may include an imaging component 90, sensor component 92, processor 91, memory 94, at least one I/O interface 96, and at least one network interface 98.

Processor 91 may be, for example, any type of general-purpose microprocessor or microcontroller, a digital signal processing (DSP) processor, an integrated circuit, a field programmable gate array (FPGA), a reconfigurable processor, a programmable read-only memory (PROM), or any combination thereof.

Memory 94 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

Each I/O interface 96 enables bet recognition device 30 to interconnect with one or more input devices, such as a keyboard, mouse, camera, touch screen and a microphone, or with one or more output devices such as a display screen and a speaker.

Each network interface 98 enables bet recognition device 30 to communicate with other components, to exchange data with other components, to access and connect to network resources, to serve applications, and perform other computing applications by connecting to a network.

Bet recognition device 30 may also include a scale component. Bet recognition device 30 may monitor chips and cards on the gaming table using scales. A scale may be placed underneath the casino table, or underneath the area on which the chips or cards are placed. The scale may take measurements during the time periods when no movement of the chips or cards is done. For example, a dealer may and the players may place the cards or chips on the table, upon seeing a particular gesture, a scale may read the weight and the system may determine, based on the weight, as well as the monitoring mechanism, the number of cards or chips on the table. The weight reading may be done at a later point, to confirm that no cards or chips were taken off of the table. The scale may take measurements of the weight responsive to a command by the system. As such, the system may determine when the chips or cards are not touched by the dealer or the player, thereby ensuring that a correct measurement is taken and, in response to such a determination, sending a command to measure the weight of the chips or cards. As an example, based on the weight and the coloring of the chips, the system may determine the present amount of the chips the user may have. This may be an example of game activity.

Using these techniques, the system may monitor and track not only the chips of the dealers but also the chips of the players, may track the progress of each player, may be able to see when and how each player is performing, and may also monitor new hands to determine hand count. The system may therefore know the amount of chips gained or lost in real time at any given time, and may also know the number of cards in each player's hand, and so on.

As described herein, embodiments described herein may provide systems, methods and devices with bet recognition capabilities. Bet recognition data may be generated and collected as game event data and may be connected to hand count data. For example, a hand may involve betting chips and system may detect chips using bet recognition device 30.

The bet recognition device may capture image data for bet data in response to chip detection in a betting region.

The system may involve bet recognition cameras inside of a bumper of the gaming table on the dealer's side. The cameras may be in nearly the same location as this may simplify table retrofitting. All of components including computers for both bet recognition and hand count may be installed there.

FIGS. 19 to 39, 51 and 52 illustrate schematic diagrams of bet recognition devices and imaging components according to some embodiments.

Embodiments described herein may implement bet recognition devices and imaging components with different camera positioning options.

For example, a bet recognition device may have an imaging component with one wide-angle lens camera at the back of the table that scans the entire casino table. An example schematic 1900 is shown in FIG. 19 including illustrative lines corresponding to a field of view for the camera.

As another example, a bet recognition device may have an imaging component with three cameras at the back of the table (e.g. left, middle, right), pointing outward towards the player positions.

Figure 28:
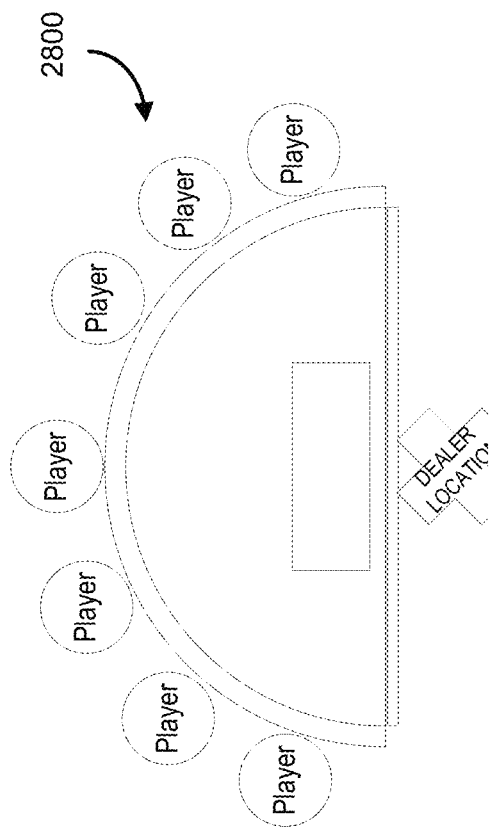
Figure 29:
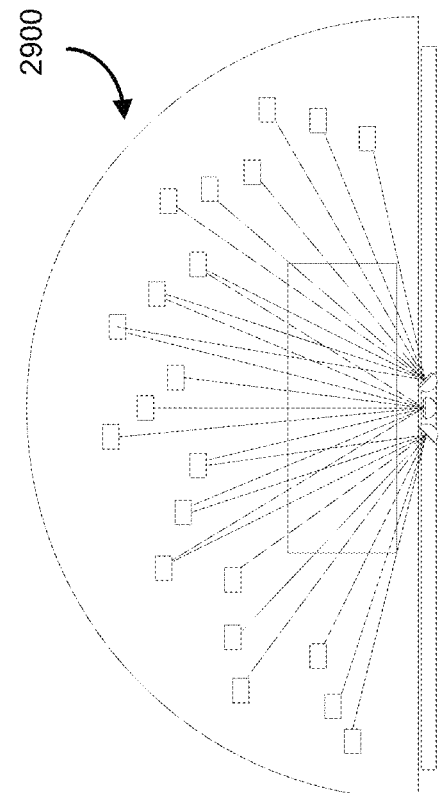
Figure 30:
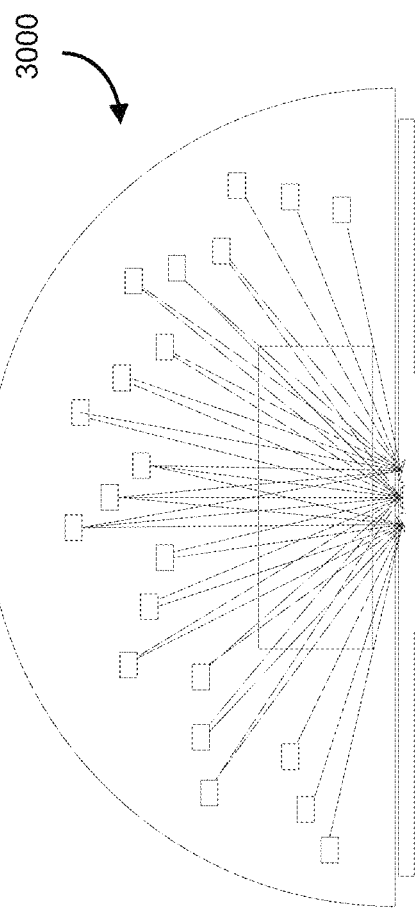
Figure 31:
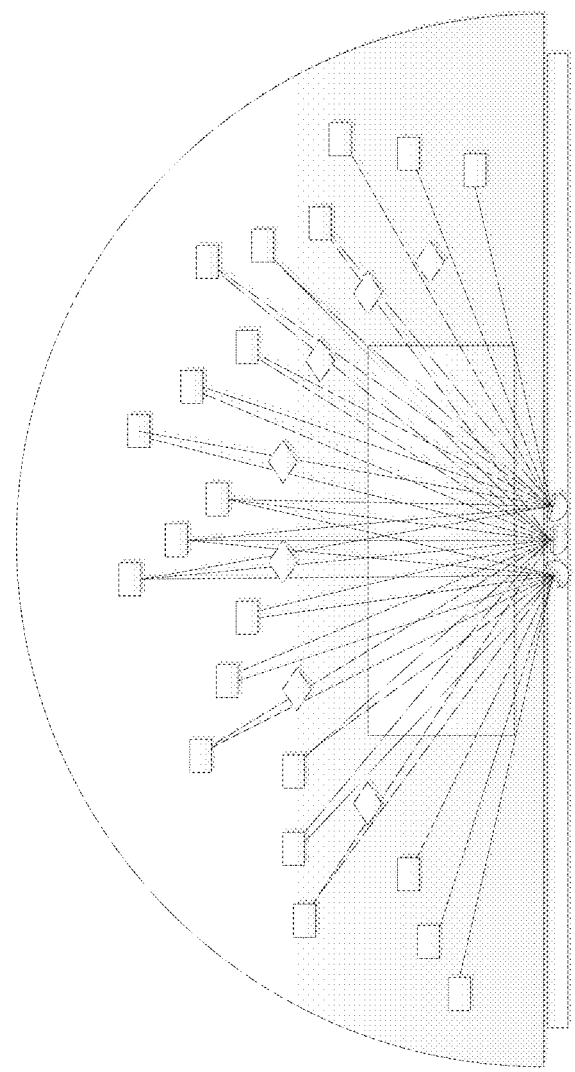
Figure 33:
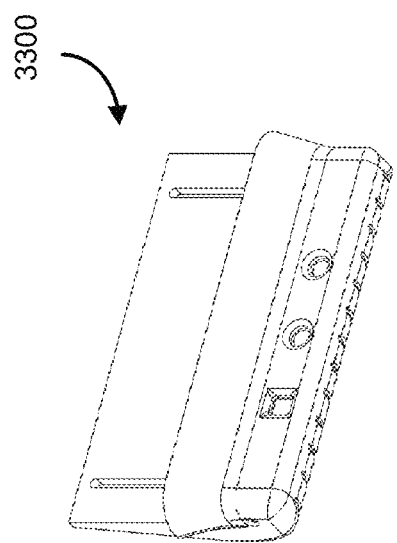
Figure 32:
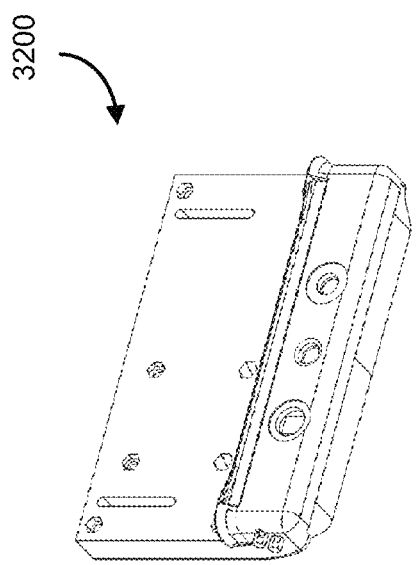

An illustrative schematic of an imaging component 3200 and 3300 with three cameras is shown in FIGS. 32 and 33. An example table layout is shown in FIG. 28. Example playing areas for image capture is shown in FIGS. 29 to 31. For example, there may be 21 or 28 playing areas for image capture for seven players with three or four playing areas allocated per player. The playing areas may be for bets, chips, cards, and other play related objects. As shown, fields of view for cameras may overlap such that one or more cameras may capture image data corresponding to each play area. For example, two cameras may capture image data corresponding to a play area. As another example, three cameras may capture image data corresponding to a play area.

As shown in FIGS. 21 to 27 a dealer may place cards on the table within one or more fields of view of cameras to capture image data relating to cards, dealer card play, and dealer gestures. The image data captured by different cameras with overlapping fields of view may be correlated to improve gesture recognition, for example.

An example is shown in FIGS. 20 to 31 including illustrative lines corresponding to fields of view for the cameras. As shown in 2000, 2100, 2200, and 2300 there may be overlapping fields of view between cameras. FIGS. 24A-24D (shown in images 2400A-2400D illustrate a dealer at a table undertaking motions to serve cards in relation to a card game. The dealer's motions may temporarily obstruct various betting areas, and it may be advantageous to have overlapping fields of view to account for such obstruction. In some embodiments, where there is a single camera, the shutter speed may be slowed so that the dealer's motions are removed during processing. Similarly, FIGS. 25A-25E, and FIGS. 26 and 27 at 2500A-2500E, 2600 and 2700 show alternate dealing motions.

FIGS. 28-31 illustrate how a computing system may track the various betting areas. As provided in the diagrams 2800, 2900, 3000, and 3100, a bet recognition system may utilize imaging components and/or sensors that process images from the perspective of a dealer. As depicted, three different cameras may be used, each tracking one or more different betting areas that are associated with each player. There may be multiple betting areas that a player may be in (e.g., craps). As indicated in FIG. 30 and FIG. 31, the fields of view may overlap for the cameras. The overlapping field of view may aid in increasing the confidence score of a particular bet analysis.

FIG. 32 and FIG. 33 depict camera assembly components 3200 and 3300 illustrating an example imaging component in relation to its relative positioning and orientation. Top view 3200 and bottom view 3300 are depicted and the camera assembly is designed to be retrofitted onto a tray or table at a betting or gaming surface.

As a further example, a bet recognition device may have an imaging component with three cameras at the back of the table (e.g., left, middle, right), pointing inward. An example 3400 is shown in FIG. 34 including illustrative lines corresponding to fields of view for the cameras.

As another example, a bet recognition device may have an imaging component with three cameras in the middle of the table (left, middle, right), pointing outward. An example 3500 is shown in FIG. 35 including illustrative lines corresponding to fields of view for the cameras.

As an additional example, a bet recognition device may have an imaging component with two cameras at the back of the table (left and right), pointing inward. An example 3600 is shown in FIG. 36 including illustrative lines corresponding to fields of view for the cameras.

Figure 37:
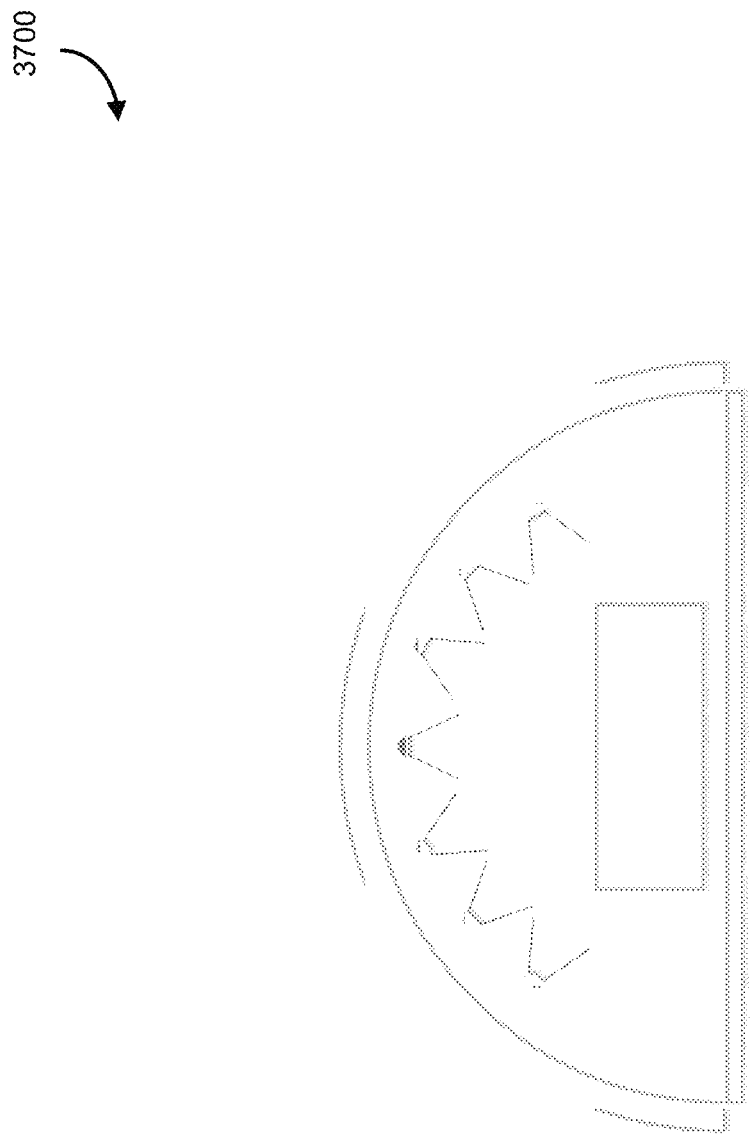
Figure 38:
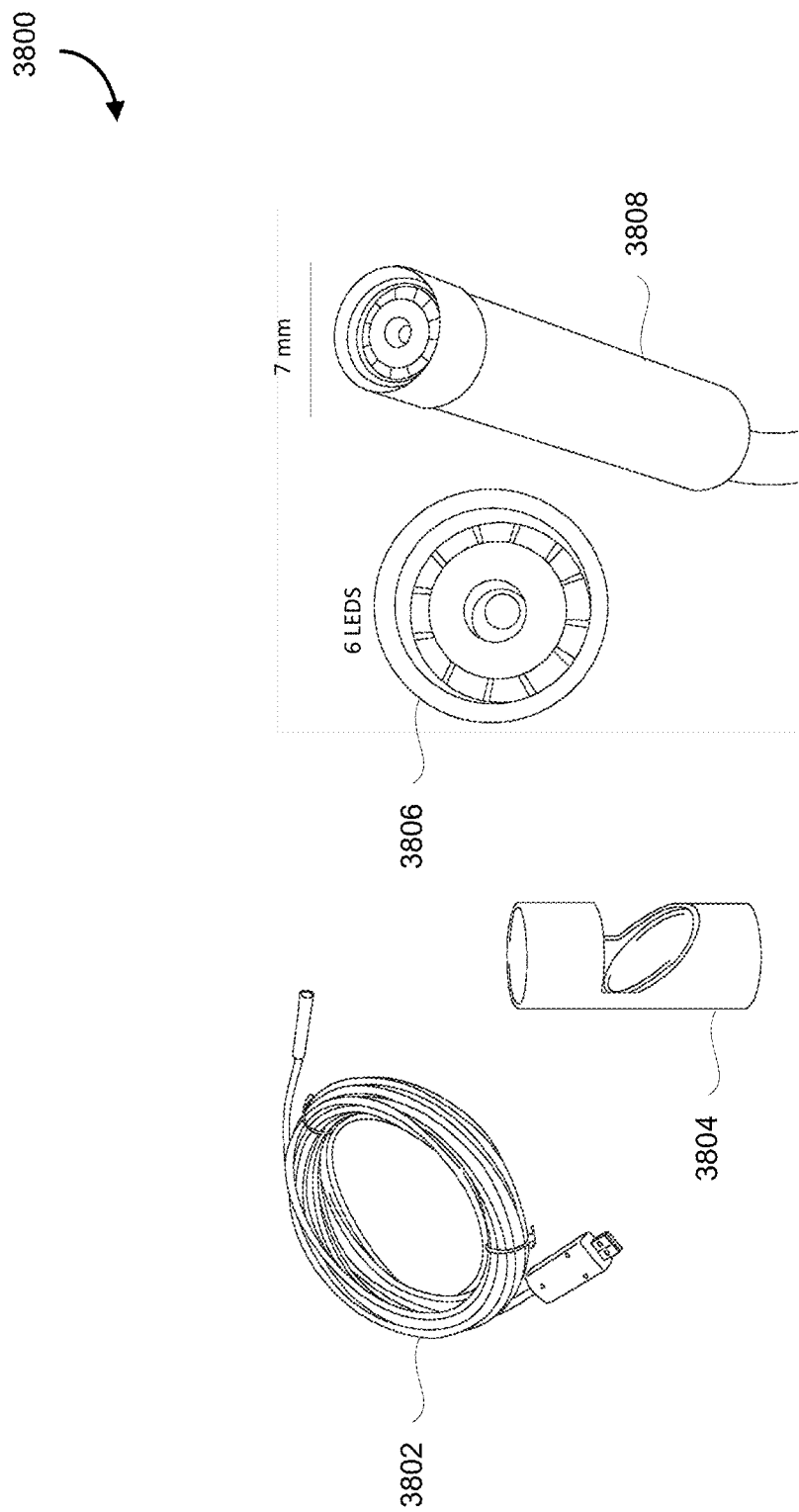
Figure 39:
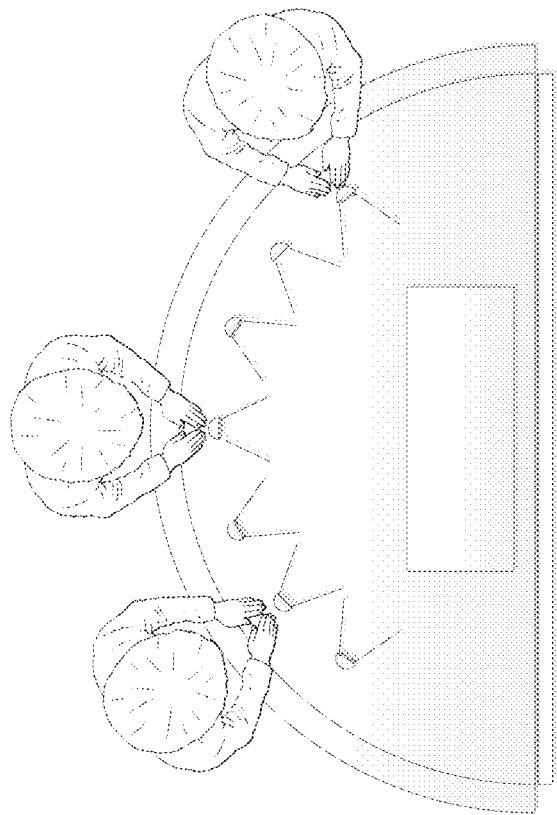

As an additional example, a bet recognition device may have an imaging component with seven endoscope cameras placed at the front of the table, between the players and the betting area, pointing inward. Examples 3700 and 3900 are shown in FIGS. 37 and 39. Example hardware components 3802-3808 for implementing an example imaging component are shown in FIG. 38 at 3800. FIG. 39 illustrates an alternate embodiment 3900 wherein cameras are positioned differently.

Endoscopes may be augmented by mirrors and light emitters in some example embodiments. The use of endoscopes may be an effective method for achieving high accuracy when analyzing chips as the cameras are located closest to the betting area as possible with no obstructions. However, the effort required to retrofit existing casino tables with endoscopes may be arduous to be practical in some situations. Accordingly, different example camera implementations may be used depending on the situation.

When capturing imaging data of the betting area for the purposes of analyzing the number and value of a player's chips, the cameras may capture images using infrared (IR) technology which is not visible to the human eye. The cameras may use IR emitters and receivers which can operate on the same wavelength. Further, the cameras may be programmed to capture images at different times so that the wavelengths do not interfere with one another, making sure that each image is not obstructed.

In another aspect, embodiments described herein may provide automatic calculation of manual casino shoes and associated statistics including, for example, shuffle per hour.

The "casino shoe" is the card release mechanism on casino tables, which may contain several decks of cards. Dealers use the casino shoe to source cards for dealing each hand.

A casino "shoe" may be monitored by hardware components to provide a measure of how many shuffles occurred per hour, how many cards were dealt to players (including the dealer) per hour, and so on. For example, to count cards on a manual shoe, a magnet and a magnetic sensor may be attached to the shoe and used to trigger when the shoe is empty of cards.

Alternatively, a dealer procedure could require the shoe to be turned on its side with the shoe weighted wedge removed. This can be recognized with the retrofitting of the tilt switch (i.e., single-axis gyroscope) inside or outside of the shoe. This may recognize when a shoe has been depleted and is to be refilled. The bet recognition device 20 can thus collect data on cards such as, for example, how many shuffles occur per hour (which varies because shoes are depleted at different depths based on different gameplay scenarios) and indicate when the bet recognition process does not need to look for player bets.

Figure 40:
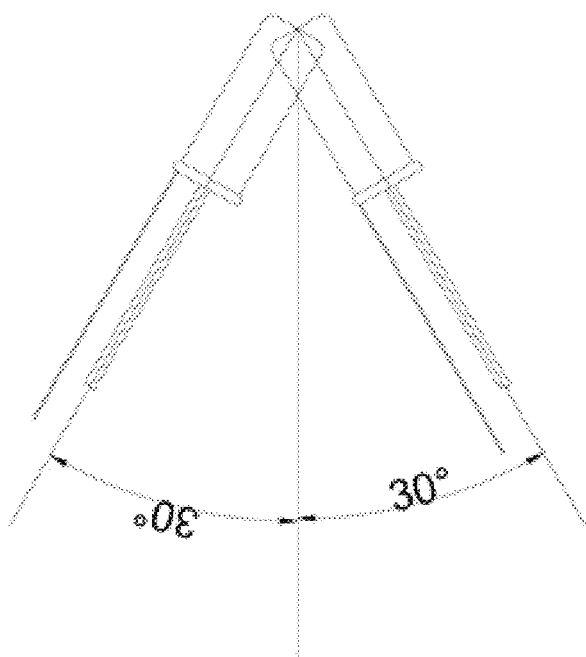
FIGS. 40 to 43 illustrate schematic diagrams of shoe devices according to some embodiments.
Figure 43:
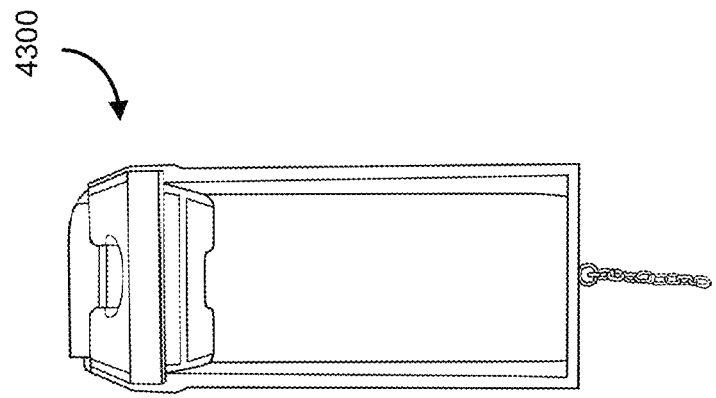
Figure 42:
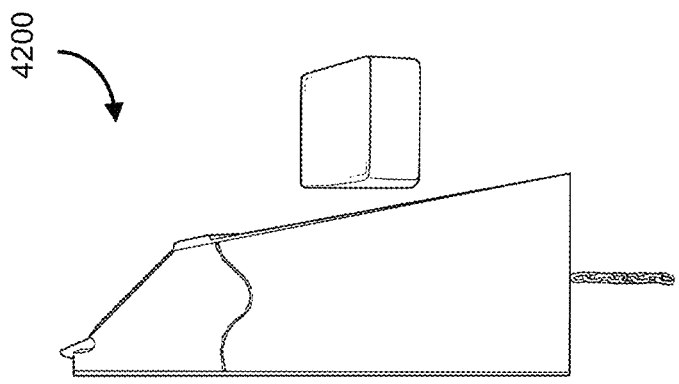
Figure 41:
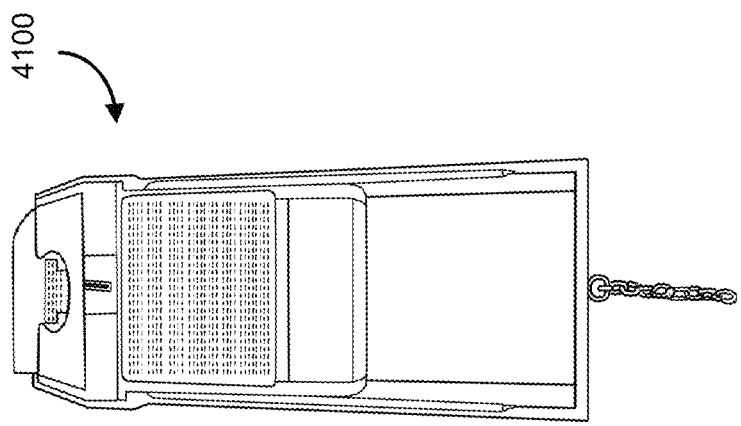

Embodiments described herein automate the process of counting "shoe" related statistics (e.g., the number of shoes). Prior attempts may require data to be collected manually by the pit manager FIG. 40 illustrates that a shoe 4000 may be positioned at various inclines (increasing, decreasing). FIGS. 41 to 43 illustrate different views 4100, 4200, 4300 of a card shoe which may be used in example embodiments. FIGS. 44 to 46C illustrate different example positions 4400, 4500, 4600A-4600C of a card shoe on a gaming table according to some example embodiments.

In another aspect, embodiments described herein may provide background image subtraction and depth segmentation. Background subtraction is a computational technique used according to embodiments described herein to differentiate the background image from the foreground image when capturing image data of the casino table. Depth segmentation is another technique that may achieve accuracy in analyzing a specific image data of a three-dimensional area of the betting table. This technique allows embodiments described herein to establish a region of analysis on the casino table and to narrow the focus of the camera onto the betting area, without incorporating the chips not relating to that player's bet (e.g., in another betting area, or out of play altogether). This area may be referred to as a "bounding box".

This is one of different example ways to perform the removal of the background of an image when establishing a "bounding box" to identify the number and types of chips in a betting area. Other example techniques include graph cut, frame differencing, mean filtering, Gaussian averaging, background mixture models, and so on.

After capturing two-dimensional images with a camera embedded in the casino table, background subtraction can be run as an automatic algorithm that first identifies the boundaries of object, and then allows the software to separate that object (e.g., chips, hands, or any other objects commonly found on the casino floor) from its background.

To increase the effectiveness of background subtraction, embodiments described herein may support three-dimensional background subtraction, making use of depth data to differentiate the foreground image from the background (illuminating the object with infrared and/or using lasers to scan the area).

Based on the distortion of the light, after projecting light onto the object, embodiments described herein can determine how far away an object is from the camera, which helps to differentiate the object from its background in two-dimensional and three-dimensional images.

In a further aspect, embodiments described herein may count the number of stacks of chips placed in the betting area.

Embodiments described herein may be used to administer casino standards for how players should place their stacks of chips. Known approaches require this to be checked manually by a dealer before a hand can begin.

Embodiments described herein may have the capacity to accurately collect data on every hand by counting the chips and their value. Embodiments described herein may have the ability to establish the quality of betting by using depth cameras to capture errors made by players.

Figure 48:
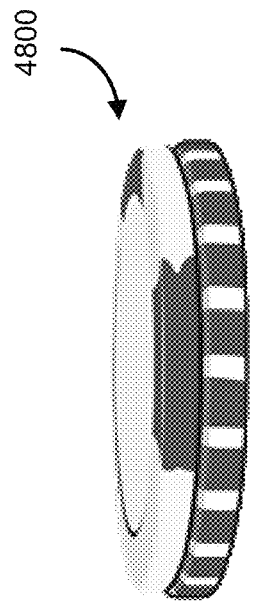
FIGS. 47 to 50 illustrate schematic diagrams of chip stacks according to some embodiments.
Figure 47:
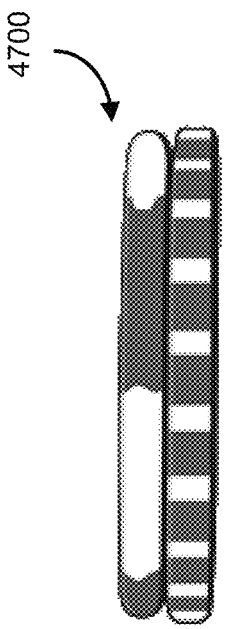

Embodiments described herein may scan and accurately count any type of chips, including but not limited to four example varietals: no stripes, all different colors; stripes, but all the same on all chips (different colours); varying colors and stripes (stripes are smeared); and different colors and stripes (stripes are well-defined). FIGS. 47 and 48 show example views of chip stacks at 4700 and 4800, respectively.

Figure 49:
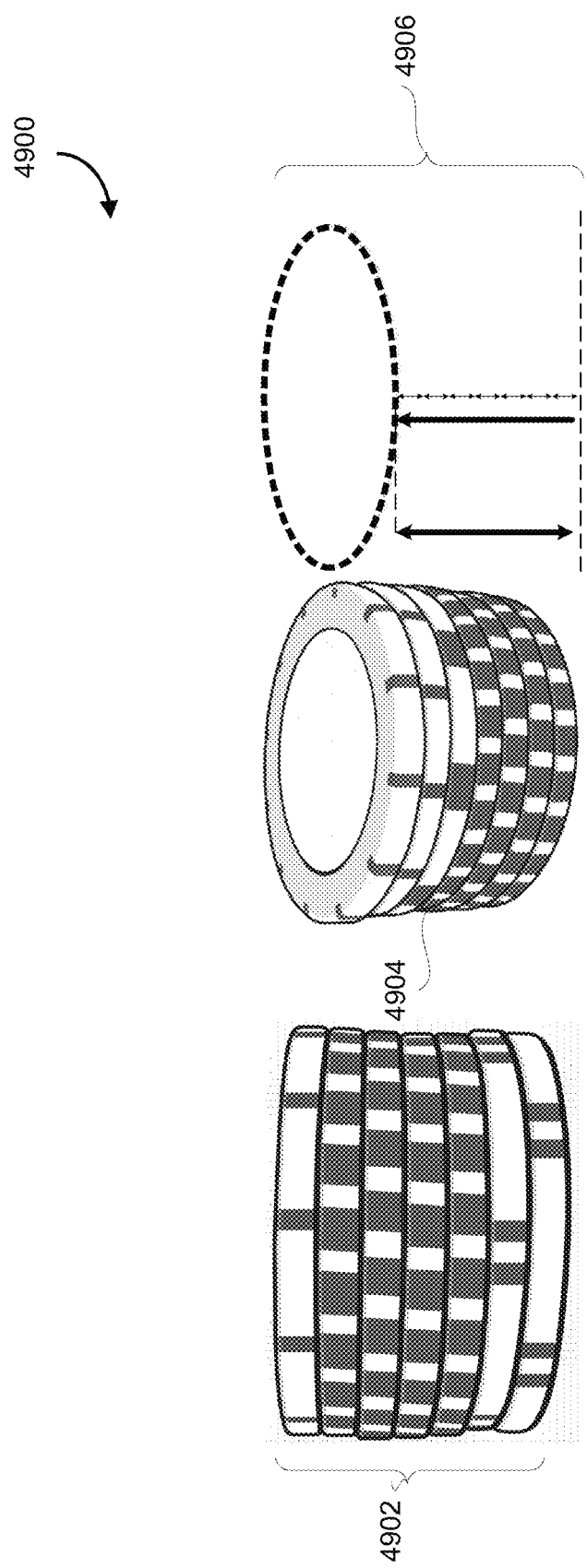

When a camera is elevated above the level of the table, embodiments described herein may be programmed to detect the top of the chip first. An example 4900 is shown in FIG. 49 at 4902, 4904, and 4906. Once the system has recognized the top of the chip, the process can quickly count top-down to establish an accurate chip count and then shift to scan bottom-up to identify the value of all these chips. This may be important due to several example features. Several cameras according to embodiments described herein may be elevated above the tabletop (e.g., looking past the dealer's body, midway up the torso). This allows the system to recognize the betting area by establishing a "bounding box", which is an area on the betting table that is scanned by to analyze physical objects, i.e., the chips.

In some casino games, such as baccarat, other chip stacks on the table may obstruct players' bets from the camera's view, so the process may encounter obstruction. To solve this, cameras placed at elevated angles may allow embodiments described herein to see more of table and maintain high accuracy.

In another aspect, embodiments described herein may determine chip stack sequence in a betting area.

When bets are being placed in betting areas, embodiments described herein may have the capacity to capture data on the visual sequence of the chips when players place them in the betting area.

Embodiments described herein may take pointed pictures (e.g. image data) of varying stripe patterns on a cylinder (e.g. the shape of the chip stack), which can vary in pixel number. In accordance with embodiments, to optimize the speed and accuracy of recognizing chips, the system may benchmark the size of image captures at 3 by N pixels for height and width measurements, in some examples. Other benchmarks may be used.

Embodiments described herein may accurately recognize when a frequency signature is present and also allows for the training of new stripe patterns, for example.

Embodiments described herein may recognize and confirm this pattern by using a camera to see the sequence of the stripes, as well as the color of the chips. The system may be configured to be precise enough to register the specific hue of the chip, which is relevant for the system in terms of both accuracy of results and security purposes.

Figure 50:
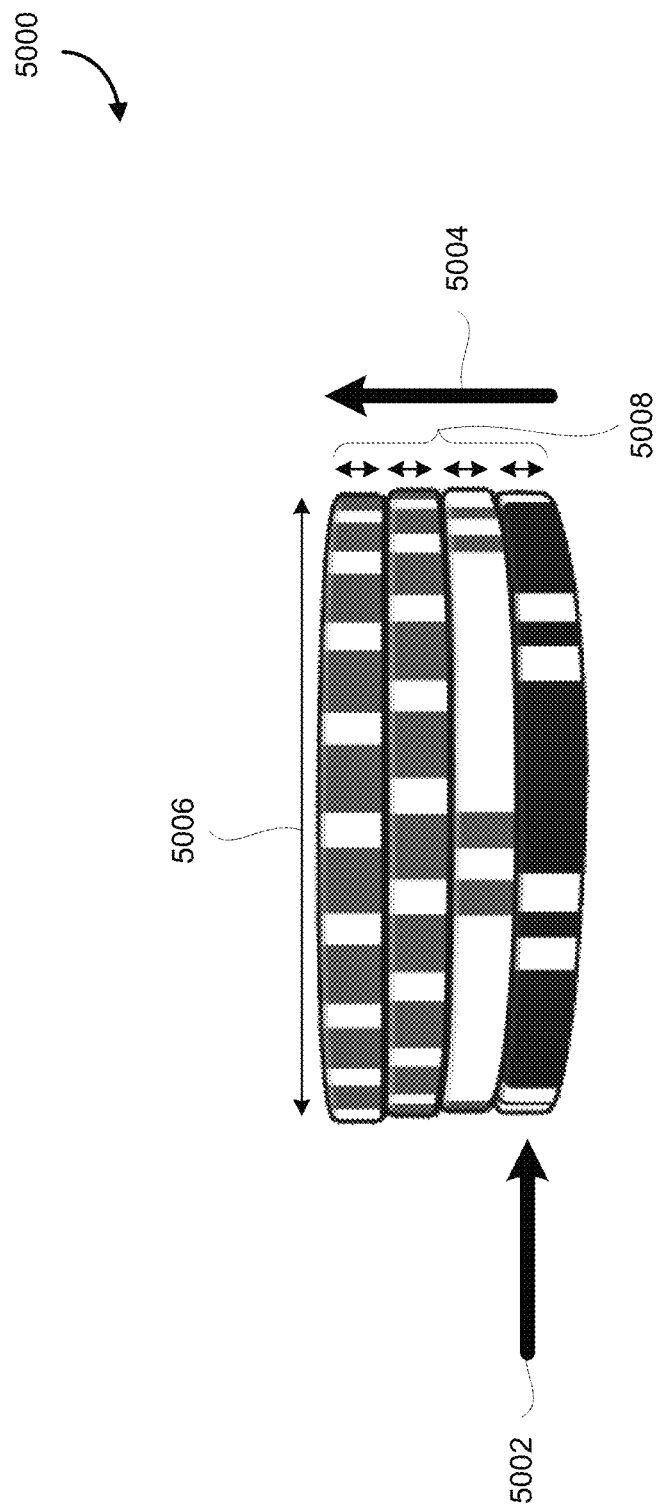

The casino standard of chip stack sequence may typically have players bet in a specific order: highest value chips on the bottom of the stack, with lower value chips layered upward. FIG. 50 shows a chip stack with this example standard.

Beyond recognizing the typical pattern (e.g., highest value on bottom, lowest on top (see FIG. 50 for 5000 at 5002-5008) embodiments described herein may use Fourier analysis to find different types of chip, applying learnable frequency/discrete signal patterns on the chip stack. Embodiments described herein may also combine with Neural Networks or equivalent learning techniques to identify when the pattern is present. By preprogramming the process to recognize particular nodes of the neural network relating to chips, Embodiments described herein can also deactivate specific nodes so that they are not optional paths in the decision process, which may improves both speed and accuracy.

This feature also enables embodiments described herein to "turn off" certain classes or types of chips during its analysis of stack sequence, so that it does not search for particularly values of chip. This has the effect of increasing the speed of the 'chip stack sequence' process while maintaining accuracy.

By training multiple classifiers, embodiments described herein can automatically remove the last highest chip value from each stack sequence to increase the speed of analysis.

Each time the algorithm scans the chip stack, it may run the example sequence as follows: 12345 (scanning all chips), 1234 (removing a value), 123 (removing another value), 12 (etc.), 1 (etc.), and finally removing all chip classifiers during its last scan. By removing values over multiple analyses, embodiments described herein may not look for certain values when they are not present in a player's bet. This may enable the process to increase its operation speed over time while maintaining accuracy.

Embodiments described herein may also recognize player errors on the occasions when the stack sequence does not meet the casino standard.

If the player makes an error or a failure to meet the standards of the casino, embodiments described herein may log that error and may generate an electronic alert for transmission to a casino manager to provide an alert of the error. The automatic alert may depend on the severity of the error.

Embodiments described herein may also detect between different versions of a chip using pattern recognition and signal processing techniques. For example, different colors and patterns on chips may have different frequencies of image data and which may be used to detect different versions of chips.

Embodiments described herein may also detect when chips require cleaning. With the same frequency image techniques used for detecting different versions of the chip, embodiments described herein may also detect when dirt has built up on chips. The build-up of debris on the chips disrupts the frequency of its colour as captured by the camera.

Embodiments described herein may also use mirrors on casino tabletops as part of the image capture component of bet recognition device 20.

Embodiments described herein may require two spaces on the surface top of a casino table to run at its top capacity.

To make these spaces smaller, one approach may be to use mirrors on the table surface to reflect the camera illumination technology onto the chips, enabling embodiments described herein to effectively differentiate the object from the background to enable the chip counting process, and other applications, to run at high capacity. Adding mirrors to the tabletop can help improve aesthetics, enable easier retrofit, and make embodiments described herein less obtrusive to the dealer and players.

Embodiments described herein may be described in relation to blackjack as an illustrative example. However, embodiments described herein may analyze other casino games.

For example, Baccarat is another game at the casino that the presently disclosed system can be used to analyze. Baccarat is a comparing card game played between two hands on the table, the player's and the banker's. Each hand of baccarat has three possible outcomes: "player" win, "banker" win, and "tie".

Embodiments described herein may obtain additional info about the hand on the table, in addition to the bet information, such as what cards the dealer and player had in their hands. Embodiments described herein may determine what a player bets, and whether the player has won, lost, or tied.

By providing more accurate account of table dynamics, embodiments described herein may be essential for improving a casinos understanding of the process of how people are playing baccarat.

Figure 52:
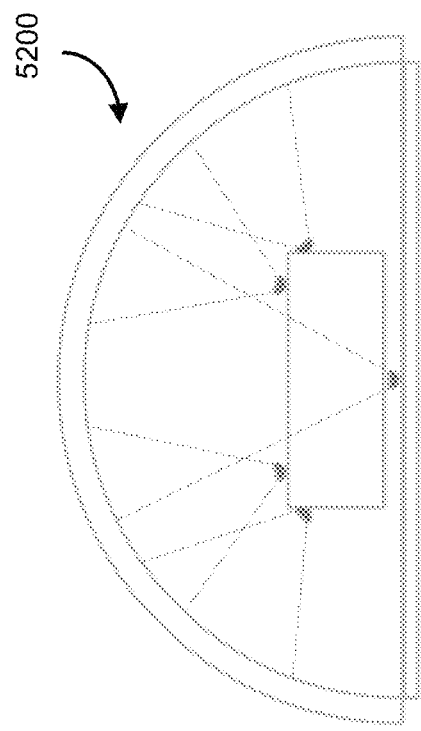
FIGS. 51 and 52 illustrate schematic diagrams of bet recognition devices with camera layouts according to some embodiments.
Figure 51:
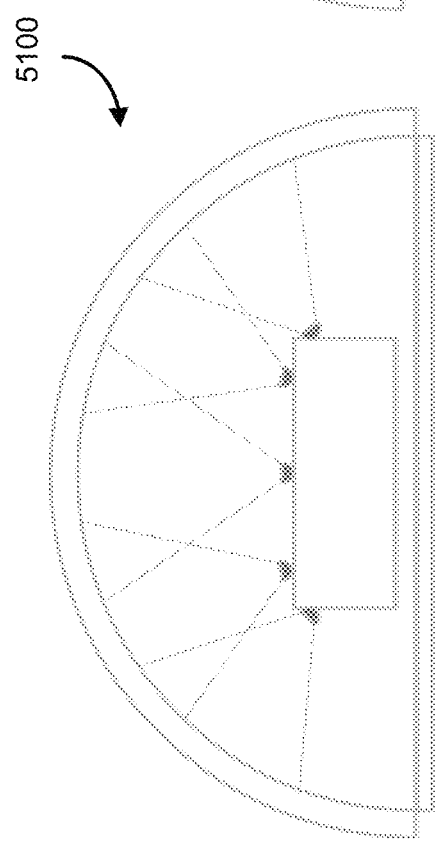

FIGS. 51 and 52 at 5100 and 5200, respectively, illustrate betting surfaces having imaging components with overlapping fields of view.

Figure 53:
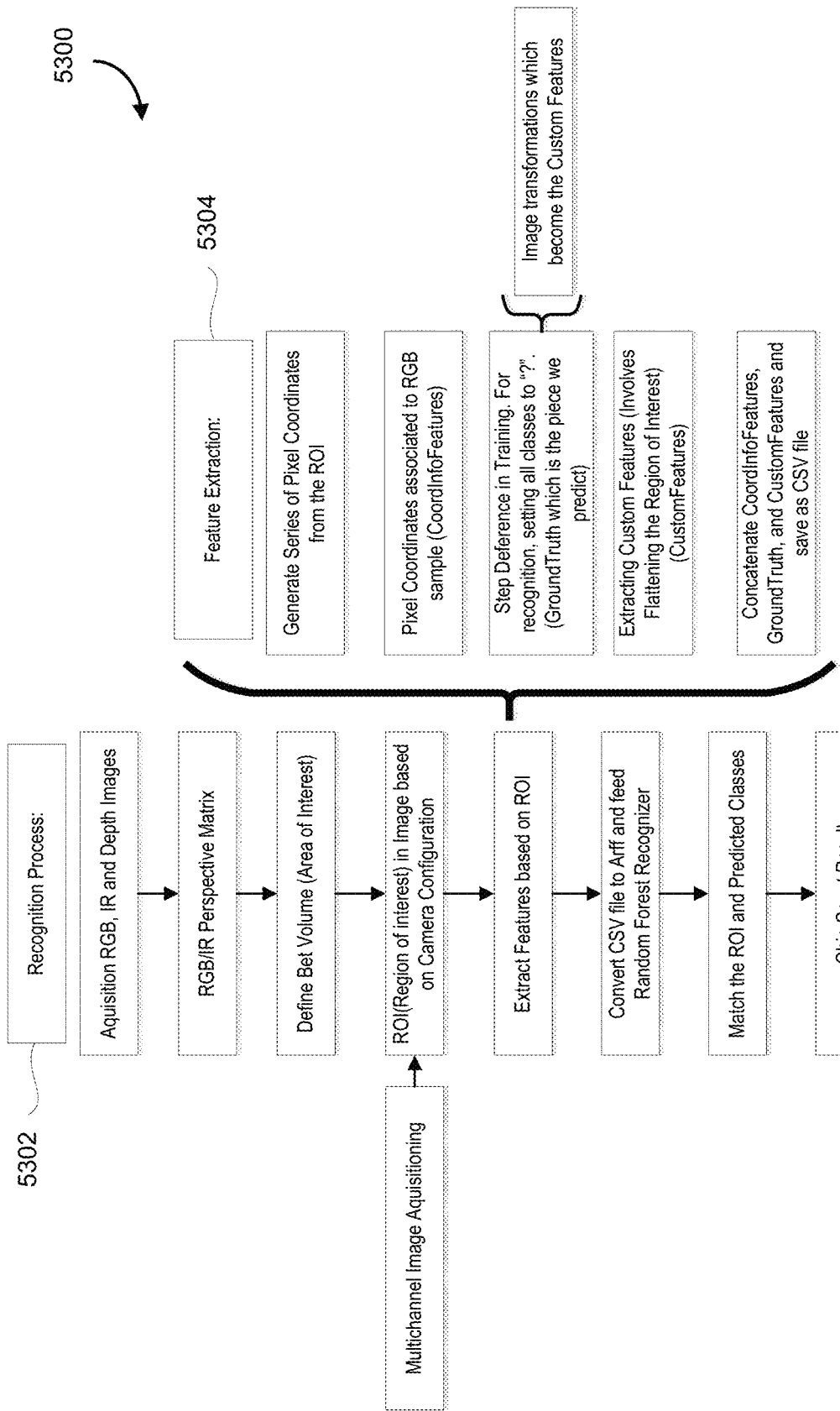
FIGS. 53-56 are sample workflows, according to some embodiments.

FIG. 53 is an example workflow 5300, illustrative of some embodiments. FIG. 53 is an example workflow 5300 illustrative of some embodiments. Workflow 5300 includes various steps, and the steps provided are examples, and different, alternate, less, more steps may be included. While steps may be performed in the order depicted, other orders may be possible. 5300 is a process for extracting and saving bet data as obtained from image data. The recognition process 5302 and the feature extraction profess 5304 are provided as examples, illustrative of example steps that may be utilized to determine a chip count result.

Figure 54:
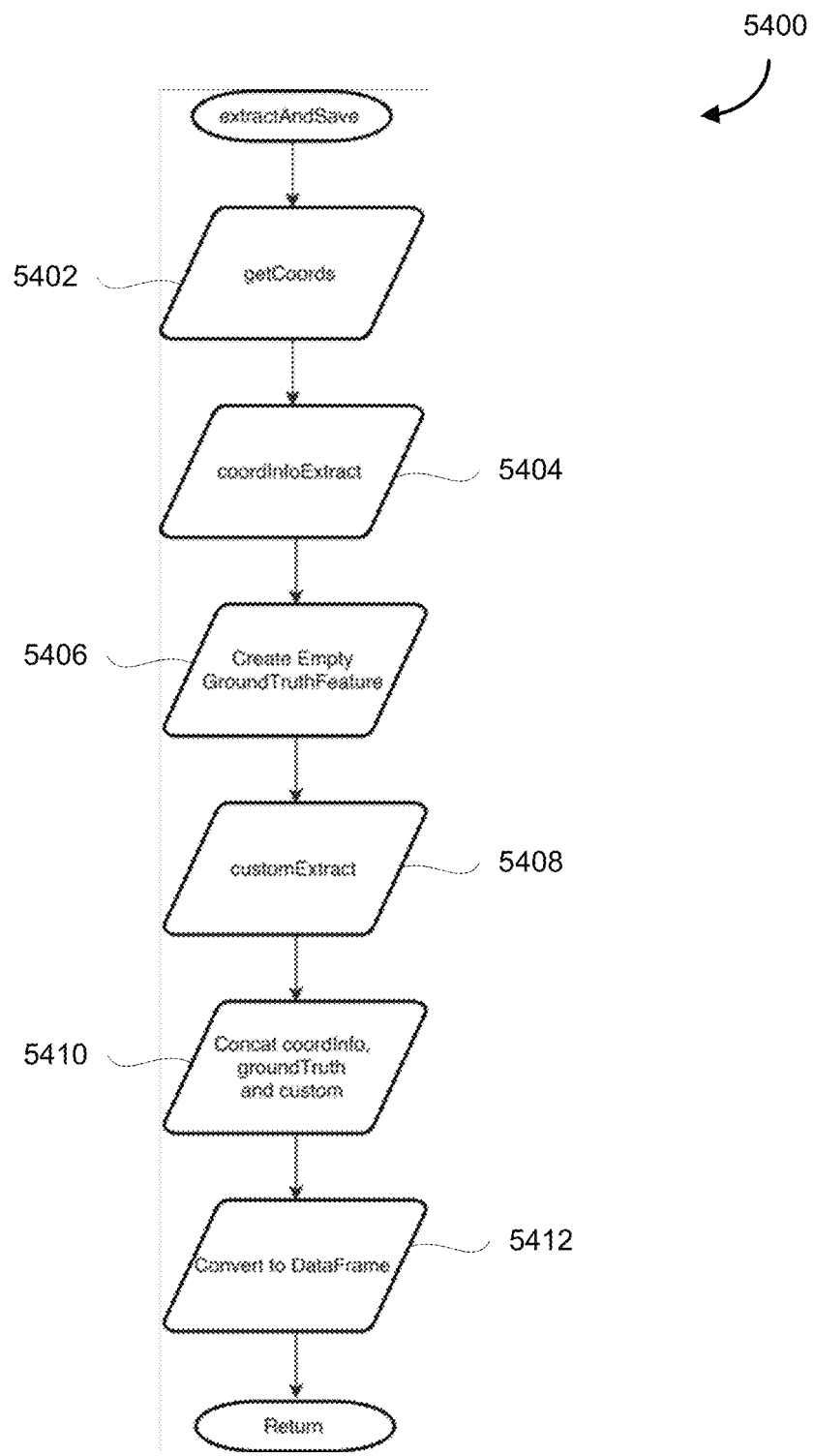

FIG. 54 is an example workflow 5400 illustrative of some embodiments. Workflow 5400 includes various steps, and the steps provided are examples, and different, alternate, less, more steps may be included. While steps may be performed in the order depicted, other orders may be possible. 5400 is a process for extracting and saving bet data as obtained from image data. At 5402, coordinates are obtained in relation to the bets as represented by chips in the betting areas. For example, coordinates may include chip height, chip width, and a horizon element that may be expressed in the form of pixels. The coordinates may be utilized to obtain lists of pixels for sampling from the images, generating a sample space using the list of pixels. Connected components are calculated from the sample space, and centroids are calculated for each of the connected components. At 5404, coordinate information is extracted. Extraction may include creating headers for coordinate information feature, mapping sample coordinates into a region of interest space into an original color image space, and creating a list of mapped coordinates. At 5406, the system is configured to create an empty ground truth feature, which is a set of data values that are normalized so that values can be compared against reference feature points. At 5408, features are extracted, and at 5410, coordinate information, ground truth and customized feature sets are concatenated and converted to a dataframe at 5412. The customized feature sets are derived, for example, in relation to distinguishing features of chip markings that may vary between different facilities and the types of chips being utilized.

Figure 55:
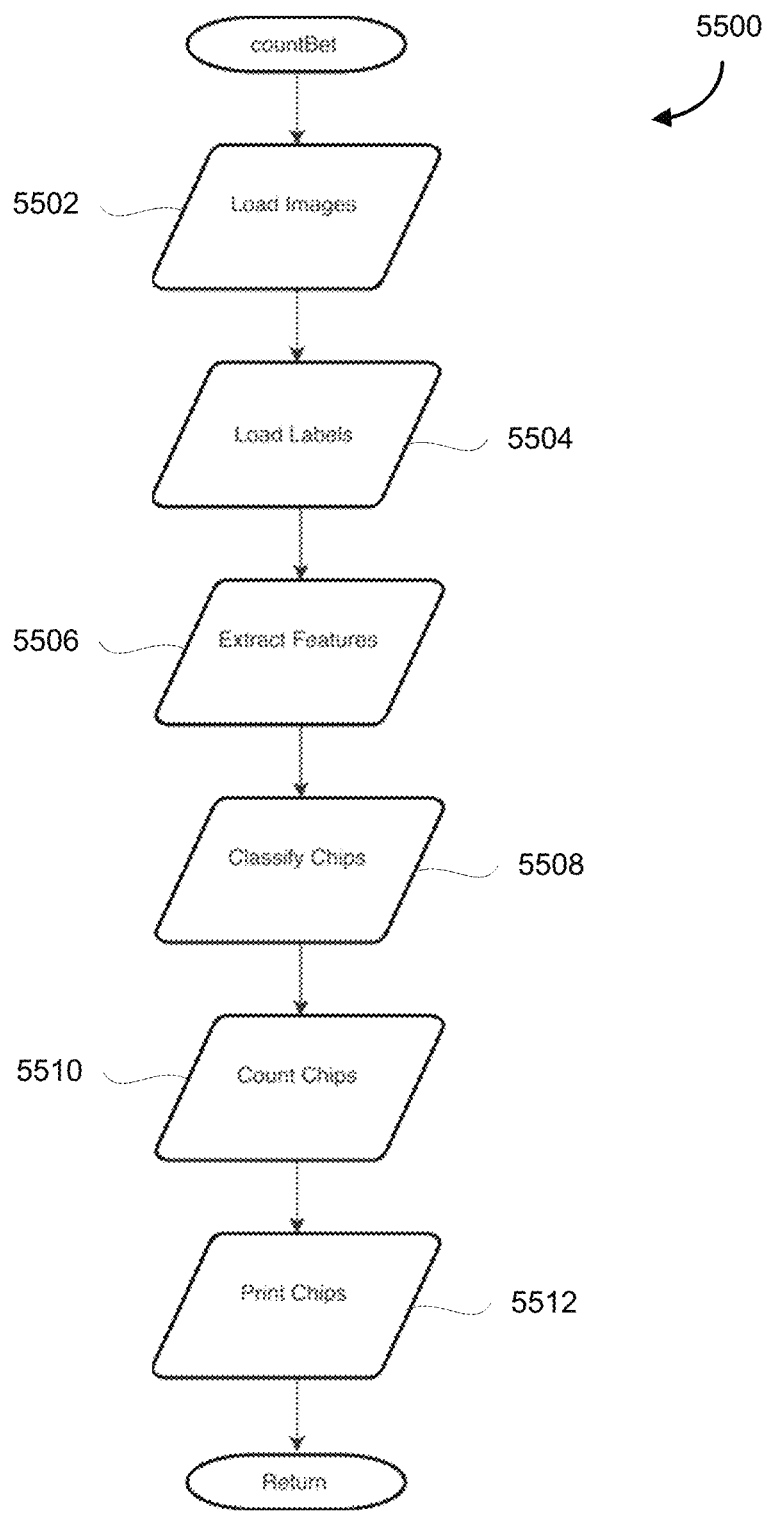

FIG. 55 is an example workflow 5500 illustrative of some embodiments. Workflow 5500 includes various steps, and the steps provided are examples, and different, alternate, less, more steps may be included. While steps may be performed in the order depicted, other orders may be possible. 5500 is a process for counting bet data as obtained from image data. At 5502, images are loaded from a data storage. During the image loading step, color images may be obtained, and in some embodiments, depth and/or infrared imaging is obtained. A transformation matrix is calculated, and the color image is read. At 5504, labels are loaded onto the images (labels are originally blank, and will be updated when the regions of interest in the images are classified), and at 5506, features are extracted from the loaded images and labels. The feature extraction process, for example, may utilize a trained classifier wherein random colors may be assigned to classes to distinguish between different classes. During the feature extraction process, one or more lines (e.g., vertical, horizontal, diagonal) are used for sampling pixels and/or dot representations of the chips.

In some embodiments, the chip pixels themselves in a region of interest representing a particular chip are blurred and/or otherwise aggregated so that the sampled regions are more likely representative of the chip in its entirety. Such an approach may reduce the number of pixels required for analysis and/or storage, increasing the speed and efficiency of classification. The dots and the pixels may therefore represent adjacent colours, and based on the height and distance, the number of chips can be determined, and each chip can be segregated by dividing the height of a stack by the height of a chip, creating individual chip segments. In some embodiments, the sample line is a 1D line of color/histogram values, and in other embodiments, a long 2D line having a length and a width of values are extracted.

This approach may be helpful where gaming facilities release different versions of chips, often differentiated by subtle differences in hue (e.g., changing the frequency of color as captured by the imaging component), or in the sequence of markings, such as stripes.

Accordingly, in some embodiments, classification include normalizing the pixel values of an image capture, gamma-decoding the image such that pixel values are proportional to the number of photos impacting the camera sensor, combining the pixels in the height dimension into a single 1D line, which is then truncated to form a uniform width for a Fast Fourier Transform analysis. Such an approach may also include classification based, for example, at least on the magnitude of the complex sinusoids returned.

Colors, among other visual markers, may be mapped to various classes. At 5508, chips are classified (e.g., based on machine-vision derived estimations). The system may also be trained to differentiate between new versions of chips from obsolete versions of chips, which may be removed from circulation to maintain security and consistency.

At 5510, chips are counted through based on the classifications, and at 5512, chip counts are printed to a file (e.g. encapsulated and/or encoded for transmission to downstream systems).

Figure 56:
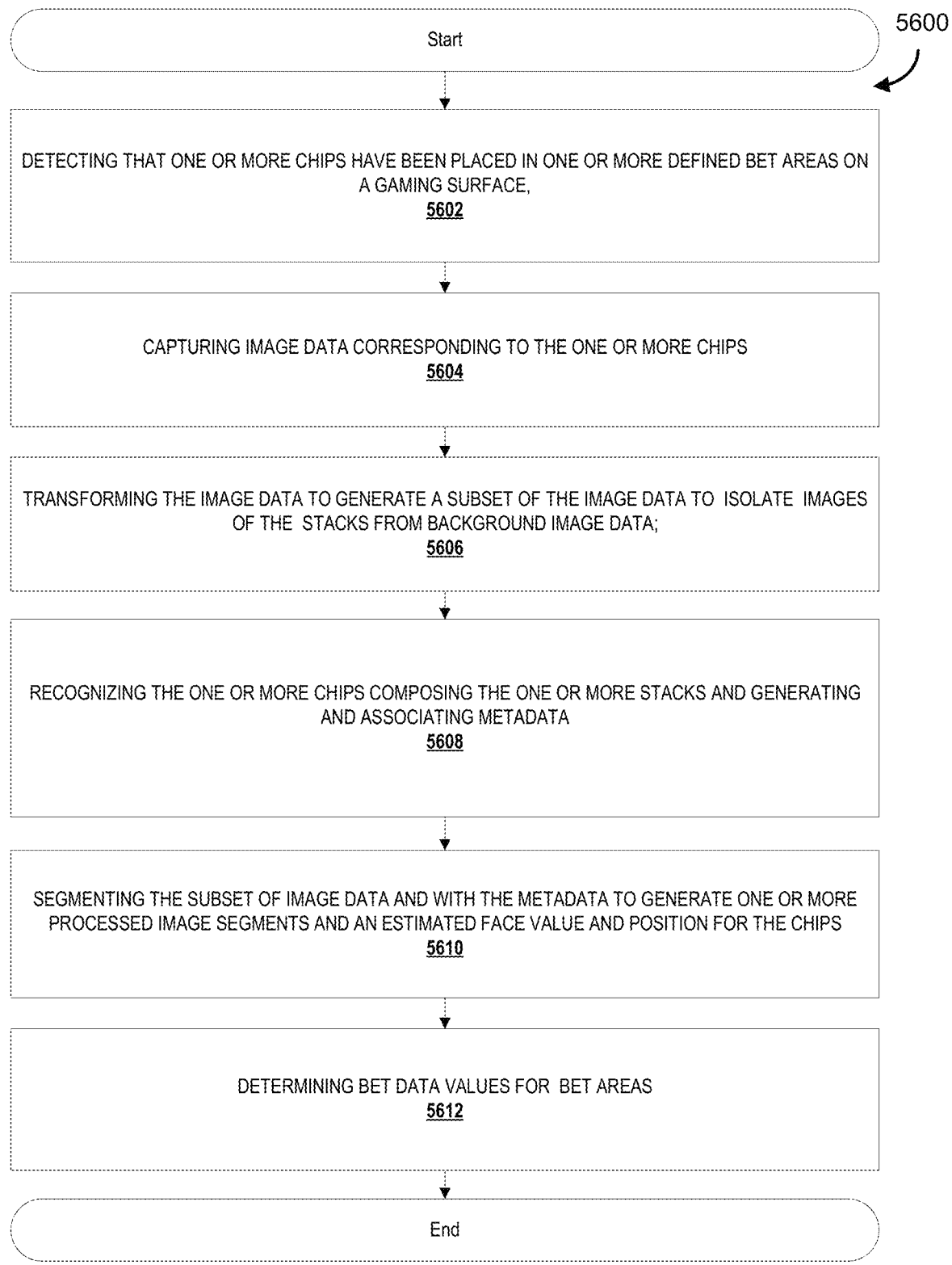

FIG. 56 is an example workflow 5600 illustrative of some embodiments. Workflow 5600 includes various steps, and the steps provided are examples, and different, alternate, less, more steps may be included. While steps may be performed in the order depicted, other orders may be possible.

At 5602, detecting, by an imaging component, that one or more chips have been placed in one or more defined bet areas on a gaming surface, each chip of the one or more chips having one or more visual identifiers representative of a face value associated with the chip, the one or more chips arranged in one or more stacks of chips.

At 5604, capturing, by the imaging component, image data corresponding to the one or more chips positioned on the gaming surface, the capturing triggered by the detection that the one or more chips have been placed in the one or more defined bet areas.

At 5606, transforming, by an image processing engine, the image data to generate a subset of the image data relating to the one or more stacks of chips, the subset of image data isolating images of the one or more stacks from the image data.

At 5608, recognizing, by an image recognizer engine, the one or more chips composing the one or more stacks, the recognizer engine generating and associating metadata representative of (i) a timestamp corresponding to when the image data was obtained, (ii) one or more estimated position values associated with the one or more chips, and (iii) one or more face values associated with the one or more chips based on the presence of the one or more visual identifiers.

At 5610 segmenting, by the image recognizer engine, the subset of image data and with the metadata representative of the one or more estimated position values with the one or more chips to generate one or more processed image segments, each processed image segment corresponding to a chip of the one or more chips and including metadata indicative of an estimated face value and position.

At 5612, determining, by a game monitoring engine, one or more bet data values, each bet data value corresponding to a bet area of the one or more defined bet areas, and determined using at least the number of chips visible in each of the one or more bet areas extracted from the processed image segments and the metadata indicative of the face value of the one or more chips.

The advantages of the some embodiments are further illustrated by the following examples. The examples and their particular details set forth herein are presented for illustration only and should not be construed as limitations.

In implementation, the process of patching together images may begin with capturing a particular number of samples from each camera that is mounted to the table.

Different scenarios of chips are used for each sample. These scenarios also include extreme situations so that the machine can learn, which allows it to handle simpler scenarios with a greater relative ease. The captured samples are then labeled by denomination to create the file that is used in training.

The capturing tools developed by the Applicant have been capable of focusing mainly on the bet area, while omitting any surrounding environments that might cause discrepancies. The removal of surrounding environments helps the system to ignore any background chips during training and testing processes.

During testing, it was noted that the removal of background chips improved accuracy. In the process of training and testing, higher accuracy of datasets and successful training were found through capturing and labelling samples in a brightly lit setting and testing them in a dimly lit setting, or executing both processes in a brightly lit setting. This approach was found to produce a higher accuracy than performing both of the process in a dimly lit setting or performing the first process in a dimly lit setting while next in bright light.

Applicant also found that providing more light from the side helped the system identify colors better.

The embodiments of the devices, systems, and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The discussion provides many example embodiments. Although each embodiment represents a single combination of inventive elements, other examples may include all possible combinations of the disclosed elements. Thus if one embodiment comprises elements A, B, and C, and a second embodiment comprises elements B and D, other remaining combinations of A, B, C, or D, may also be used.

The term "connected" or "coupled to" may include both direct coupling (in which two elements that are coupled to each other contact each other) and indirect coupling (in which at least one additional element is located between the two elements).

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

Although the embodiments have been described in detail, it should be understood that various changes, substitutions and alterations can be made herein.

Moreover, the scope of some embodiments is not intended to be limited to the particular embodiments of the process, machine, manufacture, composition of matter, means, methods and steps described in the specification. As one of ordinary skill in the art will readily appreciate from some embodiments, processes, machines, manufacture, compositions of matter, means, methods, or steps, presently existing or later to be developed, that perform substantially the same function or achieve substantially the same result as the corresponding embodiments described herein may be utilized. Accordingly, embodiments are intended to include within their scope such processes, machines, manufacture, compositions of matter, means, methods, or steps.

As can be understood, the examples described above and illustrated are intended to be exemplary only.

Figure 57:
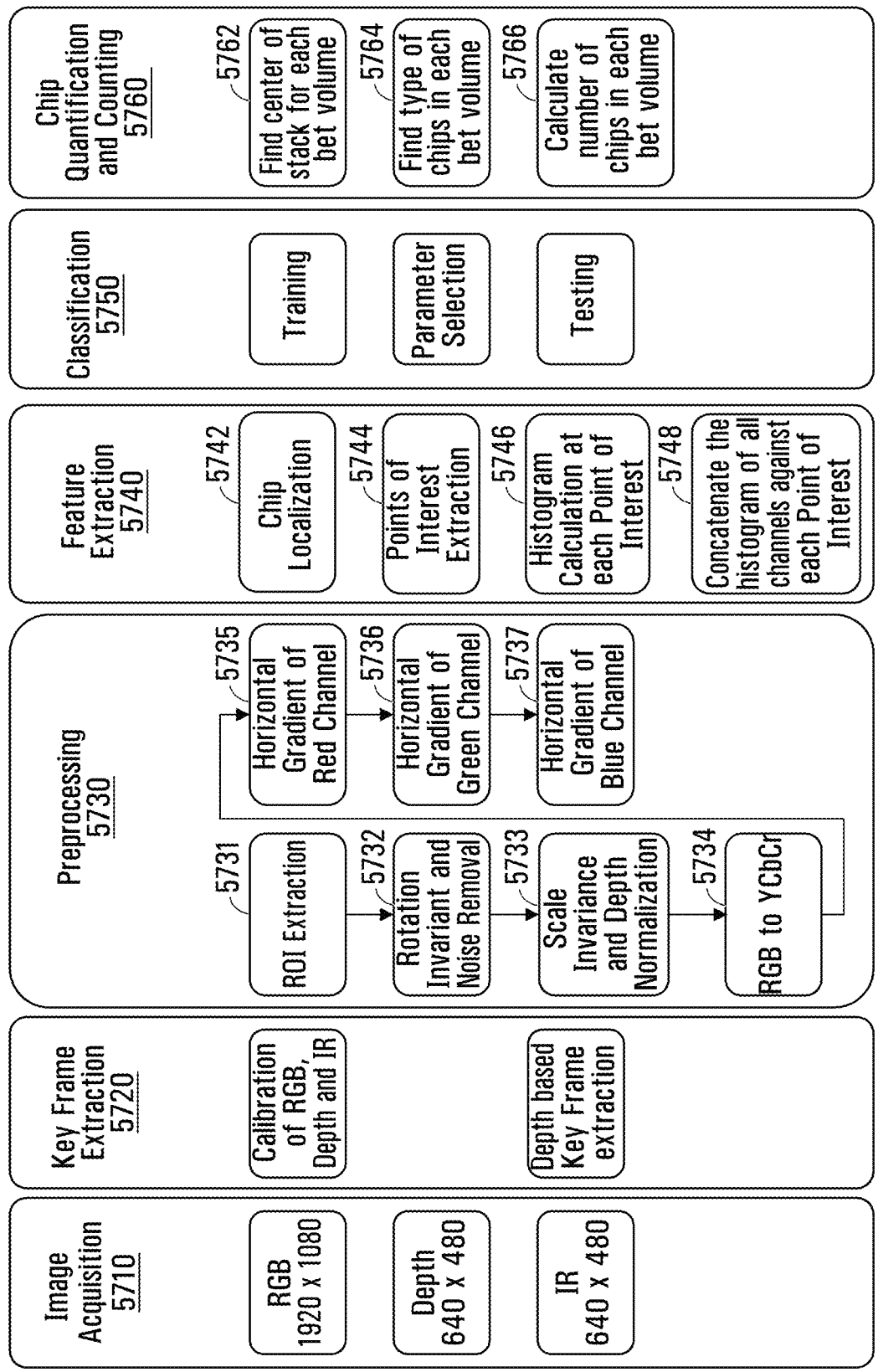
FIG. 57 is a workflow diagram of an example process for a bet recognition system according to some embodiments.

FIG. 57 is a flow diagram of an example process for bet recognition system 100 according to some embodiments.

At 5710, imaging component 202 captures image data. The image data can correspond to the one or more chips positioned in at least one betting area on a gaming surface of the respective gaming table. Each client hardware device can comprise one or more sensors responsive to activation events and deactivation events to trigger capture of the image data by the imaging component. The imaging component can be positioned to capture images of a gaming surface of the respective gaming table. For example, the images acquired can correspond to different channels. In some embodiments, a separate imaging component 202 can each capture one of colour (e.g. RGB that captures R, G, and B channels), depth (e.g., multiple imaging components that enable capturing of image data that can be compared and processed to generate depth data), and infrared (IR) data. For example, an imaging component 202 capturing RGB data can generate one or more images of a 1920×1080 pixel size, an imaging component capturing depth data can generate one or more images of a 640×480 pixel size, and imaging component capturing IR data can generate one or more images of a 640×480 pixel size.

In some embodiments, bet recognition system 200 or components thereof captures images across a plurality of channels including at least a red channel, a green channel, a blue channel, a depth information channel, and an infrared channel. Histograms are generated wherein each representative histogram is an aggregated histogram generated from combining histograms generated for each channel of the plurality of the channels.

At 5720, a processor 204 is configured to extract aggregated frames or key frames from image data captured by each imaging component 202, for example, image data across each of the RGB channels. The key frames are generated by averaging or calibrating a number of frames of image data from one or more of RGB channels, depth image data, and IR image data. Calibration can be enabled by time and/or position synchronization of the image data, using known location of the imaging components used to capture the data and/or detection of similar images captured by different imaging components. In some embodiments, captured image data is represented by an aggregated frame corresponding to average image data of image data captured across a duration of time to reduce transient effects arising from temporary visual obstructions of the imaging component.

In some embodiments, a key frame can be generated for each channel. For example, forty frames can be captured in colour (e.g., RGB) by an imaging component 202, forty frames can be captured over an IR channel, and forty frames can be captured over a depth channel. Each frame captured can have a corresponding frame in each of the other channels. A processor 204 is configured to select frames from each of the channels captured or generated, for example, can select colour, IR, and depth frames based on presence of obstructions of a region of interest. The remaining frames over the different channels can be averaged to generate a key frame image, thereby removing one or more obstructions captured in the set of 40 frames.

In some embodiments, one or more cameras can be used, for example, one or more IR cameras, with each camera capturing one or more frames of images.

Generation and use of a key frame can minimize transmission costs of images or data for processing, for example, as compared to transmission or processing of many frames from many channels of an image. This can allow for practically useful classification of chip type and quantification of chip or betting object values in a region of interest or betting location. For example, classification of betting objects and quantification of betting object types can be performed by system 200 with timing appropriate to allow for appropriate response to the classification or quantification. An administrator can be alerted by system 200 that a game participant has removed chips from their chip stack at a time that is prohibited by the game and respond to correct the game participant. The alert can be generated by system 200 based on the classification or quantification immediately after the chip stack has been altered. System 200 can immediately trigger the alert after the chip stack has been altered due to the processing time having been minimized by its use of key frames.

Processor 204 also can be configured to calibrate image data of the same gaming objects to generate depth data. Processor 204 may also be configured to use other image data, for example, IR data, in combination to generate depth data, decide how far away an object is, or decide on an object's location. For example, processor 204 can be configured to determine distance of an object based on how light or a light pattern warps over an object as captured by an IR imaging component. This distance information can be compared with other distance information of the same object captured by a separate imaging component located a known distance away. In some embodiments, two RGB cameras can be used to generate depth information using triangulation.

In some embodiments, a specified number of frames of image data can be selected and averaged to generate a key frame that can be used for further processing. This can allow transient obstructions of an object or region of interest to be removed or removed to an acceptable extent. In some embodiments, captured image data is represented by an aggregated frame corresponding to average image data of image data captured across a duration of time to reduce transient effects arising from temporary visual obstructions of the imaging component. This process of generating a key frame from averaged images can be repeated across each channel captured or across different colour spaces (e.g., RGB and Y'CbCr). In some embodiments, a single key frame is generated from averaged frames captured over multiple different channels after frames containing obstructions are removed. At 5730, a processor 204 is configured to pre-process the captured image to filter at least a portion of background image data to generate a compressed set of image data of the one or more chips free of the background image data. Here, by exploiting the fact that the depth values representing the chips should vary smoothly in a specific bet area, processor 204 employs a histogram of depth to extract and localise chips in a particular bet area from its surroundings. Background objects such as people, hands, cards, other chip stacks, and other objects can be filtered out as background image data.

In some embodiments, processor 204 can define a regions of interest (e.g., a betting location) based on threshold values such as threshold depth data. Processor 204 can be configured to use the defined regions of interest to identify a foreground object and/or separate background from foreground image data. For example, processor 204 can be configured to separate foreground objects, including chip stacks, from background objects by identifying image data (e.g., key frame image data) corresponding to objects within a region of interest, such as a betting location (e.g., where a region of interest is defined by threshold values of depth data). Data corresponding to background objects can be discarded, in some embodiments. At 5731, processor 204 is configured to extract regions of interest, for example, corresponding to a bet volume such as a chip, stack of chips, or two or more adjacent chips within a stack of chips, based on depth information allowing identification of chips.

At 5732, processor 204 is configured to generate rotation invariant image data for each region of interest and remove noise, for example, image noise or data corresponding to obstructions covering a part of the bet volume. For example, background regions of an image can be removed as noise. In some embodiments, processor 204 is configured to use median filtering to remove noise from images.

In some embodiments, where there is no noise, no noise removal step is performed. In some embodiments, processor 204 is configured to generate rotation invariant image data and subsequently generate scale invariant image data immediately after, without a noise removal step. Not performing noise removal can improve the accuracy with which images are represented, for example, as data. In some embodiments, images processed by processor 204 do not have salt and pepper noise, so noise removal on these images, for example, by median filtering, would decrease the accuracy of the images (e.g., by producing artifacts) rather than improve its accuracy or representation. Noise removal can be omitted as a redundant step in these embodiments.

At 5733, processor 204 is configured to generate rotation and scale invariant image data, for example, for each region of interest or bet volume. This allows the size or scale of the regions of interest (e.g., chip stack) or portions thereof to be represented in accurate scale when resized or rotated. Processor 204 also can be configured to normalize the image data for each region of interest. At 5734, processor 204 can be configured to extend channels by transforming the image, for example, transforming the image from RGB to a different color space where intensity is decoupled from color information or luminance is decoupled from chrominance. Examples of such color spaces include L*a*b*, HSV, and HSL. For example, processor 204 can be configured to generate YCbCr image data based on image data captured from red, green, and blue channels. The YCbCr colour space can be used because in the YCbCr colour space, luminance is decoupled from chrominance, i.e., intensity is decoupled from color. This can improve the subsequent processing, transmission, and storage features and quality of the image data. For example, the luminance and chrominance can be processed separately. This can allow for improved compression of the data (e.g., for reduced bandwidth consumption during transmission) while enabling a satisfactory representation of the image from the compressed data.

In some embodiments, processor 204 is not configured to perform depth normalization after generating scale invariant image data. Depth normalization can be omitted after the scale invariance step, for example, due to chip localization being performed. During chip localization, processor 204 is configured to identify foreground objects (e.g., chips in a region of interest or betting location) and assign whatever is in the background to 0, thereby removing background image data. In embodiments where depth normalization is performed, the normal depth of the foreground chips are used to normalize the depth image in order to give less weight to the background chips and give higher weight to the foreground chips. However, in embodiments where chip localization is performed, since the background and the foreground are isolated during chip localization, depth normalization can be removed in some embodiments. Depth information is used by processor 204 to identify the foreground objects (e.g., chip stacks, chips, etc.), for example, to determine whether anything is placed within a bet spot or region of interest.

At 5735, 5736, and 5737, processor 204 is configured to extract and generate data to produce a horizontal gradient of the red, green, and blue channels, respectively.

At 5740, processor 204 is configured to perform feature extraction to identify points of interest on betting objects in a bet volume such as a chip or stack of chips. This occurs according to the steps described at 5742, 5744, 5746, and 5748.

At 5742, processor 204 is configured to identify preprocessed image data corresponding to one or more betting objects. This data can be selected from a set of data corresponding to regions of interest. Processor 204 is configured to identify regions of interest based on threshold values of depth data. In some embodiments, processor 204 can be configured to execute instructions in memory to configure a trained classifier to identify regions of interest or objects within regions of interest, such as image data corresponding to one or more bet volumes, chip stacks, or betting objects.

At 5744, processor 204 is configured to select and extract data encoding points of interest within regions of interest. These points of interests can be used as features in a classifier to predict the type of a betting object, such as a chip type. This can enable the classifier to be trained to more accurately predict chip types using only the selected features, avoiding overfitting of the classifier to too many variables in image data. Overfitting could otherwise reduce accuracy of the classifier in classifying chip type of image datasets. The classifier would be optimized to classify only the training data, with limited generalizability to new data and, in turn, limited usefulness in providing chip type classification. Therefore, selection of a limited number of data variables can improve generalizability of the classifier and its ability to provide accurate classification of chip type from new data. The data variables can be selected as those features that can impact parameters of a random forest classifier, for example, tree depth and how nodes are split.

For example, the points of interest can be selected so points of interest are arranged in a series of straight rows spanning the width of a region of interest, that is, image data corresponding to data captured of a location on an object located at the same y-axis value. In some embodiments, points of interest can be selected by a pre-defined overlay generated by processor 204. As a separate way, as in some embodiments, points of interest for the region of interest can be selected using the data representing the leftmost edge of the region of interest as a reference point. For example, the first point of interest can be selected at a first defined interval away from the leftmost edge (e.g., to avoid selecting image data not representative of the region of interest due to image effects from proximity to other objects) and subsequent points of interest at the same y-axis value can be selected a second defined interval away from the previously selected point of interest. The scale invariant data can enable identification of the absolute location of each object.

In some embodiments, after chips have been localized (e.g., by removing background image data), points of interest are selected within a region of interest. Processor 204 is configured to select points of interest using equal spacing in a horizontal direction within the region of interest. Additional points of interest can be selected using equal spacing in a vertical direction within the region of interest. In some embodiments, the respective equal spacings can be different in horizontal and vertical directions.

At 5746, processor 204 is configured to generate a histogram at each point of interest corresponding to data captured by one or more imaging components or data generated from same. In some embodiments, processor 204 is configured to generate new, extended channels from data in channels directly captured by one or more imaging components that each capture, for example, one of RGB, IR, and depth data. Processor 204 is configured to extend the plurality of channels by transforming the captured image data from RGB to a different colour space where intensity is decoupled from color information or luminance is decoupled from chrominance, the transformations yielding additional channels in the plurality of channels. This data corresponding to each point of interest can be encoded as a histogram, with a histogram generated for each channel for each point of interest.

Processor 204 is configured to generate a histogram of gradients for each point of interest based on a horizontal gradients generated from image data of a region of interest. A 3×3 Sobel operator is applied to one or more channels (e.g., the R, G, and B channels and/or other channels) of image data of the region of interest to generate a gradient. In some embodiments, other operators can be used to generate gradient data. Processor 204 then generates a histogram of the gradients for each point of interest or region of interest. This may help minimize noise in the representation or storage of the image data or portions of the image data.

At 5748, processor 204 is configured to concatenate or otherwise associate, combine, average, or extract data from each histogram for a single point of interest. In this way, processor 204 is configured to generate a single histogram of all channels against each point of interest. The single histogram for a point of interest can plot a vector or array where each position in the vector or array encodes the total magnitude of all gradients of all channels for a single gradient direction. This concatenation or association of all histogram data for each point of interest can provide a more robust dataset for classification of chip type by a trained classifier (or, in the context of the generation of a trained classifier, can provide a more robust dataset for feature selection and training of a classifier).

For example, in an embodiment, for each channel captured by an imaging component 202 or generated, processor 204 is configured to generate a horizontal gradient. There can be a stack of eleven channels for a single image, with five channels captured by a camera and six additional channels generated by processor 204. At each point of interest (e.g., at x coordinate 10, y coordinate 10), a small selection of image data is made in corresponding locations across each of the channels. The small selection of image data can be the image data encoding the portions of the image immediately adjacent to the point of interest. Processor 204 is configured to generate a histogram for each point of interest based on each respective small selection of image data. Each histogram generated from each channel for a point of interest is concatenated. That is, in some embodiments, a histogram of horizontal gradients is generated for each channel for each point of interest and each histogram for a given point of interest is concatenated and can be used for feature extraction.

In some embodiments, the small selection of image data for a point of interest is the data encoding the portion of an image, where the portion of the image is that portion that lies within a rectangular window and includes the respective point of interest. An example window for a point of interest is depicted at the left portion of FIG. 75. Processor 204 is configured to generate a concatenated histogram based on image data from one or more or all channels encoding the portion of the image falling within the window. Processor 204 is configured to generate a concatenated histogram corresponding to each point of interest. The window size for a point of interest can be selected to cover, for example, approximately 80% of the length of a chip in a chip stack and approximately the entire height of a chip.

In some embodiments, different shapes (e.g., rectangular, circular, etc.) can be used for the window used to calculate the histograms. A rectangular window shape may correspond more closely to a chip in an image captured by imaging component 202. In this way, processor 204 can be configured to use this image data representing the portion of the image falling within the window to generate a classification (e.g., of chip colour) for each point of interest.

At 5750, processor 204 is configured to process the compressed set of image data to establish a two-dimensional grid comprising points of interest overlaid over the compressed set of image data, and for each point of interest, classifies the point of interest (e.g., as colour, or background) based on an analysis of a corresponding representative histogram generated based on the image data corresponding to the corresponding point of interest. For example, each histogram can plot a vector or array, where each position in the vector or array encodes the total magnitude of all gradients for a single gradient direction. A histogram can be generated for portions of image data, for example, where each portion corresponds to a single point of interest. That is, each point of interest can be represented as gradient values encoding the magnitude and direction of each pixel in the selected point of interest. These gradient values for the point of interest can be used to generate a vector storing total magnitudes for select gradient directions spanning the range of possible gradient directions (e.g., 0 to 160, where vector location 0 represents magnitudes with 0 or 180 degree directionality). The vector can be used to generate a histogram depicting the magnitude of gradients for all horizontal gradients at the portion of the image representing the point of interest.

A histogram of gradients (e.g., HoG) can be used in some embodiments.

In some embodiments, the horizontal gradients can be calculated by using a 3×3 Sobel operator on one or more channels, for example, the R, G, and B channels and/or channels in other colour spaces, and corresponding horizontal gradient channels in order to capture the vertical texture in the bet objects, bet volume, or chips. This can enable encoding of chip texture, for example, for classification of chip type or colour at each point of interest and of each chip. This can also enable edge detection of betting objects or chips, for example, based on vertical directionality encoded in a generated vector representation of the image gradient data. In some embodiments, processor 204 is configured to normalize each histogram, image data, and/or vector to reduce impact of lighting variations.

The processor 204 is configured to identify a dominant classification (e.g., "yellow" or "striped blue and gray") for each row in a grid of the points of interest. In some cases, the dominant classification can be determined by majority voting or selection of the most frequently classified type amongst the classified types for each point of interest in the row. The classification for each point of interest can be based on features selected from a concatenated histogram of horizontal gradients, where the concatenated histogram is generated using image data encoding a rectangular window spanning a large portion of the width of a row of points of interest (e.g., the width of a chip in a chip stack). Using a large window can allow striped chips to be assigned a different dominant classification than chips wholly coloured one of the stripe colours. This can allow the system to accurately identify and quantify chips and bet volumes.

In some embodiments, histograms generated for multiple points of interest within the same row or at the same height are used to together identify a chip, for example, by majority voting. The multiple points of interest are selected as points within a rectangular window spanning the chip.

The dominant classification is recorded in a data structure to establish a vector representation (e.g., a single dimensional array) of the one or more chips in the at least one betting area.

In some embodiments, the dominant classification can be determined by a classifier trained on sets of classification data along points of interest along an x-axis. This classifier can be trained to distinguish between blue chips, gray chips, and chips striped in an even distribution of blue and gray.

For example, in some embodiments, processor 204 is configured to generate a classifier using one or more classification models, based on, for example, random forest or neural network algorithms. Processor 204 is configured to cause the classifier to be trained on image data, for example, to predict a point of interest type (e.g., colour, background, etc.) based on histogram data, for example encoding a concatenated histogram generated from multiple channels at a single point of interest. Depending on the classification model used, this can involve parameter selection or identification of the best features for classification. The classifier can be tested or validated iteratively or dynamically using new image data captured as betting objects are used during betting events in a live game. After the classifier is trained, the classifier is then used to classify each point of interest overlaid over a compressed set of image data, for example, points of interest for a selected region of interest (e.g., bet volume or stack of chips). The classification for each point of interest is based on the histogram generated for the point of interest and based on image data from multiple channels captured. The classification for each region of interest can denote a colour, whether it is background or a betting object, etc. The trained classifier can be generated at an earlier time than its real-time use to classify betting objects during betting events.

At 5760, processor 204 is configured to determine one or more quantities of one or more chip types of the one or more chips in the at least one betting area by processing the vector representation based at least on a comparison with physical geometric characteristics of the one or more chip types. For example, a physical geometric characteristic can include a centroid determined for each bet volume and the number of chips in each bet volume determined based on the values stored in the vector representation and the nature of those values in relation to adjacent values in the vector representation.

For example, at 5762, processor 204 is configured to find the centroid of a stack of chips for each bet volume. This can be the midpoint along an x-axis of a chip, for example, the length defined by the median of the chips' corresponding points of interest projected along an x-axis. In some embodiments, processor 204 selects or transform the data to compensate for the angle that the images are captured at.

In some embodiments, the height and centroid of a stack of chips or single chip or bet object can be calculated using chip localization (e.g., isolation of foreground image data from background image data using depth data of objects in a region of interest or betting location, where each region of interest or betting location is defined by threshold depth data values). Using a dominant classification for each row and the height and/or centroid data, processor 204 is configured to quantify the chips in the chip stack, including determining chip type, quantity of each chip type in a chip stack, and total value of one or more chip stacks, bet volumes, or bet objects. Processor 204 is configured, at 5764, to find chip types in each bet volume and, at 5766, calculate a number of chips in each bet volume.

Processor 204 can be configured to cause a data storage to maintain a data structure storing one or more data fields representative of the determined one or more quantities of one or more chip types of the one or more chips in the at least one betting area. The data structure can use one or more of various implementations, such as, a relational database, non-relational database, flat file, etc. This information can be displayed in an interface element in real-time to a dealer at the betting table or transmitted to a server for trend analysis, for example.

In an example embodiment, a process for monitoring game activities at a gaming table comprises: capturing image data corresponding to the one or more chips positioned in at least one betting area on a gaming surface of the respective gaming table; pre-processing the captured image data to filter at least a portion of background image data to generate a compressed set of image data of the one or more chips free of the background image data; processing the compressed set of image data to establish a two-dimensional grid comprising points of interest overlaid over the compressed set of image data, and for each point of interest, classify the point of interest based on an analysis of a corresponding representative histogram generated based on the image data corresponding to the corresponding point of interest; identifying a dominant classification for each row in the grid of the points of interest, the dominant classification recorded in a data structure to establish a vector representation of the one or more chips in the at least one betting area; determining one or more quantities of one or more chip types of the one or more chips in the at least one betting area by processing the vector representation based at least a comparison with physical geometric characteristics of the one or more chip types; and maintaining a data structure storing one or more data fields representative of the determined one or more quantities of one or more chip types of the one or more chips in the at least one betting area.

In an example embodiment, the process further comprises pre-processing the captured image data to apply at least one of rotation and scale invariance.

In an example embodiment, there is provided a device for monitoring game activities at a gaming table comprising: an imaging component positioned on a gaming table or proximate thereto to capture image data corresponding to the one or more chips positioned in at least one betting area on a gaming surface of the respective gaming table, each imaging component comprising one or more sensors responsive to activation events and deactivation events to trigger capture of the image data by the imaging component, the imaging component positioned to capture images of a gaming surface of the respective gaming table; a processor configured to pre-process the captured image data to filter at least a portion of background image data to generate a compressed set of image data of the one or more chips free of the background image data; the processor further configured to process the compressed set of image data to establish a two-dimensional grid comprising points of interest overlaid over the compressed set of image data, and for each point of interest, classify the point of interest based on an analysis of a corresponding representative histogram generated based on the image data corresponding to the corresponding point of interest; the processor further configured to identify a dominant classification for each row in the grid of the points of interest, the dominant classification recorded in a data structure to establish a vector representation of the one or more chips in the at least one betting area; the processor further configured to determine one or more quantities of one or more chip types of the one or more chips in the at least one betting area by processing the vector representation based at least a comparison with physical geometric characteristics of the one or more chip types; and a data storage configured to maintain a data structure storing one or more data fields representative of the determined one or more quantities of one or more chip types of the one or more chips in the at least one betting area.

A device for monitoring game activities at a gaming table comprising: an imaging component positioned on a gaming table or proximate thereto to capture image data corresponding to the one or more chips positioned in at least one betting area on a gaming surface of the respective gaming table, each imaging component positioned to capture images of a gaming surface of the respective gaming table; a processor configured to pre-process the captured image data to filter at least a portion of background image data to generate a compressed set of image data of the one or more chips free of the background image data; the processor further configured to process the compressed set of image data to establish a two-dimensional grid comprising points of interest overlaid over the compressed set of image data, and for each point of interest, classify the point of interest based on an analysis of a corresponding representative histogram generated based on the image data corresponding to the corresponding point of interest; the processor further configured to identify a dominant classification for each row in the grid of the points of interest, the dominant classification recorded in a data structure to establish a vector representation of the one or more chips in the at least one betting area; the processor further configured to determine one or more quantities of one or more chip types of the one or more chips in the at least one betting area by processing the vector representation based at least a comparison with physical geometric characteristics of the one or more chip types; and a data storage configured to maintain a data structure storing one or more data fields representative of the determined one or more quantities of one or more chip types of the one or more chips in the at least one betting area.

In some embodiments, the captured image data is captured across a plurality of channels including at least a red channel, a green channel, a blue channel, a depth information channel, and an infrared channel; and wherein each representative histogram is an aggregated histogram generated from combining histograms generated for each channel of the plurality of the channels. In some embodiments, horizontal gradients are calculated using a 3×3 Sobel operator in order to capture the vertical texture in the chips.

Figure 58:
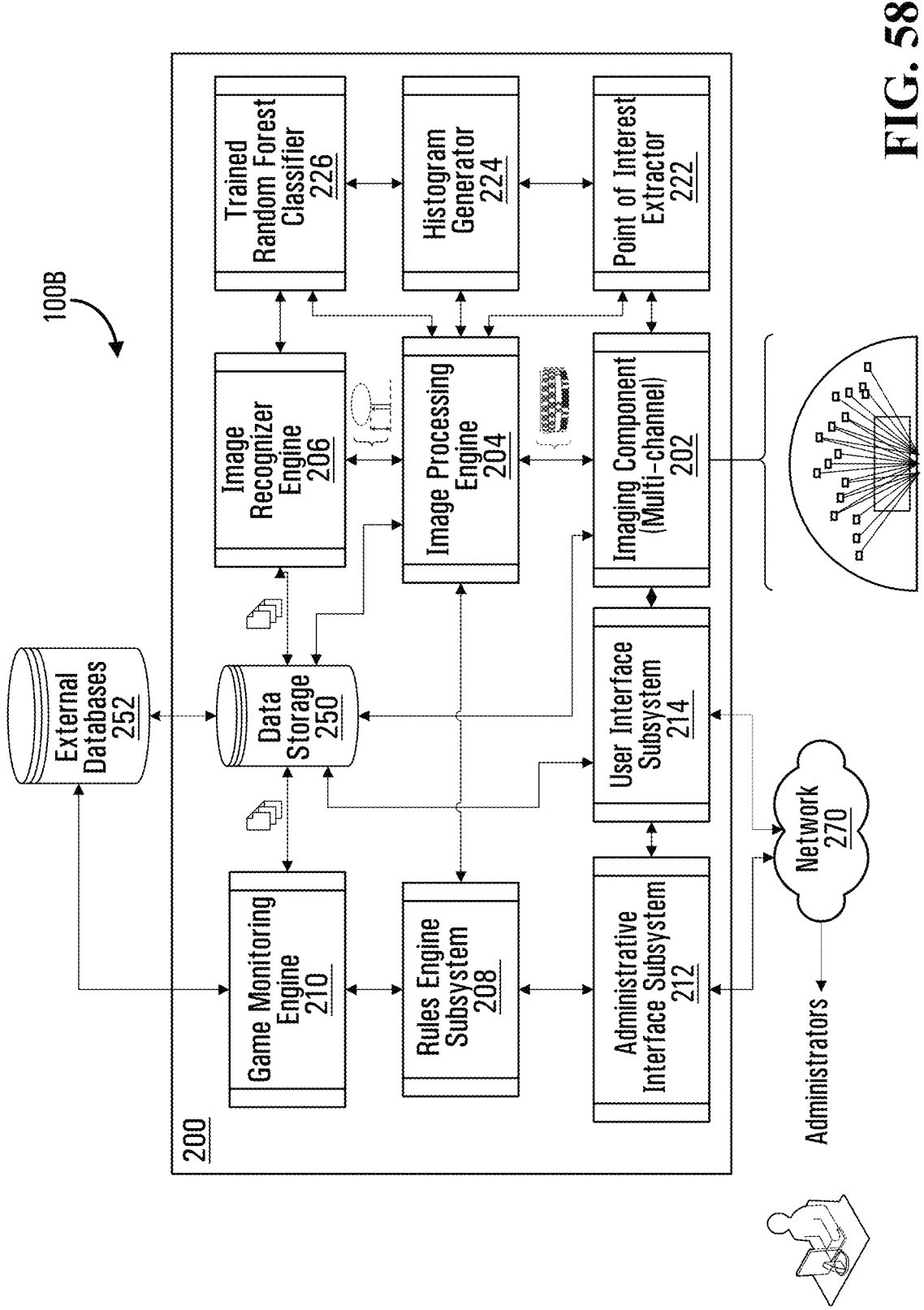
FIG. 58 is a view of an example bet recognition system according to some embodiments.

FIG. 58 is a view of an example game monitoring system 1008, including bet recognition system 200, according to some embodiments. Imaging component 202 can capture images in various channels, including RGB and IR and can also capture images allowing generation of depth information. One or more imaging components 202 can be retrofitted in a gaming establishment without modification to existing betting tables or existing betting objects. The imaging components 202 can be installed in an arrangement on a betting table that allows optimal image capturing for classification of betting object type (e.g., chip type), including distinguishing between relevant betting objects and other objects (e.g., background) using depth information. In some embodiments, imaging component 202 can be positioned at an angle or elevation away from a betting surface or gaming table. For example, one or more imaging components 202 or bet recognition system 200 can be positioned overhead above the table or an imaging component 202 can be positioned at each corner of a gaming table or betting surface. The imaging components 202 can communicate with gaming table or bet recognition system 200 (or components of same) wirelessly or via wired connections. In some embodiments, one or more imaging components 202 or bet recognition system 200 can be retrofitted on a gaming table or betting surface and one or more other imaging components 202 can be positioned at an angle, elevation, or distance away from the gaming table or betting surface. The fields of view that can be captured by the one or more imaging components 202 can be synchronized using time stamps and/or image recognition of same or similar objects. Different image channels, angles, perspectives, or data captured from the same or similar objects can be associated with each other. This can provide enhanced data for bet object recognition, generation of depth data, feature extraction, filtering, channel generation, key frame extraction, and/or removal of transient obstructions of the bet object.

Bet recognition system 200 or components thereof can include a communication link, for example, a wired, wireless, synchronous, asynchronous, or bulk link, configured for transmitting data (e.g., data structure or a subset of the data structure) to generate betting data for the gaming table. The betting data can include betting amounts for the at least one betting area. Bet recognition system 200 or components thereof can transmit the data to external systems or databases 252 or to other devices, for example, over a network 270.

In some embodiments, point of interest extractor 222 extracts points of interests from the image data (or processed image data) received from imaging component 202 or from image processing engine 204. These points of interest may span "bounding boxes" around betting objects (e.g., chip stacks or bet volumes) that include the pixels used for analysis. Point of interest extractor 222 transmits the image data for each point of interest (e.g., data from each of multiple channels capturing data at the point of interest) and any associated data (e.g., meta data, data relating a point of interest to its location) to histogram generator 224.

Histogram generator 224 can generate a histogram for data from each channel for each point of interest. Histogram generator 224 can generate a dominant histogram for each point of interest using the multiple histograms associated with the various channels for a single point of interest. Histogram generator 224 can receive data from image processing engine 204 and/or point of interest extractor 222 to generate a single histogram for each point of interest.

Histogram generator 224 can transmit the histogram for each point of interest to a classifier, for example, a random forest classifier. In some embodiments, training data can be provided to the classifier 226 to generate a trained classifier or to re-train a classifier to optimize or fine-tune its classification. Trained random forest classifier 226 can classify the histogram data for each point of interest to determine a betting object type (e.g., chip type).

In some embodiments, a dominant classification for a set of points of interest (for example, a horizontal row) can be generated by majority voting. In some embodiments, trained classifier 226 can classify the set of classifications of points of interest within a certain location (e.g., those points of interest along the same y-value) to determine a dominant classification of a chip. In some embodiments, image processing recognizer engine 206 can instead identify a dominant classification by other means, for example, by selecting the most common classification of the points of interest.

Image recognizer engine 206 can apply recognition techniques to determine betting object type (e.g., actual chip value) for each betting object (e.g., chip) in a relevant region of interest represented by a set of points of interest. For example, image recognizer engine 206 can communicate with or utilize trained classifier 226 to identify a set of points of interest corresponding to a single chip. This information can be used to determine each chip type (and in turn, quantify the chips of a given type in a chip stack or bet volume) once the dominant classification of the points of interest corresponding to each chip is determined.

Figure 59:
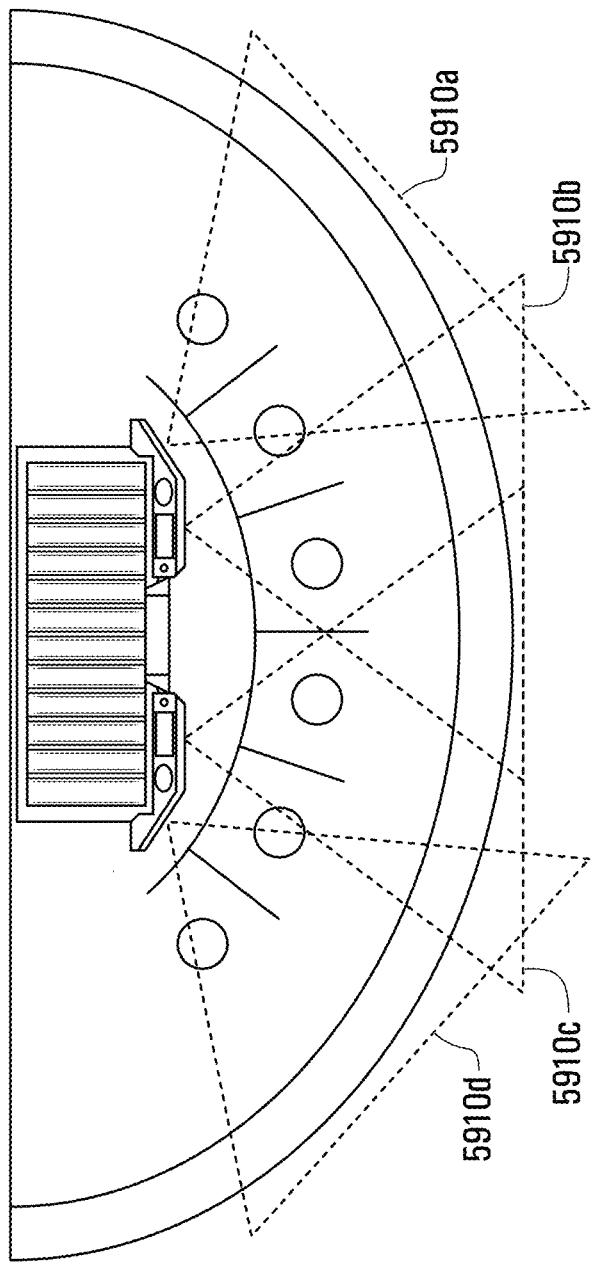
FIG. 59 is a diagram of an example playing surface with betting areas and fields of view of imaging components according to some embodiments.

FIG. 59 is a diagram of an example playing surface with betting areas and fields of view of imaging components 202. Each fields of view 5910a, 5910b, 5910c, and 5910d can cover an area of the playing surface including betting areas. Each area covered by a single field of view may overlap with an area covered by a separate field of view. Overlapping portions of fields of view can be used by game monitoring system 100b to generate multiple and/or different channels or imaging data of the same betting object (e.g., chip stack). For example, perspective views of a chip stack can be used to generate depth data by an imaging component 202 or image processing engine 204.

Figure 60:
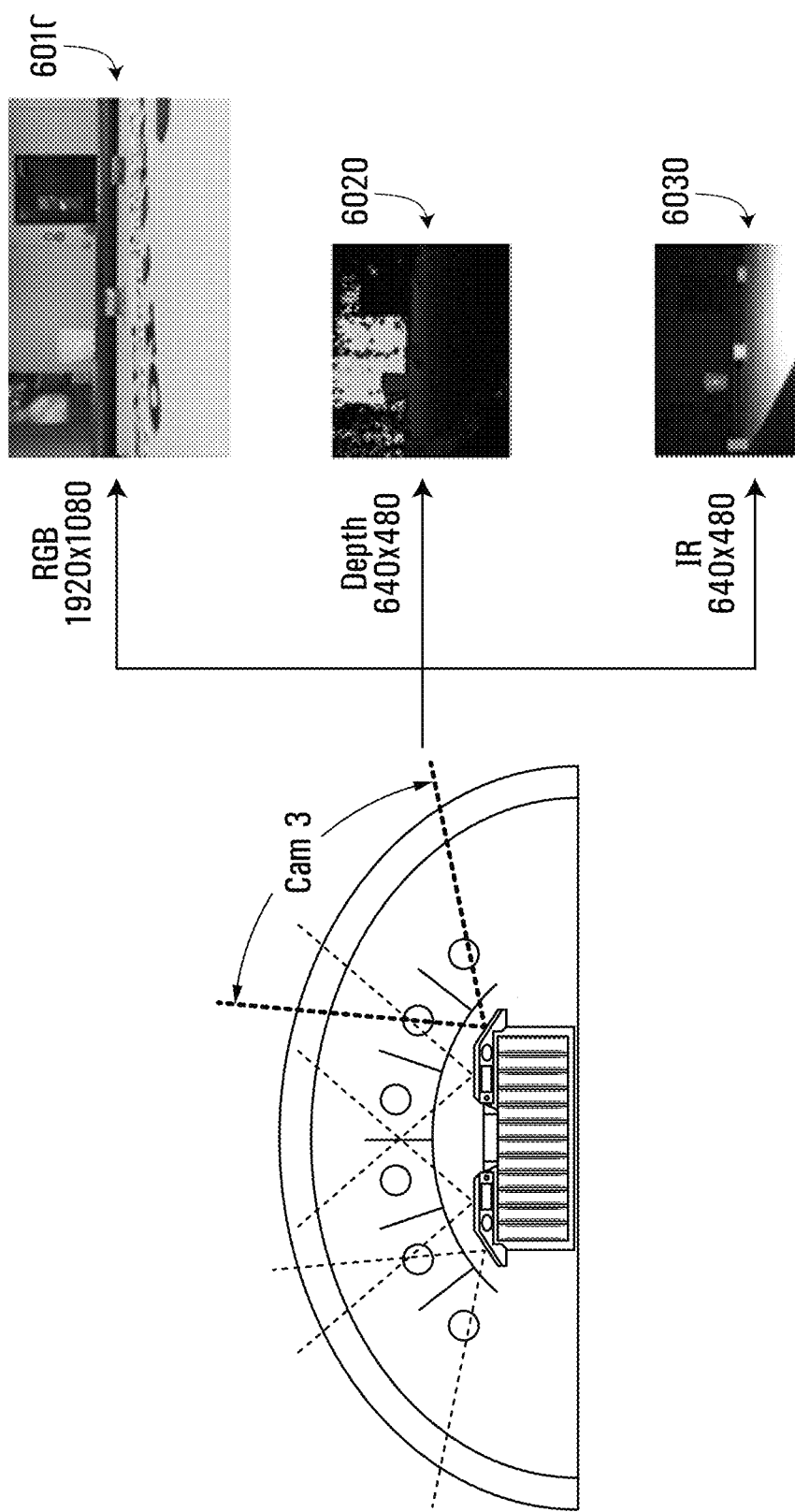
FIG. 60 is a diagram of an example playing surface with betting areas and fields of view of imaging components according to some embodiments.

FIG. 60 is a diagram of an example playing surface with betting areas and fields of view of imaging components 202. One or more imaging components 202 can produce image data for RGB channels 6010, depth 6020, and IR channels 6030 for a single field of view. Game monitoring system 100b can generate additional images from the channels captured. For example, the respective images generated from RGB channels, depth data, and IR channels are depicted at 6010, 6020, and 6030, respectively.

Figure 61:
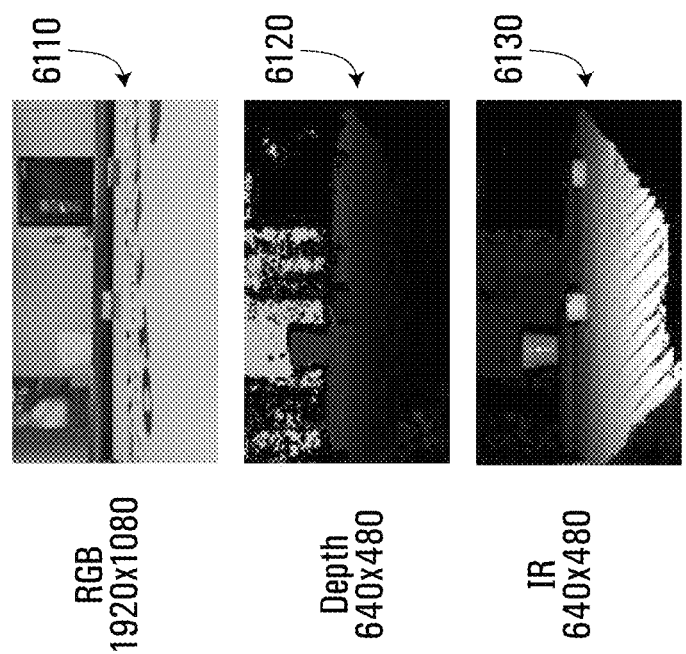
FIG. 61 is a diagram of an example set of image data according to some embodiments.

FIG. 61 is a diagram of an example set of image data including image 6110 representing capture across RGB channels, image 6120 representing differential depth information, and image 6130 representing capture across an IR channel. An imaging component 202 can capture image data and generate representations 6110, 6120, and 6130.

At 6120, a first image of a chip stack is shown as well as a second image depicting a horizontal gradient of R, G, and B channels of the first image. Gradient data can be used by processor 204 for feature extraction and classification of bet object or chip type.

Figure 62:
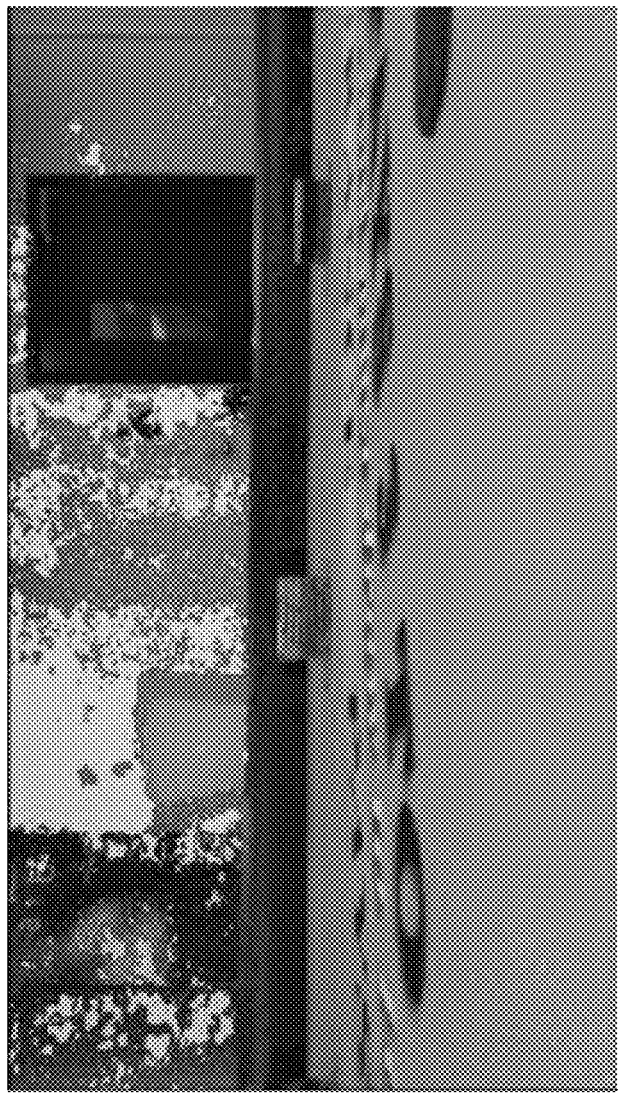
FIG. 62 is a diagram of an example representation of image data showing depth on a green channel according to some embodiments.

FIG. 62 is a diagram of an example representation of image data showing depth on a green channel. Image processing engine 204 can combine image data or representations of same into a single representation or display. This may involve calibration and synchronization across two or more images (or data representing same) to allow depiction of differential image capture over the same objects from the same perspective. For example, image processing engine 204 can receive first image data allowing representations of data capture across the green channel from an RGB camera within imaging component 202. Image processing engine 204 can also receive second image data allowing representations of data capture from cameras within imaging component 202 allowing presentation of depth information. Image processing engine 204 can overlay the first and second image data and adjust the representation (for example, using data about the location of capture corresponding to each data point) so that the overlays line up according to the locations corresponding to the data presented, for example, are synchronized to depict a single representation of a betting table and/or betting objects.

In some embodiments, an image depicting depth can be constructed by an imaging component 202 or image processing unit 204 from one or more images or frames captured from the same, similar, or different perspectives. If two or more images are used, the image can be constructed using image recognition matching similar or identical objects in the multiple images, time synchronization, or position synchronization.

Figure 63:
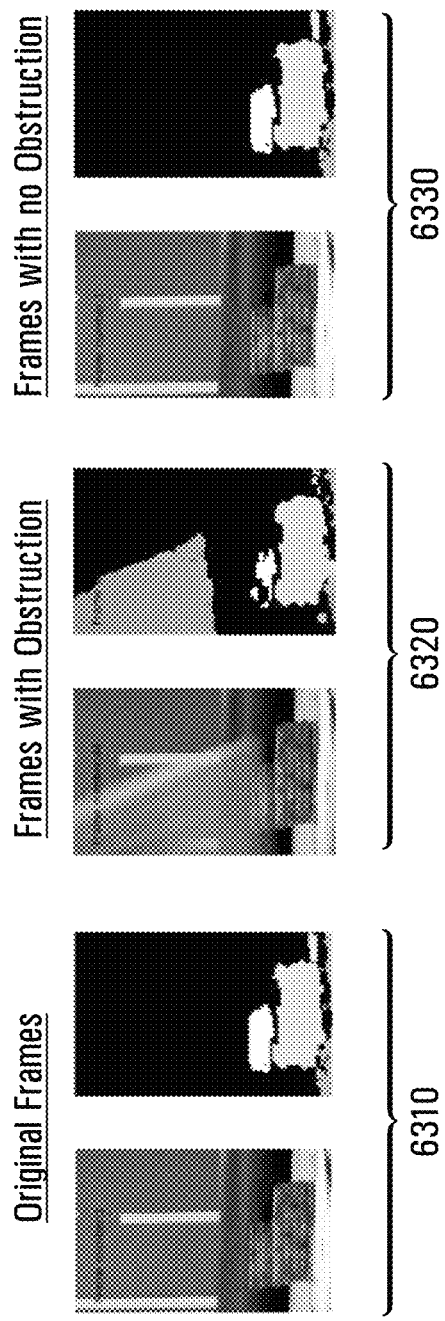
FIG. 63 is a diagram of example sets of image frames with and without obstruction according to some embodiments.

FIG. 63 is a diagram of example sets of image frames 6310 (original frames), 6320 (frames with obstruction), and 6330 (frames with no obstruction). Image processing engine 204 can process image data, for example, from an RGB camera or an IR camera, and distinguish between obstructions and objects of interest, for example, a chip stack or betting volume in the foreground. Image processing engine 204 can select one or more frames where an object is not obstructed from image data or frames taken at near-contemporaneous time of that object. Example obstructions include partially coverage in the field of view the image data is collected at. A key frame image can be generated using the average of the selected one or more frames from a channel as well as the corresponding frames from multiple other channels. The key frame can encode image data of a region of interest (e.g., including one or more chip stacks or bet volumes) with any obstructions of the region of interest removed.

Figure 64:
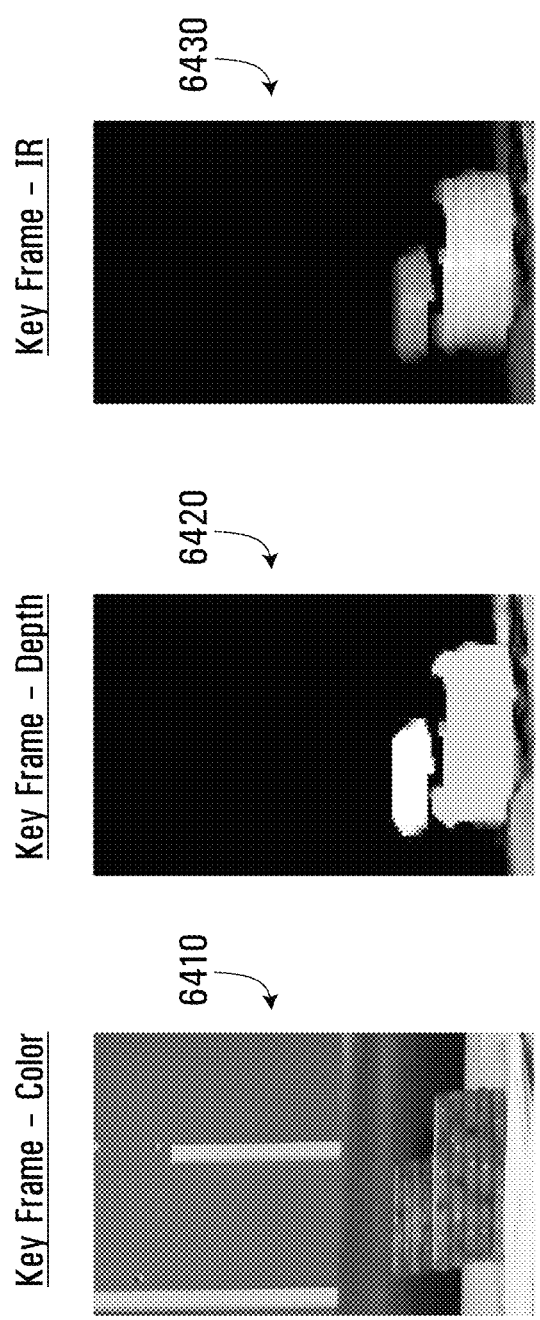
FIG. 64 is a diagram of example image frames according to some embodiments.

FIG. 64 is a diagram of example image frames containing the same object taken at contemporaneous or near-contemporaneous time from the same or similar perspective. Each image frame is selected by image processing engine 204 as a key frame for each type of image data collected, for example, colour channels (for key frame 6410), IR channels (for key frame 6430), and data encoding representation of depth information (for key frame 6420). Each key frame is selected for one or more characteristics, for example, absence of or minimal obstruction of a betting object, chip stack, or betting volume.

Figure 65:
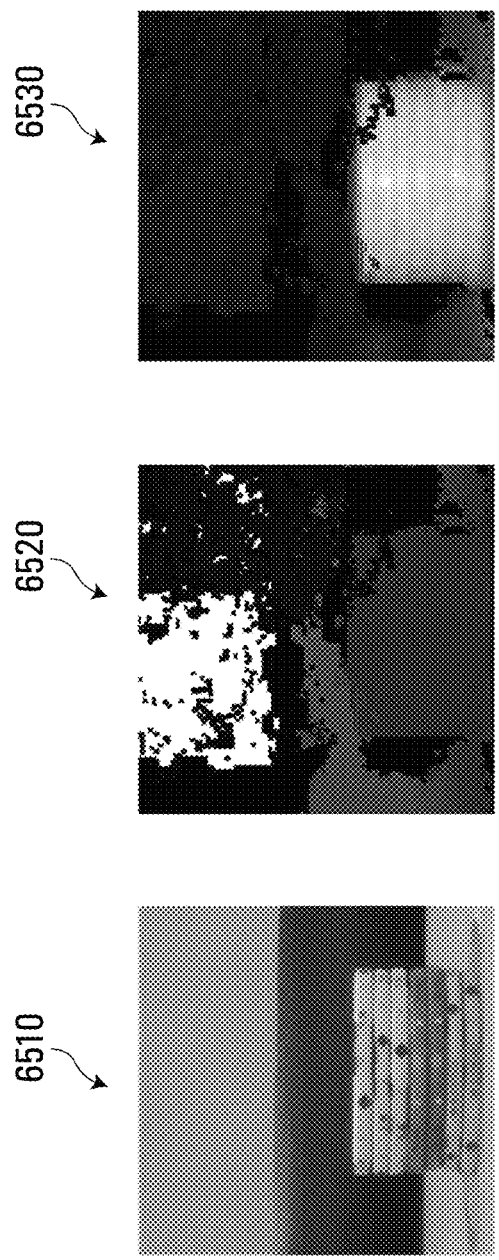
FIG. 65 is a diagram of example image frames according to some embodiments.

FIG. 65 is a diagram of example image frames containing the same object taken at contemporaneous or near-contemporaneous time from the same or similar perspective. Each image frame is selected by image processing engine 204 as a key frame for each type of image data collected, for example, colour channels (for key frame 6510), IR channels (for key frame 6530), and data encoding representation of depth information (for key frame 6520). Each key frame is selected for one or more characteristics, for example, absence of or minimal obstruction of a betting object, chip stack, or betting volume.

Figure 67:
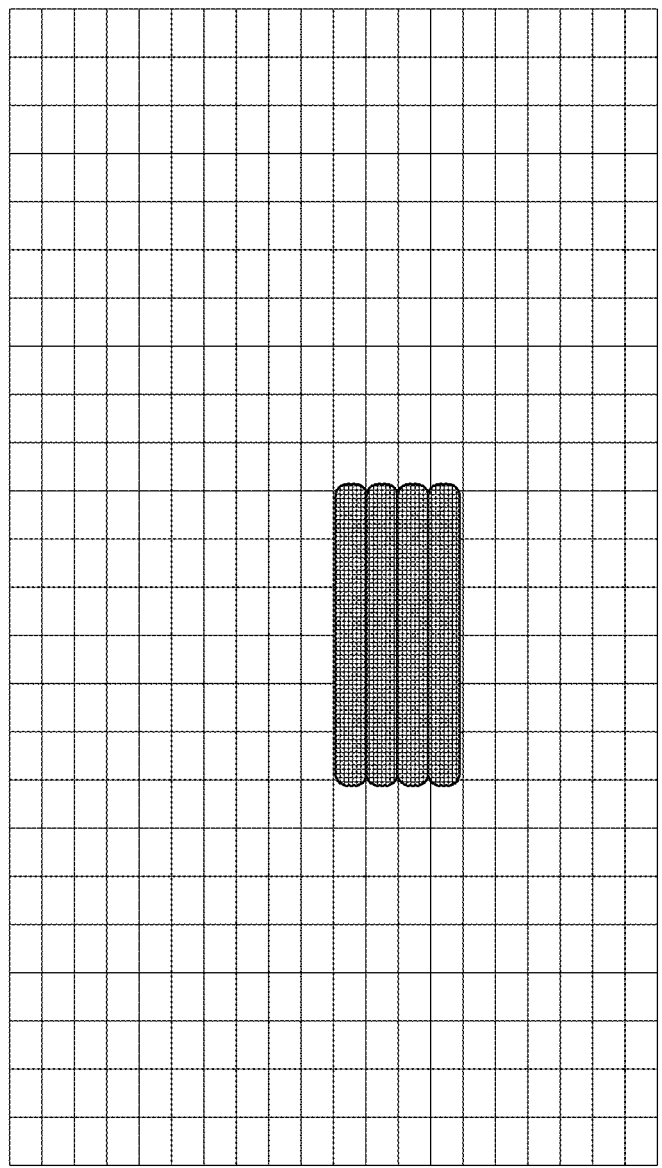
FIG. 67 is an example representation of image data of a stack of chips according to some embodiments.
Figure 98:
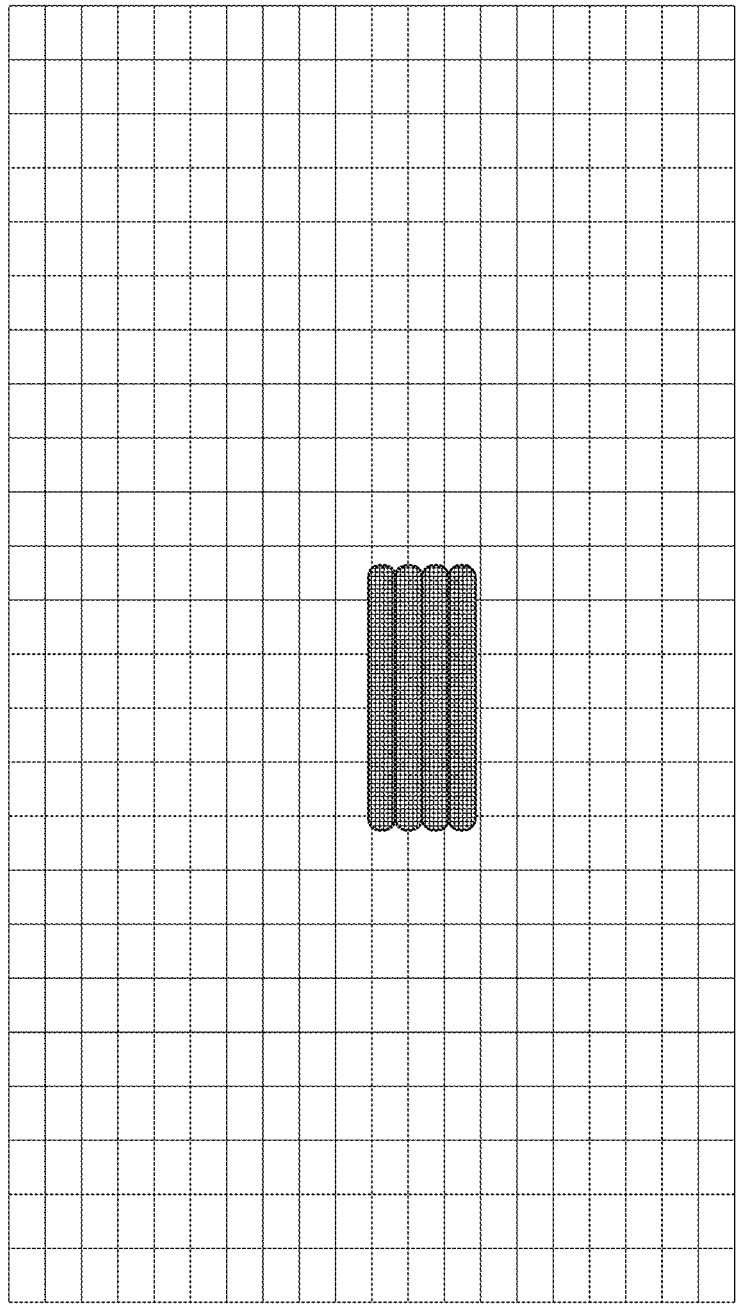
FIG. 98 is a representation of image data of a stack of chips before scale invariance, according to some embodiments.

FIGS. 98 and 67 are example representations of image data of a bet volume or stack of chips depicted as scale invariant data positioned on a two-dimensional grid. More specifically, images are depicted before (FIG. 98) and after (FIG. 67) scale invariance. For example, the image data can be modified to provide a defined aspect ratio, such that the image can be depicted on accurate scale even if the image is resized.

Figure 66:
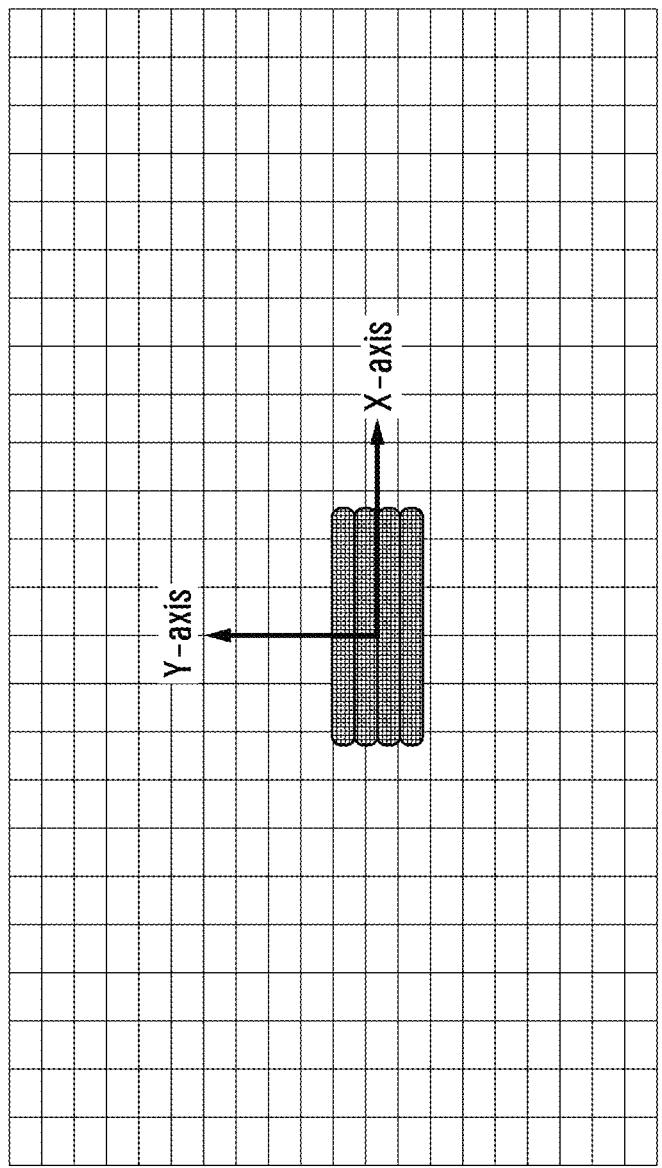
FIG. 66 is an example representation of image data of a stack of chips positioned on a two-dimensional grid according to some embodiments.
Figure 97:
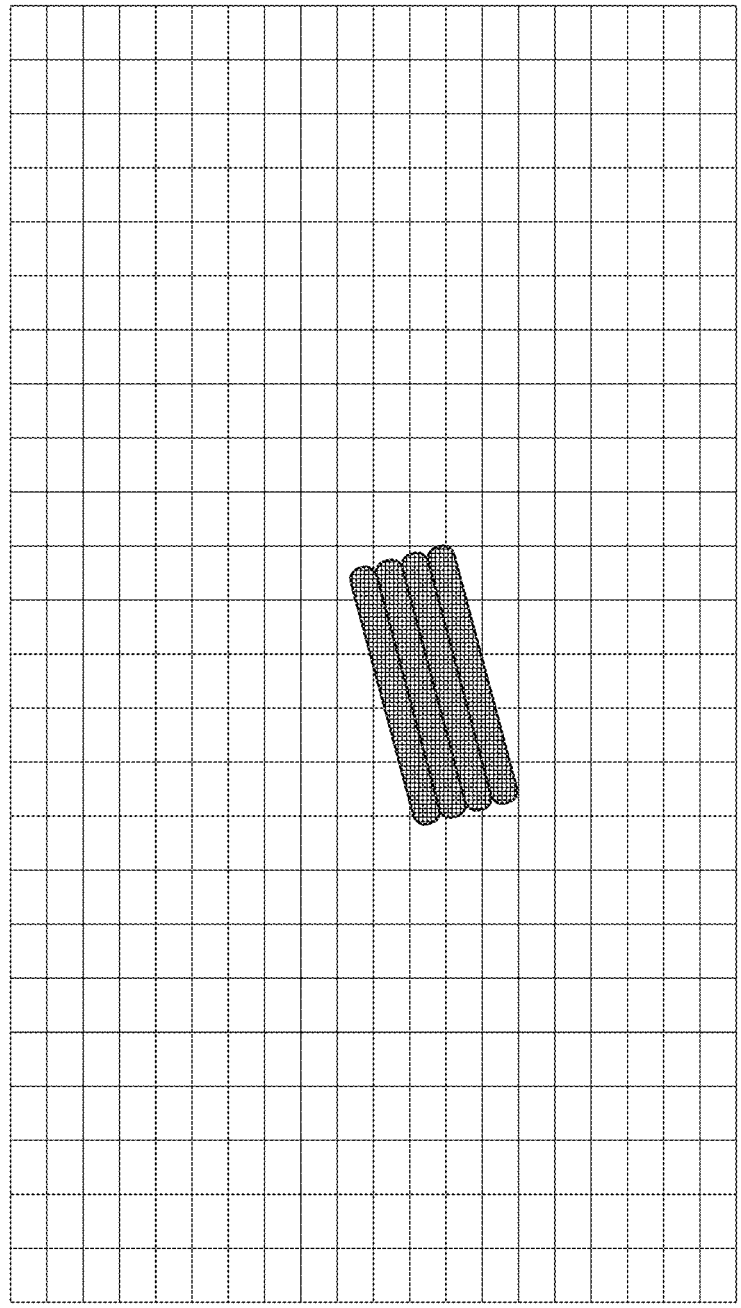
FIG. 97 is a representation of image data of a stack of chips before rotation invariance, according to some embodiments.

FIGS. 97 and 66 is an example representation of image data of a bet volume or stack of chips depicted as rotation invariant data positioned on a two-dimensional grid. More specifically, images are depicted before (FIG. 97) and after (FIG. 66) rotation invariance.

Figure 68:
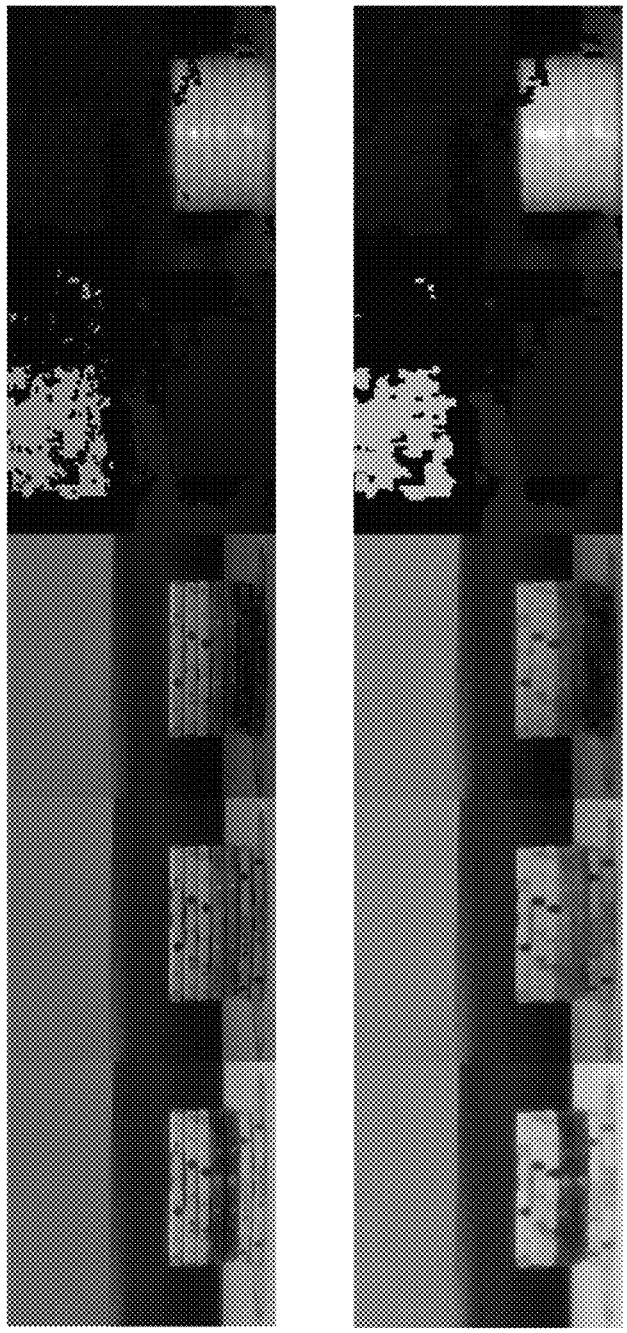
FIG. 68 is an example of two sets of image data each containing a representation of image data collected over various channels according to some embodiments.

FIG. 68 is an example of two sets of image data each containing a representation of image data collected over a red channel, green channel, blue channel, image(s) allowing generation of depth information, and IR channels. Each shows the key frame selected by the image processing unit 204.

Figure 69:
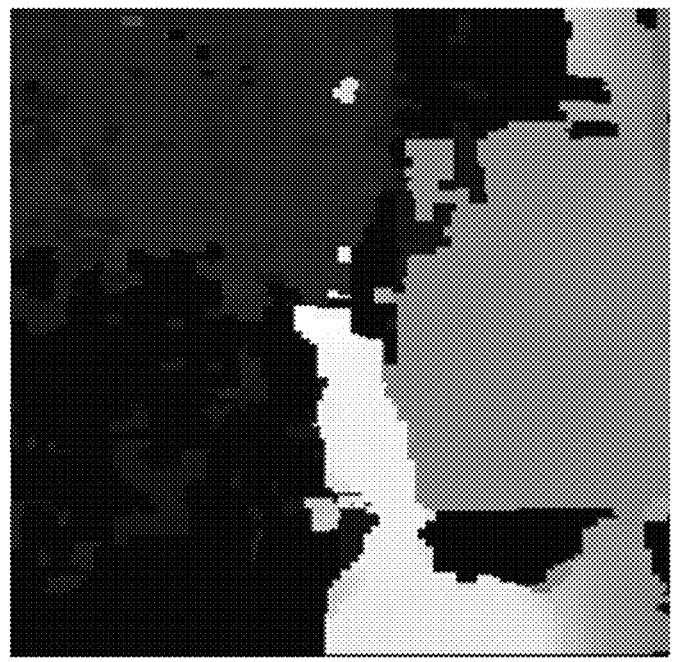
FIG. 69 is an example image captured by bet recognition system according to some embodiments.

FIG. 69 is an example image showing normalization of image data of a bet volume captured by imaging component 202. In some embodiments, depth normalization is not performed.

Figure 70:
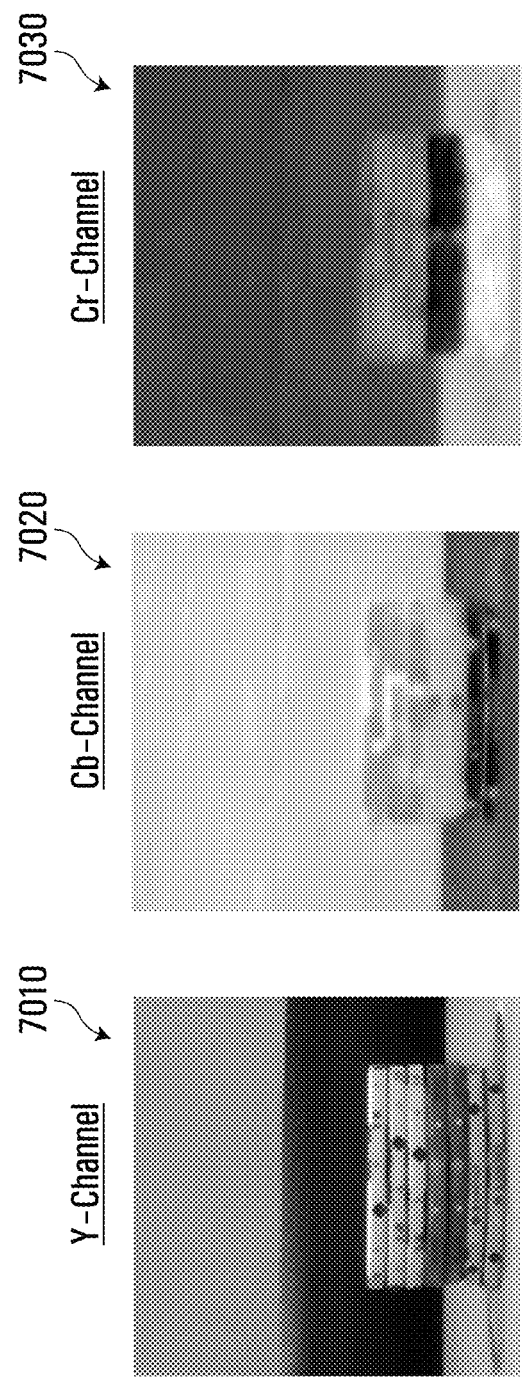
FIG. 70 is an example image set of image data, depicting a Y colour space, Cb colour space, and Cr colour space according to some embodiments.

FIG. 70 is an example image set of image data, depicting a Y colour space (image 7010), $C_b$ colour space (image 7020), and $C_r$ colour space (image 7030) of the same bet volume (a stack of chips), where each image is generated from RGB image data captured by a imaging component 202.

Figure 71:
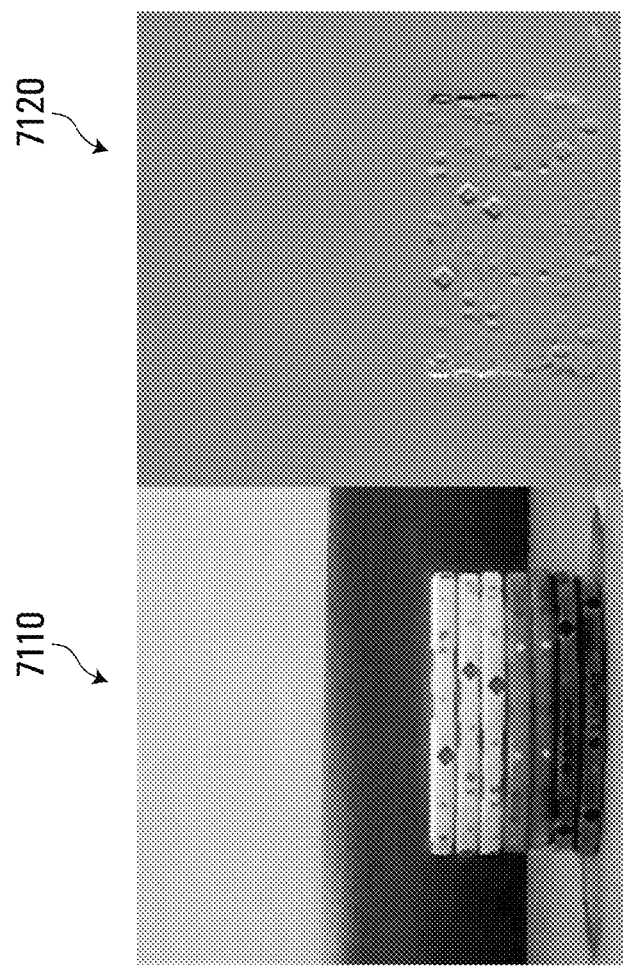
FIG. 71 are example representations of a betting object (a stack of chips) and a two-dimension representation of its horizontal gradient.

FIG. 71 are example representations of a betting object (a stack of chips) 7110 and a two-dimension representation of its horizontal gradient 7120 depicting depth information. Image processing unit 204 is configured to generate the image depicting a horizontal gradient from a processed image or an image captured, for example, over RGB channels and IR channels. The horizontal gradient data is stored in a vector or array for generation of a histogram. For each image, portion of image, region of interest, or point of interest within same, a histogram can be generated for each channel. All histograms generated for the same image, portion of image, region of interest, or point of interest within same are concatenated or otherwise combined into a single histogram. The single histogram is provided to a random forest classifier, which can generate a prediction of type, for example, chip type, colour, value, or image type (e.g., background). This process can be repeated for each point of interest in each horizontal row to determine a dominant classification type for the row. This dominant classification can represent the chip type of a chip at the corresponding location. This process can be repeated for each row of points of interest to generate a dominant classification type for each row, thereby determining the chip type for a chip in a stack of chips.

Figure 72:
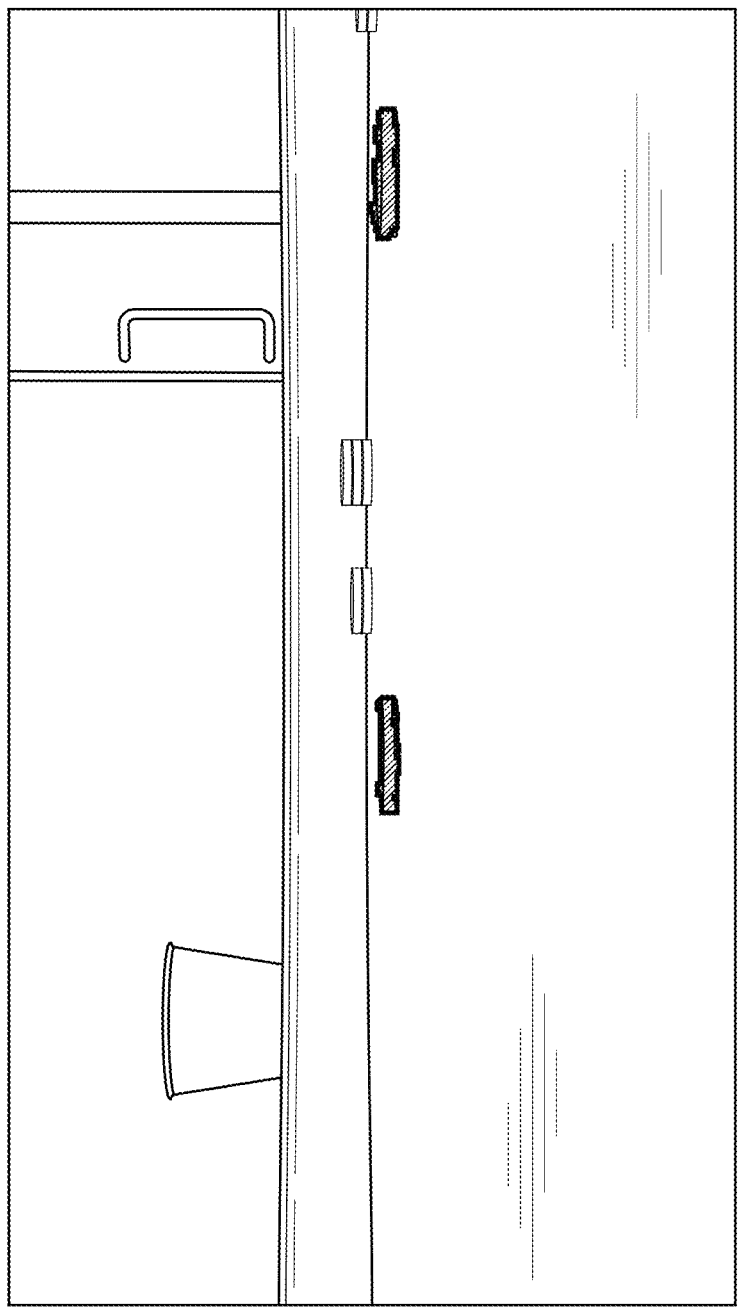
FIG. 72 is an example representation of localization of two betting objects on a betting surface by bet recognition system according to some embodiments.

FIG. 72 is an example representation of localization of two betting objects (here, chips) on a betting surface by image recognizer engine 206. Image recognizer engine 206 can generate the display distinguishing the two betting objects from other objects, including the betting surface and background objects, using different colours, for example, where the chips are pink and other objects are shades of green. Generation of a distinguishing display is not affected by the colour of the objects (e.g., felt colour), absence of chips in the bet area, background noise and chips, hands on the table at certain points of time during image capture, partial occlusion, or shadow effects.

Figure 73:
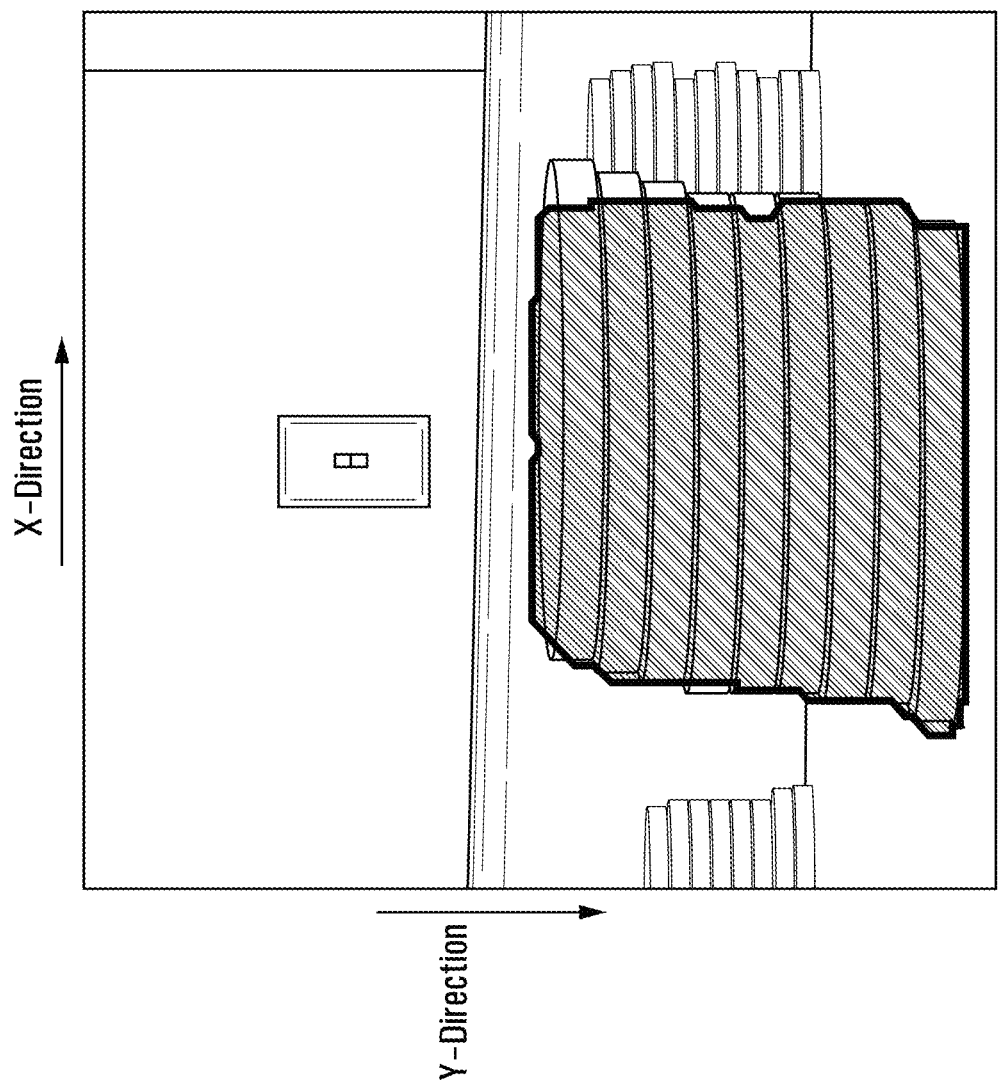
FIG. 73 is an example image with an overlay depicting image data used for image recognition bet recognition system according to some embodiments.

FIG. 73 is an example image with an overlay depicting image data used for feature extraction and/or image recognition. Points of interest extractor 222 can select features from an image captured by imaging component 202 or an image generated from same. The features can be selected to optimize training of or recognition by a classifier. Points of interest extractor 222 can select image data from a number of image locations along an x-direction as well as along a y-direction. For example, points of interest extractor 222 can manipulate the data to minimize weak matches from being extracted as a point of interest. Points of interest extractor 222 can shrink a ground truth area on both sides of the defined regions horizontally. Every point of interest can be stored as a unique representation in a data structure.

In some embodiments, points of interest extractor 222 selects points of interest by selecting points at an equal spacing apart in an x-direction within a region of interest.

Points of interest extractor 222 selects additional points of interest at an equal spacing apart in a y-direction.

Figure 74:
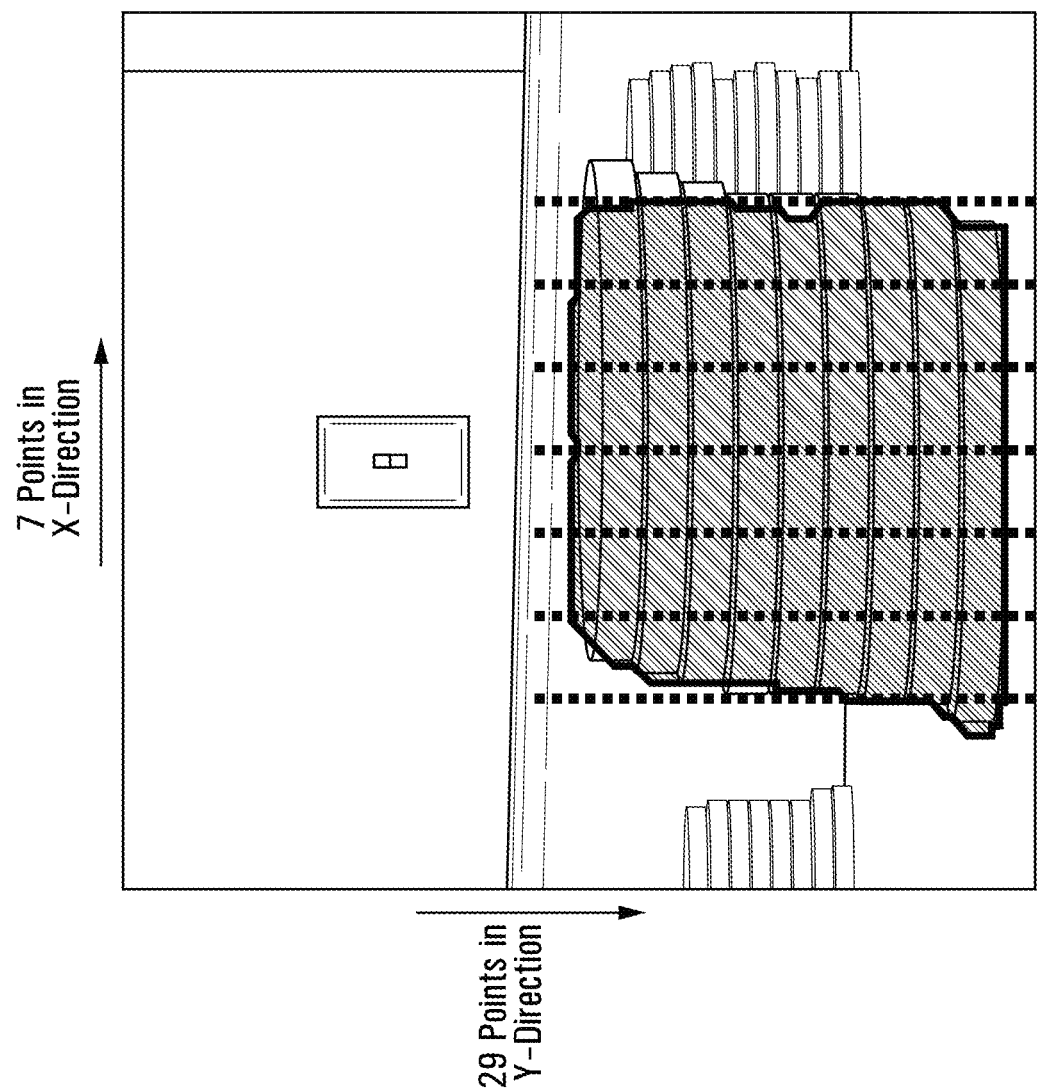
FIG. 74 is an example image with an overlay of selected points of interest according to some embodiments.

FIG. 74 is an example of the image in FIG. 73 with an overlay of the selected points of interest. As depicted, there are seven points of interest selected in each x-direction beginning at each of 29 points of interest selected in a y-direction. A different number of points can be selected at different intervals. Points of interest extractor 222 can select the points of interest such that each point along a given x-direction is selected at the same interval along the x-axis and the first point in each row is at the same x-axis value, such that the points of interest form straight columns and rows in a side view of a bet object.

Figure 75:
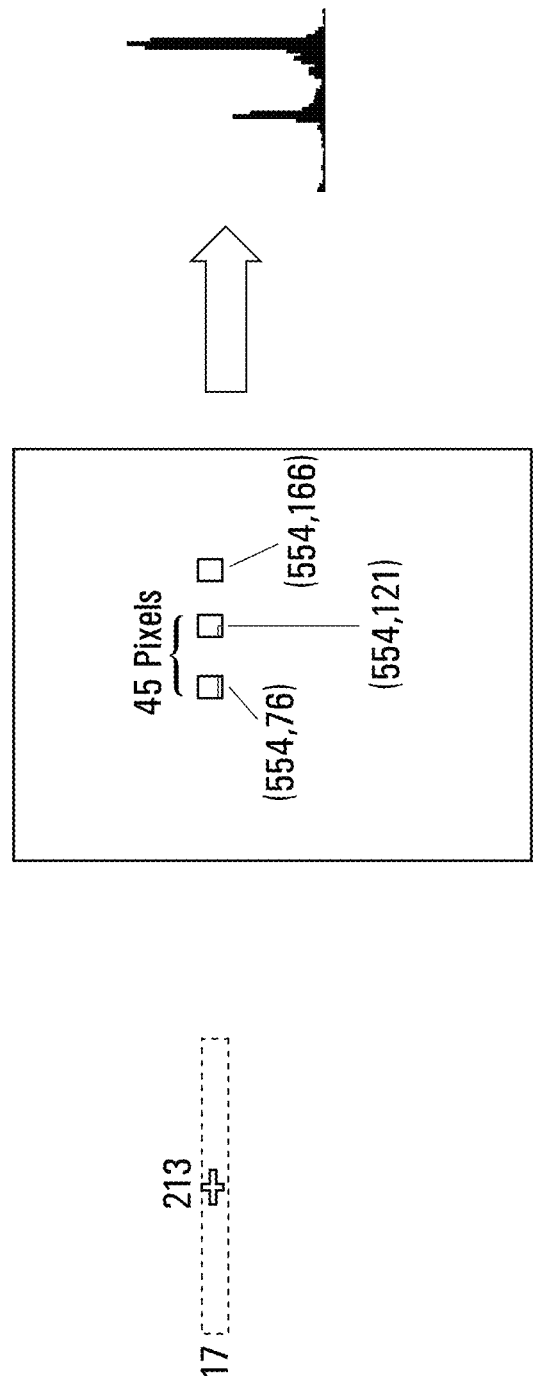
FIG. 75 is an example diagram depicting pixel representations of points of interest selected along a betting object according to some embodiments.

FIG. 75 is an example diagram depicting pixel representations of points of interest selected along a betting object, such as a chip. A centre of the chip is determined for each chip in the region of interest (e.g., bet volume or stack of chips). For example, a centroid can be calculated to determine the centre of the chip. The location of the chip centre can be used in quantifying the number of bet objects (e.g., chips) for each object type (e.g., chip type). Histogram generator 224 generates histogram data for each channel for each point of interest extracted. The histograms for each point of interest are concatenated and a single histogram for each point of interest is generated.

Figure 76:
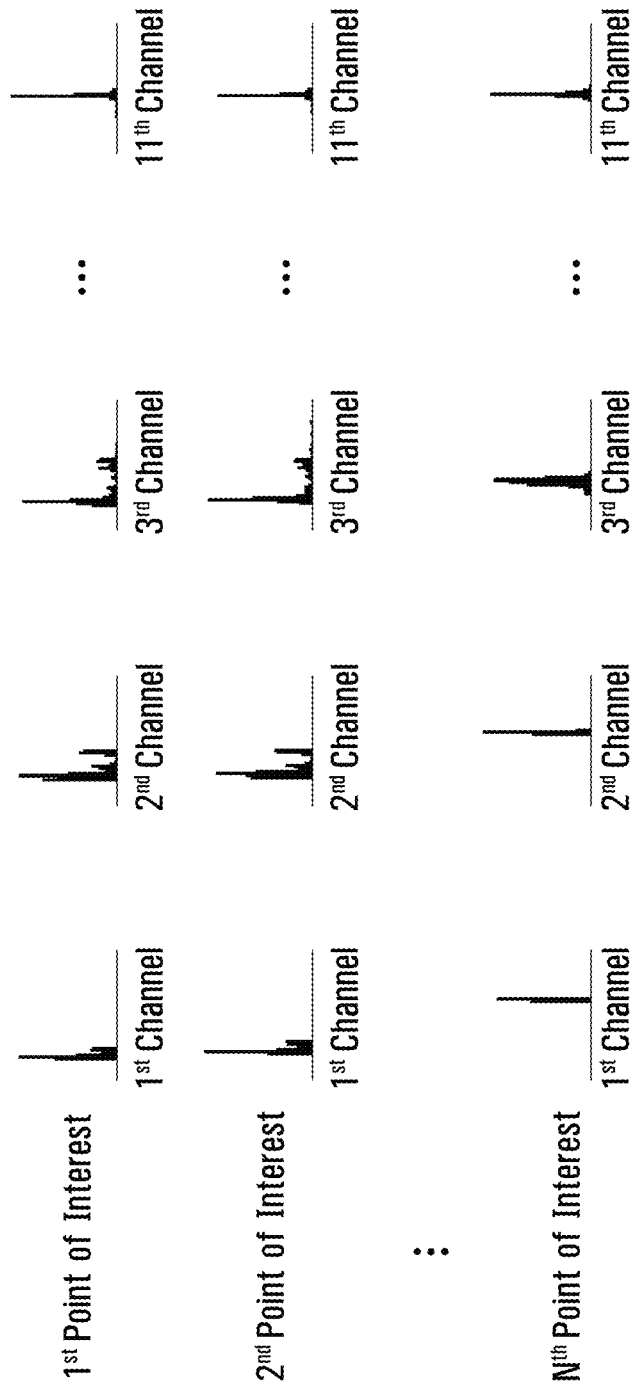
FIG. 76 is an example diagram depicting each histogram generated for points of interest according to some embodiments.

FIG. 76 is an example diagram depicting each histogram generated for each point of interest. Each histogram depicts gradient (e.g., horizontal) information of image data collected or generated from a single channel. A channel can be a selection of wavelengths captured by imaging component 202 or additional channels generated from same, for example, using a gradient analysis. The gradients can be represented by a histogram plotting numerical equivalents of colour intensity, for example. The histograms for each channel for a single point of interest can be concatenated.

Figure 77:
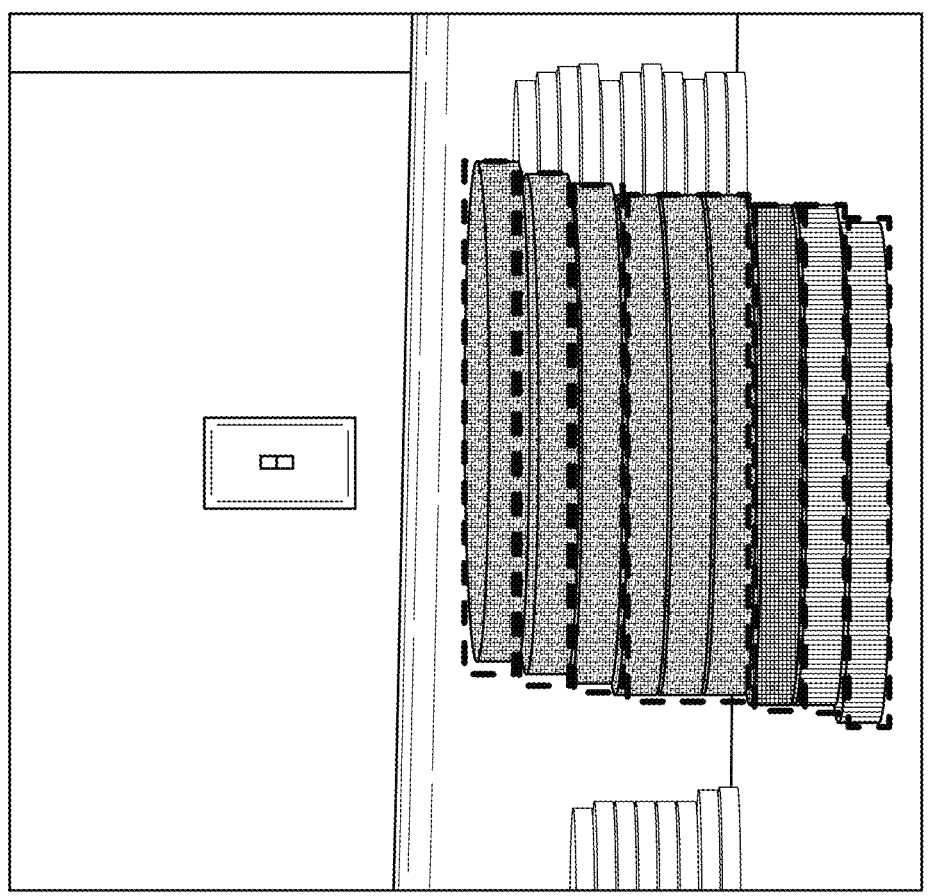
FIG. 77 is an image of an example depiction of image data used for classification of regions of interest according to some embodiments.

FIG. 77 is an image of an example depiction of image data or regions of interest used for classification of each region of interest. A single region of interest depicted includes a single bet volume (e.g., one chip, a plurality of chips, or a bet volume). A dealer or administrator can engage with system 1108, for example, at administrative interface subsystem 212, and label each bet volume for one or more betting objects or components of image data. The labelled image data (and corresponding histogram data) can be received by image recognizer engine 206, which can train one or more classifiers using the data. This can enable later classification of a bet volume, chip, or chip stack by chip type, for example, denoting colour and/or value.

In some embodiments, a classifier can be trained using received labelling, where a data indicating a point on a chip is received and used by processor 204 to define a point of interest and a window including the point of interest and, for example, of a height and width at least similar to the chip's size. The window can be used by processor 204 (e.g., while training a classifier) for defining data with which to generate a histogram for the point of interest. Processor 204 is configured in some embodiments to extract features at each point of interest, for example, using the corresponding histogram data. In some embodiments, processor 204 can train a random forest classifier using received labels, for example, corresponding to chip type, on an image such as a betting object in a region of interest.

Figure 78:
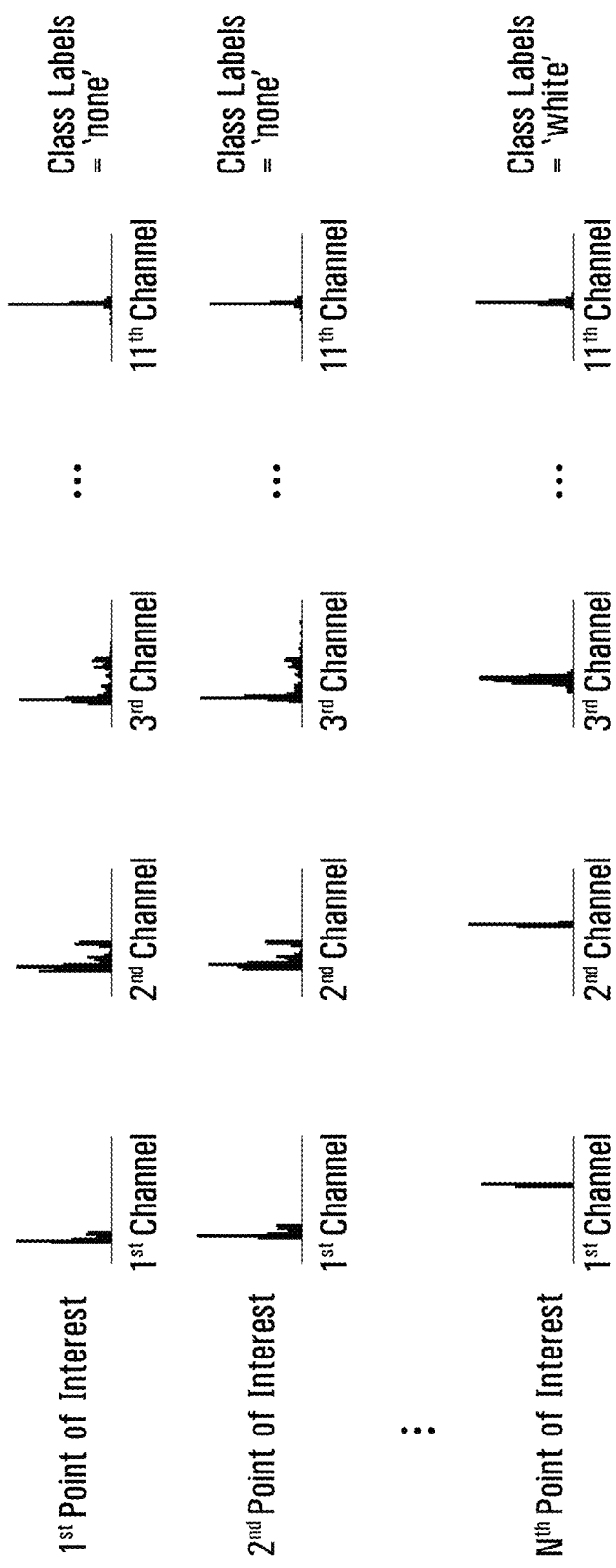
FIG. 78 is a diagram of an example classification for points of interest based on the histogram data for each point of interest.

FIG. 78 is a diagram of an example classification for each point of interest based on the histogram data for each point of interest. Image recognizer engine 206 can use a trained classifier to classify each histogram corresponding to each channel of a single point of interest. Image recognizer engine 206 can determine a dominant classification of the point of interest, for example, white, background, or none. A classification of "none" can result, for example, where the classifier does not reach a specified threshold of probability in that classification.

Figure 79:
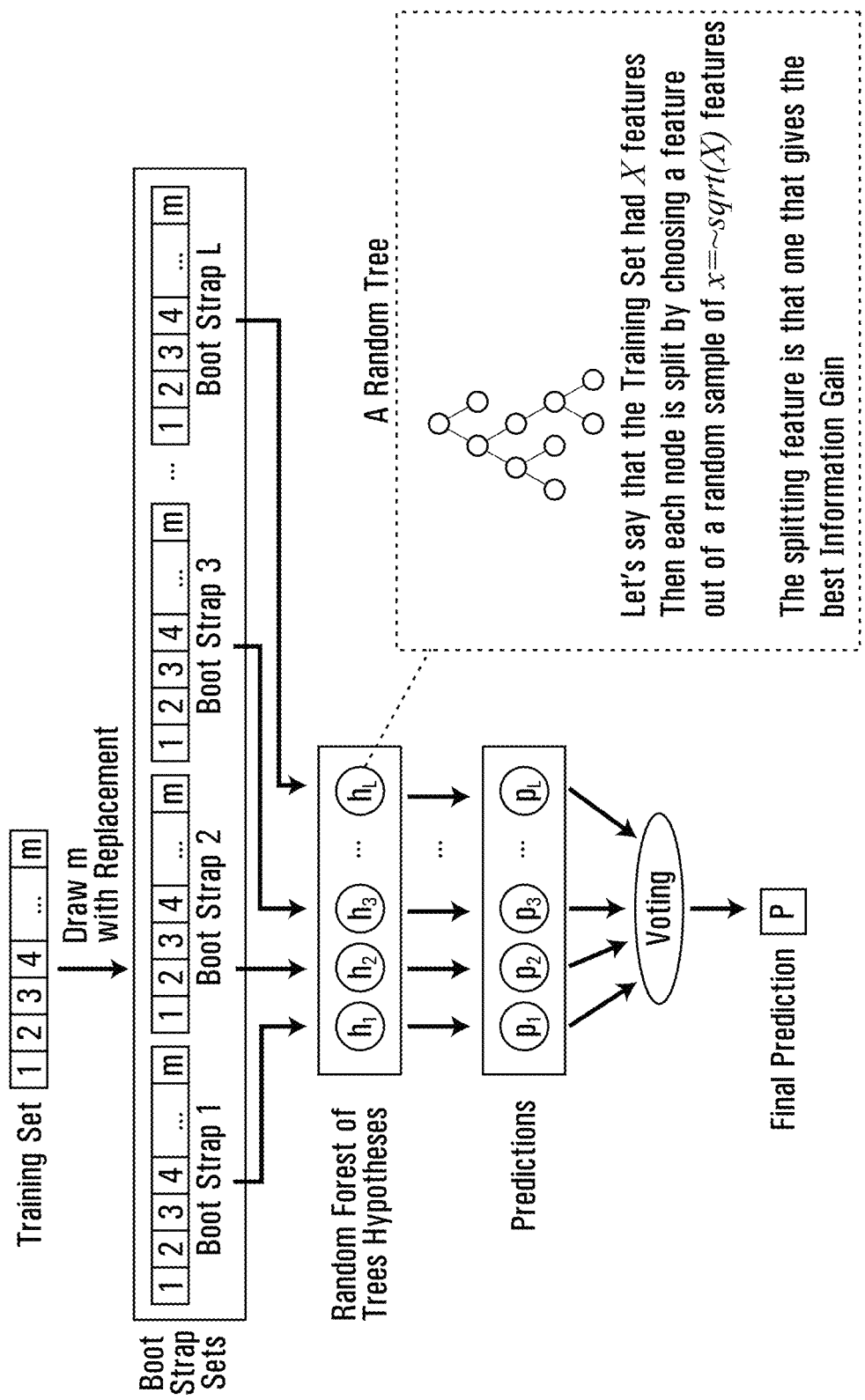
FIG. 79 is a diagram of an example process for training a classifier for predicting chip type.

FIG. 79 is a diagram of an example process for training a classifier for predicting bet volume type (e.g., chip type), for example, given histogram data (e.g., data encoding the horizontal gradient of image data) of a single point of interest. Random forest classifiers can be constructed each from a boot strap sample sets of the original training set, where training set values are sampled with replacement. Each random forest classifier can be constructed such that each node is split by choosing a feature out of a random sample of $x=\sim\sqrt{(X)}$ features. The feature at which a split is created can be selected as the feature that gives the best information gain or optimized tree. Image recognizer engine 206 can vote on a set of predictions from each random forest result, and a final prediction can be identified. Image recognizer engine 206 can provide the final prediction as a classification for the point of interest. The random forest can be constructed to optimize any or several of the following parameters: Criterion (the function to measure the quality of a split), Features (the number of features to consider when looking for the best split), Estimators (the number of trees in the forest), Minimum sample split (the minimum number of samples required to split an internal node, Maximum depth of tree (the maximum depth of the tree), and Bootstrap (whether bootstrap samples are used when building trees).

In some embodiments, the trained random forest classifier is optimized during training in relation to at least one of (i) criterion for a decision split, (ii) a number of features for consideration for determining the criterion for the decision split, (iii) a number of trees in the forest, (iv) a minimum number of samples required to split an internal node, (v) a maximum depth of a tree, and (vi) use of bootstrap samples.

In some embodiments, the trained random forest classifier can determine dominant classifications of each row in the grid of the points of interest (e.g., corresponding to a chip) or dominant classification for a point of interest. For example, the dominant classifications are determined by utilizing a trained random forest classifier where the trained random forest classifier includes a plurality of classification trees and each representative histogram is classified by a classification identified by a majority of the plurality of the classification trees. In some embodiments, the dominant classifications are determined by utilizing a trained random forest classifier and the trained random forest classifier includes a plurality of classification trees and each representative histogram is classified by a classification identified by a majority of the plurality of the classification trees.

In some embodiments, the dominant classification for each row in the grid of the points of interest is determined by a classification type representing a largest proportion of the points of interest in the row in the grid. For example, this is determined by majority voting in some embodiments.

Figure 80:
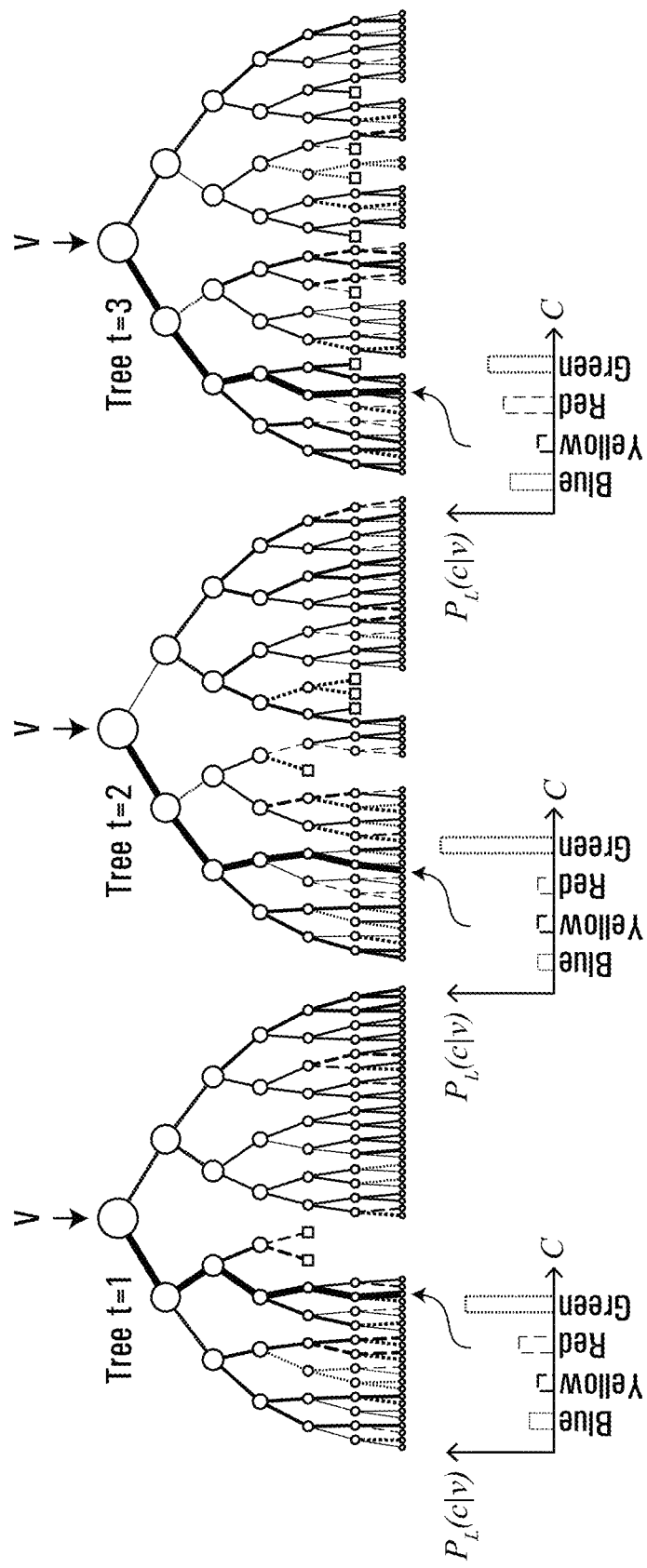
FIG. 80 is a diagram of example decision trees used by random forest classifiers for classifying a point of interest according to some embodiments.

FIG. 80 is a diagram of example decision trees used by random forest classifiers for classifying a point of interest based on histogram data plotting horizontal gradients of a single channel. A final prediction can be generated based on a voting determination amongst the predictions from each tree, where each tree is generated using a bootstrap sample of the training data. The training data can include points of interest classifications and their corresponding histogram data.

FIG. 81 is a diagram of an example mapping between classification names and colour representations. For example, image recognizer engine 206 can associate colour name "0001-white" to classification data "0 0 1" generated by a classifier.

Figure 82:
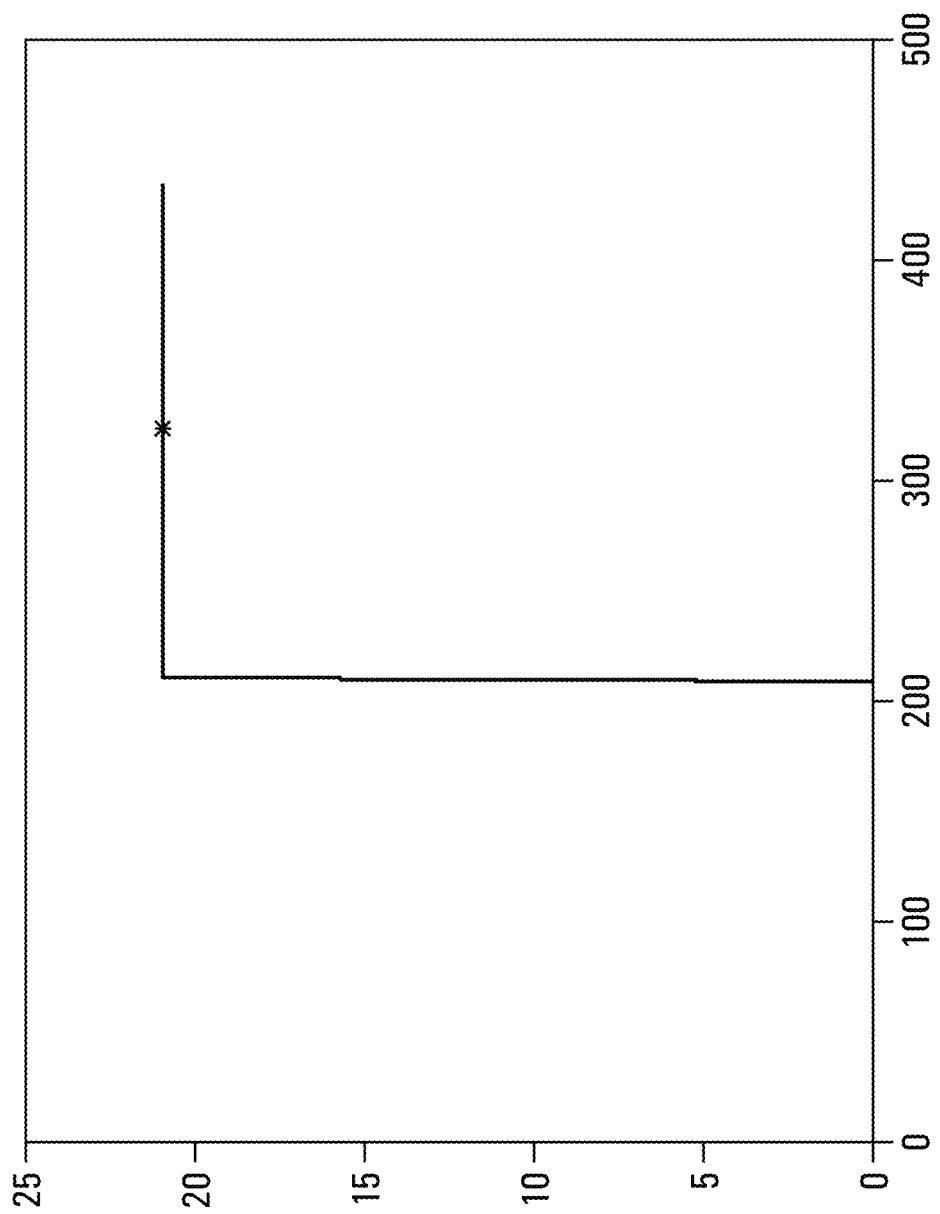
FIG. 82 is a diagram of an example depiction for a chip quantification process by bet recognition system according to some embodiments.

FIG. 82 is a diagram of an example depiction for a chip quantification process by image recognizer engine 206. Points of interest are depicted in an x-direction. The median value can be selected as an indicator of the centre of a chip in a bet volume.

Figure 83:
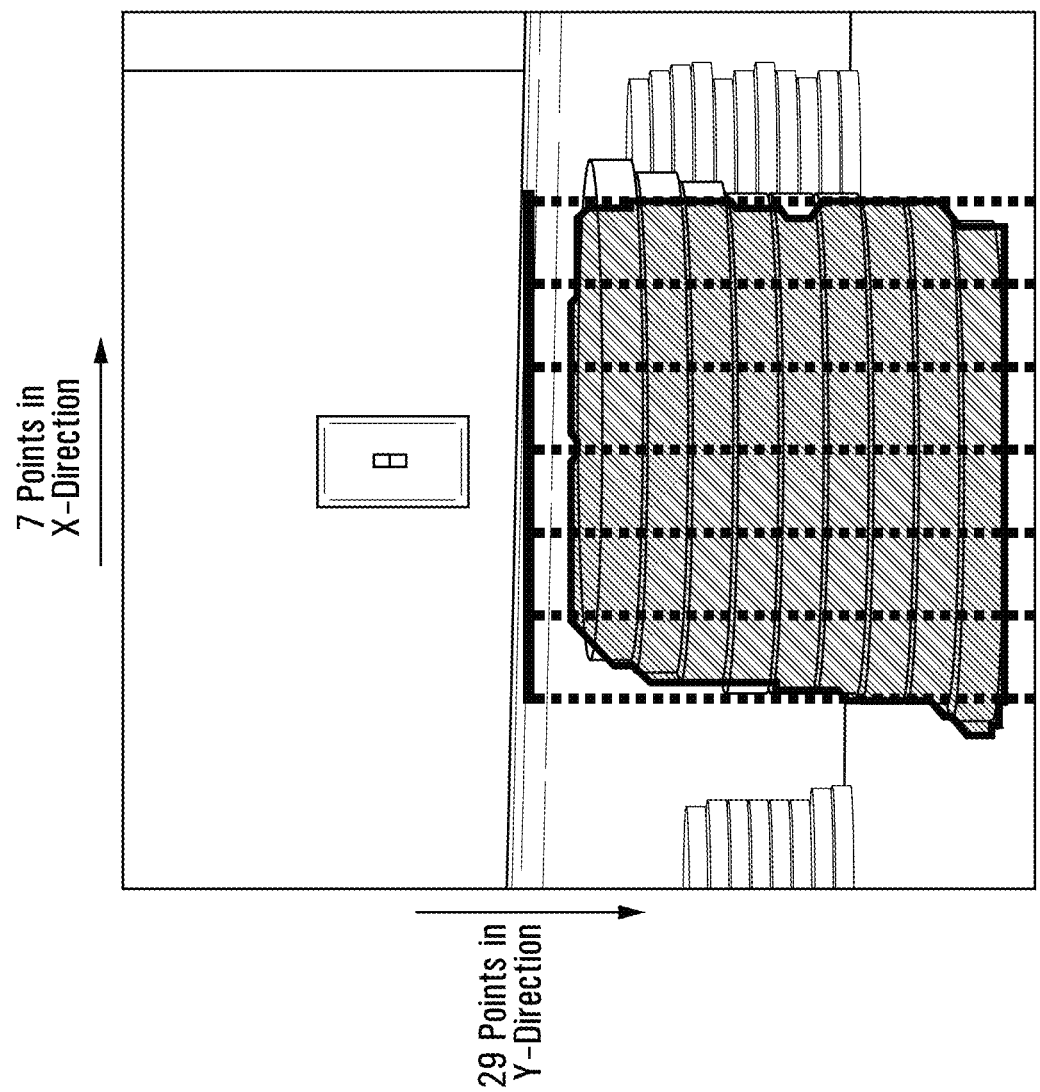
FIG. 83 is a diagram of an example depiction for a chip quantification process by bet recognition system according to some embodiments.

FIG. 83 is a diagram of an example depiction for a chip quantification process by image recognizer engine 206. Image recognizer engine 206 can determine the most frequently occurring value in each row of points of interest. This can be the dominant classification for the chip corresponding to that row of points of interest. Image recognizer engine 206 can determine the top of the stack of chips and use height, width, and image information to quantify the number of chips of each type in a chip stack. This can be facilitated by determining the centroid and height of each bet or chip volume, for example. A chip volume determined as including a stack of chips having similar classifications.

In some embodiments, bet recognition system 200 or one or more components thereof (e.g., image recognizer engine 206) can determine one or more quantities of the one or more chip types of the one or more chips in one or more betting areas. This determination can be made by a process including identifying one or more chip volumes within a vector representation by grouping similar classifications in the vector representation (each chip volume representing a stack of chips having similar classifications); determining a centroid for each chip volume of the one or more chip volumes; identifying a height for each chip volume; and estimating a number of chips in each chip volume by comparing the centroid and the height of each chip volume with the physical geometric characteristics of the one or more chip types. The estimated number of chips in each chip volume can be utilized to determine the one or more quantities of the one or more chip types.

Figure 84:
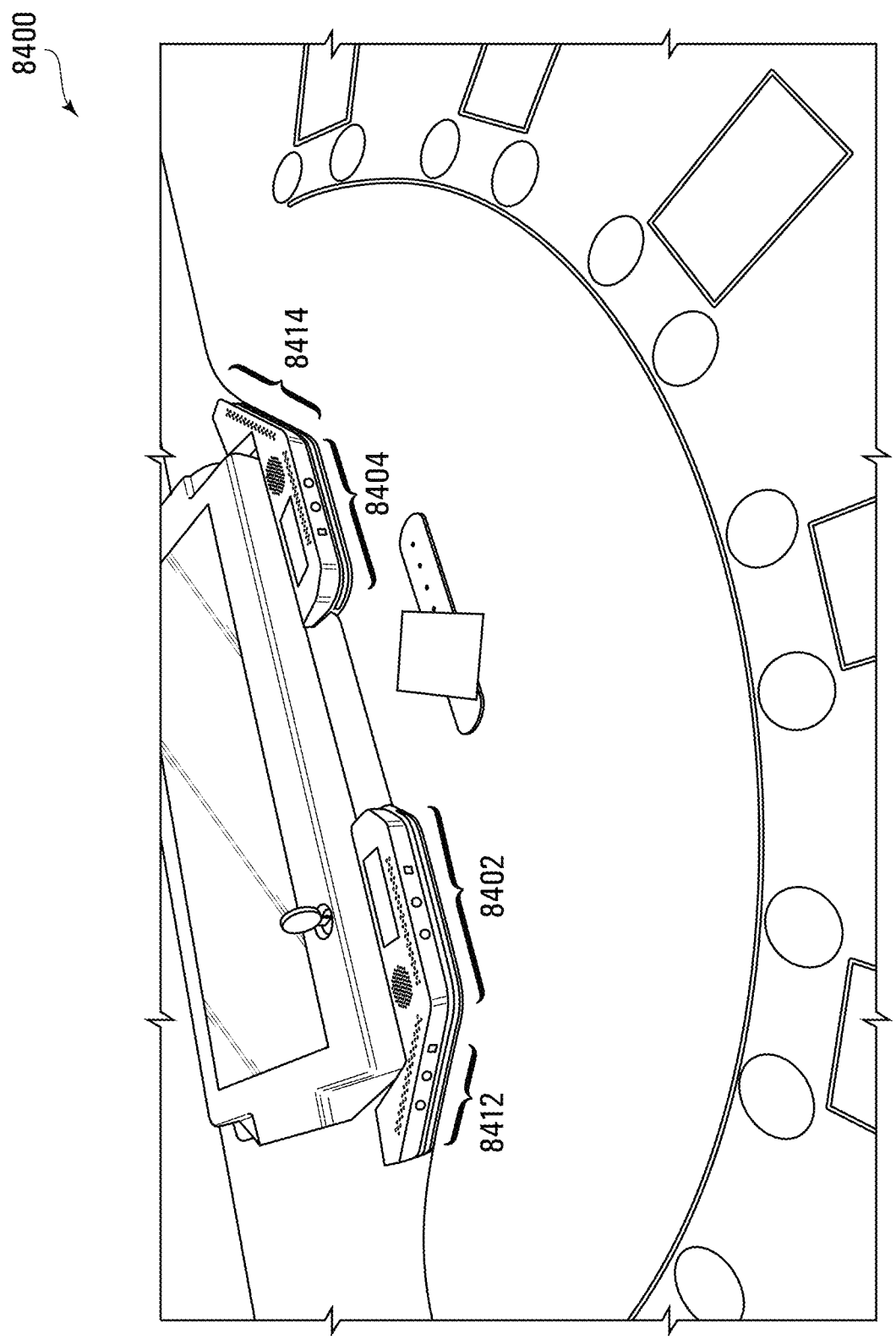
FIG. 84 is a photograph of several illuminating components (e.g., LEDs) in use that are full colour and customizable for one or more tables, according to some embodiments.

In some embodiments, imaging components 202 can function in conjunction with or synchronization with illuminating components. Illuminating components are customizable to provide illumination in various colours, among others. As an example, FIG. 84 at 8400 depicts having several illuminating components 8402, 8404 (e.g., LEDs) in use that are full colour and customizable for one or more tables, according to some embodiments. Each of the illuminating components 8402, 8404 is associated with a corresponding spread 8412, 8414.

Figure 85:
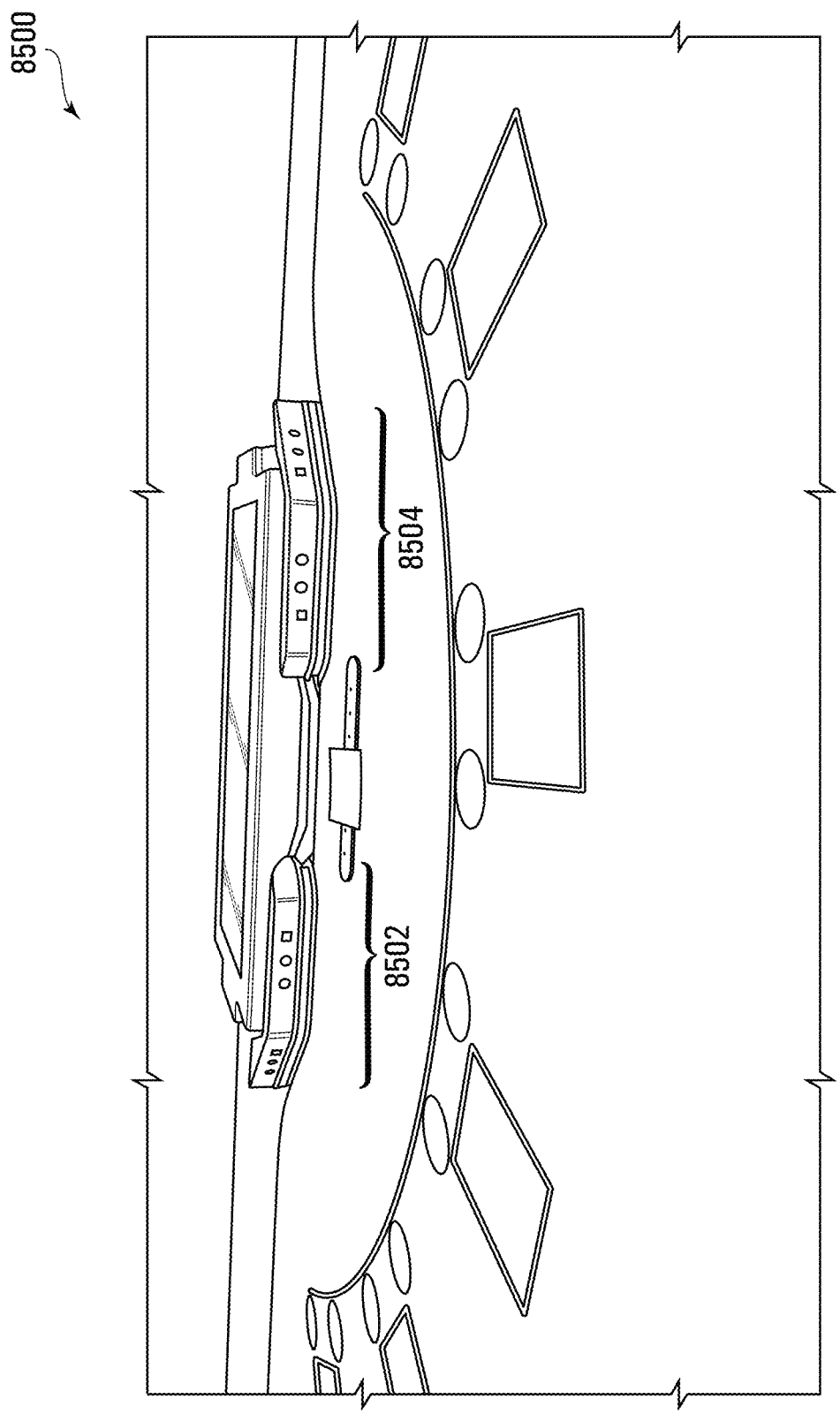
FIG. 85 depicts several illuminating components (e.g., LEDs) in use that have spreads of different color respectively, according to some embodiments.
Figure 86:
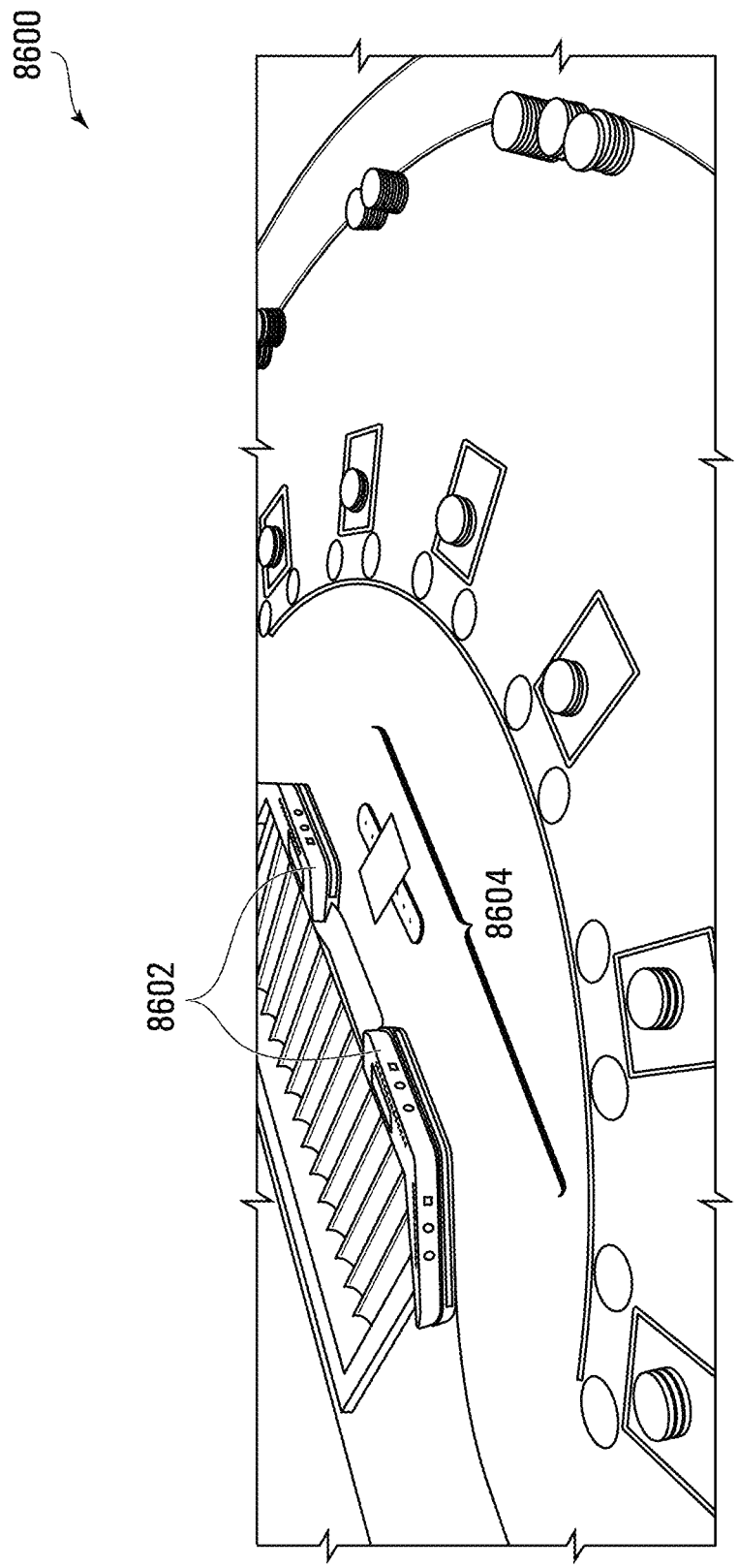
FIG. 86 depicts illuminating component with a custom color, according to some embodiments.
Figure 87:
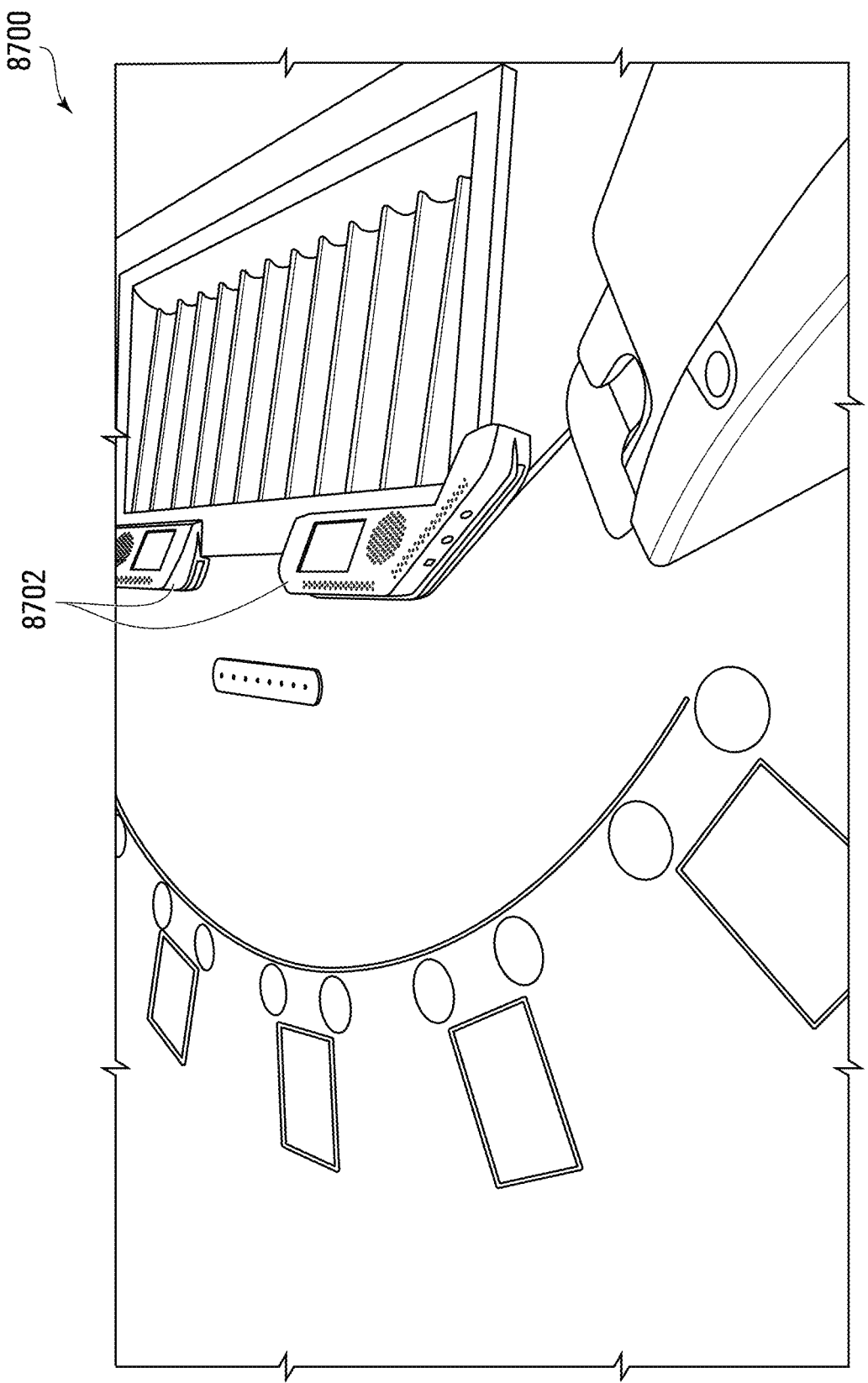
FIG. 87 is a photograph of illuminating component, depicting illuminating component from a perspective view, according to some embodiments.

Customizable levels of brightness and color are useful where an operator is seeking to configure the system in accordance with a desired theme or visual effect. FIG. 85 at 8500 having several illuminating components 8502, 8504 (e.g., LEDs) in use that have spreads of different color, respectively, according to some embodiments. FIG. 86 at 8600 depicts illuminating component 8602 with a custom color 8604, according to some embodiments. FIG. 87 is a photograph 8700 of illuminating component 8702, depicting illuminating component 8702 from a perspective view, according to some embodiments.

Figure 88:
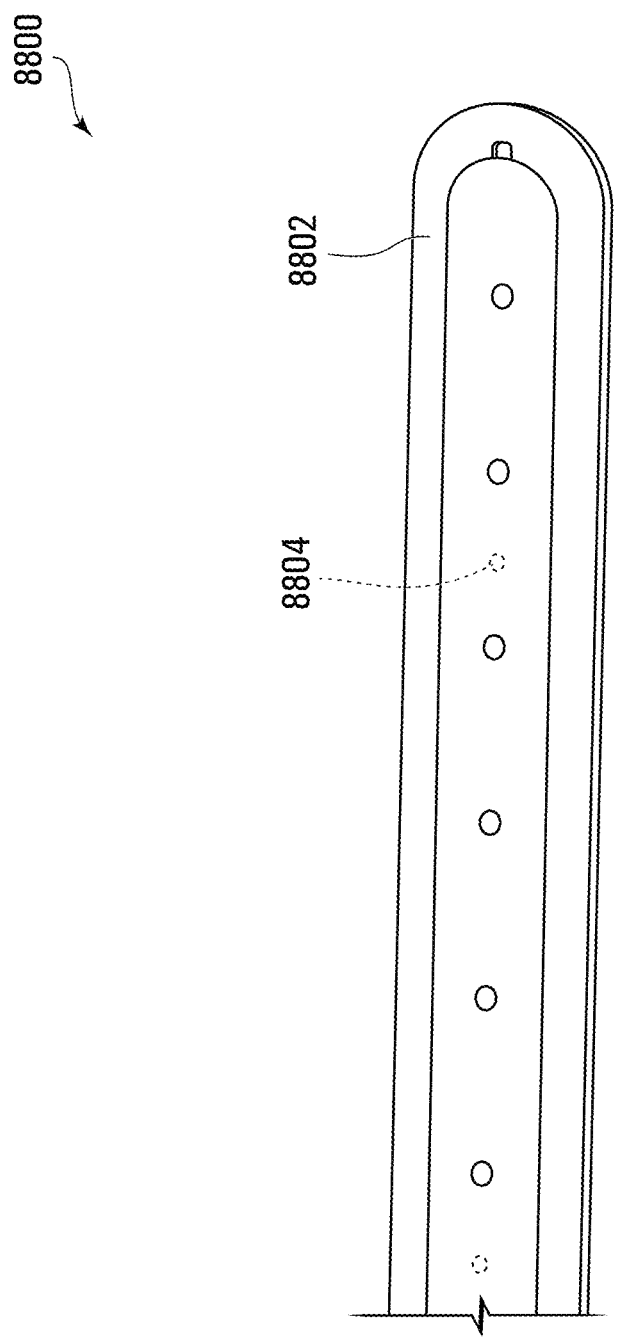
FIG. 88 is an overhead photograph of physical hand count indicator, according to some embodiments.

FIG. 88 is an overhead photograph 8800 of physical hand count indicator 8802, according to some embodiments. In this example, the physical hand count indicator 8802 includes an indicator light 8804 that is indicates to a dealer that the system is running, and/or when a particular hand is open or closed (8804 may be in a different color than 8802, for example). Other indicators are possible, for example, there may be indicator elements that indicate when the system is running at a high level of accuracy or confidence, or others that indicate when a dealer's movements or positioning is suboptimal and potentially impeding the proper operation of the system.

Figure 89:
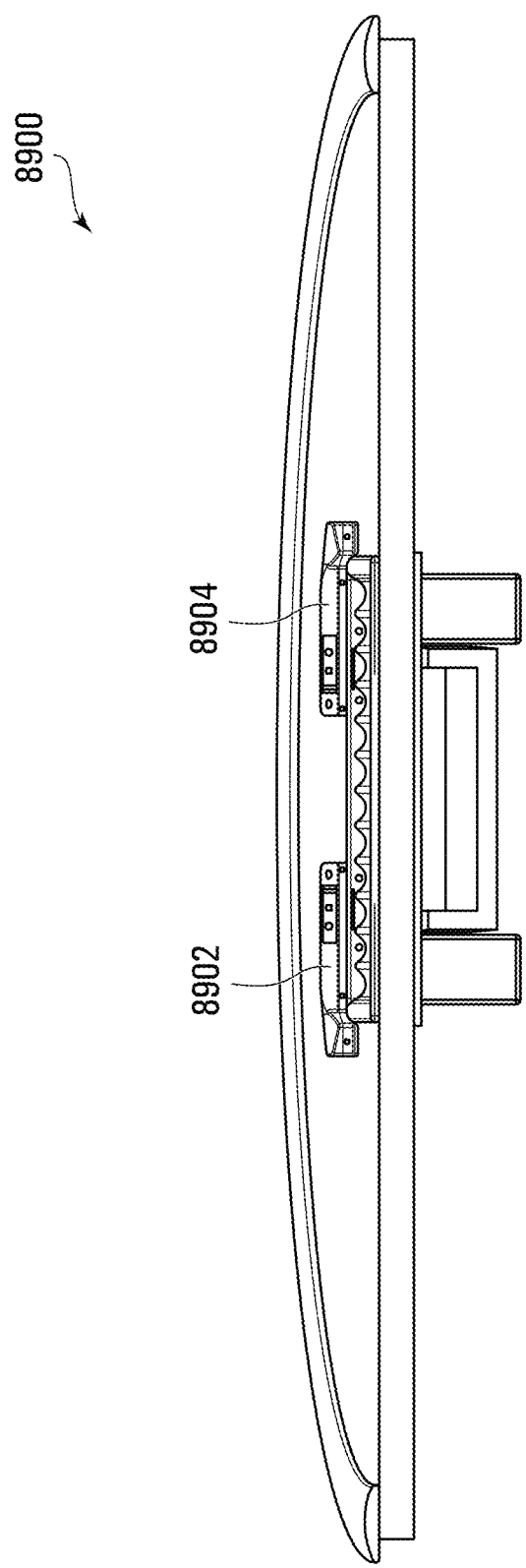
FIG. 89 is a rear perspective view of a bet recognition device that is mounted on a table surface, according to some embodiments.

FIG. 89 is a rear perspective view 8900 of a bet recognition device 30 that is mounted on a table surface, according to some embodiments. As illustrated in this example, the bet recognition device 30 includes two different bet recognition devices 8902 and 8904, which are positioned to obtain images of the gaming elements placed within their field of view. There may be more bet recognition devices, and the fields of view are not always mutually exclusive. For example, increased accuracy may be obtained by providing bet recognition devices where the fields of view overlap.

Figure 90:
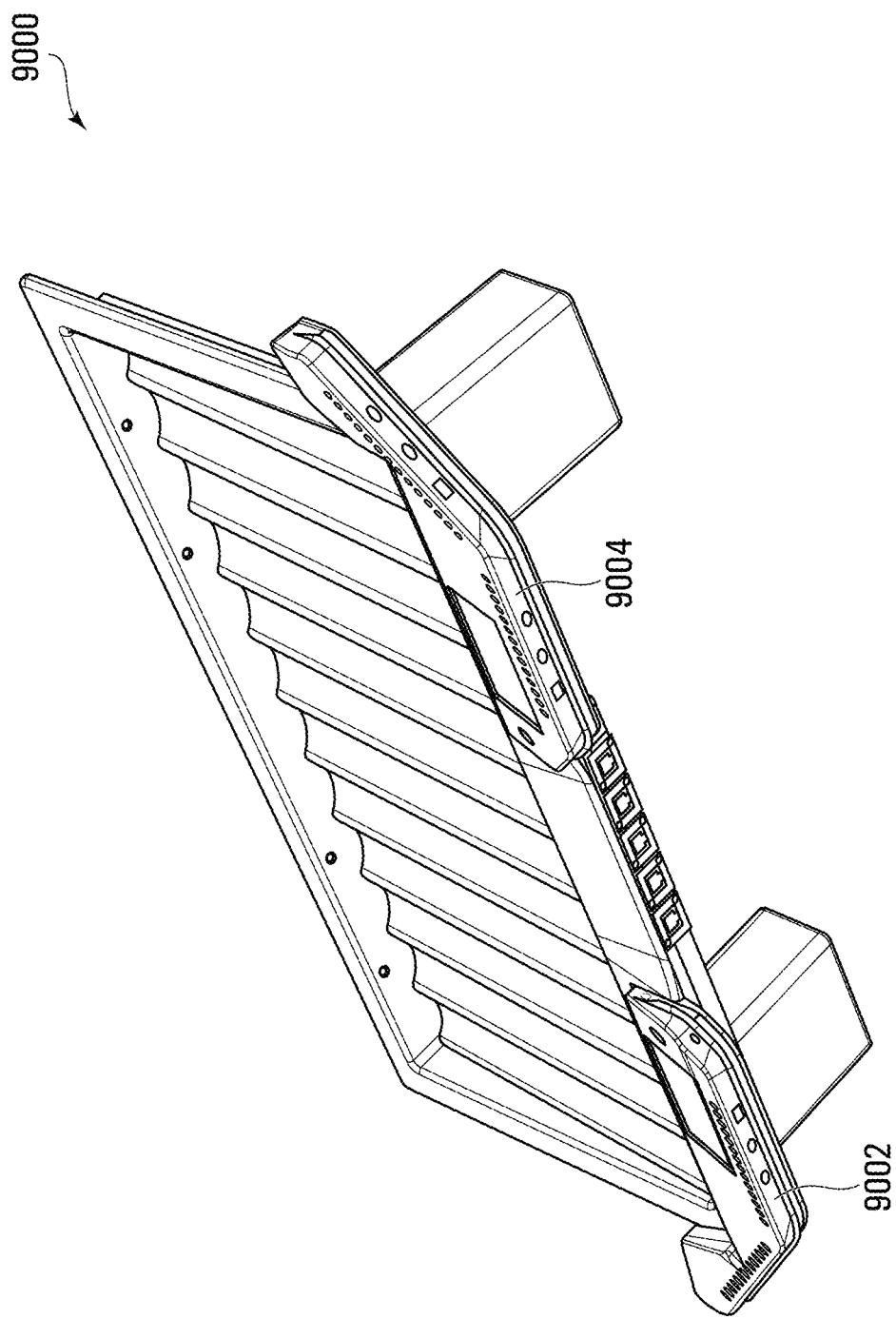
FIG. 90 is a perspective view of a bet recognition device, according to some embodiments.

FIG. 90 is a perspective view 9000 of a bet recognition device 30 whereby the bet recognition device 30 include one or more interface areas 9002 and 9004 which are in electronic connection to either a backend game monitoring server 20 or a local game monitoring device/memory proximate bet recognition device 30. The interface areas 9002 and 9004 may contain displays which are controlled for rendering visual elements indicative of various information processed in relation to gaming, for example, in relation to betting activity. Where the one or more interface areas 9002 and 9004 are in electronic connection with a connection to either a backend game monitoring server 20 or a local, directly obtained betting information can be displayed. In some embodiments, accuracy and tracking information can be provided so that a dealer or other operator can, in real or near real-time, monitor how information associated with bet recognition device 30, such as operational history, fraud/theft detection, bet/comp amounts, average bet per hand, average bet per game, estimated accuracy level (e.g., based on quality of illumination), among others.

The interface areas 9002 and 9004 in some embodiments are touchscreens. The touchscreens may be utilized, for example, by a dealer to copy and move players across players position directly from the touchscreens. The copy and move functionality is useful as it facilitates convenient tracking of players as they move from seat to seat, and in some embodiments, the interface areas 9002 and 9004 allow for a single player to play multiple betting positions each round of play. From a complementary item providing and/or player profile tracking perspective, such a system may be particularly useful as it aids in obtaining more accurate play information. For example, a single player may wish to play in multiple spots at once in a game (e.g., playing three different seats at a Blackjack table), or may wish to move from seat to seat (e.g., because of a superstition that a particular seat is of better luck). To Applicants' knowledge, such features are not available in conventional player profile tracking systems and in both situations, opportunities may be missed for player profile tracking.

Figure 91:
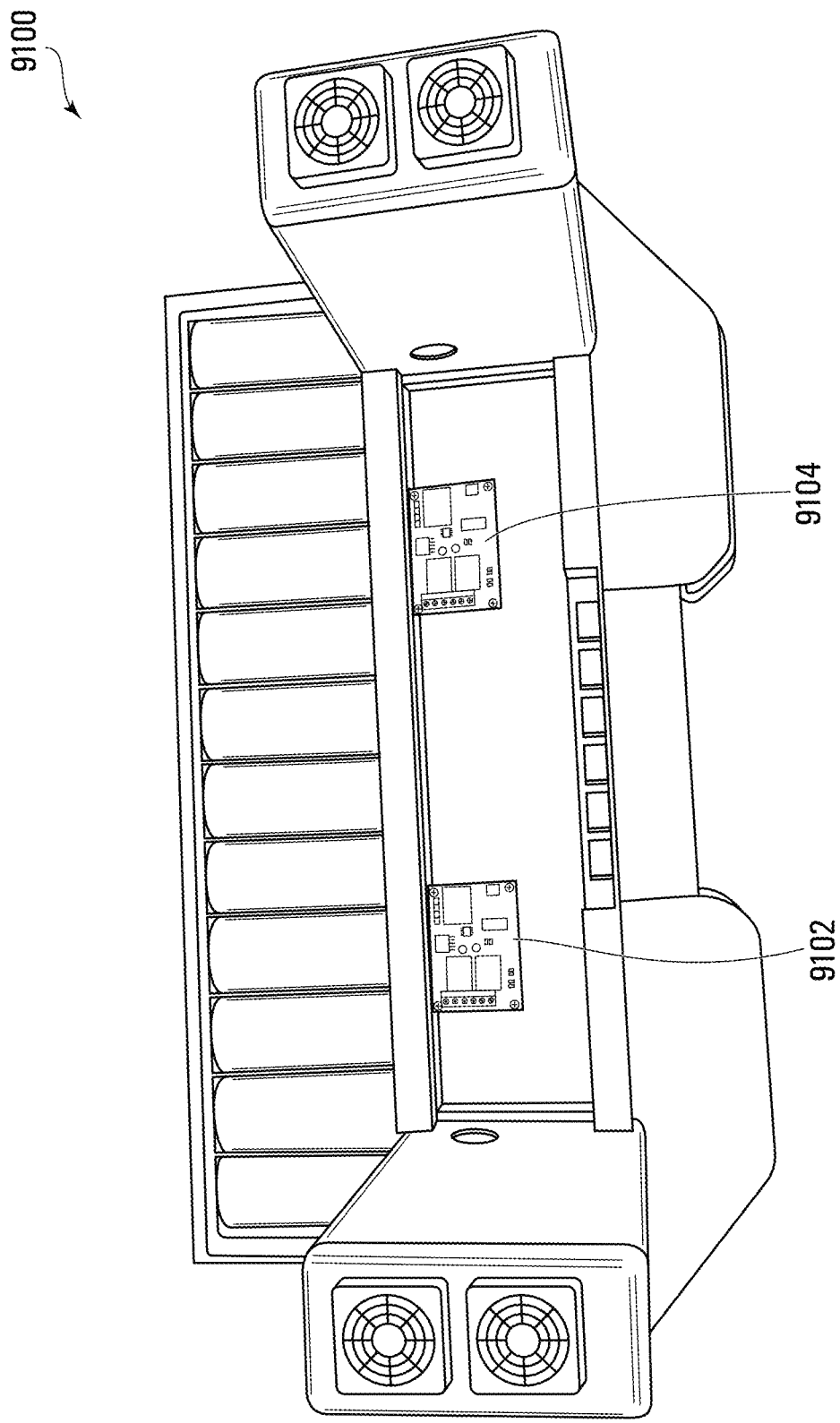
FIG. 91 is an overhead photograph illustrating two controllers, each being used to drive the bet recognition devices, according to some embodiments.

FIG. 91 is an overhead photograph 9100 illustrating two controllers 9102 and 9104, each being used to drive the bet recognition devices 30, according to some embodiments. The two controllers may have one or more memory modules, and may operate either individually or in combination.

Where the two controllers are operating in combination, the controllers may be configured for redundant failover, accuracy comparisons (e.g., where there are overlapping fields of view), bet data aggregation, among others. For example, if there are one or more controllers whose fields of view encompass all bet areas on a gaming surface, the one or more controllers, in communication with one another, may be configured to obtain and/or process data that can be utilized to model the entirety of the betting activity that is taking part on the table (assuming that that bet markers are visible relative to each of the optical systems), among others.

Figure 92:
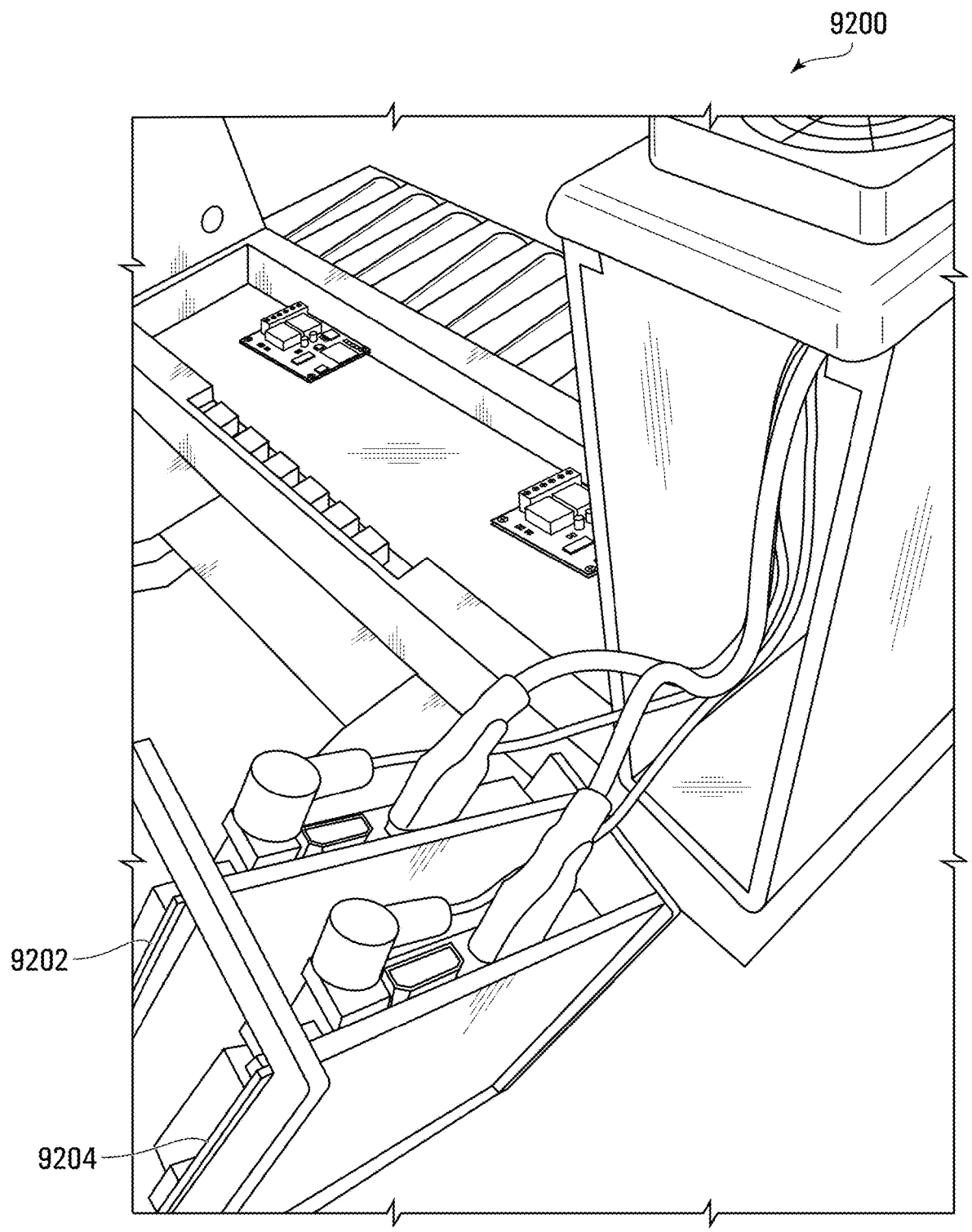
FIG. 92 is a photograph illustrating potential connections between the one or more processors according to some embodiments.

FIG. 92 is a photograph illustrating potential connections between the one or more processors according to some embodiments. In FIG. 92, at 9200, two processors 9202 and 9204 are shown. Where there is a failure, the other processor may be able to provide failover support.

Figure 93:
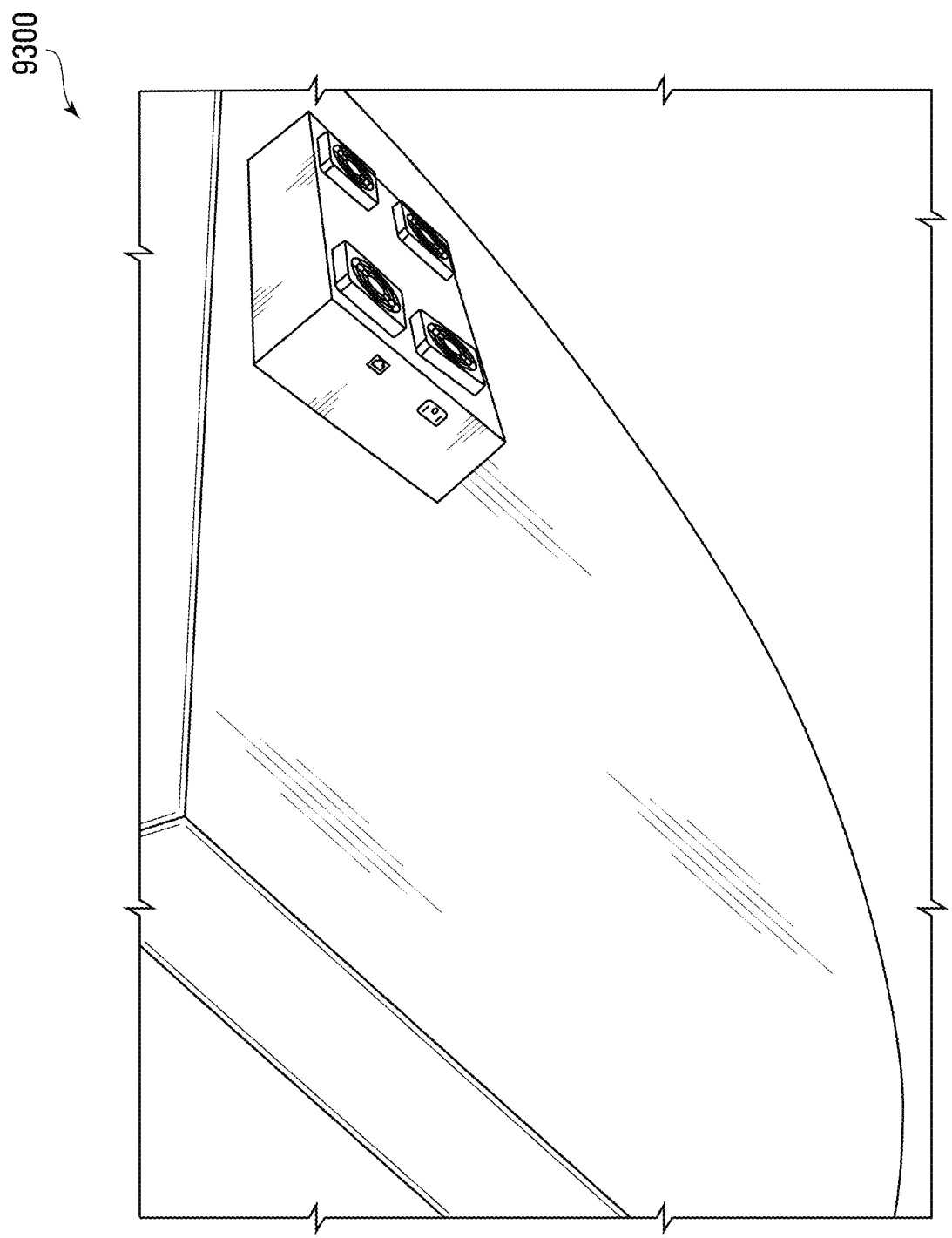
FIG. 93 is a photograph of a table without felt, illustrating areas upon which a physical retrofit can be applied to connect bet recognition device.
Figure 94:
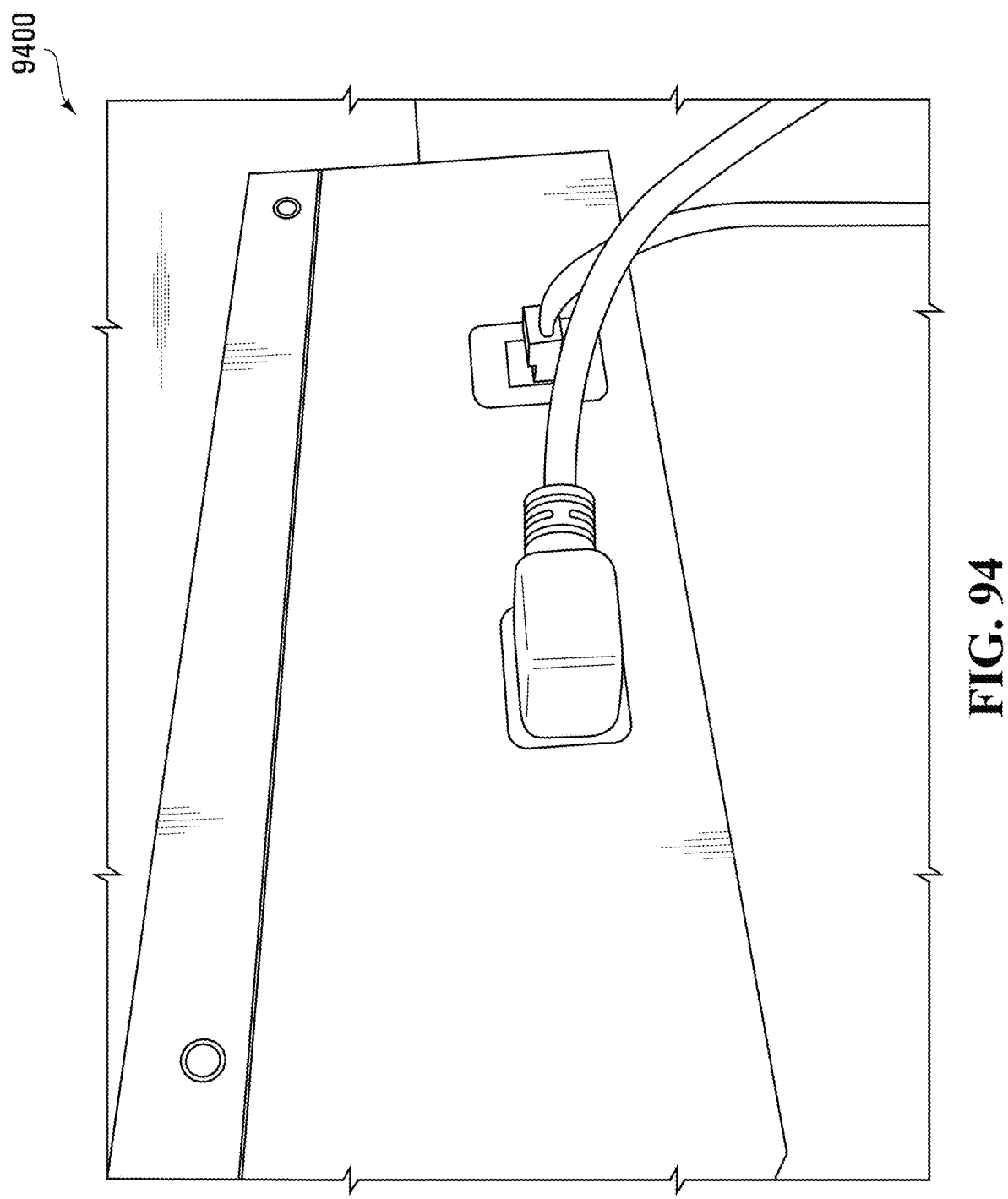
FIG. 94 is a photograph of under table connectors, according to some embodiments.

FIG. 93 is a photograph 9300 of a table without felt, illustrating areas upon which a physical retrofit can be applied to connect bet recognition device 30. FIG. 94 is a photograph 9400 of under table connectors. In this photograph, a power port and an Ethernet connector port are shown along with wires for connectivity. Various alternative computer configurations are possible (e.g., with an internal manageable network switch for one or more the networking addresses generated within an enclosure).

Figure 95:
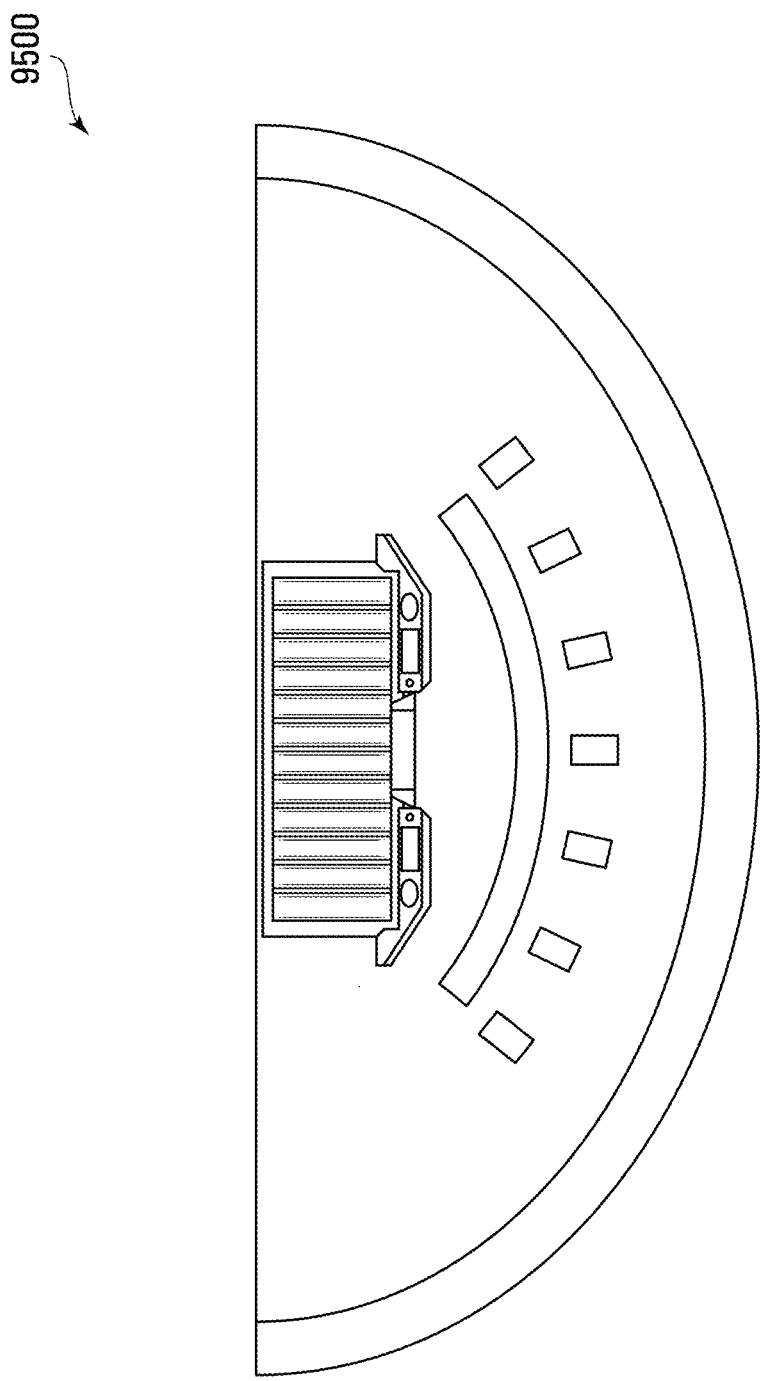
FIG. 95 is a rendering showing two interfaces that may be connected to bet recognition devices, according to some embodiments.
Figure 96:
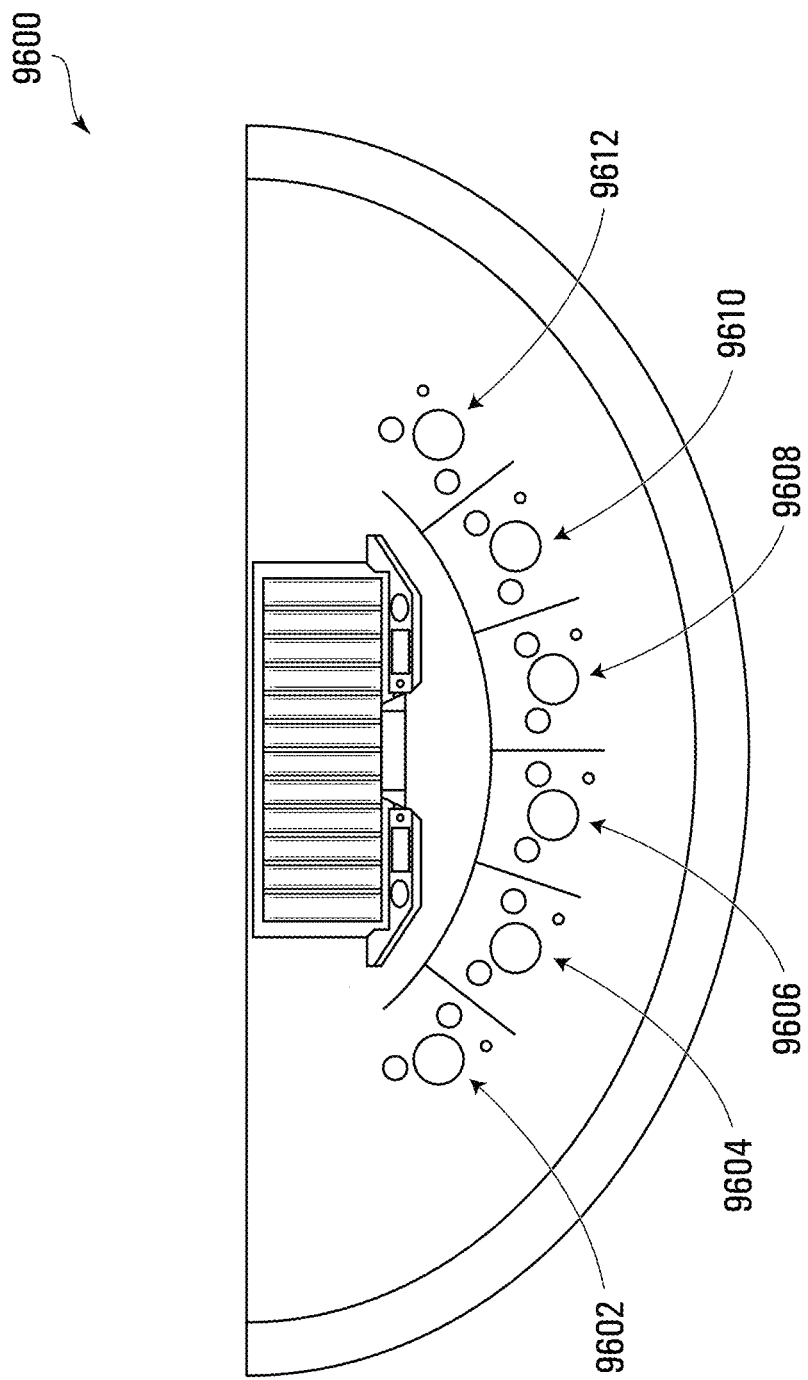
FIG. 96 illustrates an example playing surface with betting areas.

FIG. 95 is a rendering 9500 showing two interfaces that may be connected to bet recognition devices 30, according to some embodiments. FIG. 96 illustrates an example playing surface 9600 with betting areas 9602, 9604, 9606, 9608, 9610, and 9612.

In some embodiments, system 1008 including any one or more of its components, for example, processor 204, is implemented using one or more field-programmable gate arrays (FPGAs). This can allow for customized configuration and improved processing performance, including improved processing speed or improved time for transmission of data. This can allow for faster (and more useful) image processing and classification and quantification of bet objects, including chips or chip stacks.

An example embodiment of system 1008 will now be described. In the example embodiment, system 1008 is installed at a betting surface. Multiple imaging components are positioned in relation to the betting surface, including with overlapping fields of view. System 1008 is configured to capture frames of RGB images, infrared images, and depth images. Here, depth images can be generated by using time of flight sensors, structured light sensors, and/or triangulation based methods using stereo images. System 1008 is configured to extend the plurality of channels by transforming captured image data from RGB to a different colour space where luminance is decoupled from chrominance, the transformations yielding additional channels.

In the example embodiment, image processing engine 204 is configured to select a key frame from the stream of images across the captured channels based on depth values. Here, the goal is to remove all the frames that have some obstruction between the cameras and the bet spots on the table. Once the clean frames are identified, the average of the corresponding channels is taken to suppress any obstruction left. This whole process is repeated for all the bet areas within their defined region of interest. A region of interest is defined by image processing engine 204 as an area meeting threshold depth values. Image processing engine 204 is configured to generate different channels based on the derived key frame in RGB, depth and IR space. Image processing engine 204 is configured to preprocess the key frame, including generating data encoding rotation and scale invariant versions of the key frame before generating other channels.

In some embodiments, image processing engine 204 is configured to calibrate image data of the same gaming objects to generate depth data. In some embodiments, image processing engine 204 uses other image data, for example, IR data, in combination to generate depth data, decide how far away an object is, or decide on an object's location. In some embodiments of the example embodiment, image processing engine 204 determines a distance of an object based on how light or a light pattern warps over an object as captured by an IR imaging component. This distance information is compared with other distance information of the same object captured by a separate imaging component located a known distance away. In some embodiments of the example embodiment, two RGB cameras are used to generate depth information using triangulation.

In the example embodiment, image processing engine 204 is configured to extract and generate data to produce a horizontal gradient of at least the red, green, and blue channels. Image processing engine 204 is then configured to perform chip localization by generating an image from the key frame with the portions of the background of the image removed by removing data encoding portions of the key frame that do not meet one or more threshold depth values.

In the example embodiment, point of interest extractor 222 is configured to select and extract data encoding points of interest within the key frame. These points of interests are used to generate histogram-based descriptors that are used by the classifier to predict the type of a betting object, such as a chip type.

In the example embodiment, points of interest are selected by point of interest extractor 222 within a region of interest. Point of interest extractor 222 is configured to select points of interest using equal spacing in a horizontal direction within the region of interest. Additional points of interest can be selected using equal spacing in a vertical direction within the region of interest. In some embodiments, the respective equal spacings can be different in horizontal and vertical directions.

In the example embodiment, histogram generator 224 is configured to generate a histogram at each point of interest, with each histogram for a single point of interest corresponding to data from one or more of the channels. Each histogram for a single point of interest is generated based on a small selection of image data encoding the portions of the image immediately adjacent to the point of interest.

In the example embodiment, a 3×3 Sobel operator is applied to one or more channels (e.g., the R, G, and B channels and/or other channels) of image data of the region of interest to generate a gradient. In some embodiments, other operators can be used to generate gradient data.

In the example embodiment, histogram generator 224 is configured to generate a single descriptor of all channels against each point of interest by concatenating each histogram for each channel corresponding to a single point of interest. This concatenation or association of all histogram data for each point of interest can provide a more robust dataset for classification of chip type by a trained classifier (or, in the context of the generation of a trained classifier, can provide a more robust dataset for feature selection and training of a classifier).

This may help minimize noise in the representation or storage of the image data or portions of the image data.

In the example embodiment, random forest classifier 226 is configured to use the concatenated histogram for a single point of interest for feature extraction.

In the example embodiment, a gradient is calculated using a 3×3 Sobel operator on one or more channels, for example, the R, G, and B channels and/or channels in other colour spaces in order to generate horizontal gradients of the image data to capture the vertical texture in the bet objects, bet volume, or chips.

In the example embodiment, image recognizer engine 206 is configured to identify a dominant classification for each row in a grid of the points of interest. The dominant classification is determined by majority voting or selection of the most frequently classified type amongst the classified types for each point of interest in the row.

In the example embodiment, image recognizer engine 206 is configured to determine one or more quantities of one or more chip types in a chip stack in the key frame image using the dominant classifications and comparison to a physical geometric characteristic such as a centroid determined for each chip stack. Image recognizer engine 206 determines the centroid for a chip stack as the determined midpoint along an x-axis of a chip.

In the example embodiment, image recognizer engine 206 is configured to cause a data storage to maintain a data structure storing one or more data fields representative of the determined one or more quantities of one or more chip types of the one or more chips in the at least one betting area.

The foregoing discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references are made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements.

Although the embodiments have been described in detail, it should be understood that various changes, substitutions and alterations can be made herein.

Moreover, the scope of the present application is not intended to be limited to the particular embodiments of the process, machine, manufacture, composition of matter, means, methods and steps described in the specification.

As can be understood, the examples described above and illustrated are intended to be exemplary only.

What is claimed is:

1. A device for monitoring chip placement activities comprising:
   a camera or sensor capturing image data corresponding to one or more chips positioned in at least one chip placement area;
   a processor configured to segment the captured image data into one or more regions of interest, and to classify each region of interest based on an analysis of a corresponding representative histogram generated based on the captured image data corresponding to the region of interest;
   the processor further configured to identify one or more classifications for the one or more regions of interest positioned along a row or column for each row or column of regions of interest in the captured image data, each classification mapped to a corresponding row or column and recorded in a data structure and the one or more classifications, in aggregate, establishing a vector representation of the one or more chips in the at least one chip placement area;
   the processor further configured to determine one or more quantities of one or more chip types of the one or more chips in the at least one chip placement area by processing the vector representation based at least on a comparison with physical characteristics of the one or more chip types;
   a data storage configured to maintain an output data structure storing one or more data fields representative of the determined one or more quantities of the one or more chip types of the one or more chips in the at least one chip placement area; and
   wherein the captured image data is captured across a plurality of channels including at least a depth information channel, a red channel, a green channel, and a blue channel; and
   wherein each representative histogram is an aggregated histogram generated from combining histograms generated for each channel of the plurality of the channels.

2. The device of claim 1, further comprising a communication link configured for transmitting the output data structure or a subset of the output data structure to generate chip placement data including the one or more quantities of the one or more chip types for the at least one chip placement area.

3. The device of claim 1, wherein the plurality of channels includes an infrared channel.

4. The device of claim 1, wherein the processor is configured to extend the plurality of channels by transforming the captured image data from RGB to a different colour space where luminance is decoupled from chrominance, the transformation yielding additional channels in the plurality of channels.

5. The device of claim 1, wherein horizontal gradients are calculated using a 3×3 Sobel operator in order to capture one or more vertical textures in the one or more chips.

6. The device of claim 1, wherein the captured image data is represented by an aggregated frame corresponding to average image data of image data captured across a duration of time to reduce transient effects arising from temporary visual obstructions of the camera or sensor.

7. The device of claim 1, wherein the processor is further configured to pre-process the captured image data to apply at least one of rotation and scale invariance.

8. The device of claim 1, wherein the one of more classifications are determined by utilizing a trained random forest classifier; and wherein the trained random forest classifier is optimized during training in relation to at least one of (i) criterion for a decision split, (ii) a number of features for consideration for determining the criterion for the decision split, (iii) a number of trees in the forest, (iv) a minimum number of samples required to split an internal node, (v) a maximum depth of a tree, and (vi) use of bootstrap samples.

9. The device of claim 1, wherein the classification for each row or column of the regions of interest is determined by a classification type representing a largest proportion of the regions of interest in the row or column.

10. The device of claim 1, wherein the vector representation is a single dimensional array of values.

11. A method for monitoring chip placement activities, the method comprising:

capturing, by a camera or sensor, image data corresponding to one or more chips positioned in at least one chip placement area;

segmenting the captured image data into one or more regions of interest;

classifying each region of interest based on an analysis of a corresponding representative histogram generated based on the captured image data corresponding to the region of interest;

identifying one or more classifications for the one or more regions of interest positioned along a row or column for each row or column of regions of interest in the captured image data, each classification mapped to a corresponding row or column and recorded in a data structure and the one or more classifications, in aggregate, establishing a vector representation of the one or more chips in the at least one chip placement area;

determining one or more quantities of one or more chip types of the one or more chips in the at least one chip placement area by processing the vector representation based at least on a comparison with physical characteristics of the one or more chip types; and generating an output data structure storing one or more data fields representative of the determined one or more quantities of the one or more chip types of the one or more chips in the at least one chip placement area;

wherein the captured image data is captured across a plurality of channels including at least a depth information channel, a red channel, a green channel, and a blue channel; and wherein each representative histogram is an aggregated histogram generated from combining histograms generated for each channel of the plurality of the channels.

12. The method of claim 11, further comprising transmitting the output data structure or a subset of the output data structure to generate chip placement data including the one or more quantities of the one or more chip types for the at least one chip placement area.

13. The method of claim 11, wherein the plurality of channels includes an infrared channel.

14. The method of claim 11, further comprising extending the plurality of channels by transforming the captured image data from RGB to a different colour space where luminance is decoupled from chrominance, the transformation yielding additional channels in the plurality of channels.

15. The method of claim 11, wherein horizontal gradients are calculated using a 3×3 Sobel operator in order to capture one or more vertical textures in the one or more chips.

16. The method of claim 11, wherein the captured image data is represented by an aggregated frame corresponding to average image data of image data captured across a duration of time to reduce transient effects arising from temporary visual obstructions of the camera or the sensor.

17. The method of claim 11, further comprising pre-processing the captured image data to apply at least one of rotation and scale invariance.

18. The method of claim 11, wherein the one of more classifications are determined by utilizing a trained random forest classifier; and wherein the trained random forest classifier is optimized during training in relation to at least one of (i) criterion for a decision split, (ii) a number of features for consideration for determining the criterion for the decision split, (iii) a number of trees in the forest, (iv) a minimum number of samples required to split an internal node, (v) a maximum depth of a tree, and (vi) use of bootstrap samples.

19. The method of claim 11, wherein the classification for each row or column of the regions of interest is determined by a classification type representing a largest proportion of the regions of interest in the row or the column.

20. A non-transitory computer readable medium storing machine interpretable instructions, which when executed by a processor, perform a method for monitoring chip placement activities, the method comprising:

capturing, by a camera or sensor, image data corresponding to one or more chips positioned in at least one chip placement area;

segmenting the captured image data into one or more regions of interest;

classifying each region of interest based on an analysis of a corresponding representative histogram generated based on the captured image data corresponding to the region of interest;

identifying one or more classifications for the one or more regions of interest positioned along a row or column for each row or column of regions of interest in the captured image data, each classification mapped to a corresponding row or column and recorded in a data structure and the one or more classifications, in aggregate, establishing a vector representation of the one or more chips in the at least one chip placement area;

determining one or more quantities of one or more chip types of the one or more chips in the at least one chip placement area by processing the vector representation based at least on a comparison with physical characteristics of the one or more chip types; and generating an output data structure storing one or more data fields representative of the determined one or more quantities of the one or more chip types of the one or more chips in the at least one chip placement area;

wherein the captured image data is captured across a plurality of channels including at least a depth information channel, a red channel, a green channel, and a blue channel; and wherein each representative histogram is an aggregated histogram generated from combining histograms generated for each channel of the plurality of the channels.

* * * * *